US012498792B2

(12) United States Patent
Whitmire et al.

(10) Patent No.: US 12,498,792 B2
(45) Date of Patent: Dec. 16, 2025

(54) SYSTEMS FOR DETECTING GESTURES PERFORMED WITHIN ACTIVATION-THRESHOLD DISTANCES OF ARTIFICIAL-REALITY OBJECTS TO CAUSE OPERATIONS AT PHYSICAL ELECTRONIC DEVICES, AND METHODS OF USE THEREOF

(71) Applicant: Meta Platforms Technologies, LLC, Menlo Park, CA (US)

(72) Inventors: Eric Whitmire, Kenmore, WA (US); Rajinder Sodhi, Seattle, WA (US); Andre Levi, Seattle, WA (US); Austin Lee, Seattle, WA (US); Szeyin Lee, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/310,505

(22) Filed: May 1, 2023

(65) Prior Publication Data

US 2024/0019938 A1  Jan. 18, 2024

Related U.S. Application Data

(60) Provisional application No. 63/421,942, filed on Nov. 2, 2022, provisional application No. 63/353,510, filed on Jun. 17, 2022.

(51) Int. Cl.
*G06F 3/01* (2006.01)
*G06F 3/0346* (2013.01)
*G06F 3/16* (2006.01)

(52) U.S. Cl.
CPC .............. *G06F 3/017* (2013.01); *G06F 3/011* (2013.01); *G06F 3/013* (2013.01); *G06F 3/016* (2013.01); *G06F 3/0346* (2013.01); *G06F 3/165* (2013.01)

(58) Field of Classification Search
CPC ...... G06F 3/041–047; G06F 2203/041–04114; G06F 3/011;
(Continued)

(56) References Cited

U.S. PATENT DOCUMENTS

2014/0078176 A1\* 3/2014 Kim ................. G06F 3/011
                                                345/633
2019/0033974 A1\* 1/2019 Mu .................. G06F 3/011
(Continued)

FOREIGN PATENT DOCUMENTS

WO    2022046337 A1   3/2022

OTHER PUBLICATIONS

Booth R., et al., "Detecting Finger Gestures with a Wrist Worn Piezoelectric Sensor Array," IEEE International Conference on Systems, Man, and Cybernetics, Oct. 5-8, 2017, pp. 3665-3670.
(Continued)

*Primary Examiner* — Sanjiv D. Patel
(74) *Attorney, Agent, or Firm* — Morgan, Lewis & Bockius LLP

(57) ABSTRACT

A method includes, while presenting an artificial-reality environment that includes a virtual object and a representation of a physical object, detecting, based on data from a first group of sensors of a wrist-wearable device, that the wrist-wearable device is within a first distance of an electronic device responsive to user gestures and within another threshold distance of the virtual object. The electronic device is represented within the artificial-reality environment. The method includes, while the wrist-wearable device is within the first activation-threshold distance of the electronic device and is also within a second activation-threshold distance of the virtual object, determining, based on data from a second set of sensors of the wrist-wearable device, that a gesture corresponds to an operation at the electronic
(Continued)

device. And the method includes, based on determining that the user gesture corresponds to the operation, causing the physical electronic device to perform the operation.

16 Claims, 65 Drawing Sheets

(58) Field of Classification Search
CPC .......... G06F 3/014; G06F 3/017; G06F 3/163; G06F 3/0346; G06F 3/04815; G06F 2203/04101; G06F 2203/04108
See application file for complete search history.

(56) References Cited

U.S. PATENT DOCUMENTS

| | | | |
|---|---|---|---|
| 2019/0113966 | A1 | 4/2019 | Connellan et al. |
| 2020/0026352 | A1* | 1/2020 | Wang ..................... G06F 3/044 |
| 2020/0201542 | A1 | 6/2020 | Kumami et al. |
| 2021/0064132 | A1 | 3/2021 | Rubin et al. |
| 2021/0097776 | A1* | 4/2021 | Faulkner ................. G06F 3/167 |
| 2021/0286436 | A1* | 9/2021 | Parizi .................... G01S 13/581 |
| 2022/0091723 | A1 | 3/2022 | Faulkner et al. |
| 2022/0121344 | A1 | 4/2022 | Pastrana Vicente et al. |
| 2023/0333650 | A1* | 10/2023 | Hylak .................... G06F 3/017 |
| 2024/0168782 | A1* | 5/2024 | Hunt ..................... G06F 1/3215 |

OTHER PUBLICATIONS

International Preliminary Report on Patentability for International Application No. PCT/US2023/025641, mailed Dec. 26, 2024, 11 pages.
International Search Report and Written Opinion for International Application No. PCT/US2023/025641, mailed Oct. 10, 2023, 15 pages.
Iravantchi Y., et al., "BeamBand: Hand Gesture Sensing with Ultrasonic Beamforming," Proceedings of the 2019 CHI Conference on Human Factors in Computing Systems, May 2, 2019, pp. 1-10.
Notice of Allowance mailed Mar. 7, 2025 for U.S. Appl. No. 18/310,502, filed May 1, 2023, 12 pages.
Notice of Allowance mailed Nov. 20, 2024 for U.S. Appl. No. 18/310,502, filed May 1, 2023, 11 pages.
Robertson A., "Facebook Shows off How You'll Use Its Neural Wristbands with AR Glasses," The Verge, Mar. 18, 2021, [Retrieved on Sep. 30, 2023], 5 Pages, Retrieved from the Internet URL: https://www.theverge.com/2021/3/18/22338008/facebook-reality-labs-emg-wristbands-ctrl-labs-ar-interface-demo.
Shull P. B., et al., "Hand Gesture Recognition and Finger Angle Estimation via Wrist-worn Modified Barometric Pressure Sensing," IEEE Transactions on Neural Systems and Rehabilitation Engineering, Apr. 2019, vol. 27, No. 4, pp. 724-732.
Non-Final Office Action mailed May 2, 2024 for U.S. Appl. No. 18/310,502, filed May 1, 2023, 15 pages.
Jiang S., et al., "Feasibility of Wrist-worn, Real-time Hand, and Surface Gesture Recognition via sEMG and IMU Sensing," IEEE Transactions on Industrial Informatics, Aug. 11, 2018, vol. 14, No. 8, pp. 3376-3385.
Zhang Y., et al., "Recognizing Hand Gestures with Pressure-sensor-based Motion Sensing," IEEE Transactions on Biomedical Circuits and Systems, Dec. 1, 2019, vol. 13, No. 6, pp. 1425-1436.

* cited by examiner

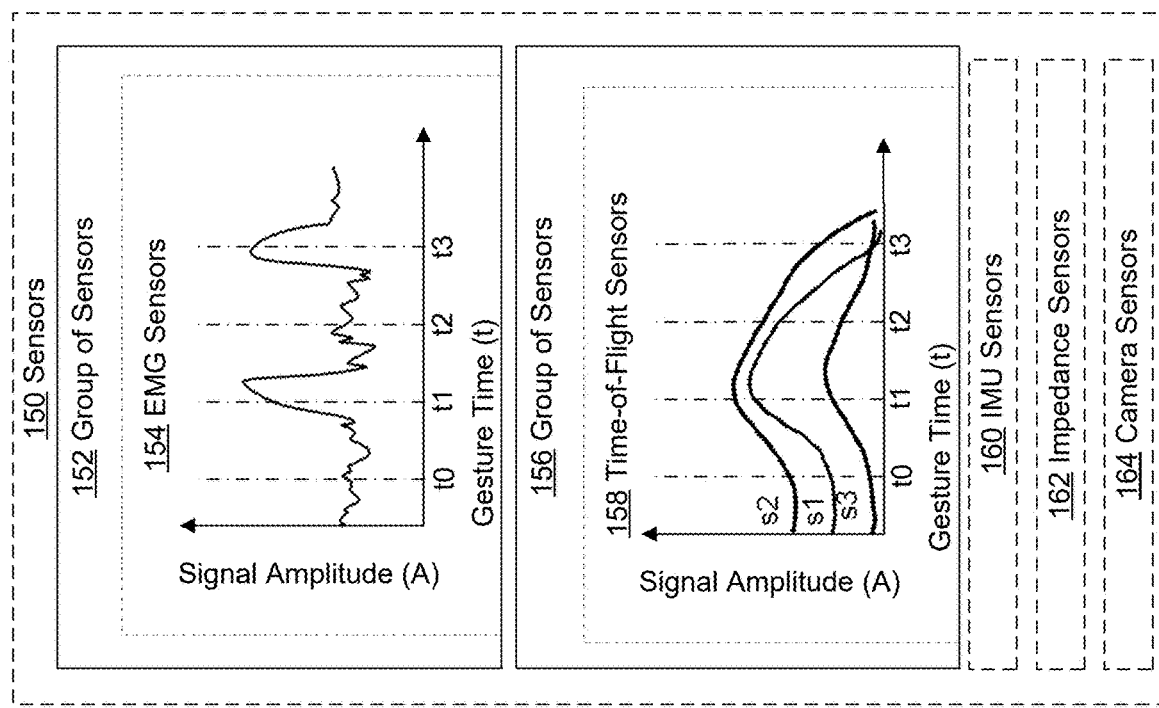
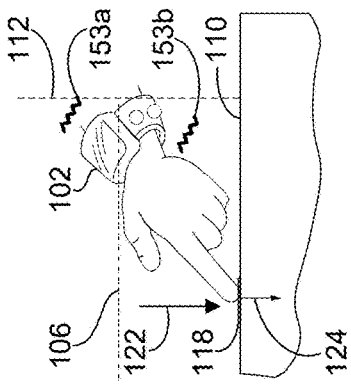
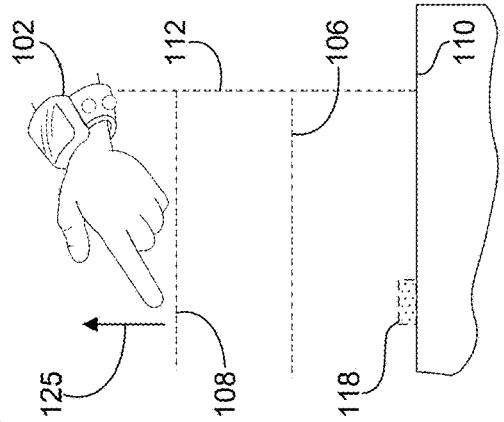
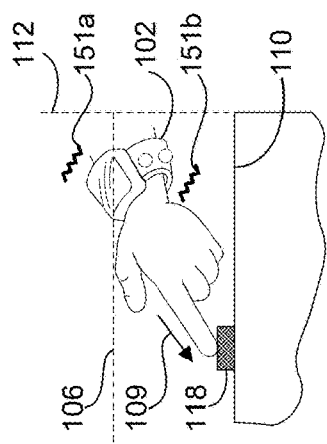
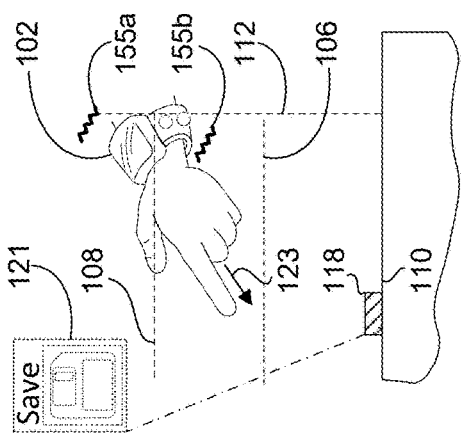
Figure 1B
Figure 1C
Figure 1D
Figure 1E

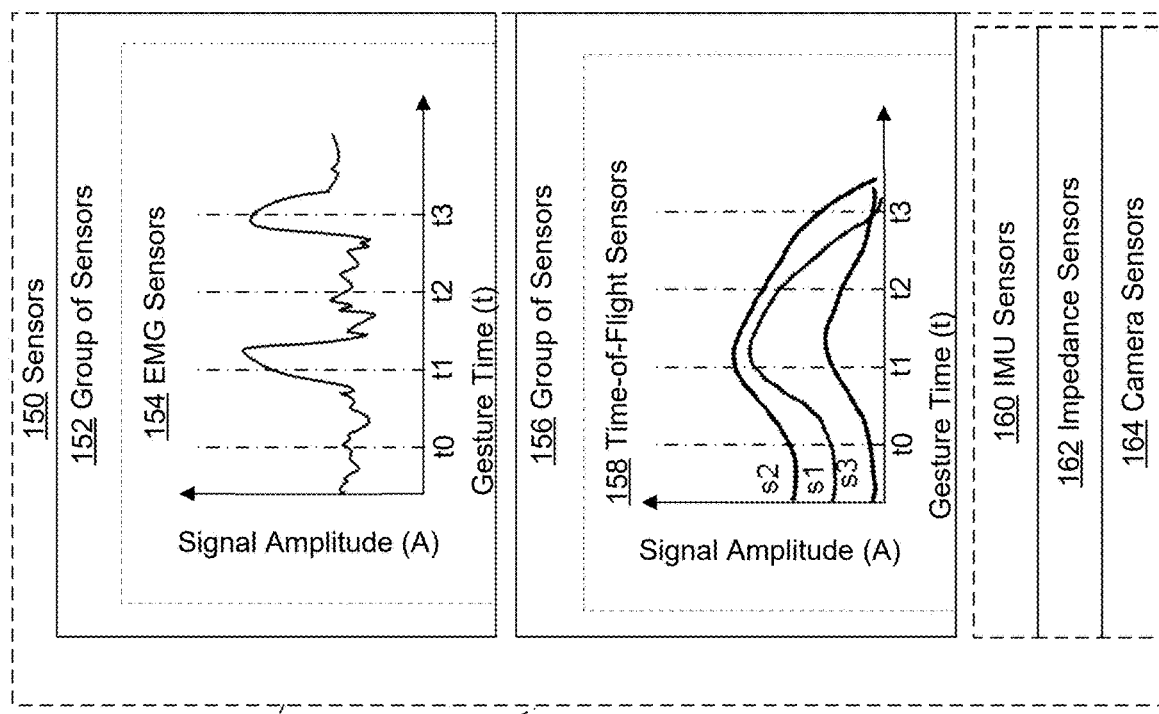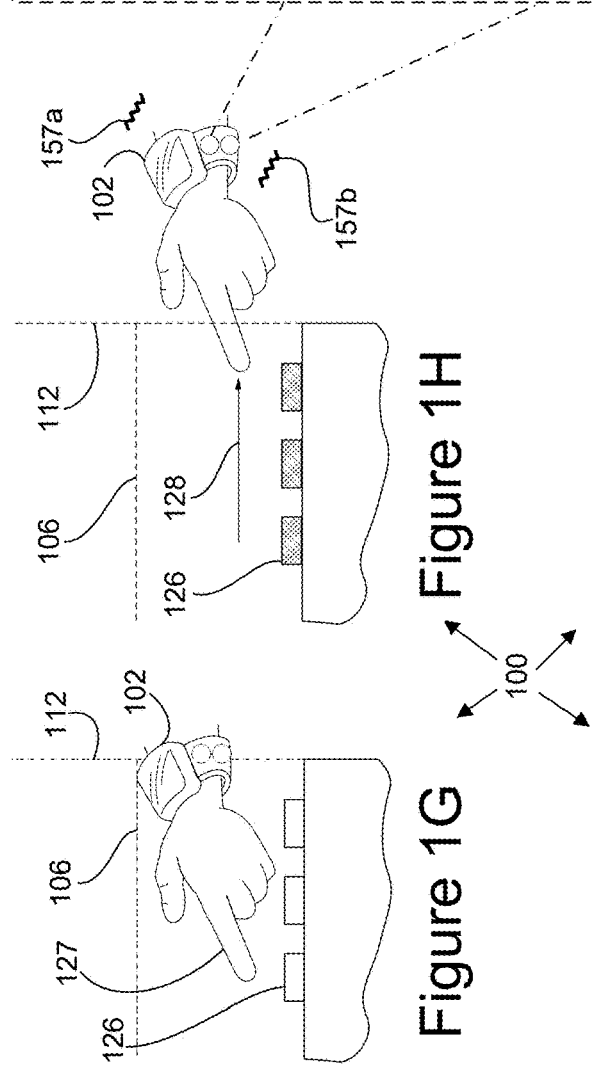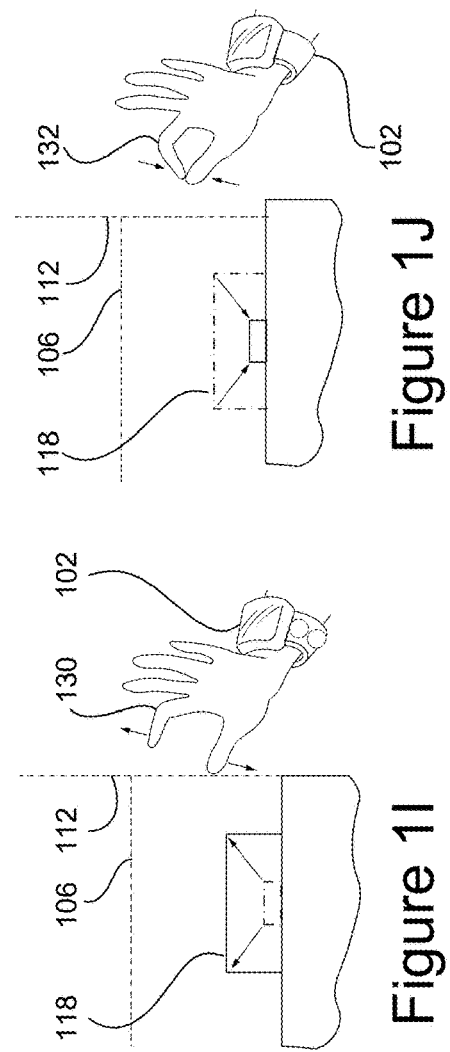
Figure 1G Figure 1H
Figure 1I Figure 1J

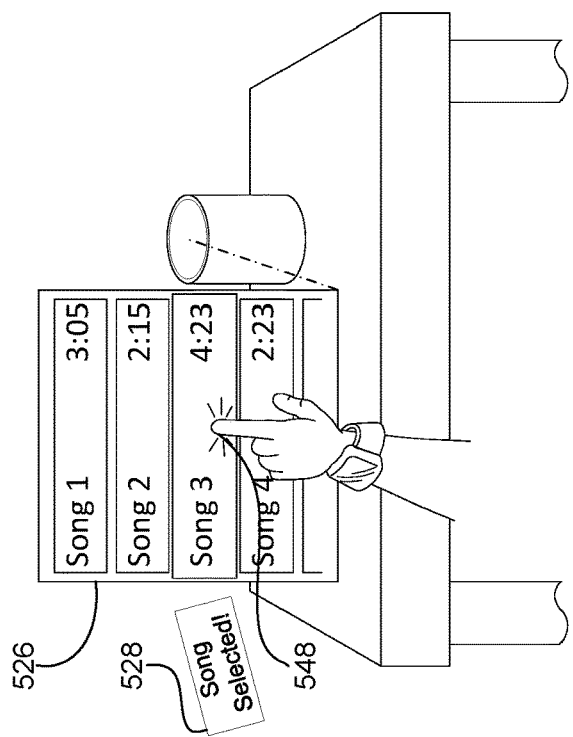
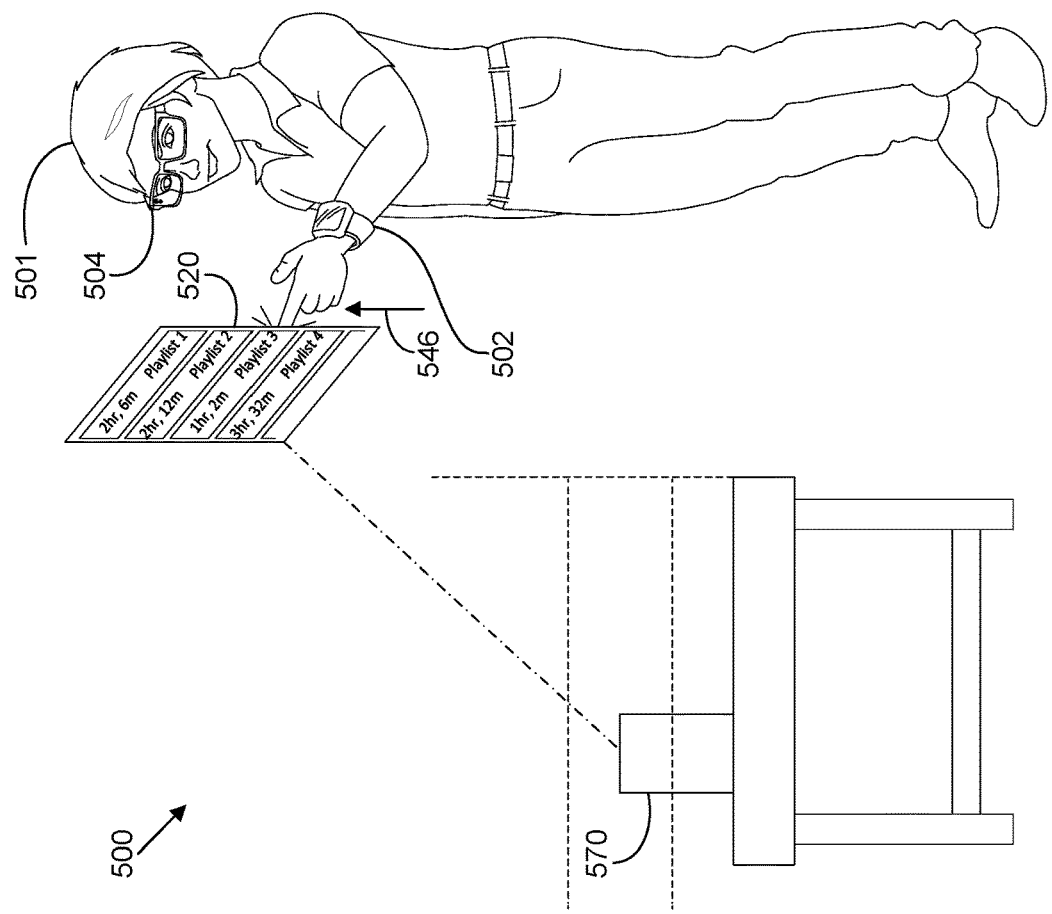
Figure 5E
Figure 5D

900

902 While an artificial-reality environment that includes a user interface is being presented by a head-wearable device:

904 The user interface responds to in-air gestures

906 In-air gestures correspond to a first set of user interface operations

908 The user interface responds to surface-contact gestures

910 Surface-contact gestures correspond to a second set of user interface operations

912 The user interface responds to a set of location-agnostic operations that correspond to location-agnostic gestures

914 The user interface includes two or more virtual objects

916 At least a portion of a first virtual object appears to be displayed at a location on the physical surface

918 At least a portion of a second virtual object is displayed in-air

920 Detect an in-air gesture from a first group of sensors

922 Detect that the in-air gesture occurred within a proximal in-air threshold distance from the physical surface

1102 Detect, based on data from a first set of sensors of a wrist-wearable device, that a user of a wrist-wearable device is in proximity to an electronic device that is responsive to user inputs that include one or more user gestures

1104 Provide an indication to the user that a user input is available at the electronic device

1106 The indication to the user that the user input is available is a haptic event at one or more of the wrist-wearable device, a head-wearable device, or a connected electronic device

1108 While the user is within an activation threshold distance to the electronic device, detect, using a second set of sensors of the wrist-wearable device, a user gesture that corresponds to an operation at the electronic device

1110 In response to detecting the user gesture, cause the electronic device to perform the operation at the electronic device

1112 The user gesture includes a movement from a first location to a second location

1114 A haptic event is produced at the wrist-wearable device between the first location and the second location of the user gesture indicating a change to a controlled option at the electronic device

1116 The electronic device is a speaker, and the operation performed at the speaker adjusts a volume level of the speaker (A)

1602 A user is wearing a wrist-wearable device that includes an imaging sensor.

1604 The imaging sensor is facing towards the hand of the user while the wrist-wearable device is worn by the user.

1606 Before presenting a user interface object to the user at a head-wearable device, receiving a first indication, from the wrist-wearable device, of a performance of a first in-air hand gesture that includes a rotation of a wrist of the user, the rotation being of at least a threshold angular range, where the rotation is detected by the imaging sensor facing toward the user's hand.

1608 In response to the first indication, cause the user interface object to be displayed within the user interface presented at the head-wearable device.

1610 Present a user interface to a user via a head-wearable device.

1612 Before receiving the second indication about the performance of the in-air hand gesture, detect, using the imaging sensor, that the user's hand is in a first location that corresponds to an acceptable starting position.

1614 Based on detecting that the user's hand is in the acceptable starting position, providing a visual notification to the user that the user's hand is in a first location that corresponds to an acceptable starting position.

1616 Receive an indication, from the wrist-wearable device, of a performance of an in-air hand gesture that includes movement of a hand of a user in a direction relative to a starting position of the hand of the user.

1618 The movement is detected by the imaging sensor included on the wrist-wearable device.

1620 No EMG sensor is used to detect the in-air hand gesture.

1622 In response to the indication, controlling the user interface object on the display of the head-wearable device in accordance with determining the movement of the hand of the user.

1624 The controlling of the user interface object is based on the direction of the movement relative to the starting position of the hand of the user.

1626 The controlling of the user interface object is based on an amount associated with the movement, where the amount associated with the movement is one of a distance of the movement, a speed of the movement, or a period of time during which the movement takes place.

1628 The controlling of the user interface object includes moving between the plurality of available options of the user interface object.

1630 The in-air hand gesture is a hand-waving gesture that causes a focus selector to move circumferentially around the circular menu user interface object.

1632 While a first option of a plurality of available options, at the user interface, is in focus, detect, using one or more sensors of the wrist-wearable device that are not EMG sensors, a pinch gesture that includes a contact between a thumb of the user and an index finger of the user, the contact having at least a predefined pinch intensity.

1634 Based on detecting the pinch gesture, performing an action associated with the user interface object.

1636 In response to the second indication, causing an image to be captured by a camera at the wrist-wearable device, the head-wearable device, or another electronic device.

Figure 16B

SYSTEMS FOR DETECTING GESTURES PERFORMED WITHIN ACTIVATION-THRESHOLD DISTANCES OF ARTIFICIAL-REALITY OBJECTS TO CAUSE OPERATIONS AT PHYSICAL ELECTRONIC DEVICES, AND METHODS OF USE THEREOF

CROSS-REFERENCE TO RELATED APPLICATIONS

This application claims priority to U.S. Prov. App. No. 63/421,942, filed on Nov. 2, 2022, and titled "Controlling an Artificial-Reality User Interface at a Head-Wearable Device Based on Hand Gestures Detected by an Image Sensor of a Wrist-Wearable Device, and Systems and Methods of use thereof," which is hereby incorporated by reference in its entirety. This application also claims priority to U.S. Prov. App. No. 63/353,510, filed on Jun. 17, 2022, and titled "Systems for Detecting In-Air and Surface Gestures Available for use in an Artificial-Reality Environment using Sensors at a Wrist-Wearable Device, and Methods of use thereof," which is hereby incorporated by reference in its entirety.

TECHNICAL FIELD

This relates generally to wearable devices (e.g., wrist-wearable devices and head-wearable devices) and methods for detecting different types of gestures using wearable devices, including but not limited to, wearable devices configured to detect gestures performed in artificial-reality environments using various sensing capabilities (e.g., time-of-flight sensors, electromyography (EMG) sensors, inertial measurement unit (IMU) sensors, etc.).

BACKGROUND

Artificial-reality (e.g., augmented-reality (AR), virtual-reality (VR), etc.) environments can provide immersive experiences to users, allowing users to interact with user interfaces using a head-wearable device that displays an artificial-reality environment.

In some examples of user interactions with artificial-reality environments, hand-held devices (e.g., game controllers) can be used to detect a user's motion, including gestures performed by the user. In some examples, detection of the user's motions causes adjustments to the display of the artificial-reality environment. However, such artificial-reality environments, hand-held devices, and wearable devices can offer many inconvenient, awkward, and socially unacceptable interactions by requiring the user's full attention, and large gestures that need significant available space (e.g., at least an arm's-length distance of space), while also requiring considerable energy to be expended by the user.

Further, such systems can require the user to carry and manipulate hand-held devices (e.g., controllers) for such systems to detect the user's gestures, and/or require users to wear multiple electronic devices on each potential contact point (e.g., fingertips) of the users' bodies, which is often tedious or otherwise inconvenient, and fails to take advantage of wearable devices that a user wears for everyday purposes.

Finally, certain VR devices and approaches associated therewith can isolate users from physical surfaces that they could potentially make physical contact with (e.g., via creation of stationary guardian boundary around the user, and/or by providing the user with indications that they are close to coming into physical contact with a physical object), instead of allowing users to interact with such physical surfaces and or other features and objects within the user's actual physical surroundings.

SUMMARY

Thus, explorations around different types of gestures to interact with artificial-reality environments, and testing around appropriately defined gestures spaces, can provide technical improvements, particularly when wrist-wearable devices are used to control aspects of artificial-reality environments.

As such, it would be desirable to address one or more of the above-identified issues, drawbacks, or areas for further exploration.

The systems (e.g., wearable devices) and methods described herein address at least one of the above-mentioned drawbacks by allowing a user to interact with an artificial-reality environment using one or more wearable devices (e.g., a wrist-wearable device) that include sensors for detecting gestures performed by the user of the one or more wearable devices. The sensors at the wearable devices can include time-of-flight sensors (e.g., to detect spatial distances) and EMG sensors (e.g., to detect muscular responses).

As described herein, a user gesture can correspond to an operation to adjust the display of an artificial-reality environment. For example, a tap gesture at a virtual button displayed so to appear at a physical surface can cause an update to a user interface displayed in the air (e.g., "in-air") in front of the user. In other words, a gesture performed by a user can, directly (e.g., at a virtual object where the gesture is directed to) or indirectly (e.g., at a different virtual object, or a different physical electronic device), cause operations to be performed to update a visual aspect of the artificial-reality environment. Other user gestures can correspond to operations that cause non-visual updates, either within the artificial-reality environment or at another electronic device. For example, a "thumbs-up" gesture in front of a virtual screen element displayed in front of the user can cause an operation to be performed that saves the current state of a virtual object in the artificial-reality environment, which can occur without any visual update to the artificial-reality environment.

As also described herein, an artificial-reality system can be configured to detect "surface" gestures that occur at or near the physical surface, as well as "in-air gestures" that occur at a further distance from the surface but are still within a threshold distance (e.g., an in-air threshold distance) to be detectable by sensors of the artificial-reality system (e.g., the time-of-flight sensors). As also described herein, the artificial-reality system can also be configured to detect "location-agnostic gestures" that do not depend on a spatial relationship with a physical surface (e.g., using sensors of the wearable device or another connected device). Further, there can be aspects of the physical environment which, when present, can cause a head-wearable device (also referred to as a head-worn wearable device, head-mounted display device, or simply as a head-mounted or head-wearable device, and the head-mounted device is also a wearable device since it is worn on the user's head) to update the display of virtual objects intended to be displayed within a certain proximity of the physical surface, including a physical surface with a curved surface portion (e.g., an irregular surface shape).

The wearable devices described herein, after receiving or detecting the user's gestures, can provide data to a computing device which causes the computing device to perform operations that update the presentation of a user interface (e.g., a user interface presented by a head-wearable device). The computing device can be another wearable device or an intermediary device (e.g., a smartphone). In some instances, the wearable device (or an intermediary device) is configured to cause operations to be performed at other electronic devices, such as audio speakers, home appliances (e.g., light bulbs), and/or smartphones.

As an illustrative example, suppose a person, Lynn, wants to browse various websites on the internet. Conventionally, Lynn would need to go to her personal computer or use a mobile electronic device such as a smartphone. Either option has drawbacks. With mobile devices, the small screen size (i.e., limited "real estate") can make it difficult to view content, particularly while the requested user interface elements for performing the desired operations take up a substantial portion of the screen. With a personal computer, Lynn is required to go to the computer (e.g., in her office) and remain there while she browses.

The artificial-reality systems described herein allow Lynn to browse at any location because the wearable devices (e.g., artificial-reality glasses and a wristband) are also mobile devices and provide a larger (e.g., virtual) and/or more quick and efficient display (that is not associated with a larger size of any physical display component) for interacting with content. In this example, Lynn can view the websites on a user interface presented via her AR glasses and can navigate with gestures that are detected by sensors in the AR glasses, the wristband, or both, without having to use another electronic device, such as a smartphone and/or laptop. Moreover, the navigation controls and other user interface elements can be displayed at a physical surface (e.g., to simulate a keyboard or touchscreen experience) while the content can be displayed in-air. In this way, the user interface elements do not obstruct the content Lynn wants to view, providing an improved man-machine interface, based on at least the above-mentioned gains in efficiency. Additionally, Lynn can manipulate the content and user interface in this example with a combination of in-air gestures (such as pinch gestures to adjust magnification of the content), surface gestures (such as a tap gesture on a virtual button or a slide gesture on a virtual slider at or near a physical surface), and location-agnostic gestures that can cause the same or similar operations to be performed, despite being performed at various distinct locations with respect to the user. A skilled artisan will appreciate by the embodiments described herein that a surface gesture can be a gesture that involves actual contact between a portion of the user's body (e.g., a fingertip) and the physical surface that they are interacting with (e.g., a surface-contact gesture), or it can be a gesture within a threshold distance (e.g., a surface threshold distance) of, but not in physical contact with, the physical surface (e.g., a near-surface gesture). In some embodiments, the surface gestures that are surface-contact gestures can cause different operations to be performed than corresponding near-surface gestures. In embodiments where surface gestures include gestures within a surface threshold distance of the physical surface, in-air gestures can be gestures that are performed beyond the surface threshold distance of the physical surface but within an in-air threshold distance of the physical surface.

To continue the example, suppose that after browsing, Lynn wants to watch a local sporting event on television. Conventionally, Lynn would watch the sporting event on television while sitting on her couch and using a remote control. With the artificial-reality systems described herein, Lynn can watch the sporting event on television (which can be displayed on a physical television screen or within her AR glasses) without having to find and provide manual user inputs to physical buttons of her remote control. The artificial-reality systems described herein can present virtual affordances (e.g., two-dimensional or three-dimensional virtual objects that can be likened to buttons and sliders on a two-dimensional computer screen) for controlling the television (which Lynn's AR glasses can display) and the system can relay the commands to the television (e.g., via Bluetooth or Wi-Fi protocol). In this example, Lynn does not have a flat surface (e.g., a table or a desk) near her on which to project the virtual affordances when she is sitting on her couch. Accordingly, the virtual affordances are presented on a curved surface (e.g., an arm of the couch or Lynn's leg or palm). When presenting the virtual affordances on the curved surface, the system can adjust display properties of the virtual affordances (e.g., to have a shape that complements the surface curvature) so that Lynn can use surface gestures that are analogous to manipulating a conventional remote control.

To continue the example further, suppose Lynn wants to turn the lights in her apartment off while watching the sporting event. Conventionally, Lynn would need to get up and walk to the light switch to turn the lights off. With the artificial-reality systems described herein, Lynn can manipulate the lights without needing to go to a physical light switch. For example, Lynn can turn toward the light switch and perform a gesture that corresponds to turning off the switch (e.g., a tapping gesture on the palm of her hand). The artificial-reality system can detect Lynn's change in orientation from the television to the light switch and replace (or supplement) the virtual affordances for the television with a virtual affordance for the light switch. The system can relay the command to the light switch (e.g., via a Bluetooth or Zigbee protocol). The virtual affordance for the light switch in this example need not be displayed visually for Lynn, by, for example, a head-wearable device, and can instead correspond to a particular gesture (tapping on one's palm) while oriented on the light switch. For example, she can adjust the light switch after having removed her AR glasses, while watching the physical television.

In this way, the systems and methods described herein can provide for a more efficient man-machine interface, because they allow the user to interact with an artificial-reality system without being as visibly distracted by, for example, a computer screen or other components of associated electronic devices. For example, the user can receive a message from another user of a different electronic device, at the wrist-wearable device, and apply a reaction in response to the message by performing, for instance, a location-agnostic "thumbs-up" gesture (e.g., the user's performance of the location-agnostic "thumbs-up" gesture causes a "thumbs-up" reaction to be applied to the message in the a message-thread user interface, and is received by the other user). These improvements allow for the wearable devices to be designed such that they are comfortable, functional, practical, and socially acceptable for day-to-day use. Further, these improvements allow users to interact with a computer and/or user interface without requiring a fixed location or orientation for the interaction (e.g., a physical monitor or keyboard). The user interface can move in accordance with the user's location and orientation. Moreover, the user does not necessarily need to interact directly with an electronic device (e.g., a speaker or light switch) to interact with it and can also access different operations of the respective electronic device by performing gestures at different relative locations and with different types of user movements to modify the operations performed at the respective electronic device. Further, the user can also use the same gesture space to modify which electronic device is being interacted with. All this furthers the goal of getting more users to adopt emerging technologies in the artificial-reality (AR and VR) spaces (e.g., the metaverse) for more use cases, especially beyond just gaming uses in large open spaces.

Further, the systems and methods described herein can allow for a more efficient and simplified man-machine interface, because they can provide a user with more optionality for interacting with electronic devices and digital mediums without cluttering user interfaces of electronic devices with graphical representations for each available operation that can be performed by the electronic devices. Therefore, the improvements simplify the user interface by providing fewer visual elements and simplify user input for interacting with such interfaces. For example, a single virtual object, as described herein, is capable of being interacted with by at least a surface gesture, an in-air gesture, or a location-agnostic gesture, and each type of gesture can have its own gesture space, further defining the potential modes of interaction available to the user. Therefore, the user can cause more operations to be performed without dealing with the distraction of having more user interface controls, clicking through myriad windows of options, etc. Some of the gestures and operations described herein can be performed without any user interfaces being displayed, which allows users to interact with digital technology more seamlessly as they perform their daily tasks in the physical world.

Further, the systems and methods described herein can allow for a more efficient and ergonomic man-machine interface, because they do not require the user to provide user inputs at physical objects disposed at various locations within their accessible range of motion, and/or require the user to provide physical force in a less-than-optimal ergonomic setting, which can cause, for example, carpal tunnel syndrome. Further, it does not require the user to engage with additional output devices different from the input devices discussed above. For example, a physical contact with a physical surface can be detected without any devices or sensors at the point of contact (e.g., a user's fingertip or an electronic device that includes the physical surface being interacted with (e.g., a touch-sensitive display)).

In accordance with some embodiments, a method is provided for making in-air and surface gestures available to a user. The method includes presenting, via a head-wearable device, an artificial-reality environment that includes a user interface. The user interface is responsive to a first set of operations corresponding to respective in-air gestures and a second set of operations corresponding to respective surface gestures. The method also includes, while presenting the user interface and in response to detecting, using a first group of sensors of a wrist-wearable device, performance of an in-air gesture that corresponds to an operation from the first set of operations, causing the head-wearable device to perform an operation of the first set of operations to update the presentation of the user interface. The method further includes, while presenting the user interface and in response to detecting, using a second group of sensors of the wrist-wearable device, the second group of sensors having at least one sensor that is not in the first group of sensors, performance of a surface gesture at a physical surface that corresponds to an operation from the second set of operations, causing the head-wearable device to perform the operation from the second set of operations to update the presentation of the user interface.

In accordance with some embodiments, a method is provided for using time-of-flight sensors for gesture detection and content-rendering determinations in an artificial-reality environment. The method includes receiving data, from one or more time-of-flight sensors communicatively coupled with a wrist-wearable device, about a physical surface, where the wrist-wearable device is communicatively coupled with a head-wearable device that is configured to display a virtual object within an artificial-reality environment presented by the head-wearable device. The method further includes, in accordance with a determination, based on the data, that the physical surface has a curved surface portion, causing display of at least a portion of the virtual object at the curved surface portion, including updating the display of the virtual object in accordance with the curved surface portion.

In accordance with some embodiments, a method is provided for using interactions within an artificial-reality environment to control at least one other electronic device. The method includes detecting, based on data from a first group of sensors of a wrist-wearable device, that a user of the wrist-wearable device is within an activation threshold distance of an electronic device that is responsive to user gestures. While the user is within the activation threshold distance of the electronic device, the method further includes detecting, using a second set of sensors of the wrist-wearable device, a user gesture that corresponds to an operation at the electronic device. In response to detecting the user gesture, the method further includes causing the electronic device to perform the operation. In some embodiments, the artificial-reality environment is entirely non-visual, meaning that it contains no visual user interface objects (e.g., virtual objects). In some embodiments, the user does not need to wear any head-wearable device to interact with the artificial-reality environment.

The systems (e.g., wearable devices) and methods described herein address at least one of the above-mentioned drawbacks by allowing a user to interact with an artificial-reality environment using one or more wearable devices (e.g., a wrist-wearable device) that include sensors for detecting gestures performed by the user of the one or more wearable devices, using imaging sensors of at least one wearable device. Other sensors at the wearable devices can include time-of-flight sensors (e.g., to detect spatial distances) and EMG sensors (e.g., to detect muscular responses). As described herein, an in-air gesture can correspond to an operation that causes a focus selector to change locations within a user interface of an artificial-reality environment.

In accordance with some embodiments, a method is provided for controlling a user interface object in an artificial-reality environment based on subtle hand gestures by a user. The method, while a user interface object is in focus at a user interface presented to a user via a head-wearable device, receiving an indication, from a wrist-wearable device that includes an imaging sensor, of a performance of an in-air hand gesture that includes movement of a user's hand in a direction relative to a starting position of a hand of the user. The imaging sensor is facing toward the user's hand while the wrist-wearable device is worn by the user, and the movement is detected by the imaging sensor included on the wrist-wearable device. The method further includes, in response to the indication, controlling the user interface object presented to the user via the head-wearable device in accordance with determining the movement of the user's hand, where controlling the user interface object is based on the direction of the movement relative to the starting position of the user's hand.

In accordance with some embodiments, a method is provided for making in-air and surface gestures available to a user. The method includes presenting, via a head-wearable device, an artificial-reality environment that includes a user interface. The user interface is responsive to a first set of operations corresponding to respective in-air gestures and a second set of operations corresponding to respective surface gestures. The method also includes, while presenting the user interface and in response to detecting, using a first group of sensors of a wrist-wearable device, performance of an in-air gesture that corresponds to an operation from the first set of operations, causing the head-wearable device to perform an operation of the first set of operations to update the presentation of the user interface. The method further includes, while presenting the user interface and in response to detecting, using a second group of sensors of the wrist-wearable device, the second group of sensors having at least one sensor that is not in the first group of sensors, performance of a surface gesture at a physical surface that corresponds to an operation from the second set of operations, causing the head-wearable device to perform the operation from the second set of operations to update the presentation of the user interface.

In some embodiments, an artificial-reality system (e.g., a wrist-wearable device or a head-wearable device) includes one or more processors, memory, a display, and one or more programs stored in the memory. The one or more programs are configured for execution by the one or more processors. The one or more programs include instructions for performing any of the methods described herein (e.g., including methods 900, 1000, and 1100 that are described in detail below).

In some embodiments, a non-transitory computer-readable storage medium stores one or more programs configured for execution by a computing device (e.g., a wrist-wearable device or a head-wearable device, or another connected device, such as a smartphone or desktop or laptop computer that can be configured to coordinate operations at the wrist-wearable device and the head-wearable device), having one or more processors, memory, and a display (in some embodiments, the display can be optional, such as for certain example connected devices that can coordinate for operations to be performed at the wrist-wearable device and/or the head-wearable device, and thus have processing and power resources). The one or more programs include instructions for performing (or causing performance of) any of the methods described herein (e.g., including methods 900, 1000, and 1100 that are described in detail below).

Thus, methods, systems, and computer-readable storage media are disclosed for detecting in-air and surface gestures in an artificial-reality environment. Such methods can complement or replace conventional methods for interacting with an artificial-reality environment.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 1A-1J illustrate an example user scenario with an artificial-reality system (e.g., including at least augmented-reality glasses and a wrist-wearable device) in accordance with some embodiments.

FIGS. 5A-5H illustrate another example user scenario with an artificial-reality system (e.g., including at least a wrist-wearable device) in accordance with some embodiments.

FIGS. 9A-9C are flow diagrams illustrating an example method for making in-air and surface gestures available to a user in accordance with some embodiments.

FIGS. 11A-11B are flow diagrams illustrating an example method for using interactions with an artificial-reality environment to control at least one physical electronic device in accordance with some embodiments.

FIGS. 16A-16B are flow diagrams illustrating a method for controlling a user interface object in an artificial-reality environment using subtle hand gestures.

In accordance with common practice, the various features illustrated in the drawings are not necessarily drawn to scale, and like reference numerals can be used to denote like features throughout the specification and figures.

DETAILED DESCRIPTION

Figure 1A:
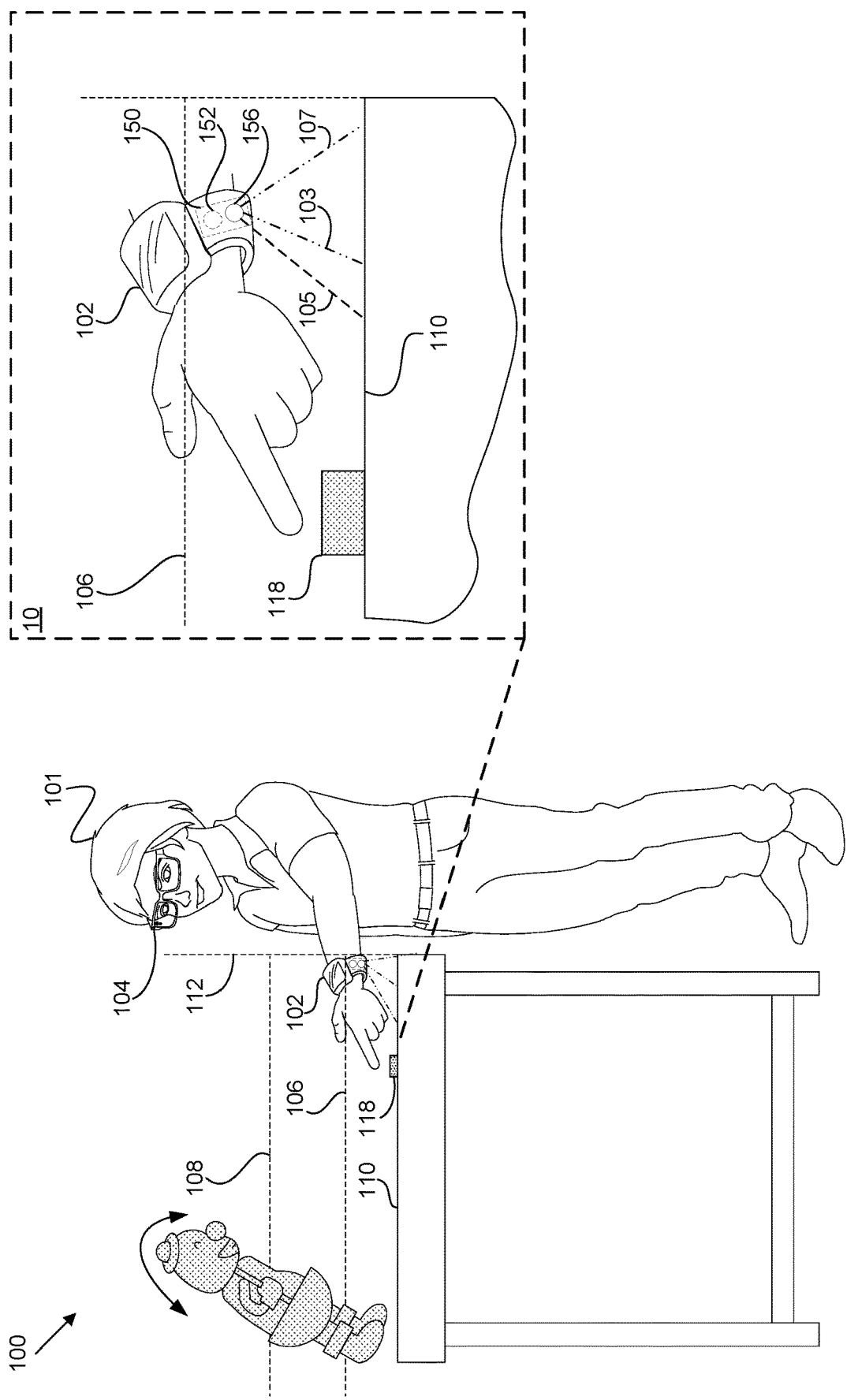

Numerous details are described herein, to provide a thorough understanding of the example embodiments illustrated in the accompanying drawings. However, some embodiments can be practiced without many of the specific details, and the scope of the claims is only limited by those features and aspects specifically recited in the claims. Furthermore, well-known processes, components, and materials have not necessarily been described in exhaustive detail, to avoid obscuring pertinent aspects of the embodiments described herein.

Embodiments of this disclosure can include or be implemented in conjunction with various types or embodiments of artificial reality systems. Artificial reality, as described herein, is any superimposed functionality and or sensory-detectable presentation provided by an artificial-reality system within a user's physical surroundings. Such artificial-reality can include and/or represent virtual reality (VR), augmented reality (AR), mixed artificial reality (MAR), or some combination and/or variation one of these. For example, a user can perform a swiping in-air hand gesture to cause a song to be skipped by a song-providing application programming interface providing playback at, for example, a home speaker. In some embodiments of an AR system, ambient light can be passed through a display element of a respective head-wearable device presenting aspects of the AR system. In some embodiments, ambient light can be passed through respective aspects of the AR system. For example, a visual user interface element (e.g., a notification user interface element) can be presented at the head-wearable device, and an amount of ambient light (e.g., 15%-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

Artificial-reality systems can be implemented in a variety of different form factors and configurations. Some artificial-reality systems include a near-eye display (NED), which provides visibility into the real world (e.g., the AR system 1320 in FIG. 13A) or that visually immerses a user in an artificial reality (e.g., the VR system 1350 in FIG. 13B). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., the wrist-wearable device 102 in FIGS. 1A-1J), devices worn by one or more other users and/or any other suitable external system.

FIGS. 1A-1J illustrate an example user scenario with an artificial-reality system (e.g., including at least augmented-reality glasses and a wrist-wearable device) in accordance with some embodiments. FIG. 1A shows a user 101 and an artificial-reality system 100 that includes a wrist-wearable device 102 and a head-wearable device 104 (e.g., AR glasses). The user 101 in FIGS. 1A-1J is performing gestures that correspond to operations to be performed by the artificial-reality system 100. In the specific example illustrated by FIGS. 1A-1J, the user 101 is interacting with virtual objects displayed at the physical surface 110 (e.g., the virtual object 118 in FIGS. 1A-1E and 1I-1J and the virtual object 126 in FIGS. 1F-1H). In some embodiments, the virtual objects are part of a virtual user interface displayed at the physical surface 110. For example, the virtual objects 118 and 126 (e.g., virtual buttons) displayed by the head-wearable device 104 resemble buttons of a physical electronic device, such as a computer keyboard. Other example virtual objects include any of the following listed examples and derivatives, including combinations, thereof:

Buttons, including buttons with three-dimensional depth and a plurality of visual display configurations associated with a plurality of states of the buttons as they are pressed and/or otherwise interacted with. In some embodiments, a plurality of buttons can be presented by the head-wearable device, and some of the plurality of the buttons can be three-dimensional, while others of the plurality of buttons are displayed as two-dimensional, without three-dimensional depth.

Sliders, including sliders with a vertical portion corresponding to a range of adjustment of the respective slider, with a selectable "handle" affordance that can optionally have a three-dimensional depth and be used to set a control option within the artificial-reality environment or at another electronic device.

Switches, including switches with toggle affordance that moves between two or more distinct locations that correspond to two or more discrete states (e.g., "on," or "off") of an aspect of an artificial-reality environment, or at another electronic device.

Menus, including menus with selectable affordances for adjusting options and performing other operations related to the configuration of the head-wearable device and/or the wrist-wearable device, and/or one or more additional electronic devices.

Levers, including levers that appear to have a three-dimensional depth while being presented within the artificial-reality environment presented by the head-wearable device.

Dials, including dials that appear to have a three-dimensional depth as displayed by the head-wearable device, such that a user can perform a gesture at a simulated location of the dial to cause the dial to turn about an axis of the dial at the simulated location where the dial is displayed.

Virtual Keyboards, including virtual keyboards that appear to have a three-dimensional depth as displayed by the head-wearable device, and can include virtual buttons representing individual buttons of a physical keyboard.

Virtual Screen Elements, including virtual screen elements that can be configured to display at least two-dimensional content within the virtual screen element.

The above-mentioned list of potential virtual objects that can be displayed by the head-wearable device 104 are just some examples of virtual objects that are capable of being visually displayed. In some embodiments, users can create additional virtual objects by performing the methods and operations described herein.

Additionally, while FIGS. 1A-1J show three-dimensional virtual objects, in some embodiments, the user interface includes one or more two-dimensional virtual objects displayed at the physical surface (or in the air).

FIG. 1A also illustrates visual aids in the form of dashed lines representing a surface threshold distance 106 (e.g., one, three, or twelve inches from the surface) and an in-air threshold distance 108 (e.g., six, twelve, or eighteen inches from the surface). As discussed above in the Summary, a skilled artisan will appreciate that a surface gesture can be a gesture that involves actual physical contact between a portion of the user's body and the physical surface that they are interacting with (e.g., a surface-contact gesture), or it can be a gesture within a surface threshold distance (e.g., the surface threshold distance 106) of, but not in physical contact with, the physical surface (e.g., a near-surface gesture). In some embodiments, the surface gestures that are surface-contact gestures can cause different operations to be performed than corresponding near-surface gestures. In embodiments where surface gestures include gestures within a surface threshold distance of the physical surface, in-air gestures can be gestures that are performed beyond the surface threshold distance of the physical surface (e.g., the surface threshold distance 106), but within an in-air threshold distance (e.g., the in-air threshold distance 108) of the physical surface.

As will be discussed below, a particular set of operations corresponds to gestures that are performed by the user 101 within the surface threshold distance 106 of a physical surface 110. For example, the set of operations include operations responsive to the surface gesture 109 in FIG. 1B and the surface gesture 122 in FIG. 1C. The surface gestures in FIGS. 1A-1J are detected using data from a group of sensors 156, which include ones or more time-of-flight sensors 158. Gestures occurring beyond the in-air threshold distance 108 can be classified as in-air gestures by the user 101 (e.g., the in-air gesture 123 in FIG. 1D, and the location-agnostic gesture 125 in FIG. 1E). The in-air gestures in FIGS. 1A-1J are detected using data from a group of sensors 152, which includes one or more EMG sensors 154.

The expanded view 10 in FIG. 1A shows the physical surface 110 near the wrist-wearable device 102 and illustrates that the wrist-wearable device 102 has sensors 150 that include a group of sensors 152 and a group of sensors 156. In the examples of FIGS. 1A-1F, the group of sensors 152 is used to detect in-air gestures and the group of sensors 156 is used to detect surface gestures, as will be explained in detail below. In some embodiments, one or more sensors in the sensors 150 belong to both the group of sensors 152 and the group of sensors 156. For example, the groups of sensors 152 and 156 do not need to be mutually exclusive. Further, in some embodiments, the group of sensors 152 can be used to detect or characterize some surface gestures, and the group of sensors 156 can be used to detect or characterize some in-air gestures. In some embodiments, power is reduced to one or more sensors from the group of sensors 152 while the user 101 is performing surface gestures (e.g., while the wrist-wearable device 102 is within the surface threshold distance), which can include surface-contact and near-surface gestures. In some embodiments, a determination to reduce power to one or more sensors from the group of sensors 152 is made when the wrist-wearable device 102 has remained within the surface threshold distance 106 for a predefined duration (e.g., a "dwell" duration). In some embodiments, power is reduced to one or more sensors from the group of sensors 156 while the user 101 is performing in-air gestures (or while the wrist-wearable device 102 is outside of the surface threshold distance 106 (e.g., and has been outside the surface threshold distance for a predetermined amount of time)).

In the example illustrated by FIG. 1A, the group of sensors 156 includes one or more time-of-flight sensors that can emit rays at distinct angles. As illustrated in FIG. 1A, each of the time-of-flight sensors can emit rays 113, 115, and 117 at different angles of incidence relative to the wrist-wearable device 102 for detection at distinct angles relative to the wrist-wearable device 102. As shown in FIG. 1A, the ray 113 is directed at an angle vertically downward from the wrist-wearable device 102, the ray 115 is directed at an angle offset in a forward direction relative to the wrist-wearable device 102, and the ray 117 is directed at an angle offset in a backward direction relative to the wrist-wearable device. In some embodiments, the time-of-flight sensors are arranged to be directed at angles that are offset from one another by predefined offset angles (e.g., 15, 20, or 30 degrees). In some embodiments, the one or more time-of-flight sensors at the wrist-wearable device 102 are configured and/or arranged to be pivotable, slidable, and/or otherwise adjustable to be directed at various angles of incidence relative to the wrist-wearable device. In some embodiments, the one or more time-of-flight sensors are formed into an array of individual time-of-flight sensors (e.g., an array with four rows and four columns of sensors), and the array of time-of-flight sensors can be used to produce a two-dimensional depth profile of a coverage area (e.g., as explained in more detail below, the coverage area can in one example include a physical surface such as a couch or a part of a user's body and the two-dimensional depth profile can be used to detect contouring surfaces and edges of surfaces). In some embodiments, data collected by sensors of the wrist-wearable device 102 can be transmitted to an intermediary computing device (e.g., one or more of the computing devices 1224 in FIG. 12, which can be, for example, a smart phone, a portable computing unit, that has a processor, but does not have a display or other peripheral devices, etc.). In some embodiments, the intermediary computing device can then provide the head-wearable device 104 with instructions to cause operations to be performed to update an AR or VR user interface at the head-wearable device 104.

FIG. 1B shows the user 101 performing a surface gesture 109 at the virtual object 118 (e.g., a virtual touch gesture where the user's index finger performs a gesture at a location that corresponds to a simulated location of the virtual object 118), which is detected by the group of sensors 156 of the wrist-wearable device 102 (e.g., by the time-of-flight sensors 158). The performance of the surface gesture 109 at the virtual object 118 causes an operation to be performed at the head-wearable device 104 (e.g., to update the display of the virtual object 118). In some embodiments, the user 101 receives a haptic event 151 (represented by the pair of reference numbers 151*a* and 151*b*) at the wrist-wearable device 102 in accordance with making virtual contact with the virtual object 118. In the example in FIG. 1B, the detection of the surface gesture 109 causes an operation to be performed that changes the appearance of the virtual object 118 (e.g., to indicate that the user 101 has activated a selectable function of the virtual object 118).

FIG. 1C shows the user 101 performing the surface gesture 122 at the virtual object 118, which is detected by the group of sensors 156 of the wrist-wearable device 102 (e.g., the time-of-flight sensors 158). Specifically, FIG. 1C shows a virtual push gesture where the user's index finger moves from a top of the virtual object toward the bottom of the virtual object, near the physical surface. The surface gesture 122 is performed within the surface threshold distance 106 of the physical surface 110. The performance of the surface gesture 122 directed to the virtual object 118 causes an operation to be performed at the head-wearable device 104 (e.g., to update the display of the user interface of the artificial-reality system 100, such as the display of the virtual object 118). In some embodiments, the user 101 receives a haptic event 153 (represented by the pair of reference numbers 153a and 153b) at the wrist-wearable device 102 in accordance with making virtual contact with the virtual object 118 and receives a second (e.g., distinct) haptic event at the wrist-wearable device 102 when the user 101 makes physical contact with the physical surface 110 during performance of the surface gesture 122. In some embodiments, the haptic event 153 is configured to simulate the sensation of touching a physical button (e.g., the haptic event 153 causes the wrist-wearable device 102 to apply force in a direction opposite the motion of the surface gesture 122). In the example in FIG. 1C, the detection of the surface gesture 122 causes an operation to be performed that changes the appearance of the virtual object 118 to indicate that the user 101 has activated a selectable function of the virtual object 118. Further, in FIG. 1C, the display of the virtual object 118 updates to indicate that the virtual object 118 is in a pressed state from the surface gesture 122 (as shown by the virtual object animation 124, which causes the virtual object to appear "pressed" toward the surface).

FIG. 1D shows the user 101 performing an in-air gesture 123. Specifically, FIG. 1D shows a hold gesture where the user's hand stays in one position (e.g., a constant wrist position) for a predefined hold period above. For example, the predefined hold period can be 1 second to 1.5 seconds. In some embodiments, the predefined hold period can be different for distinct respective gestures (e.g., a pointing gesture can have a hold period of 1.5 seconds, and a pinch gesture can have a hold period of 0.75 seconds). The hold gesture can also be referred to as a stateful gesture above the virtual object 118, beyond the surface threshold distance 106 but within the in-air threshold distance 108. The in-air gesture 123 is detected by the group of sensors 152 of the wrist-wearable device 102 (e.g., the EMG sensors 154). The performance of the in-air gesture 123 above the virtual object 118 causes an operation to be performed at the head-wearable device 104 to update the display of the user interface of the artificial-reality system 100, including the display of the virtual object 118. In some embodiments, the user 101 receives a haptic event 155 (represented by the pair of reference numbers 155a and 155b) at the wrist-wearable device 102 in accordance with causing an operation to be performed that corresponds to the virtual object 118 in accordance with the in-air gesture 123 (e.g., the wrist-wearable provides a soft, continuous vibration indicating that the user 101 has caused an additional operation to be made accessible at the virtual object 118). In the example in FIG. 1D, the performance of the in-air gesture 123 causes an operation to be performed that changes the appearance of the virtual object 118 to indicate that the user 101 has activated a selectable function of the virtual object 118 (e.g., a different selectable function than illustrated in FIG. 1B). Specifically, in FIG. 1D, the performance of the in-air gesture 123 causes a save operation to be performed, as displayed by the corresponding virtual object 121, which causes a document that is being displayed on another virtual object within the artificial-reality system 100 to be saved to storage at the wrist-wearable device 102, the head-wearable device 104, one or more other electronic devices, and/or a remote server. In response to the save operation, the user 101 receives the haptic event 155, distinct from the haptic event 153 (represented by the pair of reference numbers 153a and 153b) in FIG. 1C.

FIG. 1E shows the user 101 performing a location-agnostic gesture 125. Specifically, FIG. 1E shows a vertical swipe gesture where the user moves their hand in a sweeping motion, upward beyond the surface threshold distance 106 and the in-air threshold distance 108. The location-agnostic gesture 125 is detected by the group of sensors 152 of the wrist-wearable device 102 (e.g., the EMG sensors 154). The performance of the location-agnostic gesture 125 above the virtual object 118 causes an operation of a third set of operations that corresponds to location-agnostic gestures to be performed at the head-wearable device 104 to update the display of the user interface of the artificial-reality system 100, including the display of the virtual object 118. In some embodiments, the user 101 receives a haptic event at the wrist-wearable device 102 in accordance with activating the virtual object 118 via performance of the location-agnostic gesture 125 (e.g., the wrist-wearable provides a soft, continuous vibration indicating that the user 101 has reference-locked the virtual object 118). In the example in FIG. 1E, the performance of the location-agnostic gesture 125 causes an operation to be performed that changes the appearance of the virtual object 118 to indicate that the user 101 has activated a selectable function of the virtual object 118 (e.g., performing an operation at the virtual screen element of a second virtual object as shown in FIGS. 3A-3I).

The symbolic view of the sensors 150 displayed alongside FIGS. 1B-1E includes graphs of prophetic data corresponding to data collected by EMG sensors and time-of-flight sensors during the performance of the various gestures illustrated in FIGS. 1B-1E. As shown in the symbolic view of the sensors 150, more than one time of flight sensor 158 (e.g., s1, s2, s3) can be used to detect the performance of various gestures. In some embodiments, additional sensors can be used to detect various aspects of actions, including gestures, performed by the user 101, and other aspects of the user's physical surroundings. For example, IMU sensors 160 can be used to detect a specific force, angular rate, and/or orientation of a body part of the user 101 and/or their surroundings at any of the wrist-wearable device 102, the head-wearable device 104, or another electronic device. In some embodiments, impedance sensors 162 provide a signal to the user's body, which can be used to detect a resistance of the user's body to determine if the user 101 has contacted a physical surface (e.g., the physical surface 110) or another physical object. In some embodiments, one or more camera sensors 164 are used to detect user motion and gestures (e.g., in addition to, or alternative to, the sensors described above). An example of an impedance sensor is a surface electromyography (sEMG) sensor. In some embodiments, the impedance sensors 162 include at least one sEMG sensor. One of skill in the art will appreciate that while some embodiments discuss using EMG sensors in performance of operations described herein, that other types of biopotential-signal sensors, including other neuromuscular-signal sensors, are capable of being used to perform similar operations. As described herein, a biopotential-signal sensor is a type of sensor that measures the electrical signals generated by living organisms, such as humans or animals. As described herein, a neuromuscular-signal sensor is a type of biopotential-signal sensor that specifically measures the electrical signals generated by the neuromuscular system. Examples of biopotential-signal sensors include electroencephalography (EEG) sensors, which measure the electrical activity of the brain, electrocardiography (ECG) sensors, which measure the electrical activity of the heart, and electromyography (EMG) sensors, which measure the electrical activity of muscles. EMG sensors are an example of a neuromuscular-signal sensor.

Figure 1F:
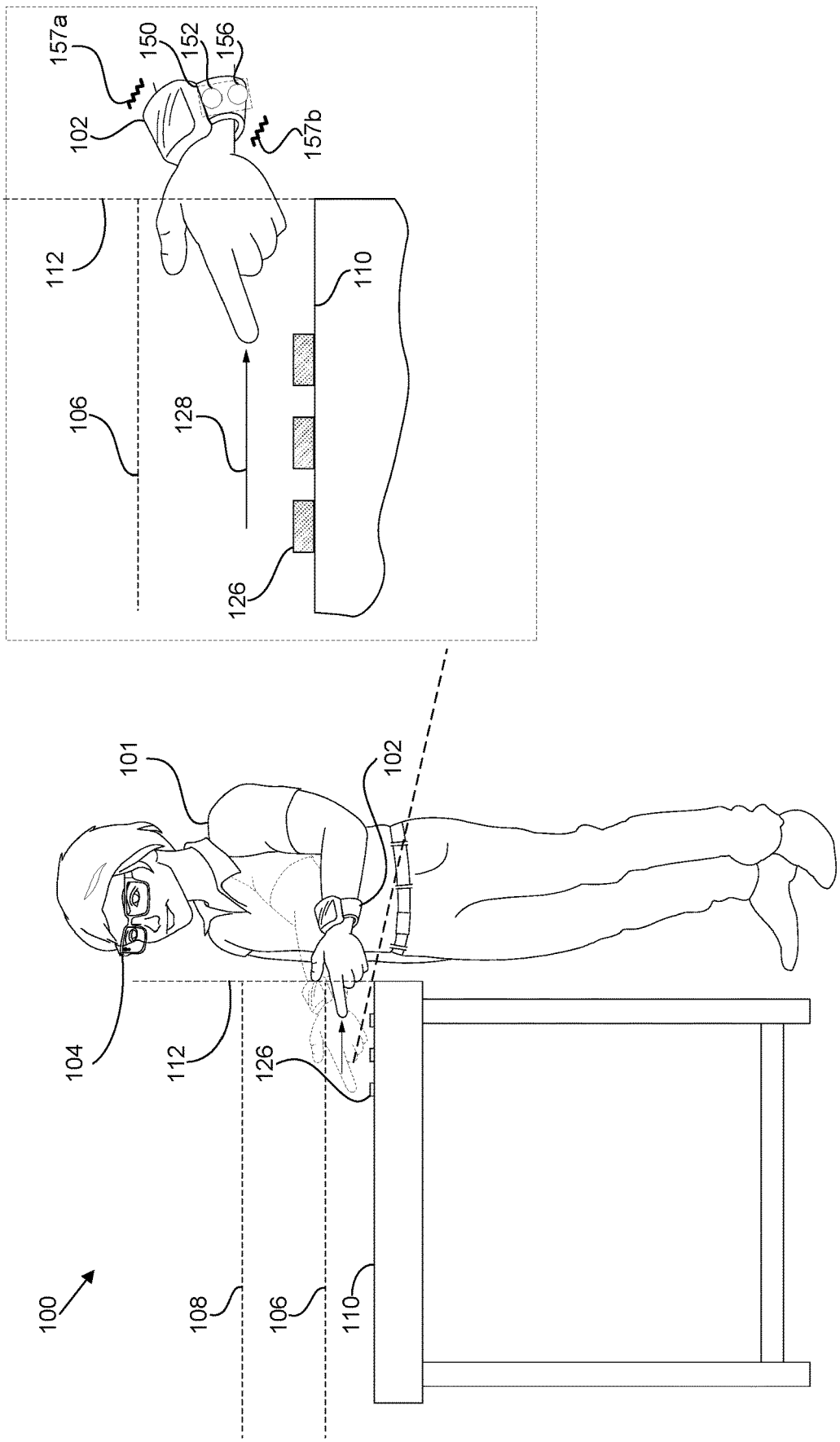

FIG. 1F, as well as the following FIGS. 1G-1J, show the user 101 performing a series of interactions, including performing user gestures that cause various operations at the artificial-reality system 100. One example that can also be illustrated by FIGS. 1G-1J is that of a user 101 performing a continuous sequence of gestures (e.g., performed within a predefined threshold time or having less than a threshold time between each individual sub-gesture of the hybrid gesture). In the example of the user 101 performing a hybrid gesture that includes a sequence of individual gestures (e.g., sub-gestures), FIGS. 1G-1J show the user 101 performing a surface gesture 128 (e.g., a vertical swipe gesture) over the virtual object 126 (which includes a set of virtual buttons) and then performing additional gestures outside of the surface edge 112 (e.g., the location-agnostic gesture 130, a "reverse-pinch" gesture, and the location-agnostic gesture 132, a pinch gesture). Any of the example processes and devices described above with respect to FIGS. 1A-1E can be used in conjunction with the sequences described in 1F-1J. In other words, the hybrid gesture includes two or more sub-gestures, including multiple gestures of one gesture type (e.g., a thumbs-up location-agnostic gesture and a directed point location-agnostic gesture) and gestures of multiple gesture types (e.g., a surface gesture and an in-air gesture). In some embodiments, a hybrid gesture causes operations to be performed that correspond to each individual sub-gesture (e.g., including any of the individual surface gestures, in-air gestures, and location-agnostic gestures described herein). In some embodiments, a hybrid operation can be distinct from the operations corresponding to one or more of the individual sub-gestures. In some embodiments, one or more of the operations corresponding to the individual gestures can be performed in addition to an operation from the set of hybrid operations that corresponds to the hybrid gesture (e.g., a hybrid gesture that includes the surface gesture 128 and the location-agnostic gesture 130). As shown in the expanded view of the surface gesture 128, a haptic event 157 (represented by the pair of reference numbers 157a and 157b) can be provided when the wrist-wearable device 102 crosses the surface edge 112 during the performance of the surface gesture 128. In some embodiments, a sub-gesture of hybrid gesture can also be a hybrid gesture.

FIG. 1G shows the user 101 performing a surface gesture 127 over the virtual object 126, which is identified as a surface gesture by the group of sensors 156 of the wrist-wearable device 102 (including, but not limited to, the time-of-flight sensors 158), by detecting that the surface gesture 127 occurred within the surface threshold distance 106 of the physical surface 110. The performance of the surface gesture 128 at the virtual object 126, causes an operation of the second set of operations to be performed at the head-wearable device 104 to update the display of the user interface of the artificial-reality system 100, including the display of the virtual object 126. In some embodiments, the user 101 receives a haptic event at the wrist-wearable device 102 in accordance with activating an operation at the virtual object 126 in accordance with the surface gesture 127. In the example in FIG. 1G, the performance of the surface gesture 127 causes an operation to be performed that changes the appearance of the virtual object 126 to indicate that the user 101 has activated a selectable function of the virtual object 126 (e.g., performing an operation at the virtual screen element of a second virtual object as shown in FIGS. 3A-3I).

FIG. 1H shows the user 101 performing a surface gesture 128 at the virtual object 126, an initial portion of which is identified as surface gesture occurring within the surface threshold distance 106 by the group of sensors 156 of the wrist-wearable device 102 (including, but not limited to, the time-of-flight sensors 158), and a second portion corresponding to when the gesture is being performed outside of the surface edge 112. The surface gesture 128 can also be an example of a sub-gesture of a hybrid gesture that includes the surface gesture 128, and, for example, the location-agnostic gesture 130. The hybrid gesture that comprises two or more sub-gestures (e.g., the surface gesture 128 and the location-agnostic gesture 130) can cause different operations to be performed, and/or cause an operation to be performed that is distinct from the one or more operations caused by performing the operation individually. In some embodiments, the user 101 receives a haptic event 157 (represented by the pair of reference numbers 157a and 157b) at the wrist-wearable device 102 in accordance with making virtual contact with the virtual object 126. In the example in FIG. 1H, the performance of the surface gesture 128 causes an operation to be performed that changes the appearance of the virtual object 126 to indicate that the user 101 has activated a selectable function of the virtual object 126 (e.g., performing an operation at the virtual screen element of a second virtual object as shown in FIGS. 3A-3I).

FIG. 1I shows the user 101 performing a location-agnostic gesture 130 (e.g., a "reverse-pinch" gesture) directed at the virtual object 118, while the user's wrist-wearable device 102 is outside of the surface edge 112. The location-agnostic gesture 130 is identified as a location-agnostic gesture by the sensors 150 of the wrist-wearable device 102 (including, but not limited to, the EMG sensors 154 of the group of sensors 152, and the IMU sensors 160). The performance of the location-agnostic gesture 130 at the virtual object 118, causes an operation to be performed at the head-wearable device 104 to update the display of the user interface of the artificial-reality system 100, including the display of the virtual object 126. In the example in FIG. 1I, the performance of the location-agnostic gesture 130 causes an operation to be performed that causes the head-wearable device 104 to adjust the visual appearance of the virtual object 118 to indicate that the user 101 has activated a selectable function of the virtual object 118 (e.g., performing an operation at the virtual screen element of a second virtual object, such as the virtual object 320 shown in FIGS. 3A-3I).

FIG. 1J shows the user 101 performing a location-agnostic gesture 132 (e.g., a "pinch" gesture) at the virtual object 118, while the user's wrist-wearable device 102 is outside of the surface edge 112. The location-agnostic gesture 132 is identified as a location-agnostic gesture by the sensors 150 of the wrist-wearable device 102 (including, but not limited to, the EMG sensors 154 of the group of sensors 152, and IMU sensors 160). The performance of the location-agnostic gesture 132 at the virtual object 118, causes an operation of the third set of operations to be performed at the head-wearable device 104 to update the display of the user interface of the artificial-reality system 100, including the display of the virtual object 118. In the example in FIG. 1J, the performance of the location-agnostic gesture 132 causes an operation to be performed that changes the appearance of the virtual object 118 to indicate that the user 101 has activated an available operation of the virtual object 118 (e.g., performing an operation at the virtual screen element of a second virtual object as shown in FIGS. 3A-3I).

The symbolic view of the sensors 150 displayed alongside FIGS. 1G-1J include graphs of prophetic data corresponding to data collected by EMG sensors and time-of-flight sensors during the performance of the various gestures illustrated in FIGS. 1G-1J. As shown in the symbolic view of the sensors 150, more than one time of flight sensor 158 (e.g., s1, s2, s3) can be used to detect the performance of various gestures. In some embodiments, additional sensors can be used to detect various aspects of actions, including gestures, performed by the user 101, and other aspects of the user's physical surroundings. For example, IMU sensors 160 can be used to detect a specific force, angular rate, and/or orientation of a body part of the user 101 and/or their surroundings at any of the wrist-wearable device 102, the head-wearable device 104, or another electronic device. In some embodiments, the impedance sensors 162 include one or more sEMG sensors. In some embodiments, one or more other sensors, including camera sensors 164 are used to detect user motion and gestures (e.g., in addition to, or alternative to, the sensors described above).

FIGS. 2A-2D illustrate an example of a user scenario taking place within an artificial-reality system 200 including virtual objects and user gestures above a physical surface 210 (e.g., in-air gestures) in accordance with some embodiments. The artificial-reality system 200 includes a head-wearable device 204 (e.g., AR system 1320 in FIG. 13A) and a wrist-wearable device 202.

Figure 2A:
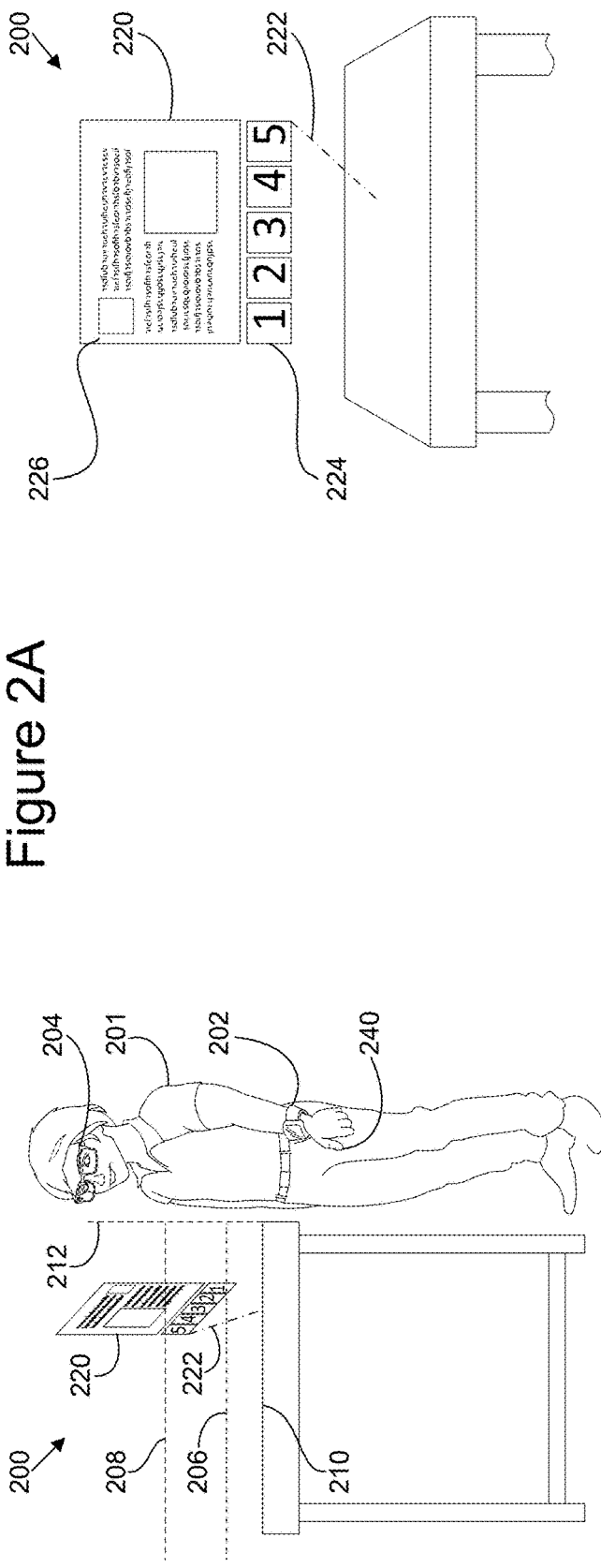
FIGS. 2A-2D illustrate another example user scenario with an artificial-reality system (e.g., including at least AR glasses and a wrist-wearable device) in accordance with some embodiments.
Figure 2A:
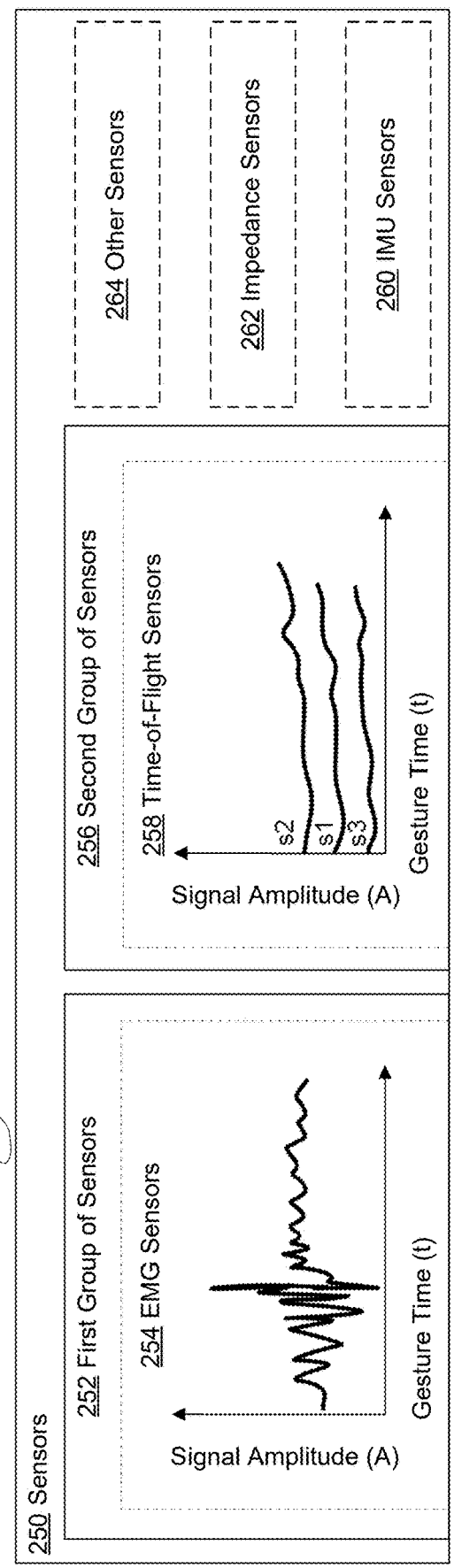
Figure 2B:
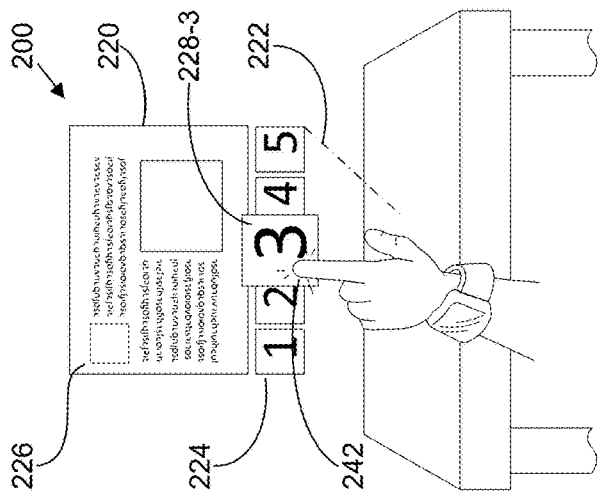
Figure 2B:
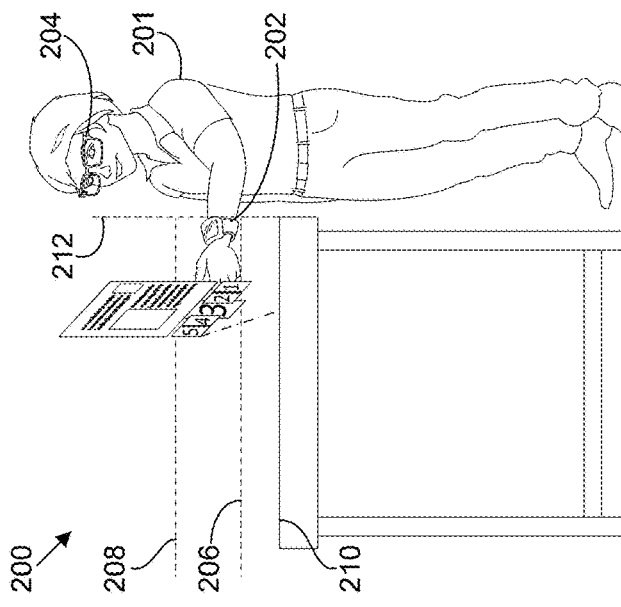
Figure 2B:
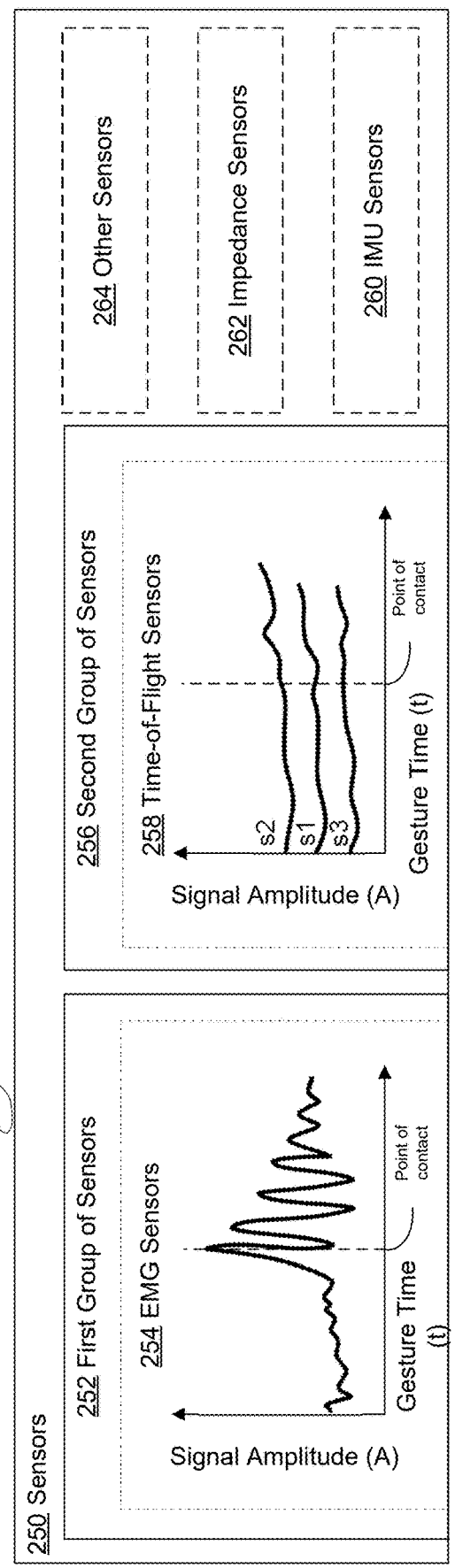
Figure 2C:
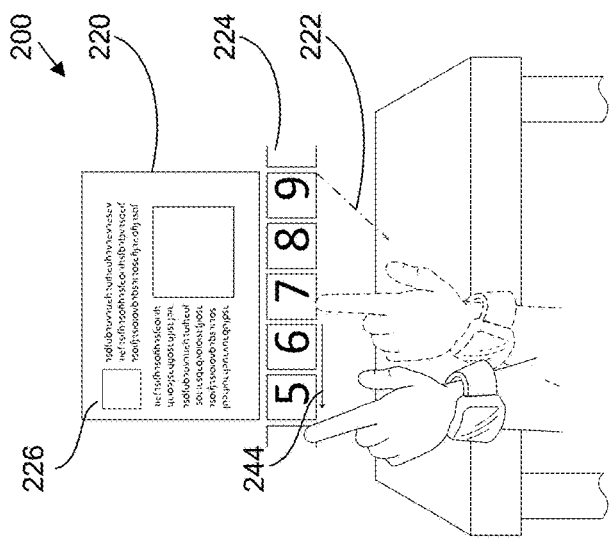
Figure 2C:
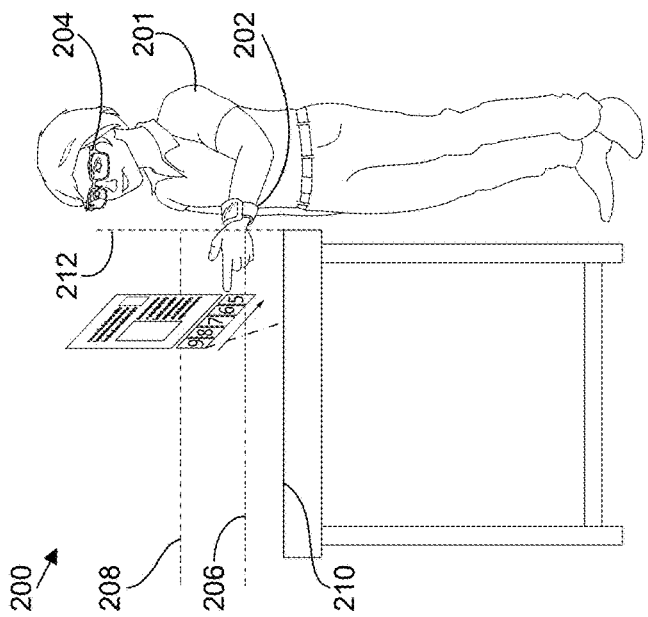
Figure 2C:
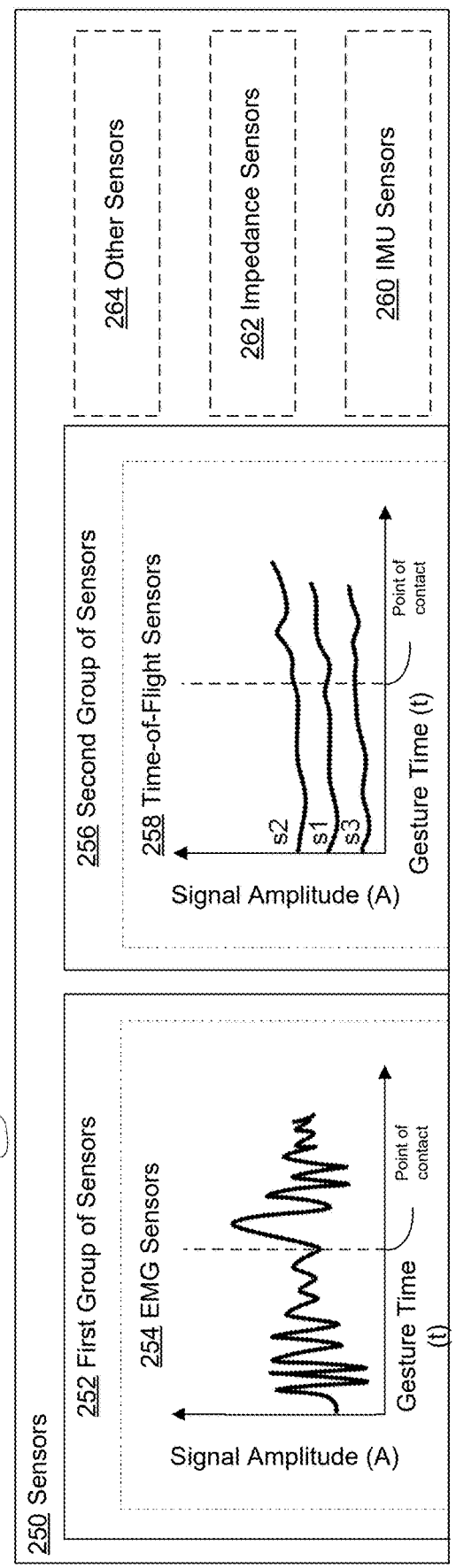
Figure 2D:
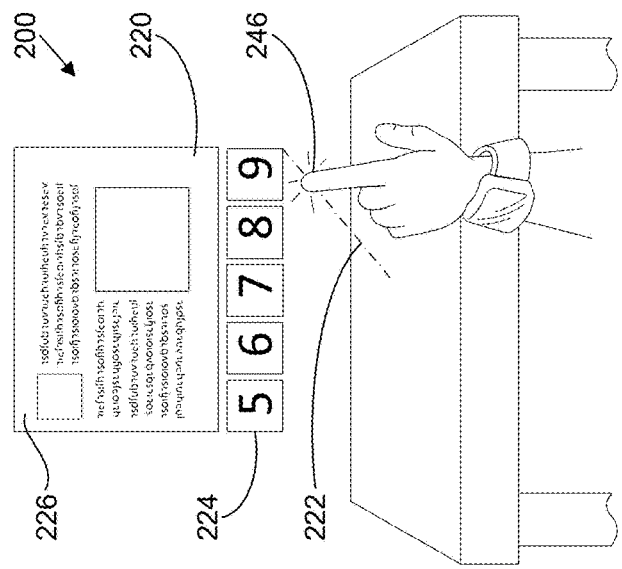
Figure 2D:
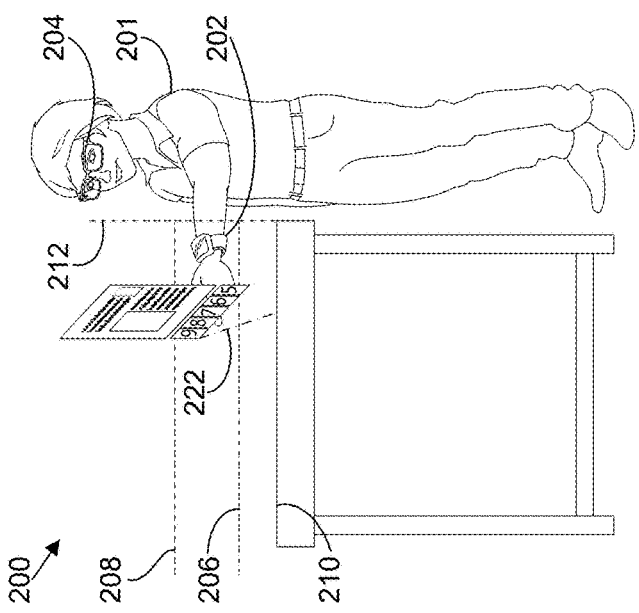
Figure 2D:
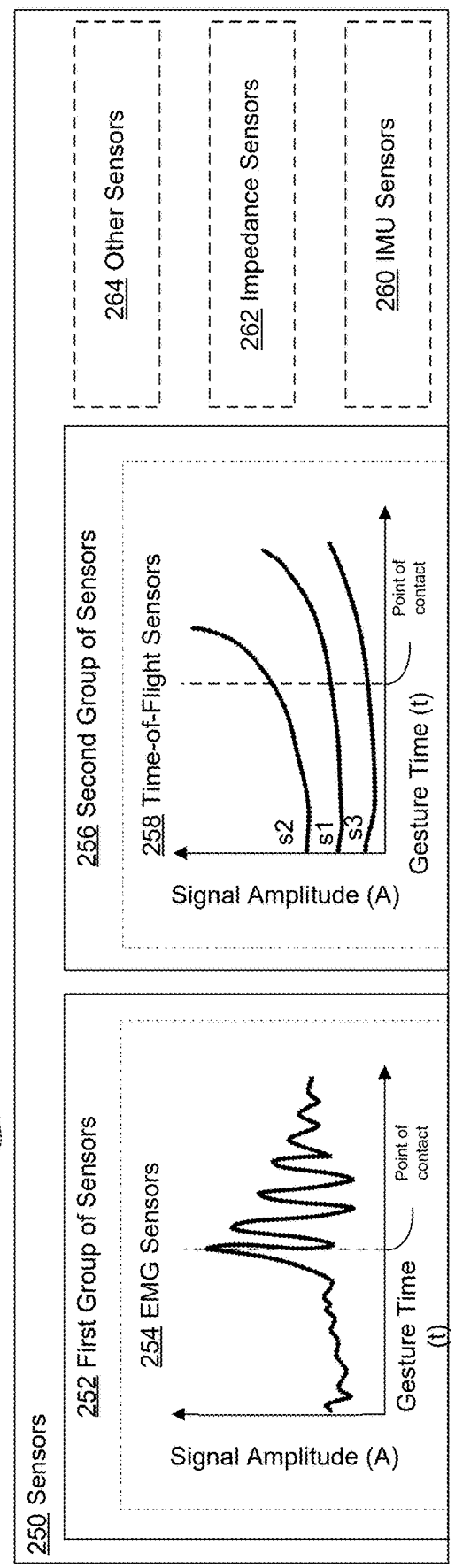

FIGS. 2A-2D also illustrate a virtual object 220. In the examples shown in FIGS. 2A-2D, the in-air virtual object is a virtual screen (also sometimes called a virtual display or virtual user interface). A skilled artisan will appreciate that the virtual object 220 can be a virtual object having various simulated dimensions, and simulated locations with respect to the field of view of the user. It will also be appreciated that the spatial relationship between the virtual object 220 and the user 201 is simulated by the head-wearable device 204. In some embodiments, the time-of-flight sensors 258 are used to determine the distance between the head-wearable device 204 and the wrist-wearable device 202 to simulate the spatial relationship between the virtual object 220 and the user 201. In some embodiments, gaze tracking as well as data from an IMU sensor (e.g., an IMU sensor 260) can be used in addition to, or as alternatives to, the use of other sensors to allow for enabling direct interactions with (and/or manipulations of) virtual objects (e.g., the interactions in which virtual objects can be contacted directly, such as is shown in FIGS. 2B-2D). Examples of indirect manipulations are also shown below in reference to FIGS. 3A-3I, in which virtual objects can be manipulated without directly contacting the virtual object.

In FIGS. 2A-2D, the user 201 is standing in proximity to a table with the physical surface 210. The user is wearing the wrist-wearable device 202 and the head-wearable device 204. The virtual object 220 is displayed above the physical surface 210 and there is a reference-lock affordance 222 displayed in a trailing manner below the virtual object 220. The reference-lock affordance 222 is usable to control the location of the virtual object 220 by allowing the user 201 to "lock" a first "reference" position of the wrist-wearable device 202 with respect to the reference-lock affordance 222. In some embodiments, the user 201 is able to make relative motions from the first reference position that cause relative motions by the virtual object 220, despite the wrist-wearable device 202 not being in the same position as the reference-lock affordance 222 (e.g., without requiring the user 101 to make simulated contact with the reference-lock affordance 222). The virtual object 220 also has an interactive display portion 226, where content (e.g., a website) can be displayed for interaction by the user 201. The virtual object 220 also has a display control portion 224. In some embodiments, the virtual object 220 is displayed without the display control portion 224. In some embodiments, the display control portion 224 is displayed at a physical surface (e.g., the physical surface 210). In some embodiments, there are one or more display controls in addition to, or alternative to, the controls displayed in the display control portion 224.

FIG. 2A also illustrates visual aids representing the surface threshold distance 206 and the in-air threshold distance 208. As will be discussed below, the in-air threshold distance 208 is associated with in-air gestures performed by the user 201 (e.g., an in-air gesture 242 in FIG. 2B and the in-air gesture 244 in FIG. 2C). FIG. 2A also shows a visual aid representing a surface edge 212 of the physical surface 210. In some embodiments, the surface 210 has more than one relevant surface edge for an example interaction in the artificial-reality system 200. In some embodiments, only location-agnostic gestures can be detected when the wrist-wearable device 202 is outside of the one or more respective surface edges of the physical surface 210. In some embodiments, surface gestures and/or in-air gestures can be detected when the wrist-wearable device is within a threshold distance outside of one of the surface edges (e.g., surface edge 212).

As shown in FIGS. 2A-2E, the sensors 250 of the wrist-wearable device 202 include a group of sensors 252, including EMG sensors 254. In some embodiments, EMG data from the EMG sensors 254 is used to determine whether the user has performed a location-agnostic gesture, such as the location-agnostic gesture 240. The sensors 250 of the wrist-wearable device 202 also include a group of sensors 256 that include time-of-flight sensors 258. In some embodiments, data from the time-of-flight sensors 258 is used to determine whether the user 201 has performed a location-agnostic gesture. In some embodiments, data from the time-of-flight sensors 258 is not used to determine whether the user 201 has performed a location-agnostic gesture. For example, the time-of-flight sensors 258 are disabled (in a low-power state) while the wrist-wearable device 202 is beyond the surface edge 212. In some embodiments, additional sensors can be used to detect various aspects of actions, including gestures, performed by the user 201, and other aspects of the user's physical surroundings. For example, IMU sensors 260 can be used to detect a specific force, angular rate, and/or orientation of a body part of the user 201 and/or their surroundings at any of the wrist-wearable device 102, the head-wearable device 104, or another electronic device. In some embodiments, the impedance sensors 262 include one or more sEMG sensors. In some embodiments, one or more other sensors 264 can be used to detect in-air gestures, including one or more imaging sensors.

In FIG. 2A, the user 201 is performing a location-agnostic gesture 240 (a "thumbs-up" gesture) to initiate the display of virtual object 220 within the artificial-reality system 200. As shown in FIGS. 4A-4D, the location-agnostic gesture 240, and other location-agnostic gestures (such as the location-agnostic gesture 440 in FIG. 4A) can be performed at different locations relative to the physical surface 210, to cause performance of the same operation with respect to the artificial-reality system 200. In some embodiments, location-agnostic gestures are not recognized if the gesture occurs within the surface threshold distance and/or the in-air threshold distance. In some embodiments, location-agnostic gestures are gestures performed beyond the surface edge and beyond the in-air threshold distance. In some embodiments, location-agnostic gestures are not recognized while the wearable device is in a particular state (e.g., a sleep state or other non-gesture state). In some embodiments, the virtual object 220 corresponds to content currently active and/or displayed at the wrist-wearable device 202 or another electronic device.

In FIG. 2B, the user 201 is performing the in-air gesture 242 at an affordance 228-3 within the virtual object 220. In the example provided by FIG. 2B, the user receives a haptic event 221 at the wrist-wearable device 202 in accordance with the in-air gesture 242 making virtual contact with the affordance 228-3.

As shown in FIG. 2B, sensors 250 of the wrist-wearable device 202 include a group of sensors 252 that include EMG sensors 254. EMG data (as shown by the prophetic data of the EMG sensors 254 in the symbolic view of the sensors 250) from the EMG sensors 254 is used to determine whether the user 201 has performed the in-air gesture 242. The sensors 250 of the wrist-wearable device 202 include a group of sensors 256 that include time-of-flight sensors 258. In some embodiments, the data from the time-of-flight sensors 258 is not used to determine whether the user 201 has performed the in-air gesture 242. For example, the EMG sensors 254 and/or the IMU sensors 260 may be used to determine whether the user 201 has performed the in-air gesture 242.

In FIG. 2C, the user is performing an in-air gesture 244 directed to the display control portion 224 of the virtual object 220. In the example provided by FIG. 2C, the user 201 receives a haptic event from the wrist-wearable device 202 in accordance with the in-air gesture 244 making virtual contact with the affordance 228-3. In some embodiments, the user 201 receives intermediate haptic events as part of the haptic event as discrete increments of a display scroll operation are performed in response to the in-air gesture 244.

As shown in FIG. 2C, sensors 250 of the wrist-wearable device 202 include a group of sensors 252 that include EMG sensors 254. EMG data from the EMG sensors 254 is used to determine whether the user 201 has performed the in-air gesture 244. The sensors 250 of the wrist-wearable device 202 include a group of sensors 256 that include time-of-flight sensors 258. In some embodiments, time-of-flight data from the time-of-flight sensors 258 is not used to determine whether the user 201 has performed the in-air gesture 244. Prophetic time-of-flight and EMG sensor data is shown in the symbolic view of the sensors 250.

In FIG. 2D, the user 201 is performing an in-air gesture 246 directed to the reference-lock affordance 222. In the example provided by FIG. 2D, the user 201 receives a haptic event at the wrist-wearable device 202 in accordance with performing the in-air gesture 246 reference-locking with the reference-lock affordance 222.

As shown in FIG. 2D, sensors 250 of the wrist-wearable device 202 include a group of sensors 252 that include EMG sensors 254. EMG data from the EMG sensors 254 is used to determine whether the user 201 has performed the in-air gesture 246. The sensors 250 of the wrist-wearable device 202 include a group of sensors 256 that include time-of-flight sensors 258. In some embodiments, time-of-flight data from the time-of-flight sensors 258 is not used to determine whether the user 201 has performed the in-air gesture 246. Prophetic time-of-flight and EMG sensor data is shown in the symbolic view of the sensors 250.

FIGS. 3A-3I illustrate an example of a user scenario with an artificial-reality system 300 including virtual objects and user gestures, which can be displayed at, above, or otherwise relative to a physical surface 310 in accordance with some embodiments. The artificial-reality system 300 includes a wrist-wearable device 302 and a head-wearable device 304 (e.g., the AR system 1320 in FIG. 13A). The user 301 in FIG. 3A-3I is standing in proximity to a table with the physical surface 310.

FIGS. 3A-3I illustrate an example of a virtual object 320. In the examples shown in FIGS. 3A-3I, the virtual object 320 is a virtual screen element. The spatial relationship between the virtual object 320 and the user 201 is simulated by the display of the head-wearable device 304. Time-of-flight sensors can be used to determine the distance between the head-wearable device 204 and the wrist-wearable device 202 to simulate the spatial relationship between the virtual object 320 and the user 301.

In FIGS. 3A-3I, the user 301 is standing in proximity to a table with the physical surface 310. The user 301 is wearing a wrist-wearable device 302 and a head-wearable device 304. A virtual object 320 is displayed above the physical surface 310. And there is a reference-lock affordance 322 displayed in a trailing manner below the virtual object 320. The virtual object 320 also has an interactive display portion 326, where content (e.g., a browser, a PDF viewing application, an image editing application, etc.) can be displayed for interaction by the user 301. And the virtual object 320 has a display control portion 324, which the user 301 can use to indirectly manipulate the interactive display portion 326. The display control portion 324 does not need to be displayed as part of virtual object 320 and can also be displayed at the physical surface 310. There can be one or more display control portions besides display control portion 324.

As shown in FIG. 3A-3I, the sensors 350 of the wrist-wearable device 302 include a group of sensors 352, including EMG sensors 354. In some embodiments, EMG data from the EMG sensors 354 is used to determine whether the user has performed a location-agnostic gesture. The sensors 350 of the wrist-wearable device 302 also include a group of sensors 356 that include time-of-flight sensors 358. In some embodiments, data from the time-of-flight sensors 358 is used to determine whether the user 301 has performed a location-agnostic gesture. In some embodiments, data from the time-of-flight sensors 358 is not used to determine whether the user 301 has performed a location-agnostic gesture. For example, the time-of-flight sensors 358 are disabled (in a low-power state) while the wrist-wearable device 302 is beyond the surface edge 312. In some embodiments, additional sensors can be used to detect various aspects of actions, including gestures, performed by the user 301, and other aspects of the user's physical surroundings. For example, IMU sensors 360 can be used to detect a specific force, angular rate, and/or orientation of a body part of the user 301 and/or their surroundings at any of the wrist-wearable device 302, the head-wearable device 304, or another electronic device. In some embodiments, the impedance sensors 362 include one or more sEMG sensors. In some embodiments, one or more other sensors 364 can be used to detect in-air gestures, including one or more imaging sensors.

Figure 3A:
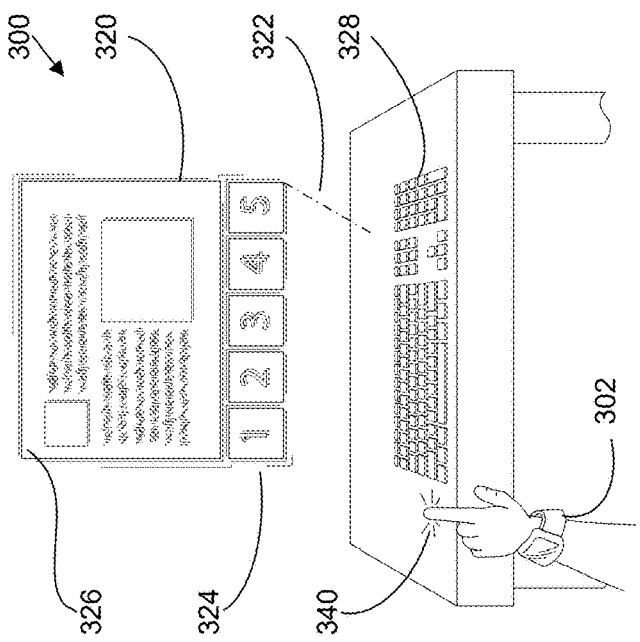
FIGS. 3A-3I illustrate another example user scenario with an artificial-reality system (e.g., including at least AR glasses and a wrist-wearable device) in accordance with some embodiments.
Figure 3A:
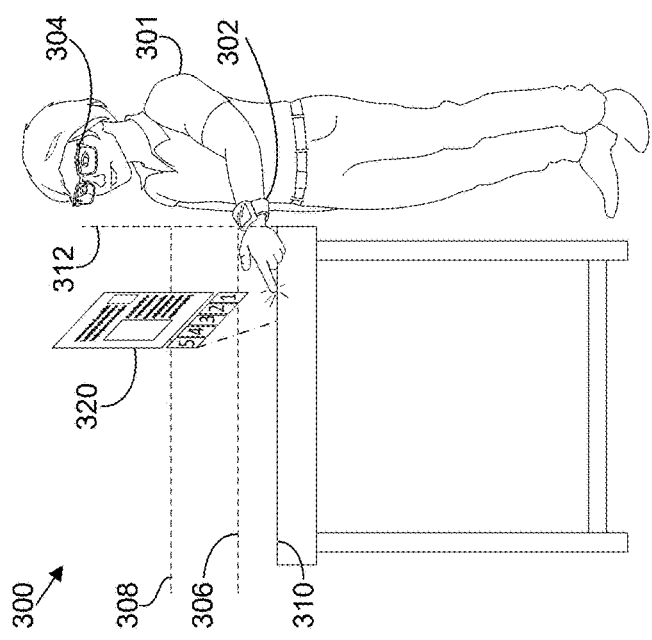
Figure 3A:
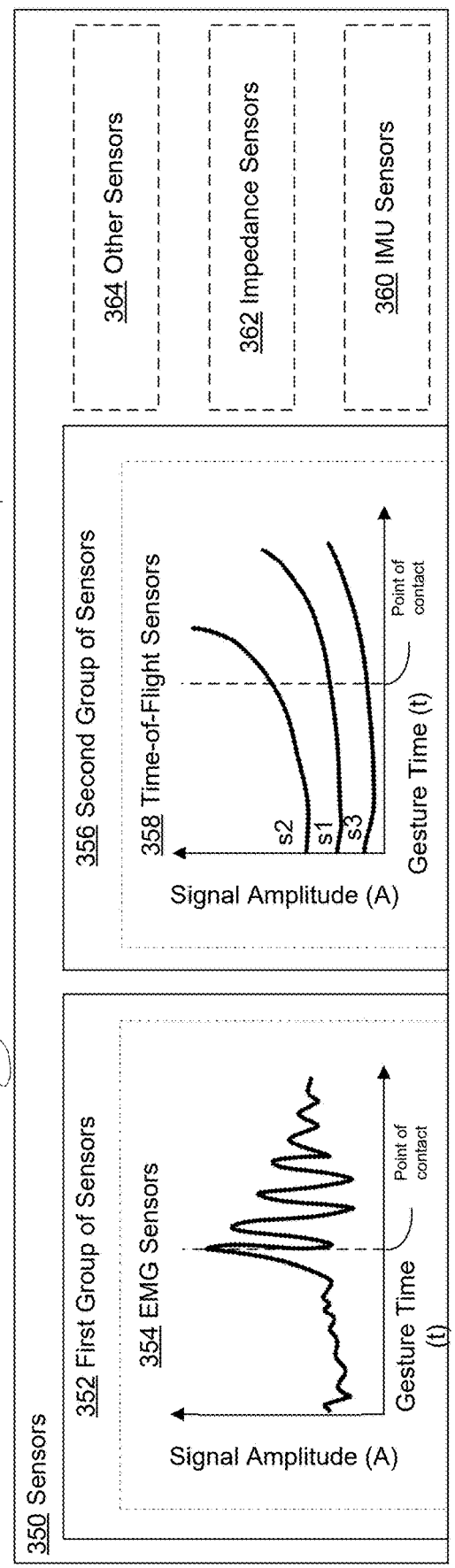

In FIG. 3A, the user 301 is performing a surface gesture 340 (e.g., a "surface tap" gesture where the user's finger makes physical contact with the physical surface 310) to initiate display of virtual object 320 which is identified as a surface gesture by the group of sensors 356 of the wrist-wearable device 302 (including, but not limited to, the time-of-flight sensors 358). The performance of the surface gesture 340 at the physical surface 310 causes an operation of the second set of operations to be performed at the head-wearable device 304 to update the display of the user interface of the artificial-reality system 300, including updating the display of the virtual object 320 by the head-wearable device 304. In some embodiments, the user 301 receives a haptic event at the wrist-wearable device 302 in accordance with contacting the physical surface 310. In the example in FIG. 3A, the performance of the surface tap gesture 340 causes an operation to be performed that changes the appearance of the virtual object 320 to indicate that the user 301 has activated a selectable function of the virtual object 320.

Figure 3B:
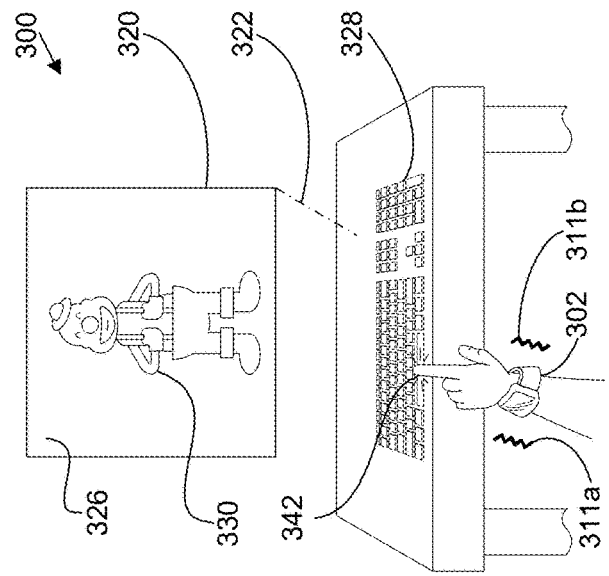
Figure 3B:
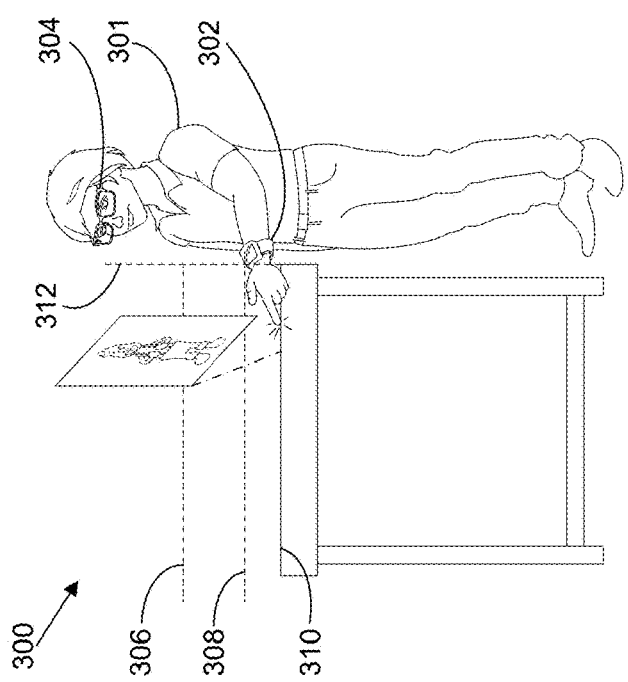
Figure 3B:
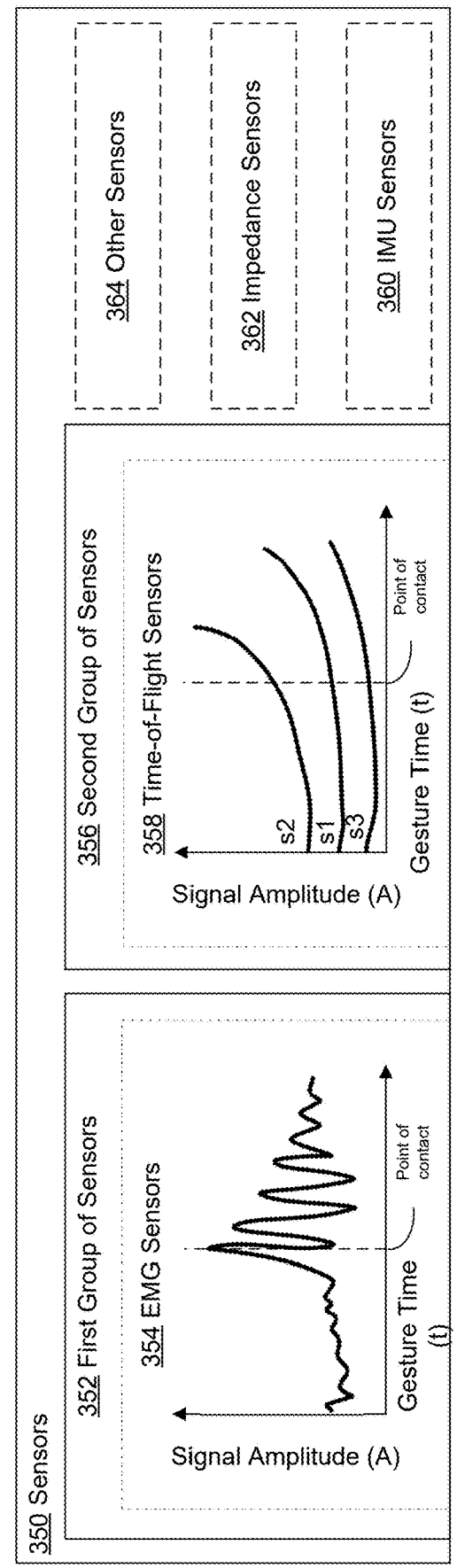

In FIG. 3B, the user 301 is performing a surface gesture 342 at an affordance of the second virtual object 328, which is identified as a surface gesture by the group of sensors 356 of the wrist-wearable device 302 (including, but not limited to, the time-of-flight sensors 358). The performance of the surface gesture 342 at the physical surface 310 causes an operation of a set of operations corresponding to in-air gestures to be performed at the head-wearable device 304 to update the display of the user interface of the artificial-reality system 300, including the display of the virtual object 320. In some embodiments, the user 301 receives a haptic event 311 (represented by the pair of reference numbers 311a and 311b) at the wrist-wearable device 302 in accordance with making virtual contact with the second virtual object 328. In the example in FIG. 3B, the performance of the surface gesture 342 causes an operation to be performed that changes the appearance of the virtual object 320 to indicate that the user 301 has activated a selectable function of the virtual object 320.

Figure 3C:
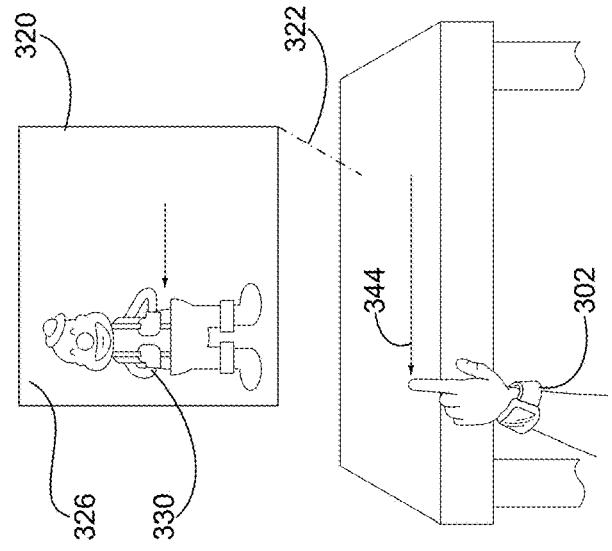
Figure 3C:
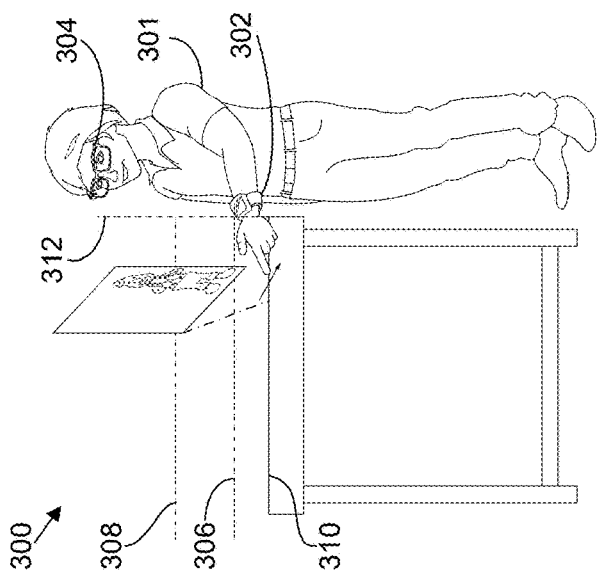
Figure 3C:
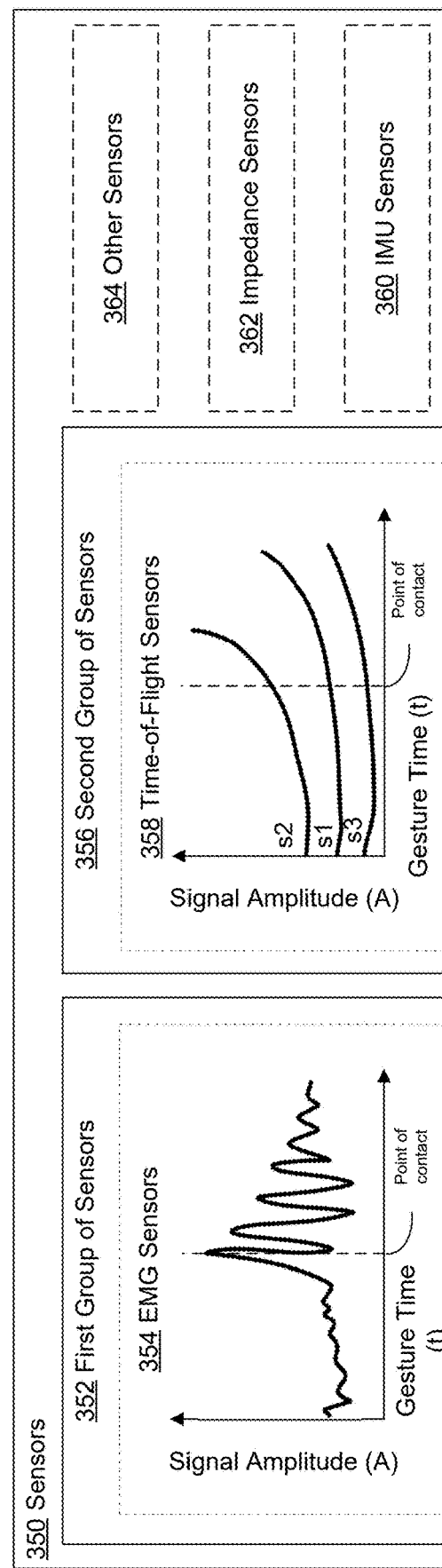

In FIG. 3C, the user 301 is performing a surface gesture 344 (e.g., a horizontal swipe gesture at or near the physical surface 310), which is identified as a surface gesture by the second group of sensors 356 of the wrist-wearable device 302 (including, but not limited to, the time-of-flight sensors 358). The performance of the surface gesture 344 causes an operation of the set of in-air operations to be performed at the head-wearable device 304 to update the display of the user interface of the artificial-reality system 300, including the display of the virtual object 320 and an affordance 330 (which is visually depicted as a smiling clown on the interactive display portion 326 of the affordance 330). In some embodiments, the user 301 receives a haptic event at the wrist-wearable device 302 in accordance with performing the surface gesture 344. In the example in FIG. 3C, the performance of the surface gesture 344 causes an operation to be performed that changes the appearance of the virtual object 320, including the location of the affordance 330.

Figure 3D:
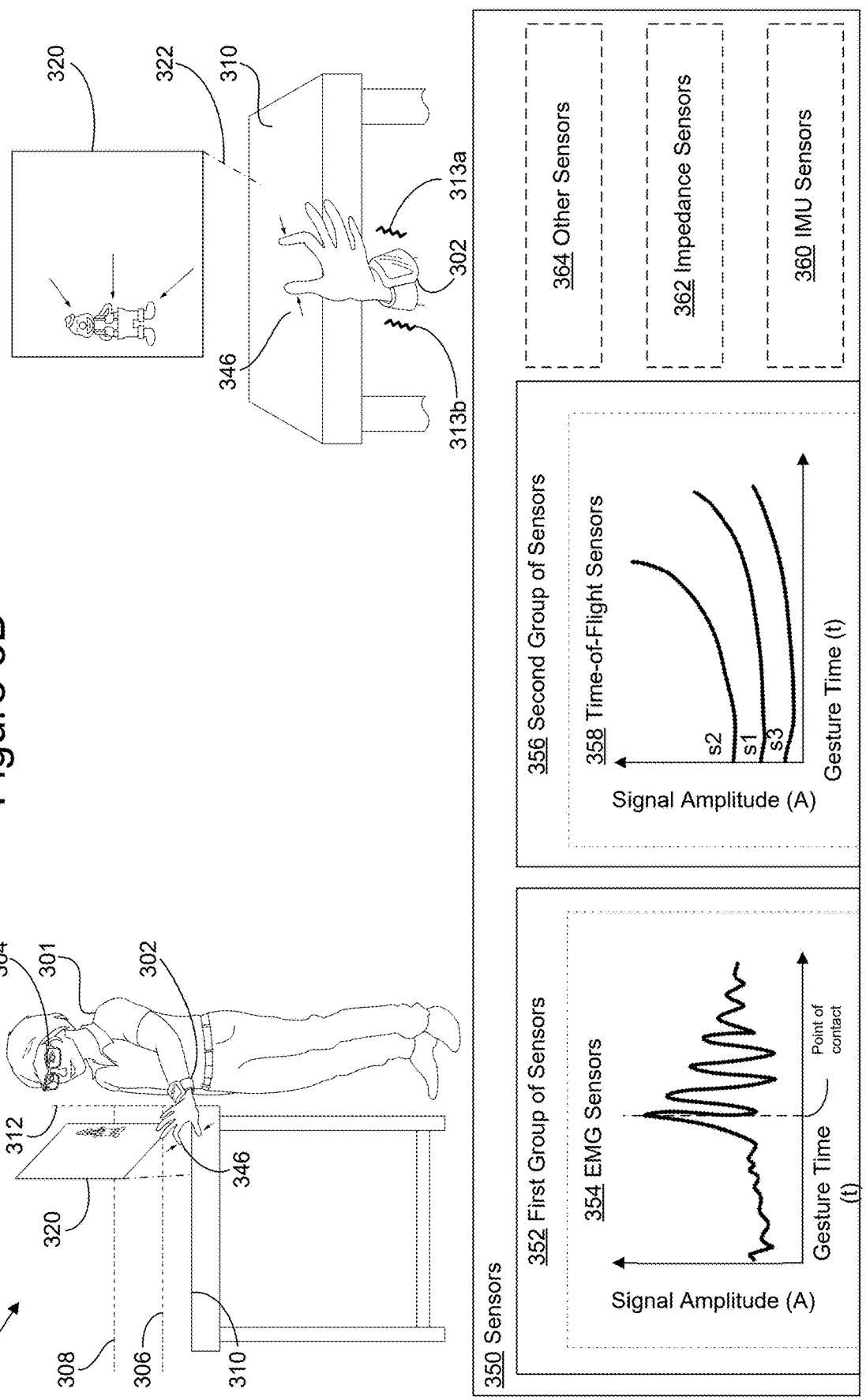

In FIG. 3D, the user 301 is performing a location-agnostic gesture 346 (a pinch gesture within the surface threshold distance of the physical surface 210), which is identified as a location-agnostic gesture by the group of sensors 356 of the wrist-wearable device 302 (including, but not limited to, the time-of-flight sensors 358), despite the wrist-wearable device 302 identifying that the location-agnostic gesture 346 occurred within the surface threshold distance 306 of the physical surface 310. The performance of the location-agnostic gesture 346 above the physical surface 310 causes an operation of a set of location-agnostic gestures to be performed at the head-wearable device 304 to update the display of the user interface of the artificial-reality system 300, including the display of the virtual object 320 and the affordance 330 (which is visually shrinking in response to the location-agnostic gesture 346). In some embodiments, the user 301 receives a haptic event 313 (represented by the pair of reference numbers 313a and 313b) at the wrist-wearable device 302 in accordance with performing the location-agnostic gesture 346. In the example in FIG. 3D, the user 301 performing the location-agnostic gesture 346 causes an operation from the set of location-agnostic gestures to be performed that changes the appearance of the virtual object 320, including the location of the affordance 330 at the virtual object 320.

Figure 3E:
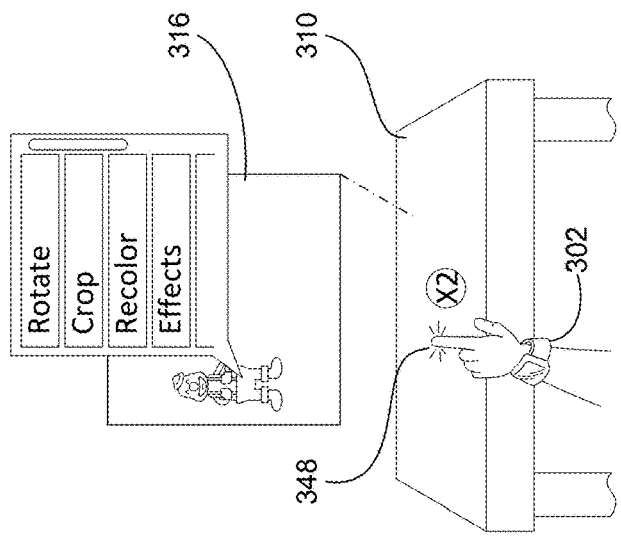
Figure 3E:
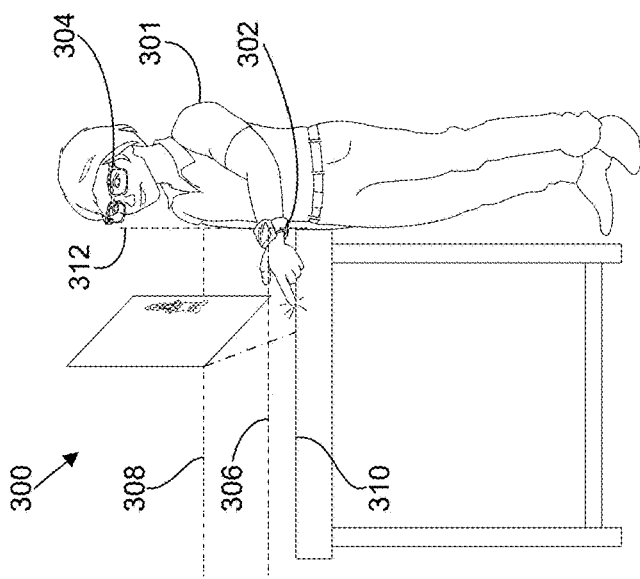
Figure 3E:
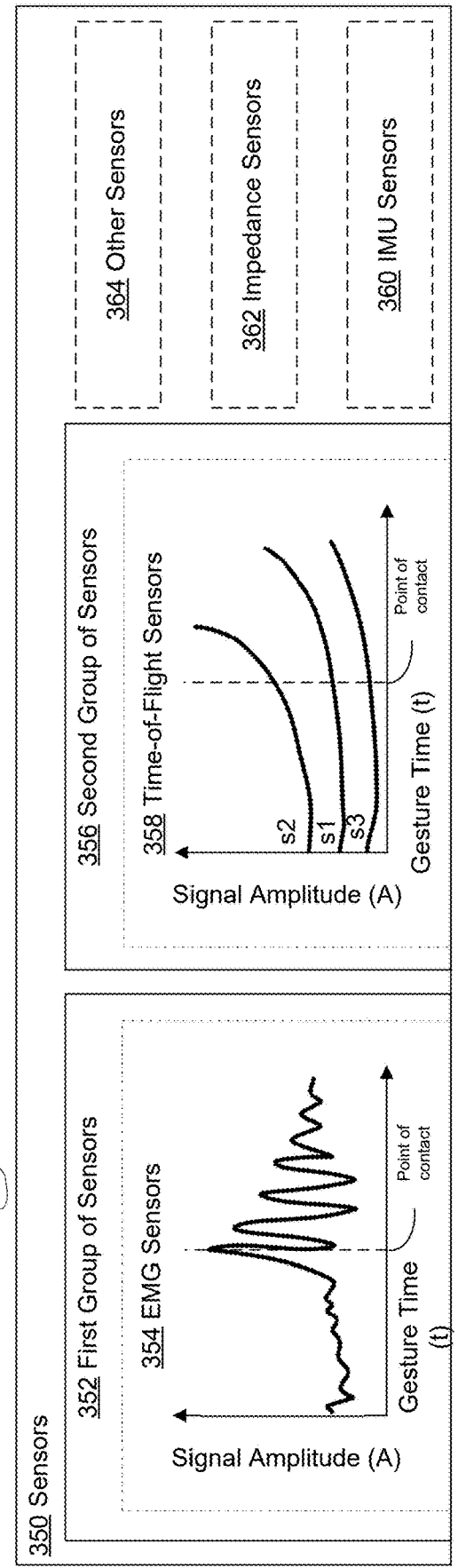

In FIG. 3E, the user 301 is performing a surface gesture 348 (a double-tap gesture performed within the surface threshold distance 306 of the physical surface 310), which is identified as a surface gesture by the group of sensors 356 of the wrist-wearable device 302 (including, but not limited to, the time-of-flight sensors 358). The performance of the surface gesture 348 at the physical surface 310 causes an operation of the set of operations corresponding to surface gestures to be performed at the head-wearable device 304 to update the display of the user interface of the artificial-reality system 300, including the display of the virtual object 320 and the affordance 330 (displaying additional options for adjusting the appearance of the affordance 330). The user 301 receives a haptic event at the wrist-wearable device 302 in accordance with performing the surface gesture 348. Specifically, the user 301 receives an individual haptic sub-event for each time they make physical contact with the physical surface 310. In the example in FIG. 3E, the performance of the surface gesture 348 causes an operation to be performed that changes the appearance of the virtual object 320, including the appearance of the affordance 330.

Figure 3F:
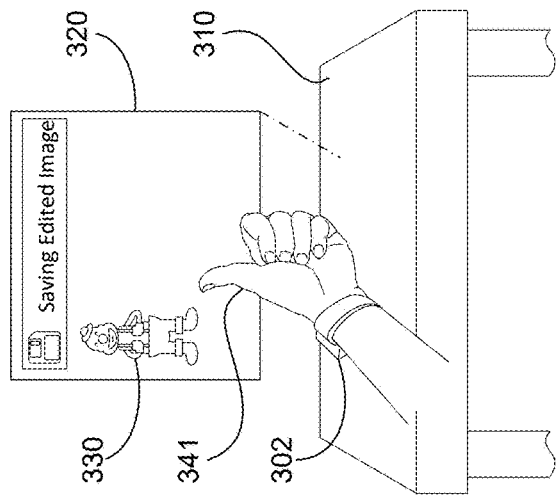
Figure 3F:
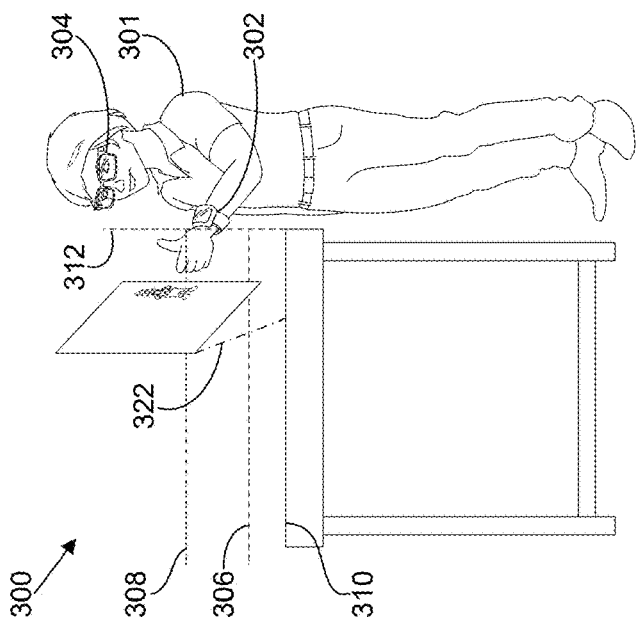
Figure 3F:
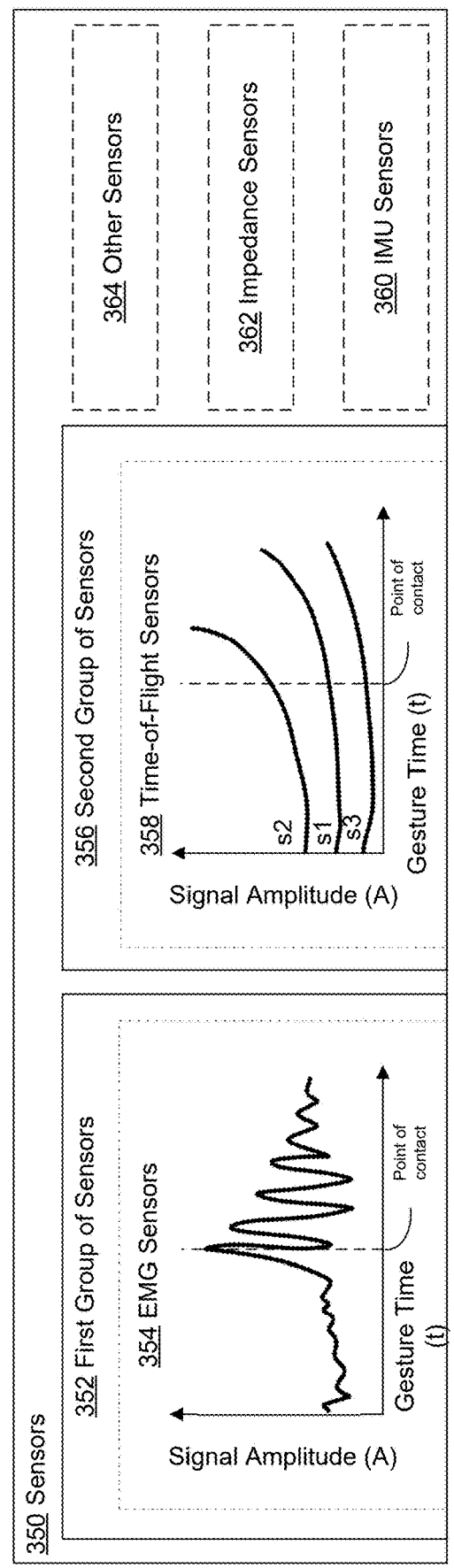

In FIG. 3F, the user 301 is performing a location-agnostic gesture 341 above the physical surface 310, which is identified as a location-agnostic gesture by the sensors 350 of the wrist-wearable device 302. The performance of the location-agnostic gesture 341 at the physical surface 310 causes an operation of the third set of operations corresponding to location-agnostic gestures to be performed at the head-wearable device 304 to update the display of the user interface of the artificial-reality system 300, including the display of the virtual object 320 and the affordance 330 (saving the current state of the affordance 330). The user 301 receives a haptic event at the wrist-wearable device 302 in accordance with performing the location-agnostic gesture 341. In the example in FIG. 3F, the performance of the location-agnostic gesture 341 causes an operation to be performed that changes the appearance of the virtual object 320, including the appearance of the affordance 330.

Figure 3G:
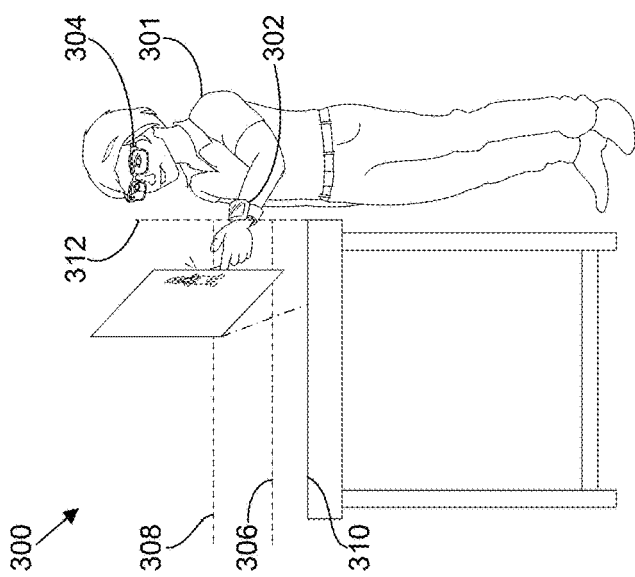
Figure 3G:
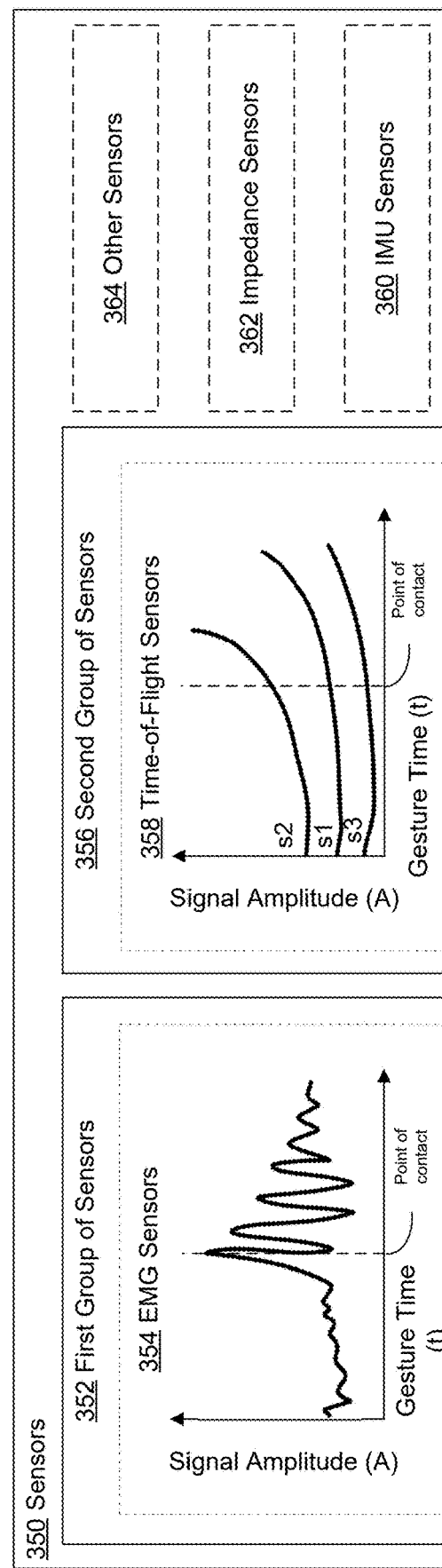

In FIG. 3G, the user 301 is performing an in-air gesture 343 (a virtual tap gesture at the simulated location of the virtual object 320 above the physical surface 310), which is identified as an in-air gesture by a group of sensors 352, including an EMG sensor 354. The performance of the in-air gesture 343 at the physical surface 310 causes an operation of the set of operations corresponding to in-air gestures to be performed at the head-wearable device 304 to update the display of the user interface of the artificial-reality system 300, including the display of the virtual object 320 and the affordance 330 (reference-locking the affordance 330 in the virtual object 320). The user 301 receives a haptic event 317 at the wrist-wearable device 302 in accordance with performing the location-agnostic gesture 341. In the example in FIG. 3F, the performance of the location-agnostic gesture 341 causes an operation to be performed that changes the appearance of the virtual object 320, including the appearance of the affordance 330.

Figure 3H:
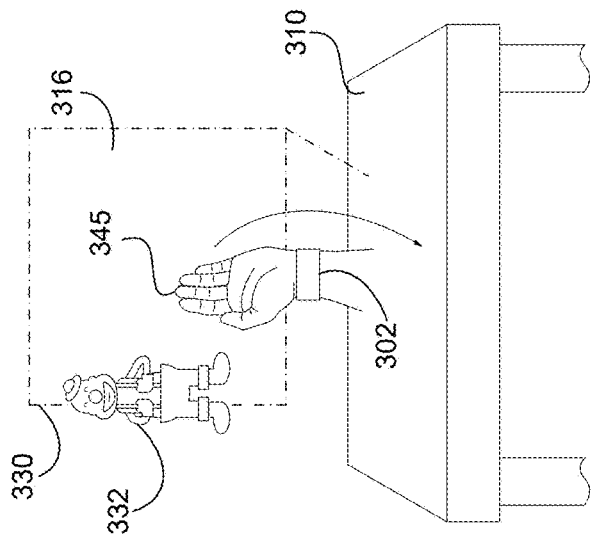
Figure 3H:
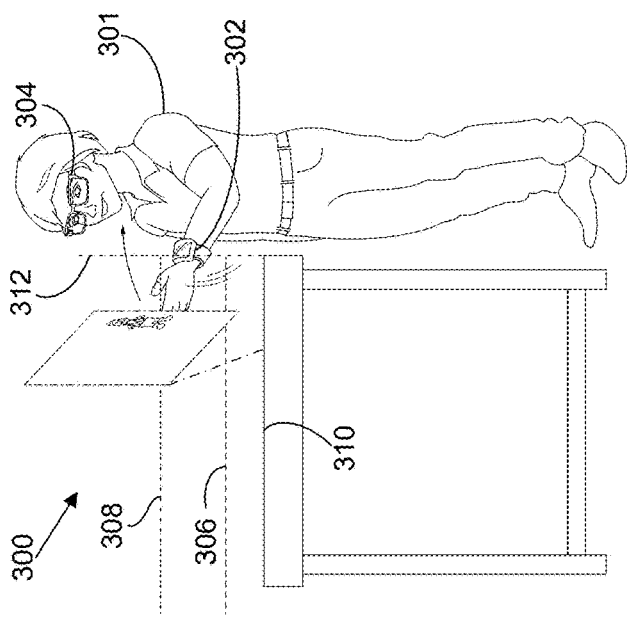
Figure 3H:
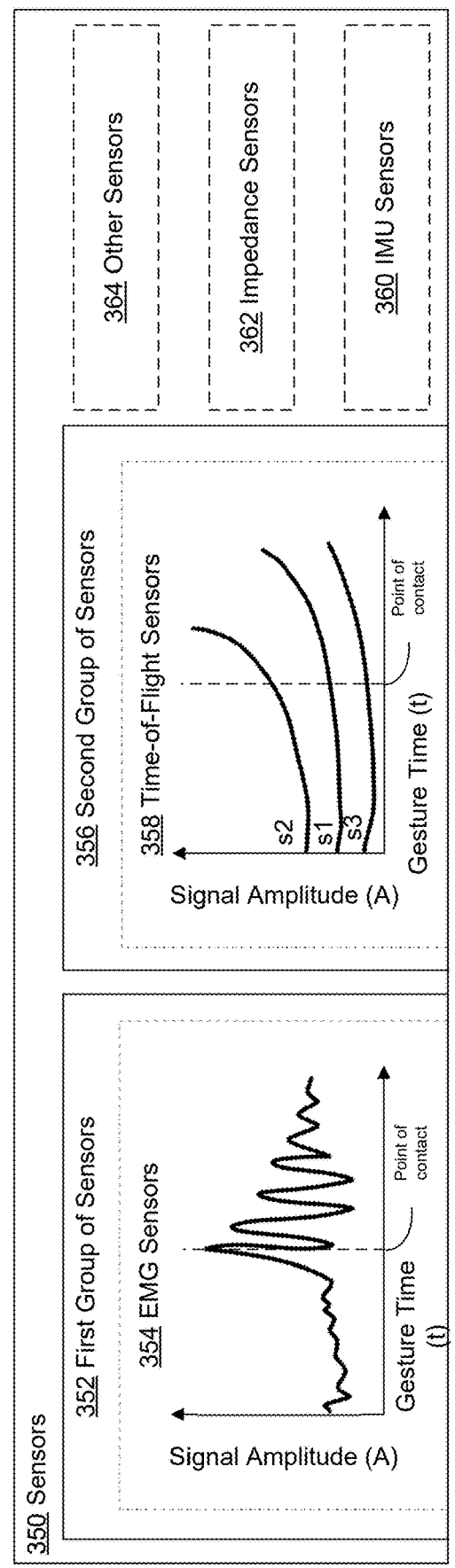

In FIG. 3H, the user 301 is performing a location-agnostic gesture 345 (a virtual pull gesture directed to the affordance 330 displayed at the virtual object 320), which is identified as an in-air gesture by a group of sensors 352, including an EMG sensor 354. The performance of the location-agnostic gesture 345 at the physical surface 310 causes an operation of a set of operations corresponding to in-air gestures to be performed at the head-wearable device 304 to update the display of the user interface of the artificial-reality system 300, including the display of the virtual object 320, and the affordance 330 (reference-locking the affordance 330 in the virtual object 320). In the example in FIG. 3H, the performance of the location-agnostic gesture 345 causes an operation to be performed that changes the appearance of the virtual object 320, including the appearance of the affordance 330 (the affordance 330 visually pulls away from virtual object 320).

Figure 3I:
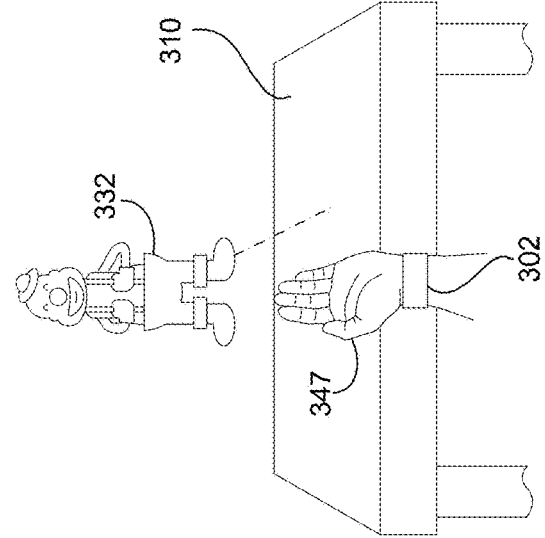
Figure 3I:
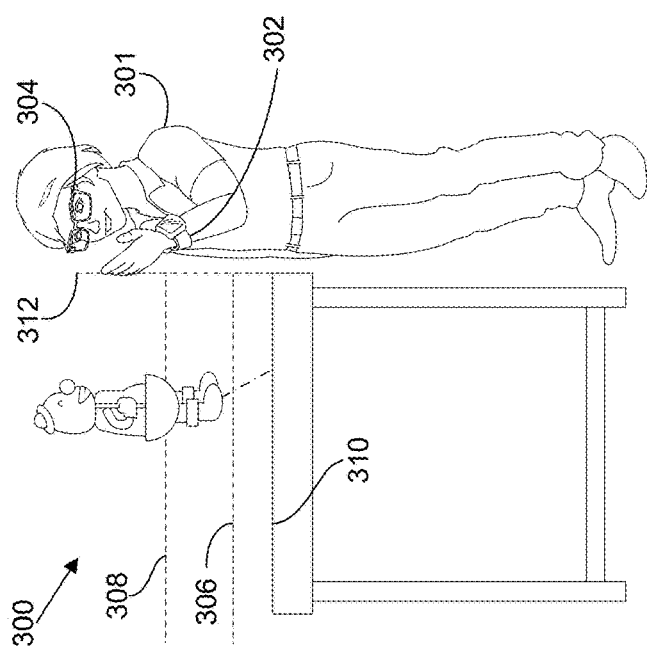
Figure 3I:
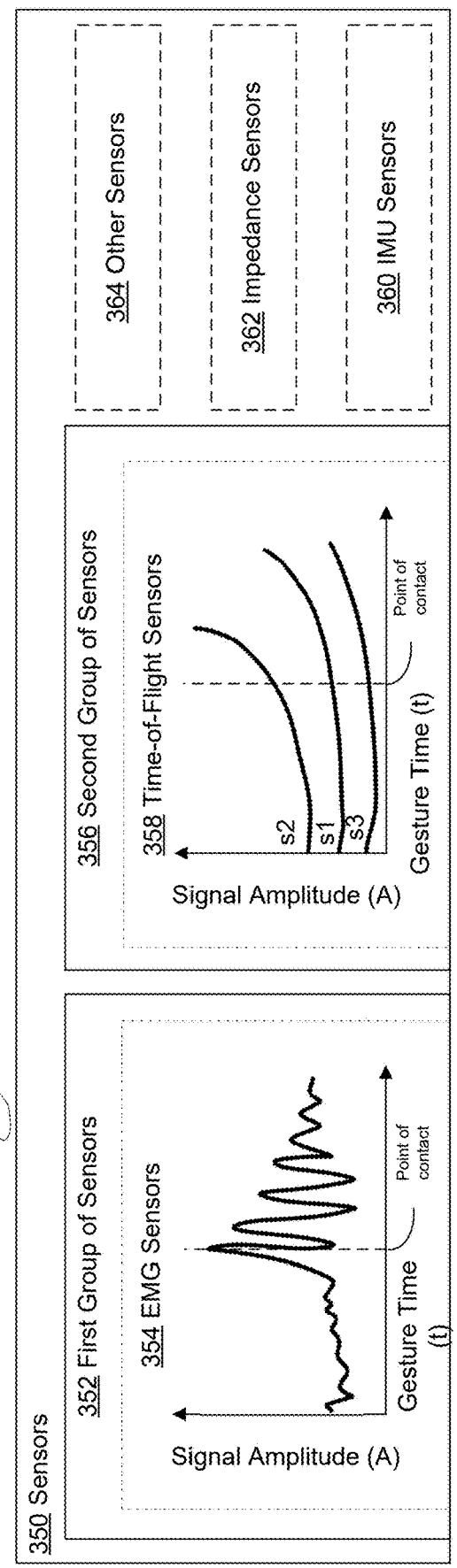

In FIG. 3I, the user 301 is performing a location-agnostic gesture 347 (a continued virtual pull gesture directed to the affordance 330 displayed at the virtual object 320), which is identified as a location-agnostic gesture by a group of sensors 352, including an EMG sensor 354. The performance of the location-agnostic gesture 347 at the physical surface 310, causes an operation of the third set of operations to be performed at the head-wearable device 304 to update the display of the user interface of the artificial-reality system 300, including the display of the virtual object 320, and the affordance 330 (reference-locking the affordance 330 in the virtual object 320). In the example in FIG. 3I, the performance of the location-agnostic gesture 345 causes an operation to be performed from the set of operations corresponding to location-agnostic gestures that changes the appearance of the virtual object 320, including the appearance of the affordance 330 (the affordance 330 visually pulls away from virtual object 320, and becomes a three-dimensional virtual object 332, as shown in FIG. 3I).

FIGS. 4A-4D illustrate an example of a user scenario with an artificial-reality system 400 including virtual objects and user gestures that can be displayed at, above, or otherwise relative to a physical surface in accordance with some embodiments. The artificial-reality system 400 includes a wrist-wearable device 402 and a head-wearable device 404 (e.g., AR system 1320 in FIG. 13A). The user 401 in FIG. 4A-4D is standing in proximity to a table with the physical surface 410.

FIG. 4A-4D illustrate an example of a virtual object 420. In the examples shown in FIGS. 4A-4D, the virtual object 420 is a virtual screen element. The spatial relationship between the virtual object 420 and the user 401 is simulated by the head-wearable device 404. In other words, the virtual object 420 is provided to the user 401 to appear at simulated three-dimensional location in the physical environment of the user 401. Time-of-flight sensors can be used to determine the distance between the head-wearable device 404 and the wrist-wearable device 402 to simulate the spatial relationship between the virtual object 420 and the user 401.

In FIG. 4A-4D, the user 401 is standing in proximity to a table with the physical surface 410. The user 401 is wearing a wrist-wearable device 402 and a head-wearable device 404. A virtual object 420 is displayed above the physical surface 410. And there is a reference lock affordance 422 displayed in a trailing manner below the virtual object 420. The virtual object 420 also has an interactive display portion 426, where content (e.g., a browser) can be displayed for interaction by the user 401. A key aspect of the examples illustrated in FIGS. 4A-4D is that certain location-agnostic gestures cause the same operation to be performed in the artificial-reality system 400, regardless of where they occur relative to the physical surface 410. But a skilled artisan will appreciate that in some circumstances the user 401 performing a location-agnostic gesture will not be recognized as such because of criterion including, for instance, the location of the wrist-wearable device and or the state of the sensors 450.

Sensors at the wrist-wearable device 402 in FIG. 4A-4D can include any of the sensors 450, including a group of sensors 452 that include EMG sensors 454, and a group of sensors 456 that include time-of-flight sensors 458. In some embodiments, data from the time-of-flight sensors 458 is not used to determine whether the user 401 has performed a location-agnostic gesture. For example, the time-of-flight sensors 458 are disabled (in a low-power state) while the wrist-wearable device 402 is beyond the surface edge 412. In some embodiments, additional sensors can be used to detect various aspects of actions, including gestures, performed by the user 401, and other aspects of the user's physical surroundings. For example, IMU sensors 460 can be used to detect a specific force, angular rate, and/or orientation of a body part of the user 401 and/or their surroundings at any of the wrist-wearable device 402, the head-wearable device 404, or another electronic device. In some embodiments, impedance sensors 462 include one or more sEMG sensors. In some embodiments, other sensors 464 can be used including, for example, imaging sensors, audio sensors, etc.

Figure 4A:
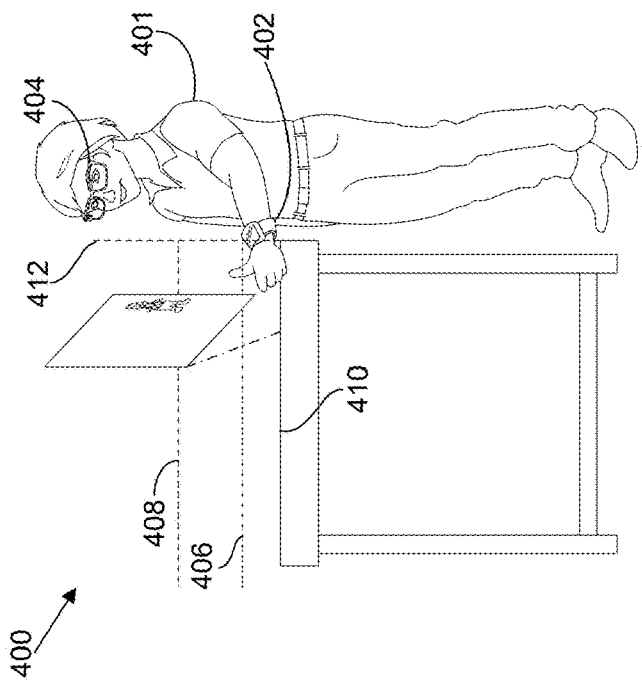
FIGS. 4A-4D illustrate another example user scenario with an artificial-reality system (e.g., including at least AR glasses and a wrist-wearable device) in accordance with some embodiments.
Figure 4A:
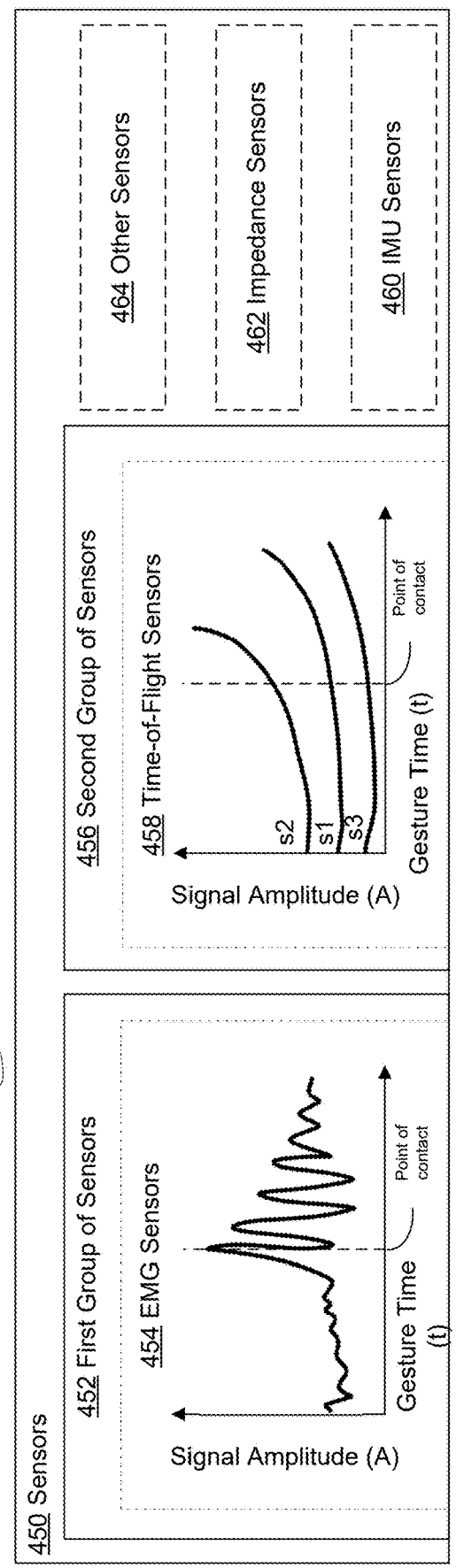

In FIG. 4A, the user 401 performs a location-agnostic gesture 440 (a "thumbs-up" gesture performed while the user's hand is above the physical surface 410, within the surface threshold distance 406 of the physical surface 410). In FIG. 4A, the location-agnostic gesture 440 is performed within the surface threshold distance 406 of the physical surface 410. The user 401 performing the location-agnostic gesture 440 above the physical surface 410 causes the head-wearable device 404 to perform an operation from a set of location-agnostic operations to save the current state of the two-dimensional affordance 430 of the virtual object 420.

Figure 4B:
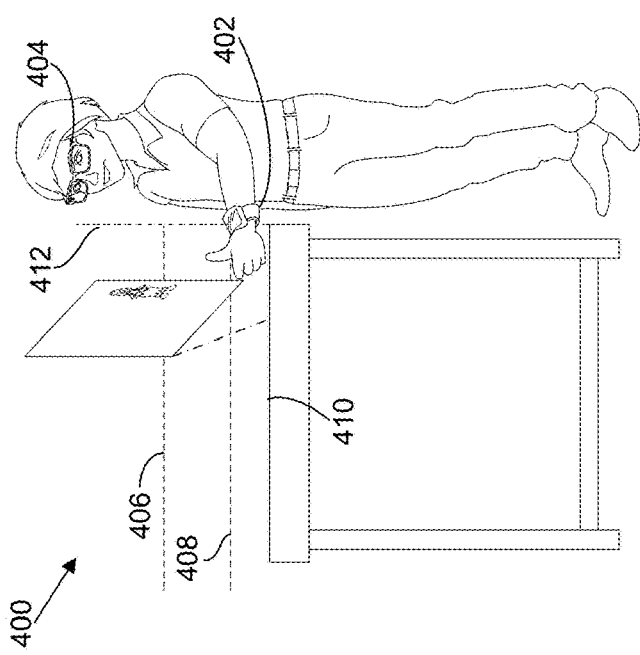
Figure 4B:
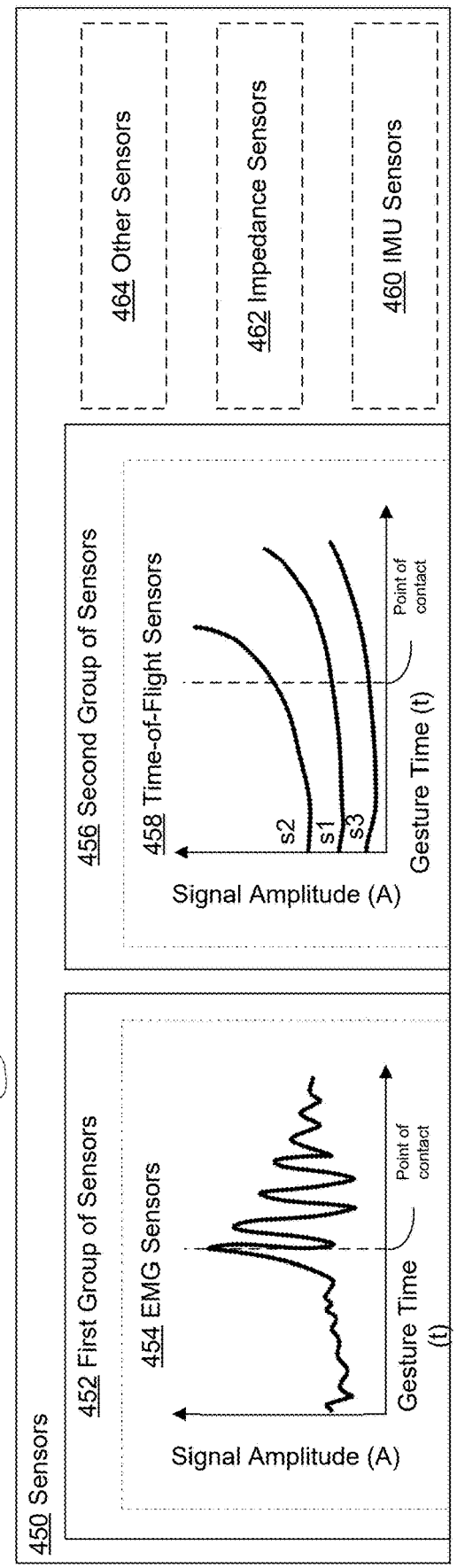

In FIG. 4B, the user 401 performs a location-agnostic gesture 442 (a "thumbs-up" gesture performed while the user's hand is in contact with the physical surface 410). The user 401 performing the thumbs-up gesture 442 within the surface threshold distance causes the head-wearable device to perform an operation from a set of location-agnostic operations to save the current state of the two-dimensional affordance 430 in the interactive display portion 426 of the virtual object 420. It should be noted that even though the thumbs-up gesture 442 is performed within the surface threshold distance 406, it does not cause an operation from the second set of operations to be performed even though the second set of operations is typically associated with the surface gestures.

Figure 4C:
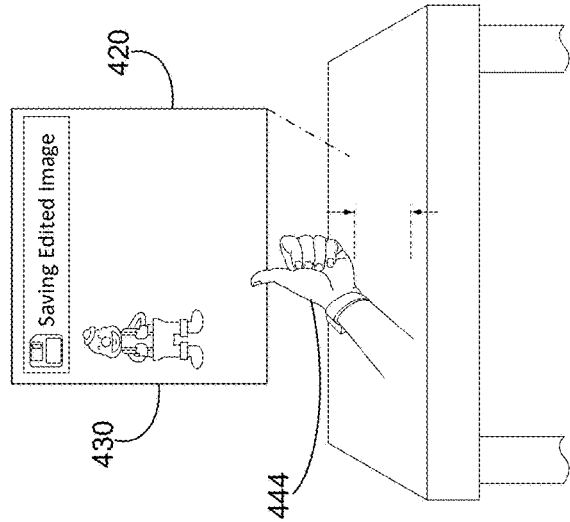
Figure 4C:
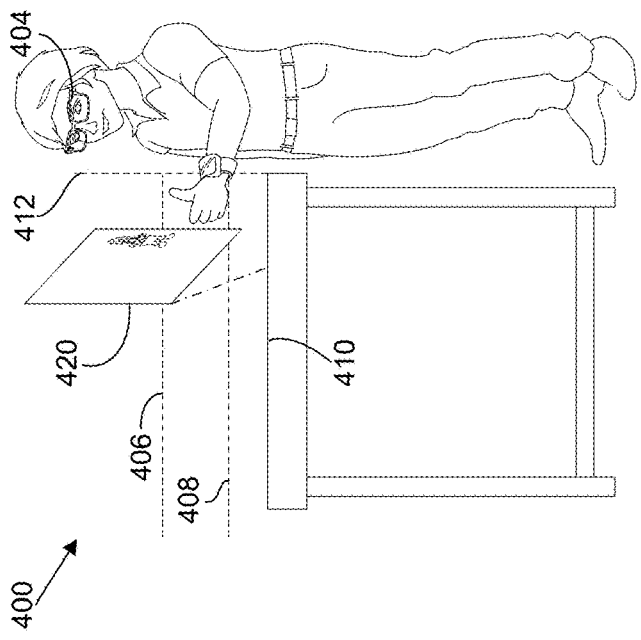
Figure 4C:
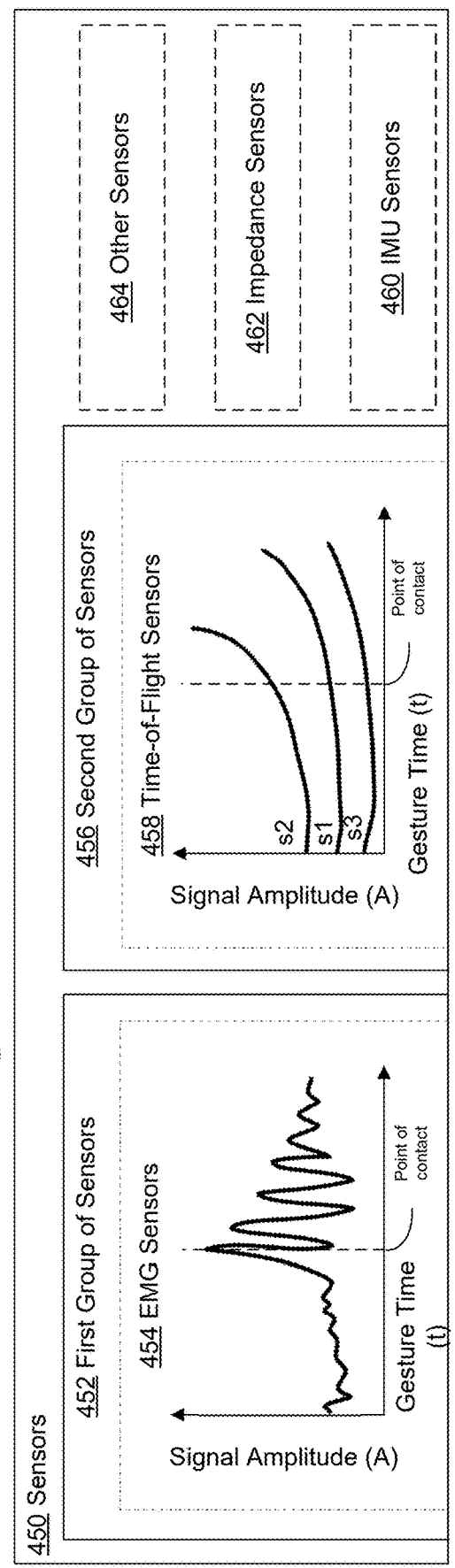

In FIG. 4C, the user 401 performs a location-agnostic gesture 444 (a "thumbs-up" gesture performed while the user's hand is in the in-air threshold distance 406 the physical surface 410). The user 401 performing the location-agnostic gesture 444, within the in-air threshold distance 408 causes the head-wearable device 404 to perform an operation from a set of location-agnostic operations to save the current state of the affordance 430 of the virtual object 420. A skilled artisan will appreciate that even though the location-agnostic gesture 444 is performed within the in-air threshold distance 408, it does not cause an operation from the second set of operations to be performed even though the second set of operations is typically associated with the surface gestures.

Figure 4D:
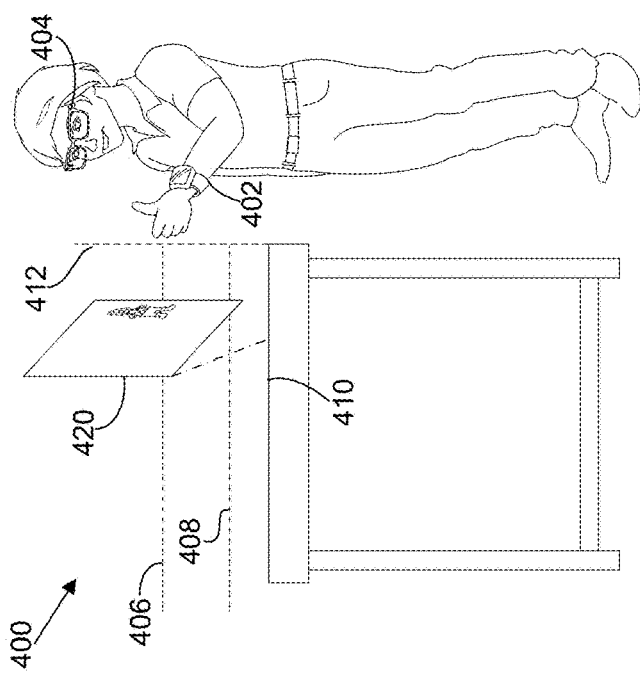
Figure 4D:
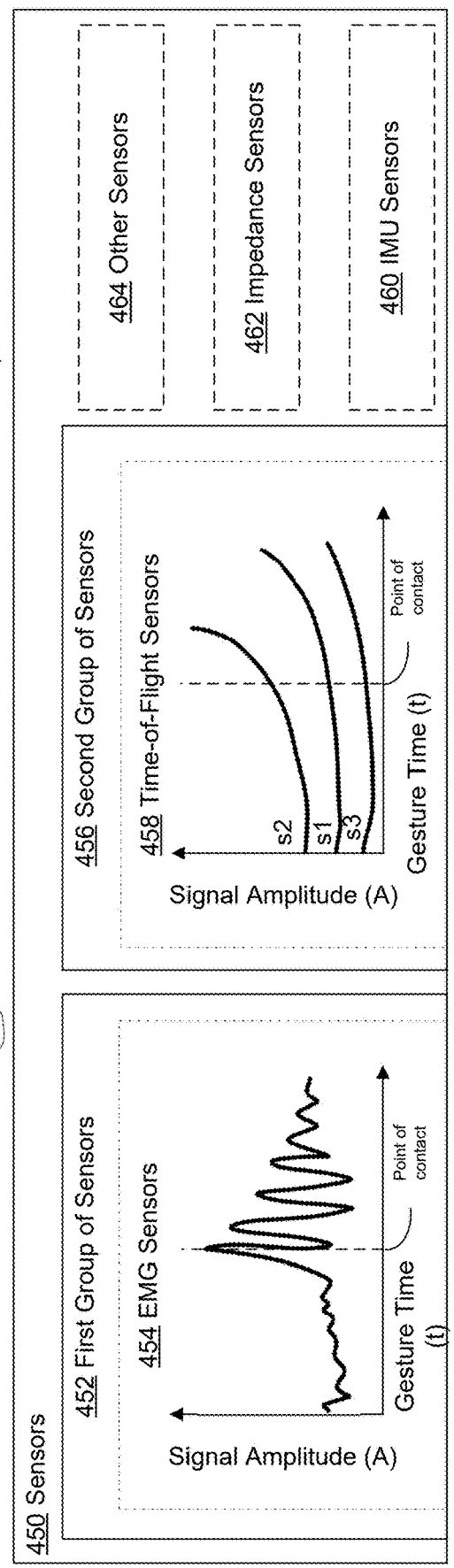

In FIG. 4D, the user 401 performs a location-agnostic gesture 446 (a "thumbs-up" gesture performed while the user's hand is outside of the surface edge 412 of the physical surface and is also not within either the surface threshold distance 406 or the in-air threshold distance 408). The user 401 performing the location-agnostic gesture 446, within the in-air threshold distance 408 causes the head-wearable device 404 to perform an operation from a set of location-agnostic operations to save the current state of the two-dimensional affordance 430 of the virtual object 420. It should be noted that even though the location-agnostic gesture 446 is performed within the in-air threshold distance 408, it does not cause an operation from the first set of operations to be performed even though the first set of operations is typically associated with the surface gestures.

FIGS. 5A-5H illustrate an example of a user scenario with an artificial-reality system including virtual objects and user gestures that cause performance of operations to adjust control options of physical objects (e.g., electronic devices), which can be provided as representations of the physical objects (e.g., with augmented visual display features over-layed on the electronic device). The artificial-reality system 500 includes a wrist-wearable device 502 and a head-wearable device 504 (e.g., AR system 1320 in FIG. 13A). The user 501 in FIG. 5A-5H is standing in proximity to a table with the physical surface 510. There is a physical object, an electronic device 570, on the physical surface 510.

Figure 5A:
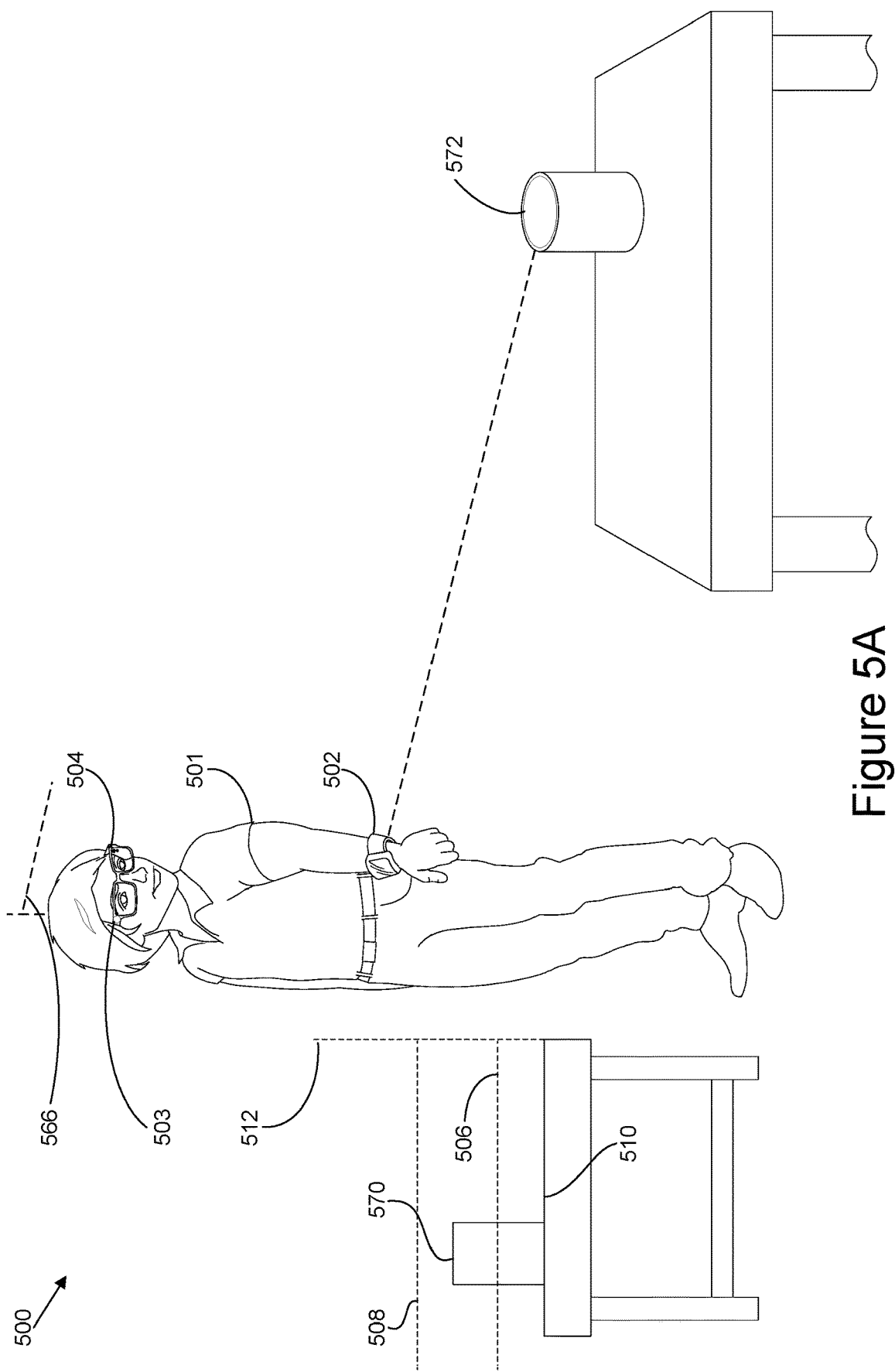

In FIG. 5A, the user 501 is wearing a wrist-wearable device 502 and a head-wearable device 504. The user 501 is oriented in a gaze direction 566 that is directed to an electronic device 572. In the examples illustrated by FIGS. 5A-5H, the electronic device 570 is only responsive to the user's gestures when the user 501 has a gaze direction 566 that is within a predefined gaze range of the electronic device 570. In FIG. 5A, there is also an electronic device 570 that is capable of being interacted with by the user 501. The device is located at a physical surface 510 of a coffee table, and there are visual aids to represent that there is a surface threshold distance 506 and an in-air threshold distance 508 associated with the table. There is also a surface edge 512 associated with the coffee table. In some embodiments, the user 501 can perform surface gestures within the surface threshold distance 506 of the physical surface 510, and in-air gestures within the in-air threshold distance 508. However, FIGS. 5A-5H illustrate embodiments where the user 501 is performing gestures outside of each respective region (e.g., away from the surface).

Figure 5B:
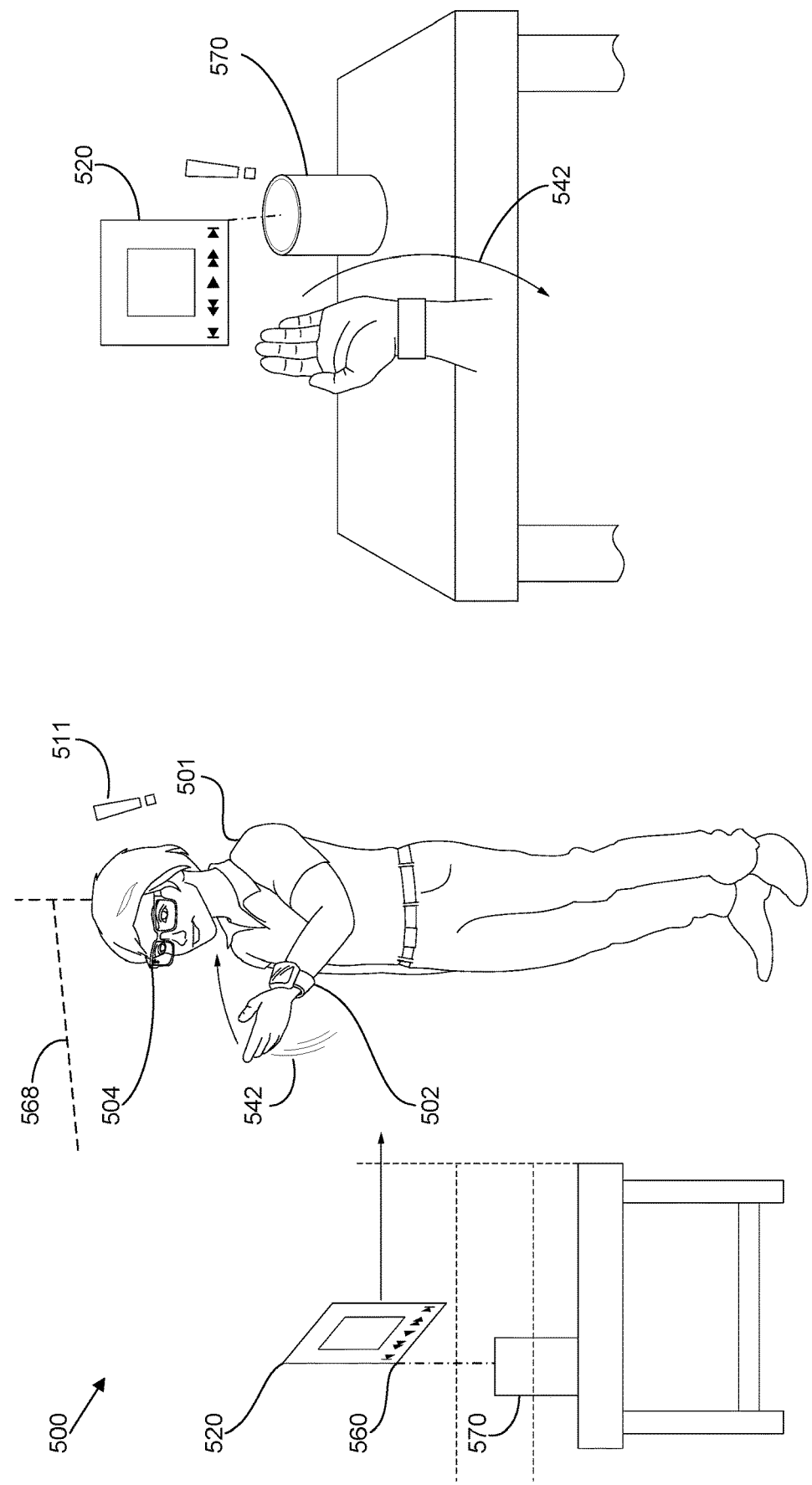

In FIG. 5B, the user 501 has a gaze direction 568 that is directed within a predefined gaze range of the electronic device 570. In some embodiments, when the user 501 has a gaze direction within the predefined gaze range of the electronic device 570 (e.g., gaze direction 568), the user 501 can perform gestures directed to the electronic device 570 to cause performance of operations related to the function of the electronic device 570. In the example shown, the electronic device 570 is a smart home speaker, and the user 501 is able to perform gestures to cause the electronic device 570 to play music. In some embodiments gestures can cause operations to be performed at one or more additional devices with additional control options that can be distinct from the control options of the electronic device 570.

In FIG. 5B, the user 501 is performing a virtual pull gesture 542 (e.g., a beckoning gesture) directed to the electronic device 570. In response to detecting, based on data from a group of sensors of the wrist-wearable device 502, the virtual pull gesture 542, the head-wearable device 504 is caused to display a virtual object 520. The virtual object 520 is displayed at a simulated location near the electronic device 570. In some embodiments, one or more additional gesture criteria must be met for the virtual pull gesture 542 to cause the performance of the operation to display the virtual object 520. For example, certain levels of EMG detection can be considered in determining whether to cause the operation to be performed at the head-wearable device 504 to display the virtual object 520. As show in FIG. 5B, the virtual object 520 can be displayed at a home display location 560 relative to the electronic device 570.

Figure 5C:
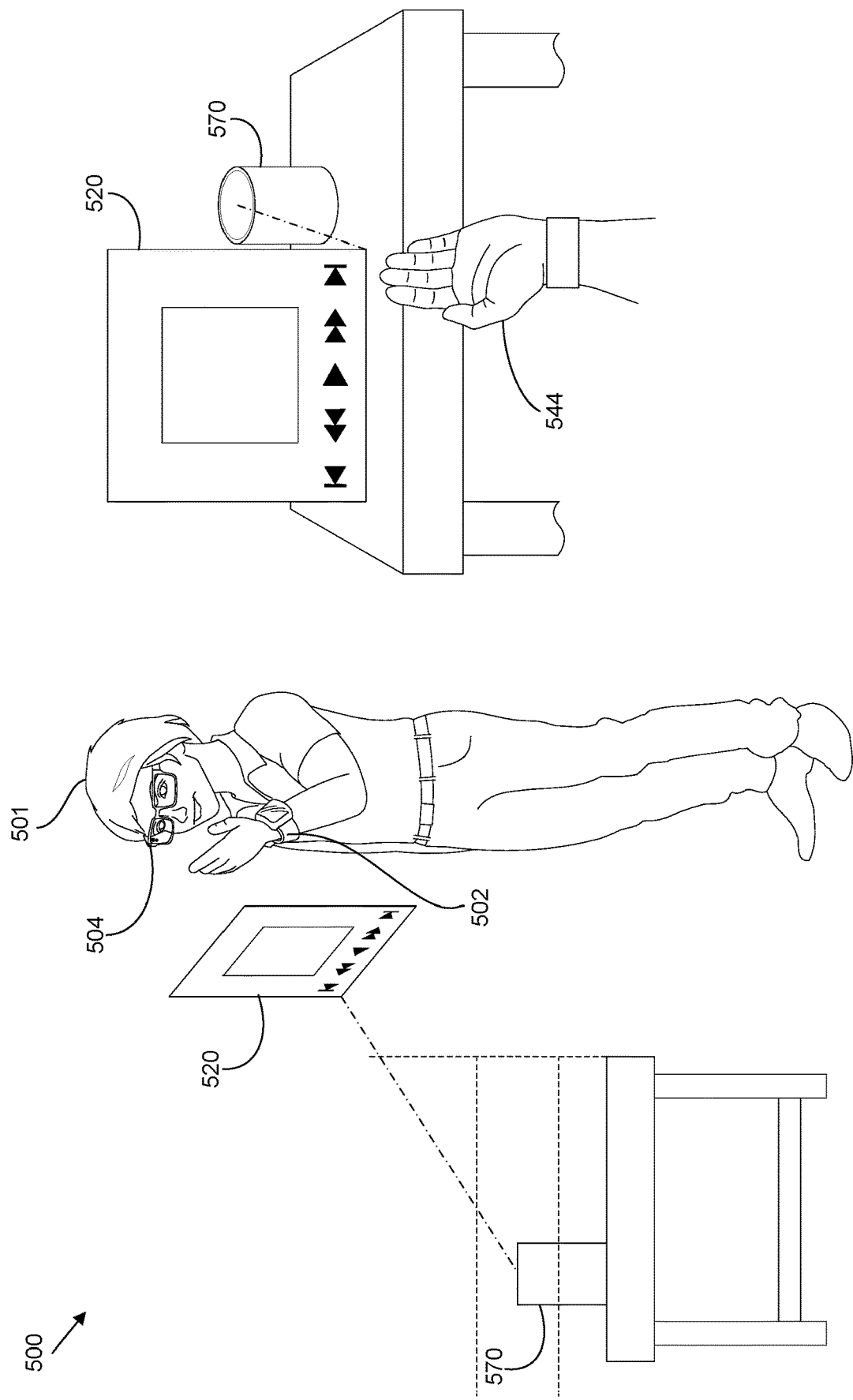

In FIG. 5C, the user 501 is performing an in-air gesture 544 directed to the virtual object 520 (e.g., a "virtual pull" gesture). The in-air gesture 544 is similar to the virtual pull gesture 542 in FIG. 5B, but since is directed to the virtual object 520 instead of the electronic device 570, and therefore causes performance of a distinct operation to that performed in FIG. 5B that corresponds to the displayed virtual object 520. Specifically, in response to detecting, based on data from a group of sensors of the wrist-wearable device 502, the in-air gesture 544 directed to the virtual object 520 in FIG. 5C causes the performance of an operation at the head-wearable device 504 to update the display of the virtual object 520 within the artificial-reality system 500.

In FIG. 5D, the user 501 is performing a virtual swipe gesture 546, which can be detected as either an in-air gesture or a location-agnostic gesture, at the interactive display portion 526 of the virtual object 520. In the example shown in FIG. 5D, the user 501 is performing the virtual swipe gesture 546 at a two-dimensional affordance 530 within the interactive display portion 526 of the virtual object 520. The virtual swipe gesture 546 in Figure causes performance of several operations at the head-wearable device and/or the electronic device 570. For one, an operation is performed at the head-wearable device 504 that causes the display of the virtual object 520 to be updated in the artificial-reality system 500. The update to the display changes the content displayed in the interactive display portion 526 of the virtual object 520. Additionally, the in-air gesture 544 causes an operation to be performed at the wrist-wearable device 502 that causes a haptic event at the wrist-wearable device 502 when the user 501 makes a virtual touch contact with the simulated location of the virtual object 520. Further, a second haptic event is provided at the wrist-wearable device when the user's virtual touch contact with the simulated location of the virtual object 520 continues with the in-air gesture 544. In some embodiments, the haptic events provided as part of these operations performed at the wrist-wearable device 502 correspond to the actual force that would be applied to the user 501 if the virtual object 520 were a physical object with material properties.

In FIG. 5E, the user 501 is performing a virtual tap gesture 548 at a two-dimensional affordance 530 within the interactive display portion 526 of the virtual object 520. In the example shown in FIG. 5E, the user 501 is selecting a song from a playlist to be played at the electronic device 570. When the user 501 makes simulated contact with the two-dimensional affordance 530, a haptic event 590 is provided at the wrist-wearable device. Data from the first group of sensors is used to detect the virtual tap gesture 548 at the simulated location of the two-dimensional affordance 530. For example, an EMG sensor and/or an optical imaging sensor can detect positions and/or movements of the user's hand. The virtual tap gesture 548 causes an operation from a first set of operations to be performed at the head-wearable device 504 to update the display of the virtual object 520 in the artificial-reality system 500. While various specific updates are possible, in the example of FIG. 5E, the user receives a visual indication that the song has been selected in the form of a user-interface element 528 that is separately display from the virtual object 520. In some embodiments, the user 501 can perform a pinch gesture to hide the user-interface element 528.

Figure 5G:
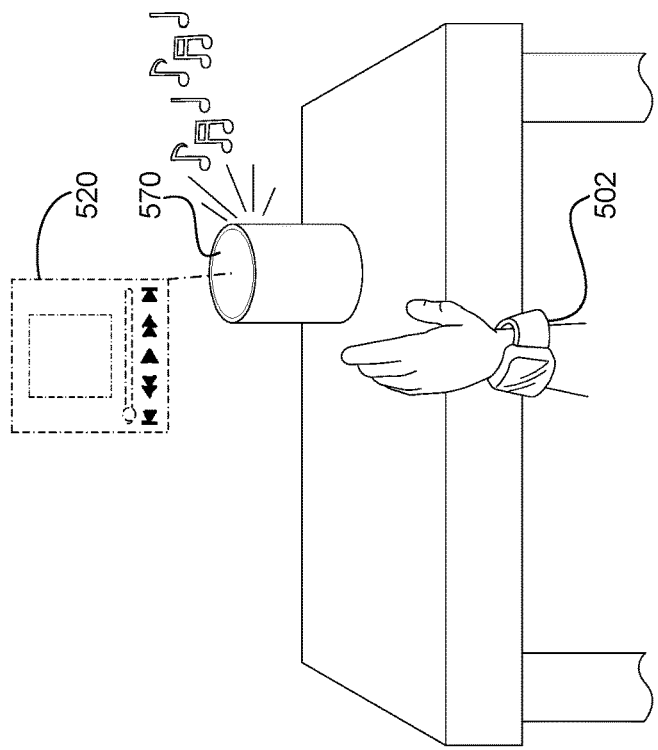
Figure 5F:
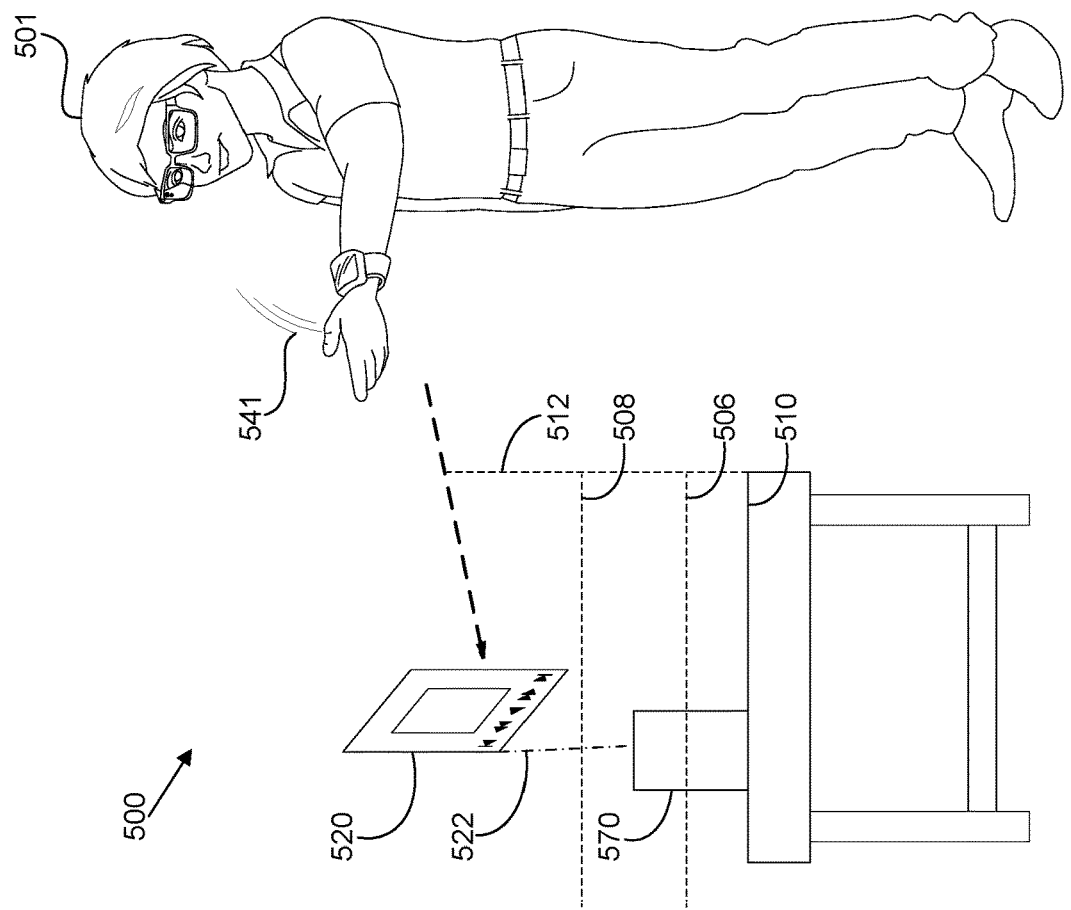

In FIG. 5F, the user is performing a virtual push gesture 541 directed at the virtual object 520, which causes an operation to be performed at the head-wearable device 504 to update the display of virtual object 520 such that it performs an animated movement towards the electronic device 570. As the virtual object 520 is animated along its path toward the electronic device 570, the electronic device 570 performs an operation that causes an audial confirmation to be emitted from the electronic device 570, which indicates to the user that the song selection has been confirmed at the electronic device 570. The animated movement of the virtual object 520 continues until the virtual object 520 reaches the home display location 560 relative to the electronic device 570.

In FIG. 5G, the virtual object 520 animates to a hidden state as playback of the song selected by the user 501 begins at the electronic device 570. The animation of the virtual object 520 is in accordance with the virtual object reaching the home display location 560 relative to the electronic device 570. Once the virtual object reaches the home display location 560 relative to the electronic device 570, an operation is performed at the head-wearable device 504 which causes an update to the display of the virtual object 520. As shown in FIG. 5G, the update to the display of the virtual object 520 is an animated sequence that hides the virtual object 520. In accordance with the virtual object 520 being hidden from display in the artificial-reality system 500, the user 501 also receives a haptic event at the wrist-wearable device 502.

Figure 5H:
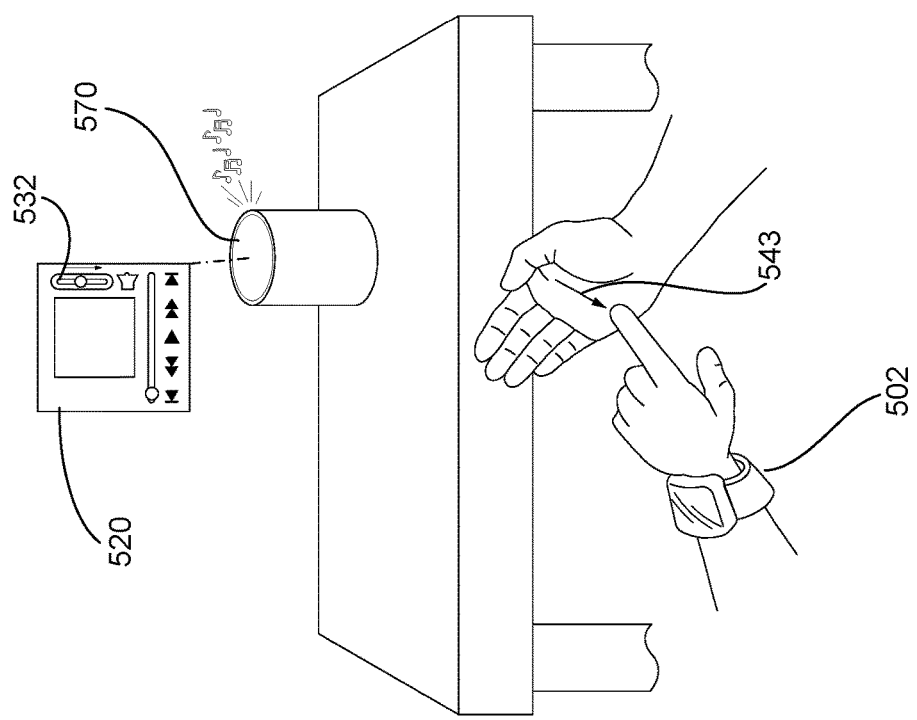
Figure 5H:
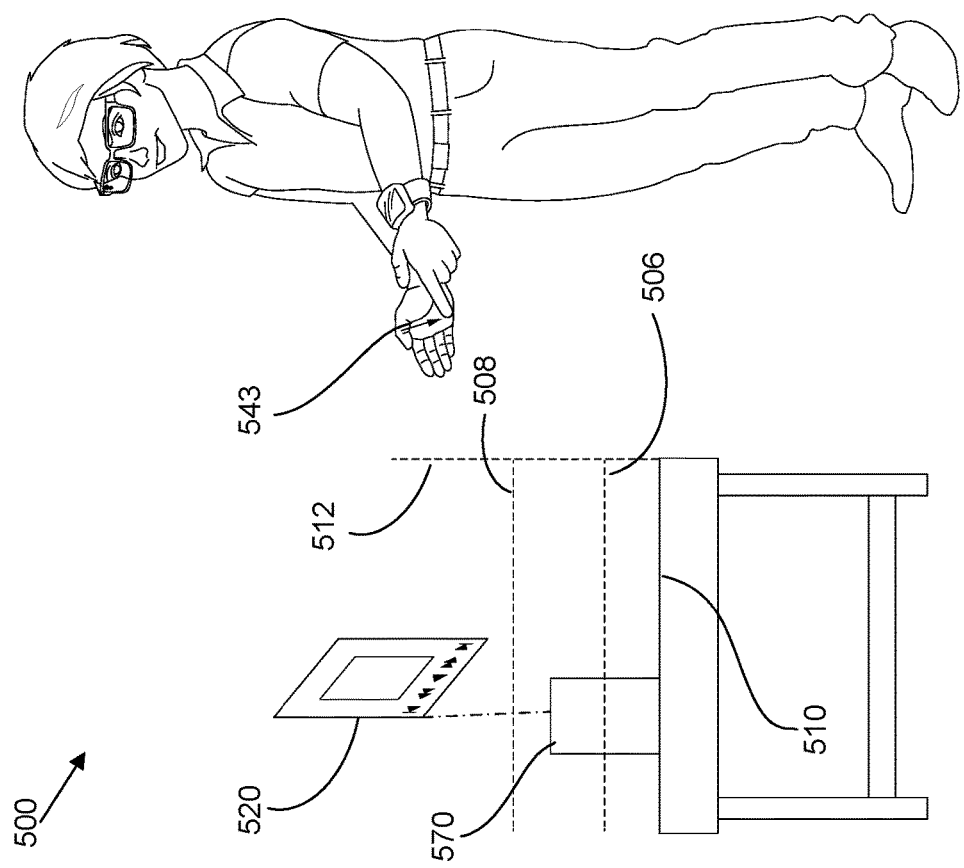

In FIG. 5H, the user is performing a surface gesture at the palm of their hand. Specifically, the user 501 is performing a surface gesture 543 (e.g., a virtual swipe gesture in a particular direction along a palm of the user 501). Detecting, using the data from a second group of sensors of the wrist-wearable device, the surface gesture, causes the performance of an operation from a second set of operations at the head-wearable device 504, which causes an update to the display of the virtual object 520, and specifically causes a two-dimensional volume control affordance 532 to change values. The surface gesture 543 also causes an operation to be performed at the electronic device 570 that lowers the volume of the music being played at the electronic device 570.

Figure 6A:
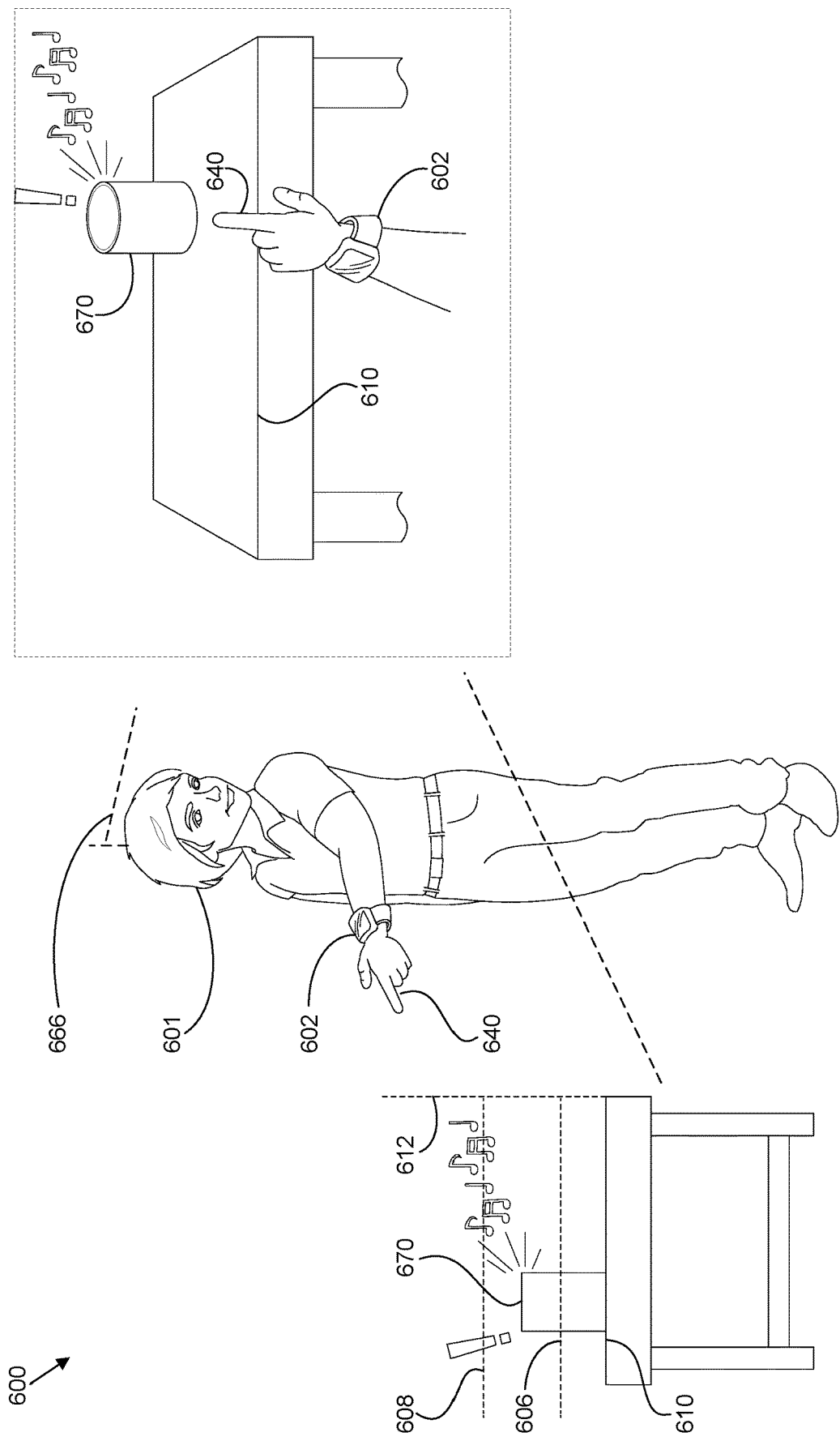
FIGS. 6A-6C illustrate another example user scenario with an artificial-reality system (e.g., including at least a wrist-wearable device) in accordance with some embodiments.
Figure 6B:
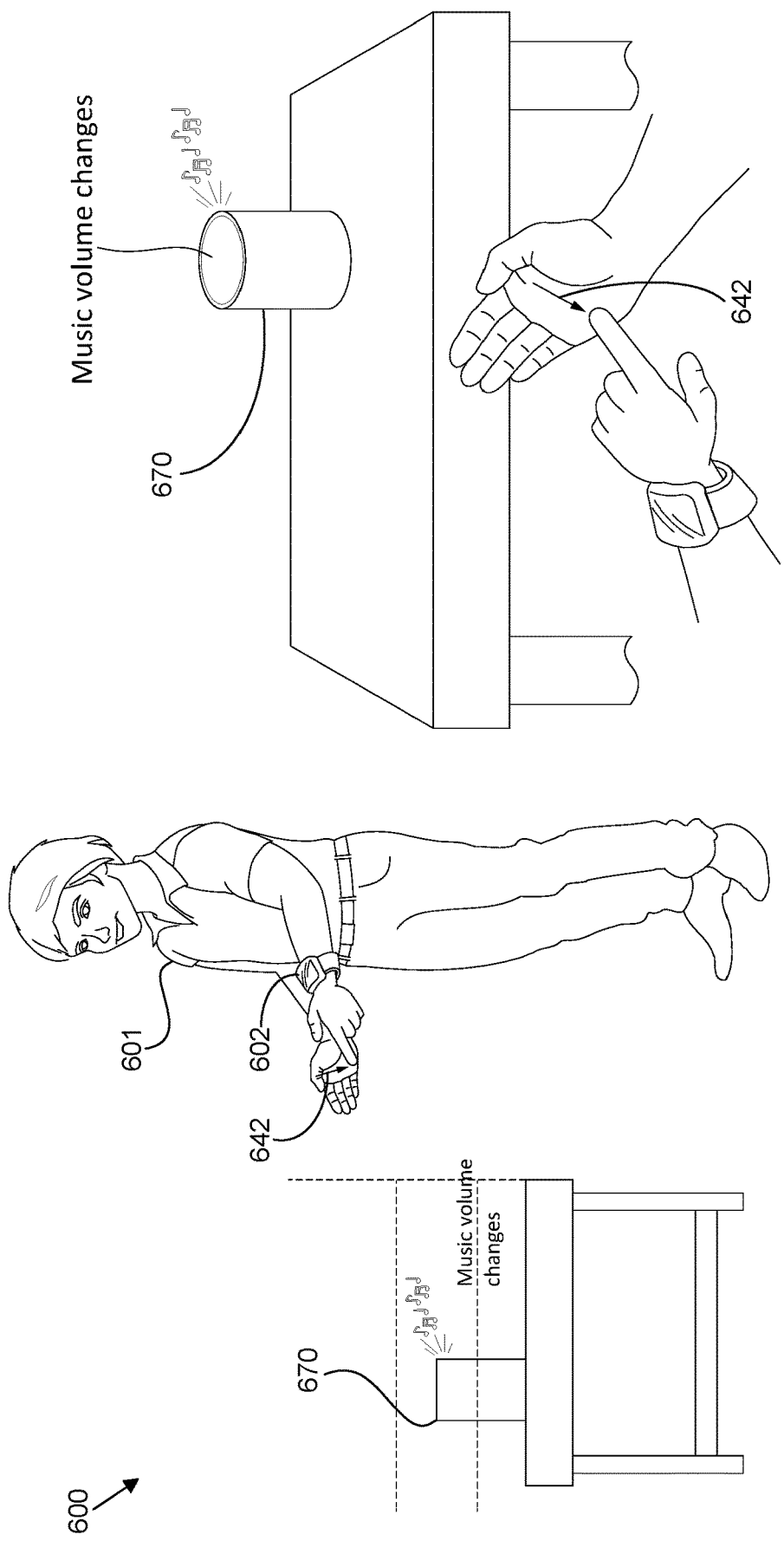
Figure 6C:
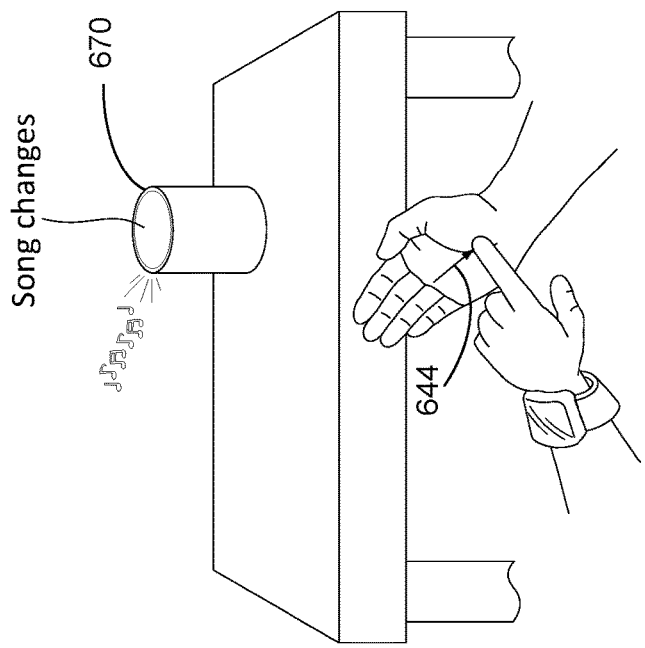
Figure 6C:
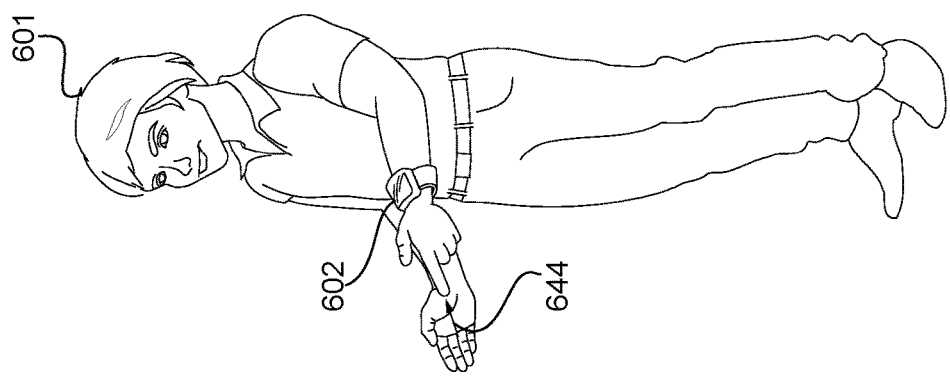
Figure 6C:
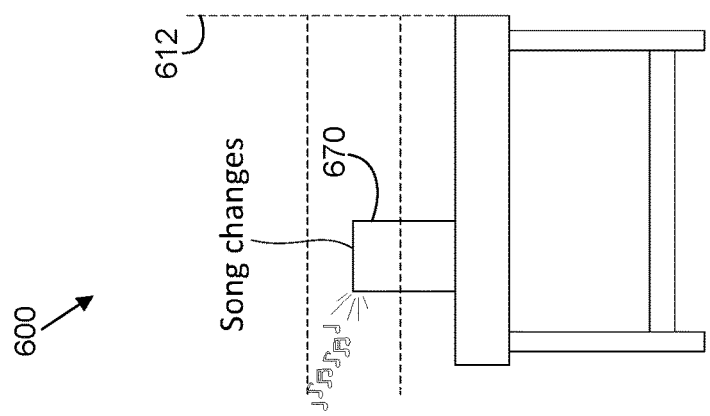

FIGS. 6A-6C illustrate an example of a user scenario with an artificial-reality system, including virtual objects and user gestures that cause performance of operations to adjust control options of response electronic devices. The artificial-reality system 600 includes a wrist-wearable device 602, but notably, does not include a head-wearable device. The user 601 in FIG. 6A-6C is standing in proximity to a table with the physical surface 610. There is an electronic device 670 on the physical surface 610. There are visual aids in FIGS. 6A-6C to represent that there is a surface threshold distance 606 and an in-air threshold distance 608 associated with the physical surface 610 of the table. There is also a surface edge 612 associated with the coffee table. In some embodiments, the user 601 can perform surface gestures within the surface threshold distance 606 of the physical surface 610, and in-air gestures within the in-air threshold distance 608. However, FIGS. 6A-6C illustrate embodiments where the user 601 is performing gestures outside of each respective region (e.g., away from the physical surface 610).

In FIG. 6A, the user 601 is wearing the wrist-wearable device 602. The user 601 is oriented to have a gaze direction 666 that is directed away from the electronic device 670. However, regardless of the user's gaze direction 666, in the example illustrated by FIGS. 6A-6C, the electronic device 670 still responds to gestures performed by the user 601. This is known as "eyes-away" responsiveness to user gestures, which will be discussed further below. In FIG. 6A, the user 601 is specifically performing a gesture 640 at the electronic device 670 (a "pointing gesture" directed to the electronic device 670). In accordance with the user 601 performing the 640, the electronic device 670 begins playing music through a speaker of the electronic device 670.

In FIG. 6B, the user 601 is performing a surface gesture, specifically, a surface gesture 642 in a first direction at the user's palm. The surface gesture 642 causes a volume control operation to be performed at the electronic device 670. In the example illustrated in FIG. 6B, the volume control operation that corresponds to the user's virtual swipe gestures is a reduce volume operation. In some embodiments, as shown in FIG. 5H, a virtual object is displayed at a head-wearable device (e.g., head-wearable device 504 in FIG. 5H).

In FIG. 6C, the user 601 is performing a surface gesture, specifically a surface gesture 644 at the user's palm. The surface gesture 644 is in a second direction distinct from the first direction of the surface gesture 642 performed in FIG. 6B. In accordance with the user 601 performing the surface gesture 644 in the second direction, an operation is performed at the responsive device, distinct from the operation performed in FIG. 6B. Specifically, in FIG. 6C, when the user 601 performs the surface gesture 644 in the second direction at the user's palm, it causes the song to change at the electronic device 670.

FIGS. 7A-7F illustrate an example of a user scenario with an artificial-reality system including virtual objects and user gestures that cause performance of operations to adjust control options of electronic devices. The artificial-reality system 700 includes a wrist-wearable device 702 and, optionally, a head-wearable device (e.g., AR system 1320 in FIG. 13A). The user 701 in FIG. 7A-7F is standing in proximity to a table with the physical surface 710. There is a physical object, an electronic device 770 on the physical surface 710. In some embodiments, a head-wearable device displays a representation of the physical object that is different (e.g., augmented) from the actual appearance of the physical object.

Figure 7A:
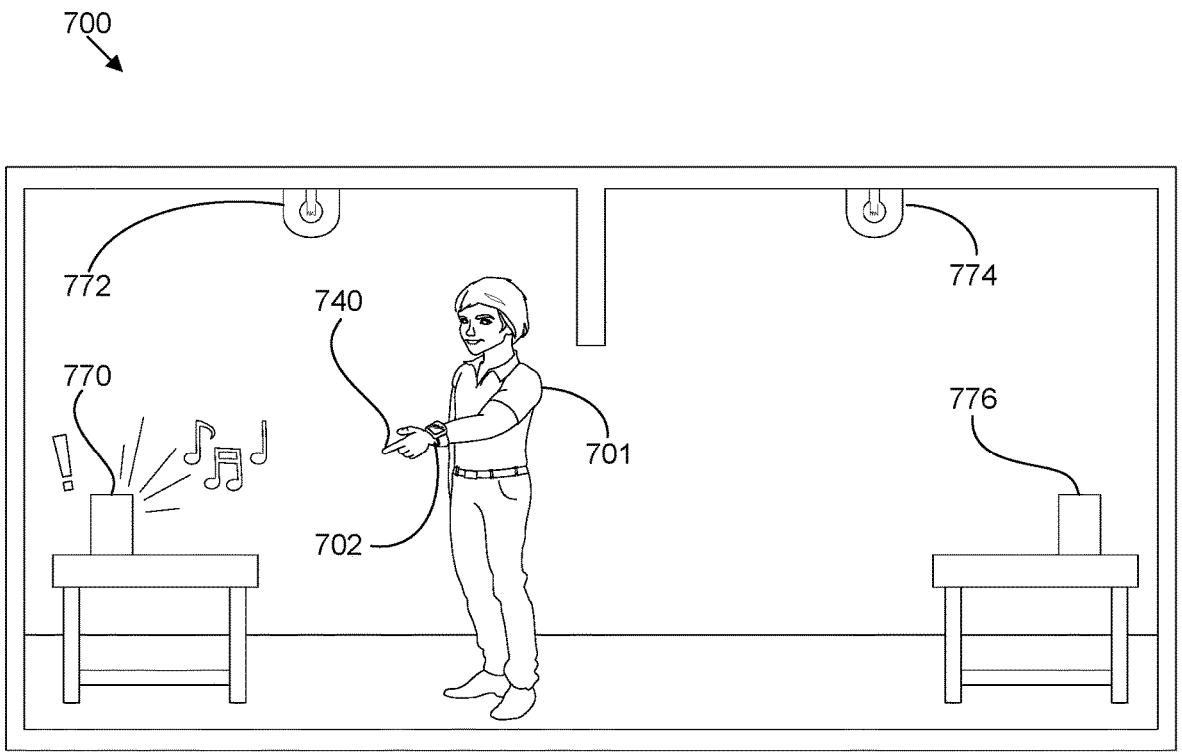
FIGS. 7A-7F illustrate another example user scenario with an artificial-reality system (e.g., including at least a wrist-wearable device) in accordance with some embodiments.

In FIG. 7A, the user 701 is performing a location-agnostic gesture 740 directed at an electronic device 770. The wrist-wearable device 702 detects, using data from a first group of sensors, the directed location-agnostic gesture 740 toward the electronic device 770. In accordance with the wrist-wearable device 702 detecting the directed location-agnostic gesture 740 toward the electronic device 770, the wrist-wearable device communicates electronically with electronic device 770 to cause the electronic device 770 to begin playing music that the user 701 had been previously playing from the wrist-wearable device 702. The electronic device 770 begins playback of song at the point that it ceased playing at the wrist-wearable device 702.

Figure 7B:
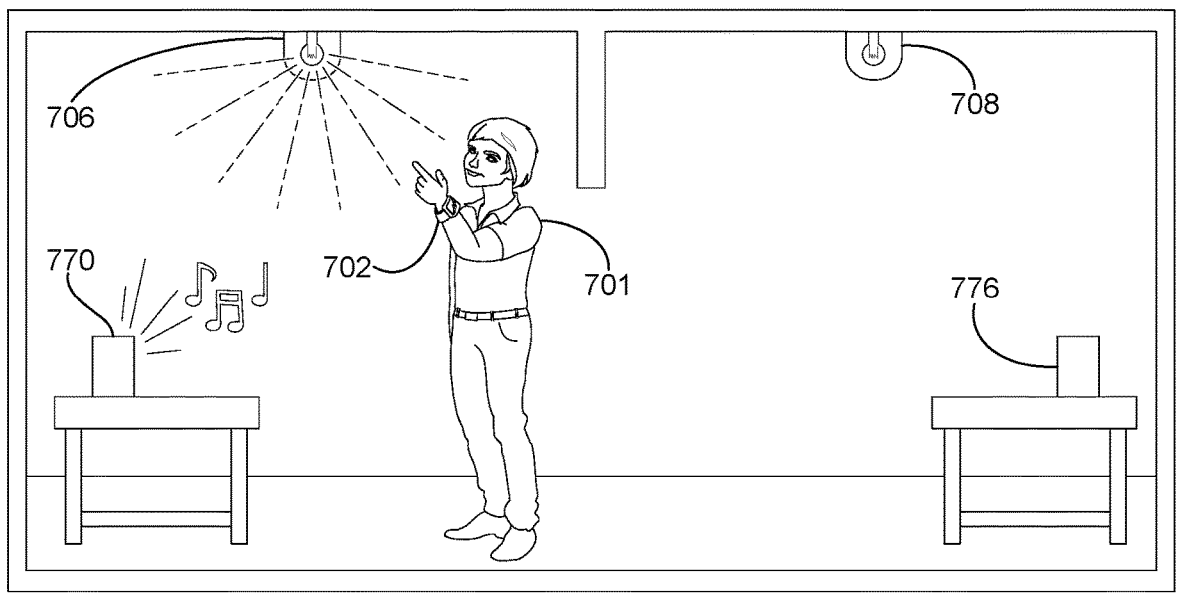

In FIG. 7B, the user 701 is performing a directed point gesture 742 at an electronic device 772. Since the user's directed point gesture 742 is not directed at the electronic device 770, it begins playback of the song according to the directed point gesture 740 performed in FIG. 7A. In accordance with the wrist-wearable device 702 detecting the directed point gesture 742 toward the electronic device 772, the wrist-wearable device communicates electronically with the electronic device 772 to cause the electronic device 772 to activate a light source (e.g., a light bulb) of the electronic device 772.

Figure 7C:
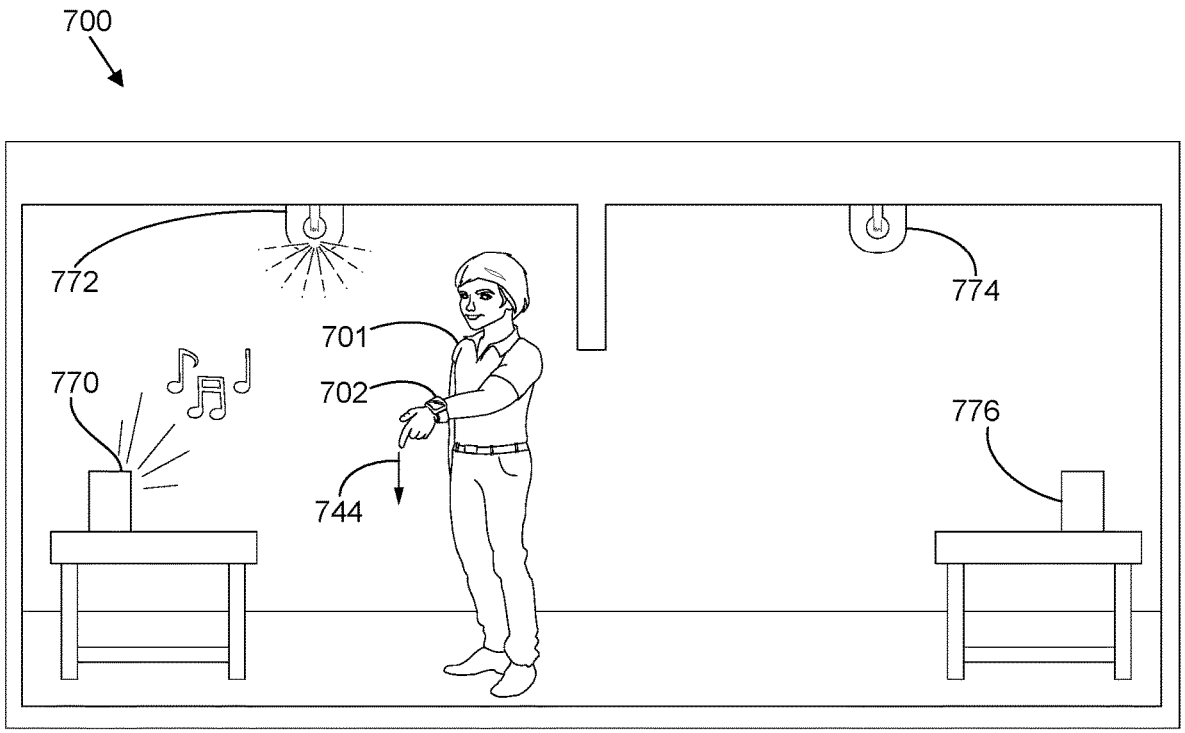

In FIG. 7C, the user 701 is performing an in-air gesture 744 that is not directed at either the electronic device 770, or the electronic device 772. However, since the user 701 most previously interacted with the electronic device 772, the user's in-air gesture 744 is reference-locked to the electronic device 772. In accordance with the wrist-wearable device 702 detecting the in-air gesture 744, the wrist-wearable device 702 communicates electronically with the electronic device 772 to cause the electronic device 772 to lower a brightness level of the light source of the electronic device 772.

Figure 7D:
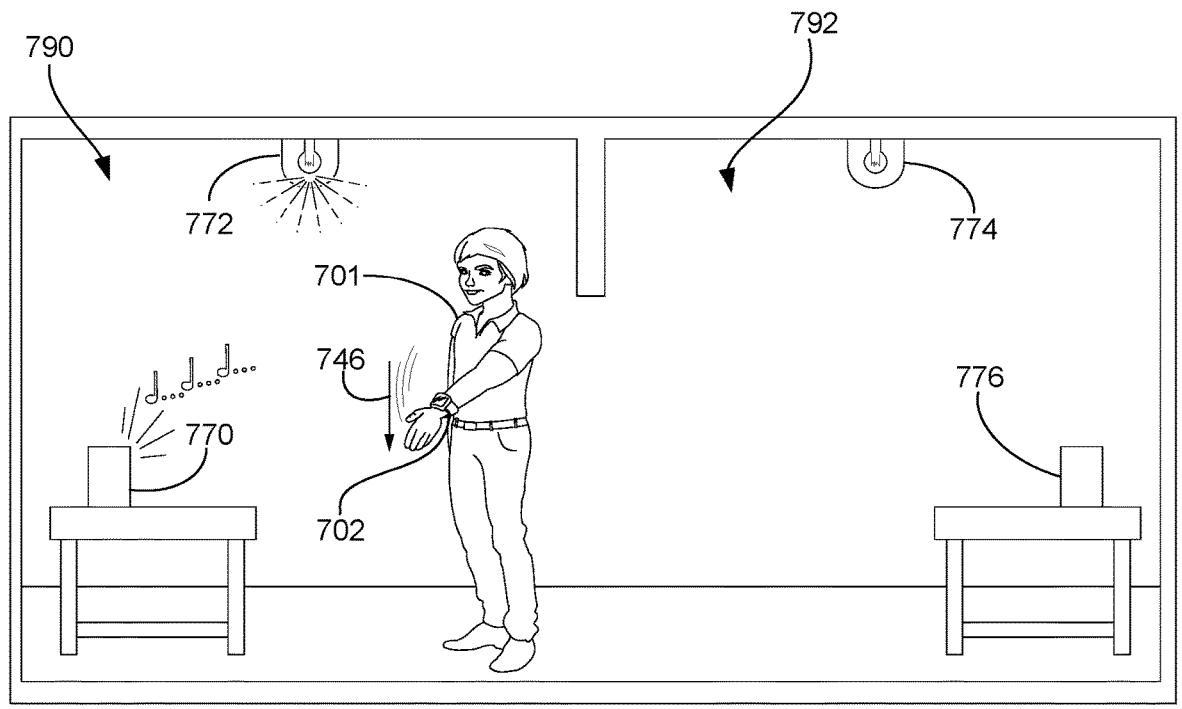

In FIG. 7D, the user 701 is performing a location-agnostic gesture 746 (e.g., a master-control gesture that is not directed at either the electronic device 770, or the electronic device 772. However, since the location-agnostic gesture 746 is a gesture of a set of master command gestures enabled by the user 701 to be performed in conjunction with the wrist-wearable device 702, the location-agnostic gesture 746 causes operations to be performed at all electronic devices in the room 790. In accordance with the wrist-wearable device 702 detecting the location-agnostic gesture 746, the wrist-wearable device 702 communicates electronically with the electronic device 770 and the electronic device 772 to (a) further lower a brightness level of the light source of the electronic device 772, and (b) lower a volume level of the music playing from the electronic device 770. In the example of FIG. 7D the location-agnostic gesture 746 does not cause operations to be performed at the third electronic device 774 or the fourth electronic device 776, because those devices are not in the same room with the user (e.g., they are both in the room 792).

Figure 7E:
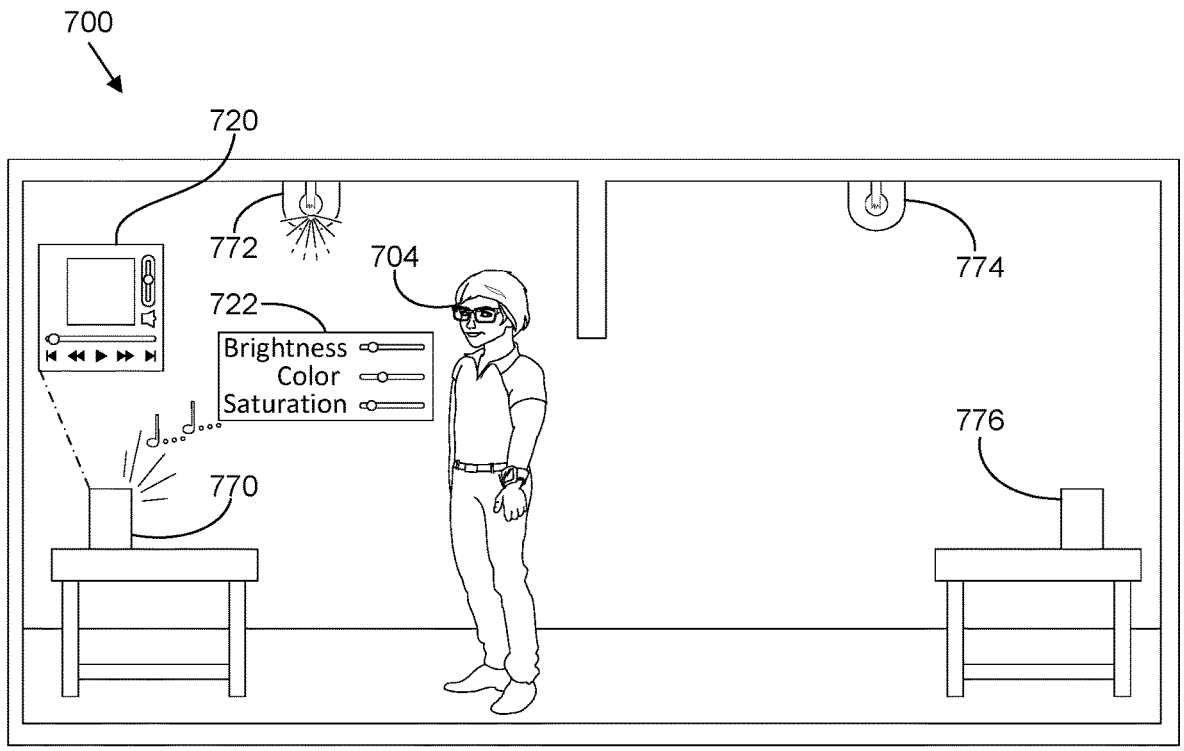

In FIG. 7E the user puts on a head-wearable device and is able to see .... In FIG. 7E, a virtual object 720 and a virtual object 722 are displayed in artificial-reality system 700. The virtual object 720 displays control settings of the electronic device 770. And the virtual object 722 displays control settings of the electronic device 772. In the example shown in FIG. 7E, the virtual object 720 and the virtual object 722 are displayed in accordance with the user performing the location-agnostic gesture 746 (as shown in FIG. 7D). In some embodiments, virtual objects are displayed continually in conjunction with user interactions with electronic devices. In some embodiments, no virtual objects are displayed (e.g., as described above with reference to FIGS. 6A-7D).

Figure 7F:
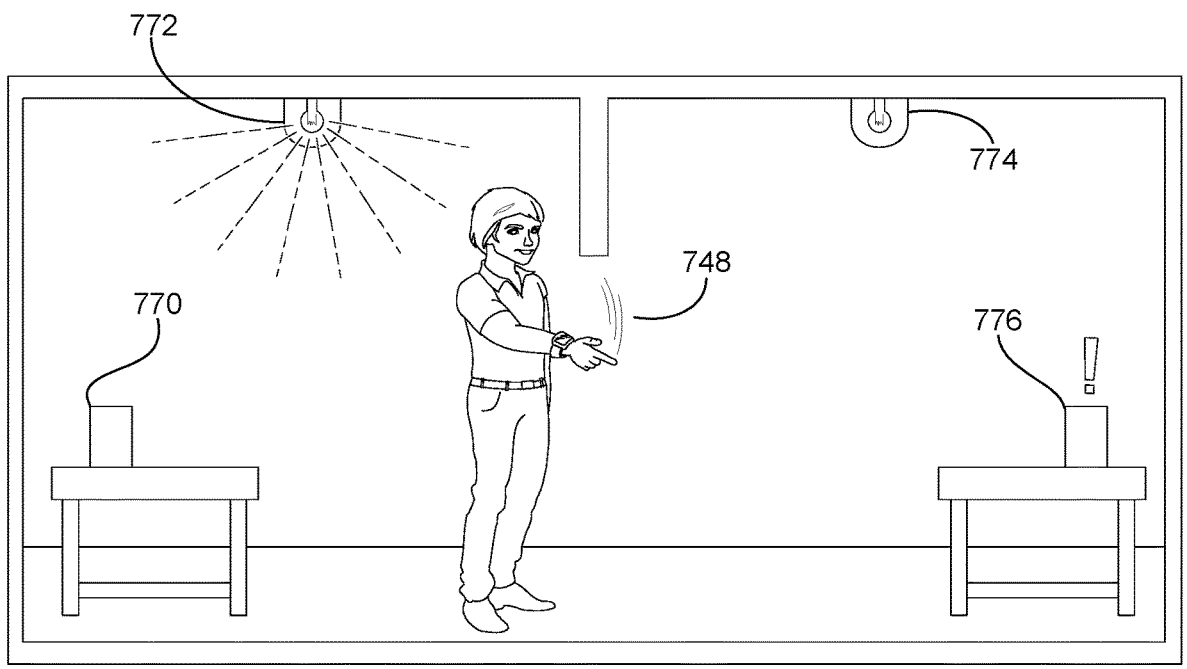

In FIG. 7F, the user 701 is performing a location-agnostic gesture 748 directed at a fourth electronic device 776. In accordance with the wrist-wearable device 702 detecting the location-agnostic gesture 748 directed toward the fourth electronic device 776, the wrist-wearable device 702 communicates electronically with the fourth electronic device 776 to cause the fourth electronic device 776 to begin playback of music from a speaker of the fourth electronic device 776. In the example shown in FIG. 7F, the music plays from the point that it ceased playing from a speaker of the electronic device 770. In the example, the music ceased playing from the electronic device 770 when the user 701 entered the room 792. In the example, the music ceased playing from the electronic device 770 in response to the location-agnostic gesture 748.

FIGS. 8A-8E illustrate another example user scenario with an artificial-reality system (e.g., including at least AR glasses and a wrist-wearable device) in accordance with some embodiments. The artificial-reality system 800 includes a wrist-wearable device 802 and a head-wearable device 804.

Figure 8A:
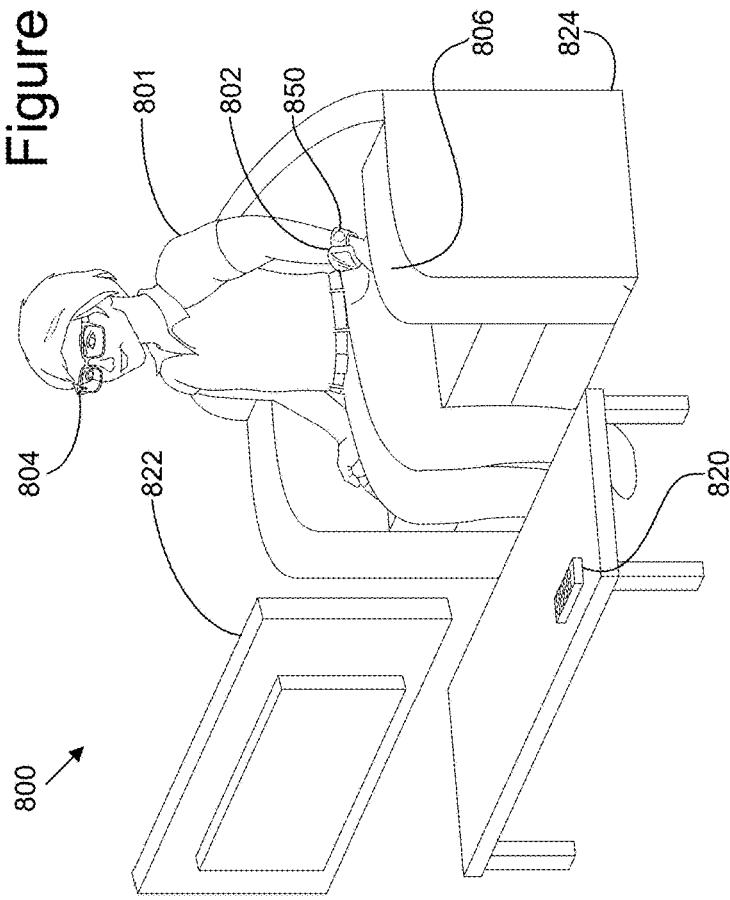
FIGS. 8A-8E illustrate another example user scenario with an artificial-reality system (e.g., including at least AR glasses and a wrist-wearable device) in accordance with some embodiments.
Figure 8A:
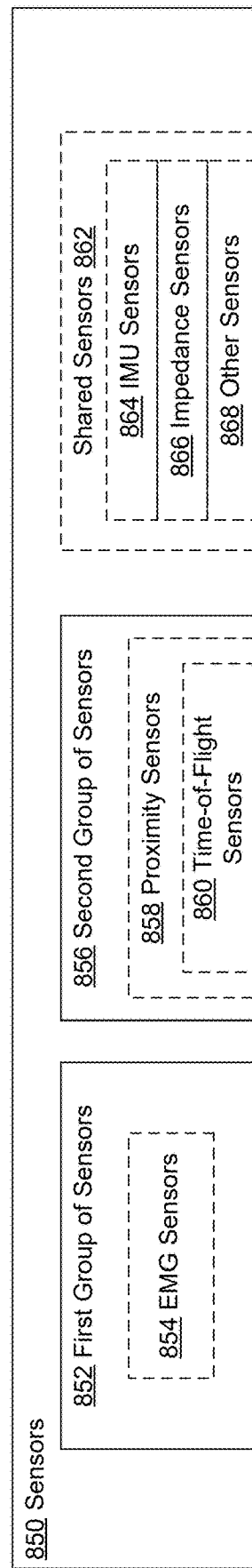

In FIG. 8A, the user 801 is sitting at a couch 824 watching television at a television 822. In FIG. 8A, no user-interface elements are being displayed by the head-wearable device 804, and the user is simply interacting with their physical surroundings. In some embodiments, the head-wearable device provides a user-interface element representing the content displayed on the television 822, so that the user 801 can enjoy the same content without requiring being in proximity to the television 822. The couch 824 has two armrests, including a curved surface portion 806 of a physical surface 808. While in the examples illustrated by FIGS. 8A-8E the curved surface portion has a single, smooth field of curvature around the arm of the surface, in some embodiments, the curved surface portion includes more complex geometries and/or topographies. As shown in the expanded view in FIG. 8A, the sensors 850 include groups of sensors for detecting the user's 801 gestures and proximations to various physical objects and/or physical electronic devices. As illustrated in the expanded view, the sensors 850 include one or more of: a group of sensors 852 (that include one or more EMG sensors 854), a group of sensors 856 (that include one or more time-of-flight sensors 858), one or more IMU sensors 860, one or more sensors 862, and one or more other sensors 864. FIG. 8A further shows a remote-control device 820 configured for communication with the television 822.

Figure 8B:
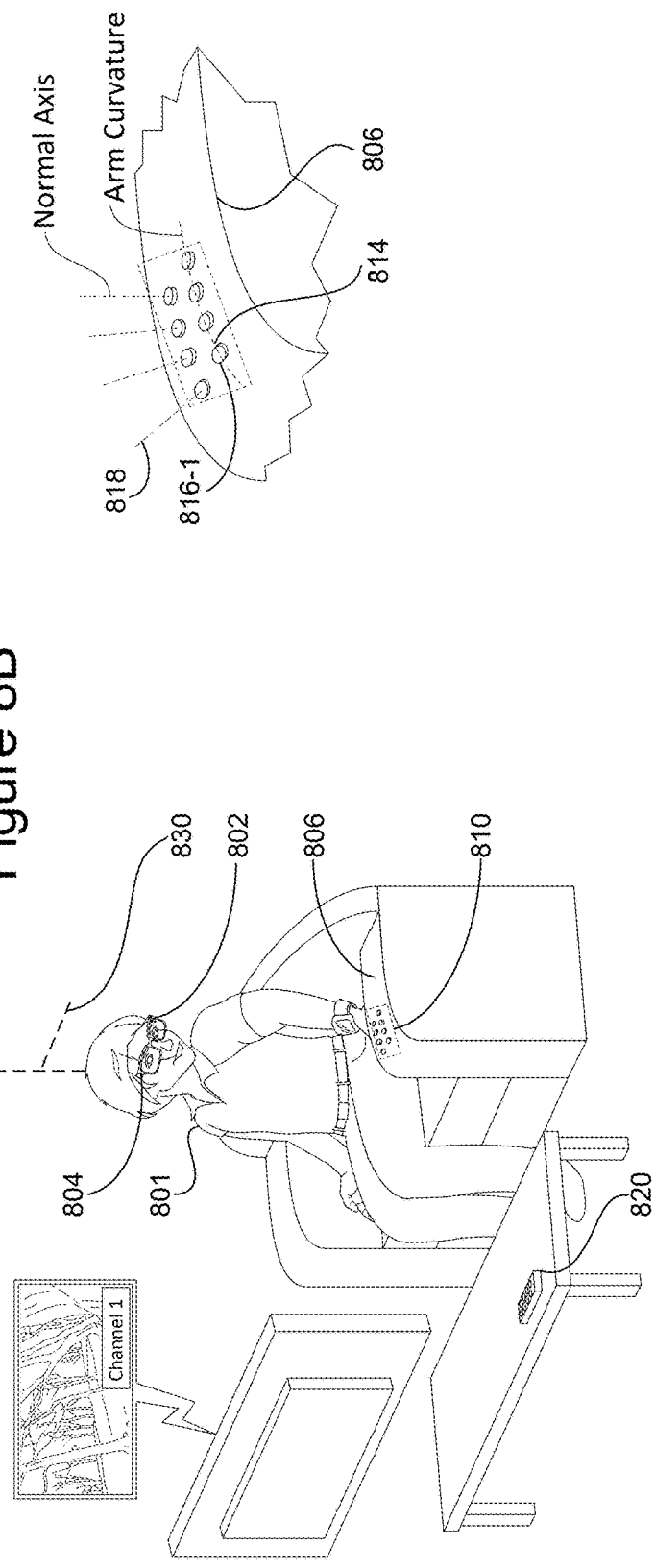
Figure 8B:
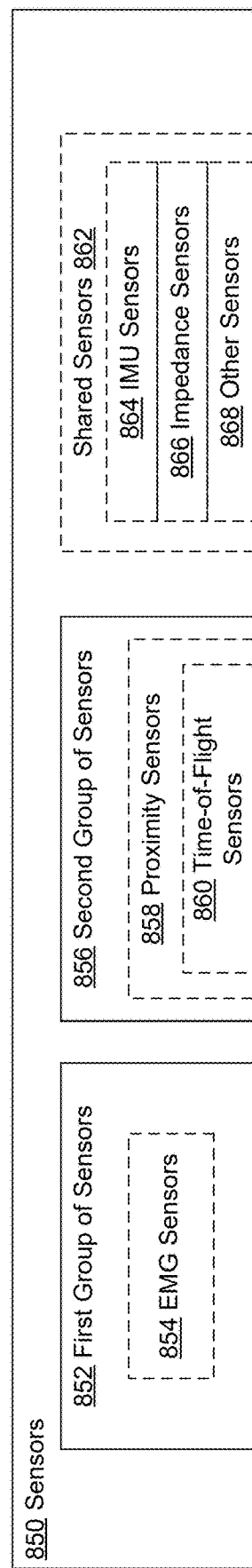

In FIG. 8B, the user 801 turns such that they have a gaze direction 830 at an angle within a threshold gaze angular range such that the head-wearable device 804 displays the virtual object 810, which includes a plurality of virtual buttons displayed along an arm curvature 814 of the curved surface portion 806 (e.g., virtual button 816-1). The portion of virtual object 812 that is displayed causes the display at the head-wearable device 804 to be updated such that the portion of the virtual object 812 appears to be displayed at the physical surface of the arm of the couch 824. The virtual object 812 corresponds to the remote-control device 820 (e.g., replicates functionality of the remote-control device 820) in accordance with some embodiments. The head-wearable device 804 displays the virtual object 812 based on communications with the television 822 (e.g., the virtual object 812 includes controls that correspond to operation of the television 822).

Figure 8C:
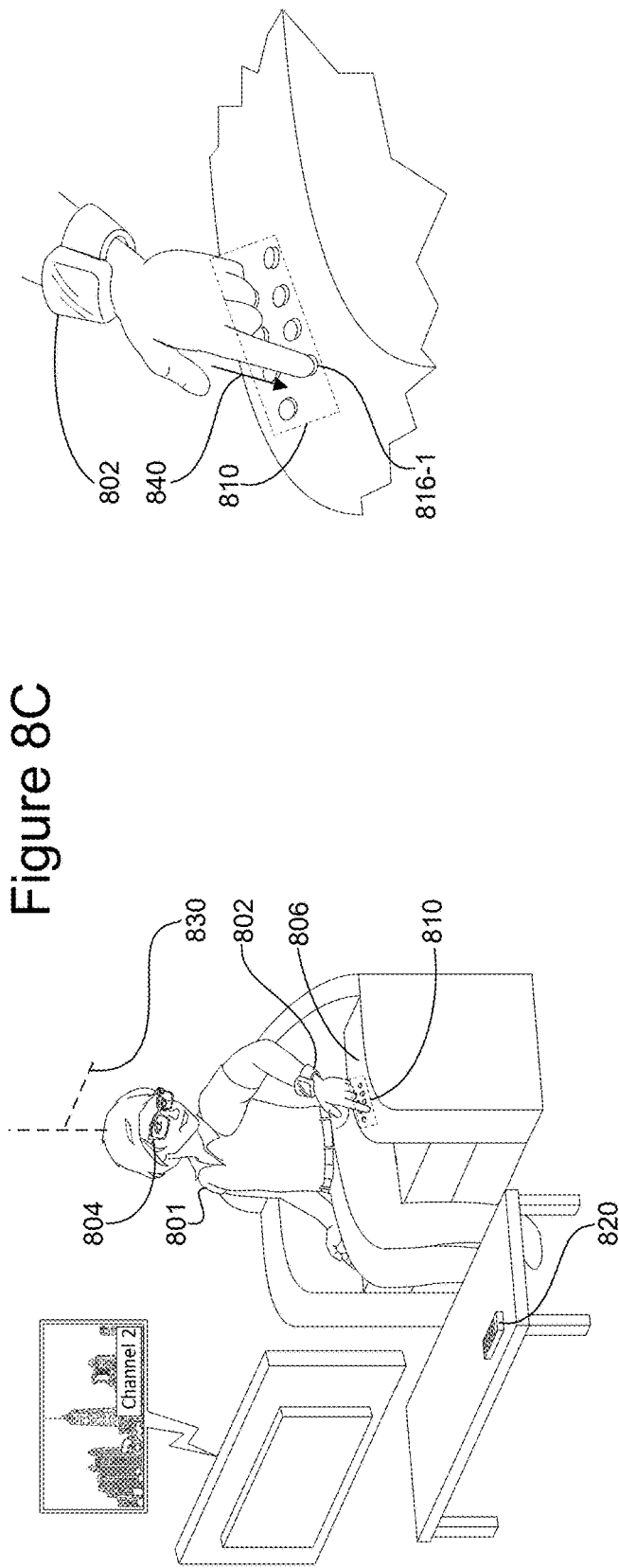
Figure 8C:
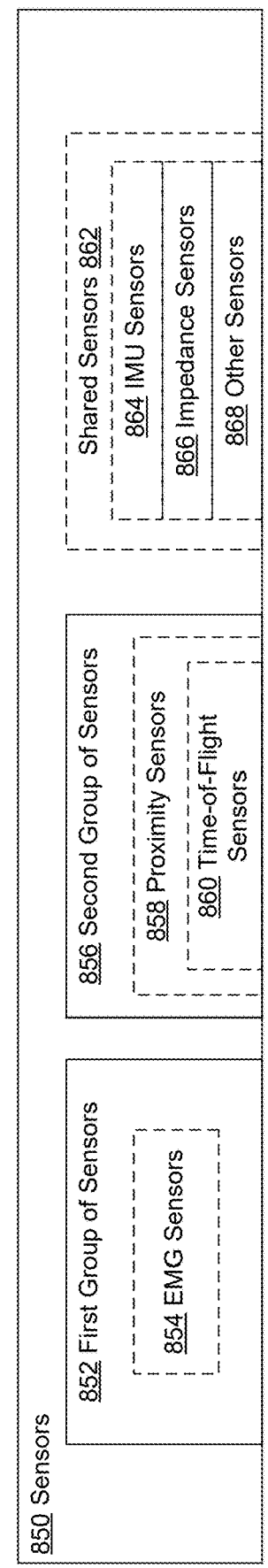

In FIG. 8C, the user 801 activates controls of the television by performing a surface gesture 842 at the virtual button 816-1 of the virtual object 812 displayed at the curved surface portion 806. The surface threshold distance for surface gestures at the curved surface portion 806 are altered based on the shape of the curved surface portion 806. The wrist-wearable device 802 or the head-wearable device 804 communicates with the television 822 in response to activation of the virtual button 816-1 to adjust operation of the television 822.

Figure 8D:
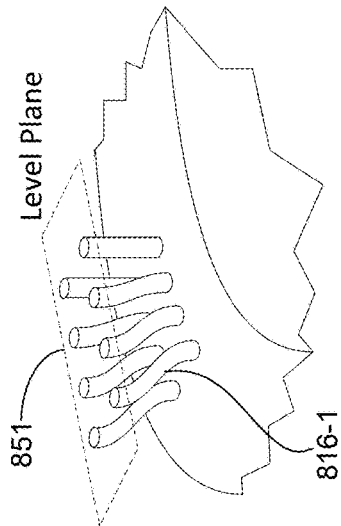
Figure 8D:
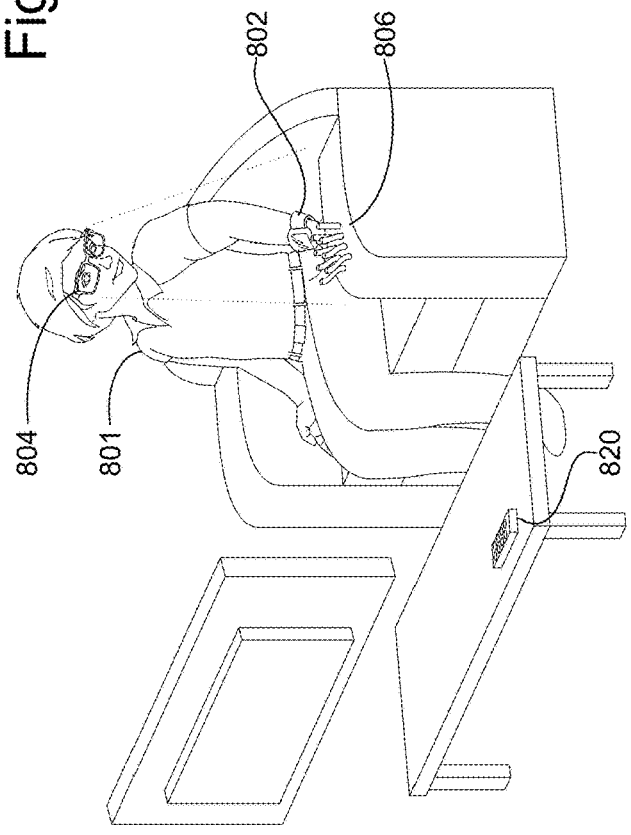
Figure 8D:
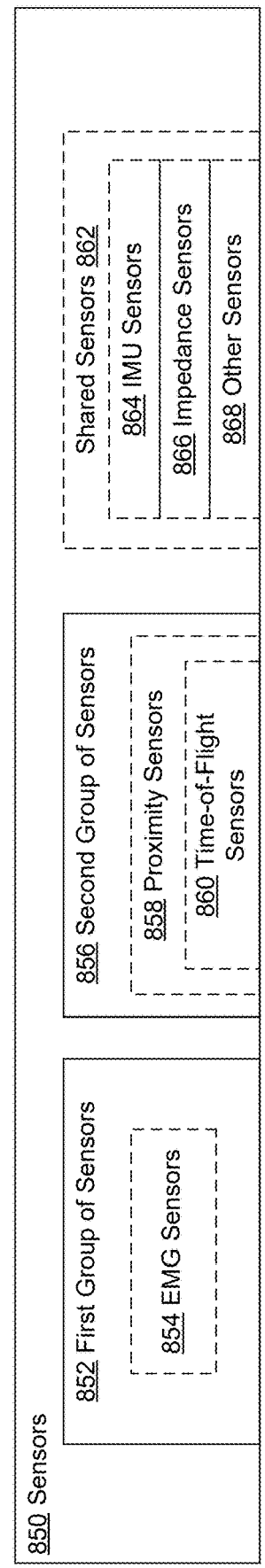

Turning now to FIG. 8D, in some embodiments, the virtual button 816-1 and other affordances of the virtual object 810 are configured and arranged to be displayed at a level plane 851 above the curved surface portion 806, to provide the user 801 with a more consistent interaction experience at the curved surface portion 806.

Figure 8E:
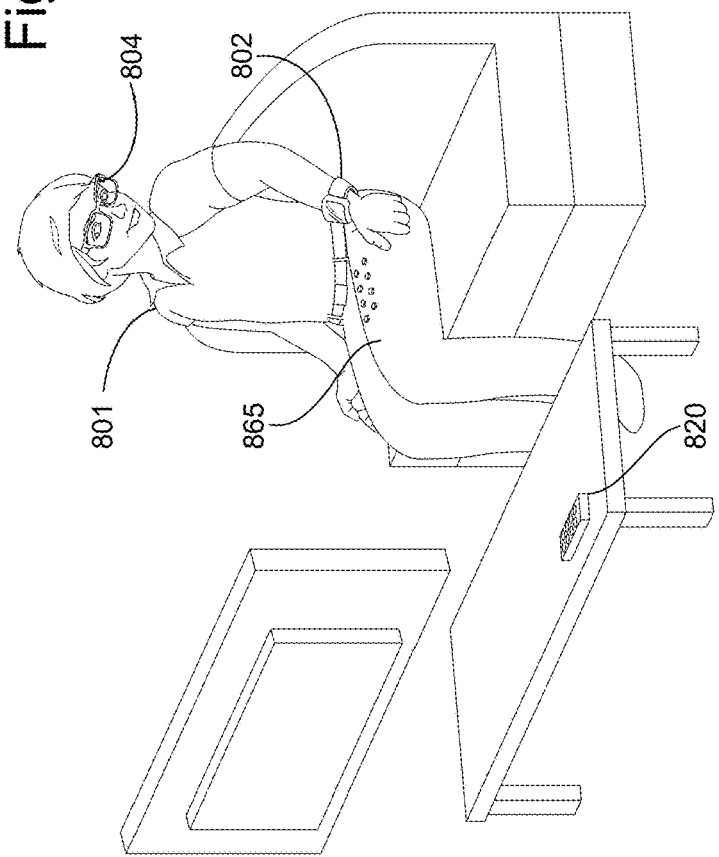
Figure 8E:
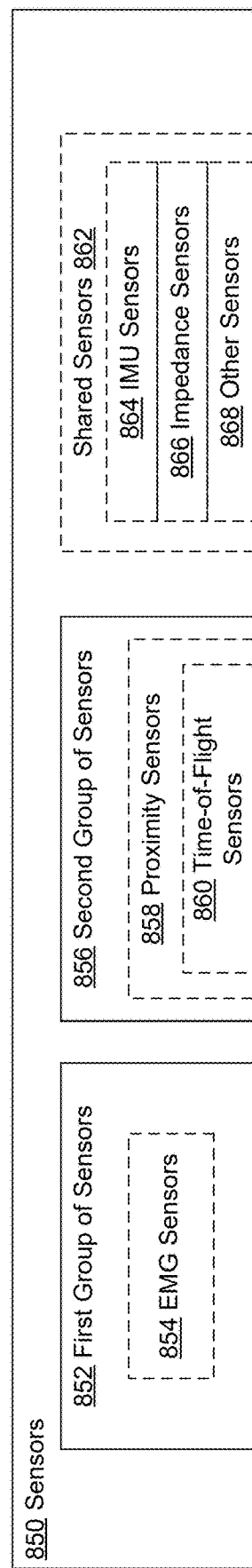

FIG. 8E illustrates another way that the head-wearable device 804 can display the virtual object 812 at a curved surface portion. In FIG. 8E, the physical surface is part of the leg 865 (e.g., a leg portion) of the user 801. Like in FIGS. 8A-8D, a portion of the virtual object 812 can be displayed at the curved surface portion 806 even when the physical surface is part of user's body, such as the leg 865 of the user 801. In some embodiments, other portions of the user's body can be used to perform operations similar to those described with respect to FIGS. 8A-8D (e.g., a palm portion of the user's hand).

Additionally, although the user scenarios described with respect to the series of FIGS. 1-8 are described as separate sequences, in some embodiments, the user scenarios are combined with one another. For example, the methods for detecting curved surface portions of physical surfaces described with respect to the sequence of FIGS. 8A-8E can be used in conjunction with the methods described with respect to the sequences shown In FIG. 1A-4D. In other words, the methods for detecting gestures performed within various distances of a physical surface can be adjusted to account for a curved surface portion, such as the curved surface portion of FIGS. 8A-8E. Similarly, the method for performing gestures that correspond to operations at electronic devices described with respect to FIGS. 5A-7F is optionally performed based on gestures within various distances of physical surfaces, as shown in FIGS. 1A-4D, and such systems can further account for curved surface portions of such physical surfaces.

Figure 9B:
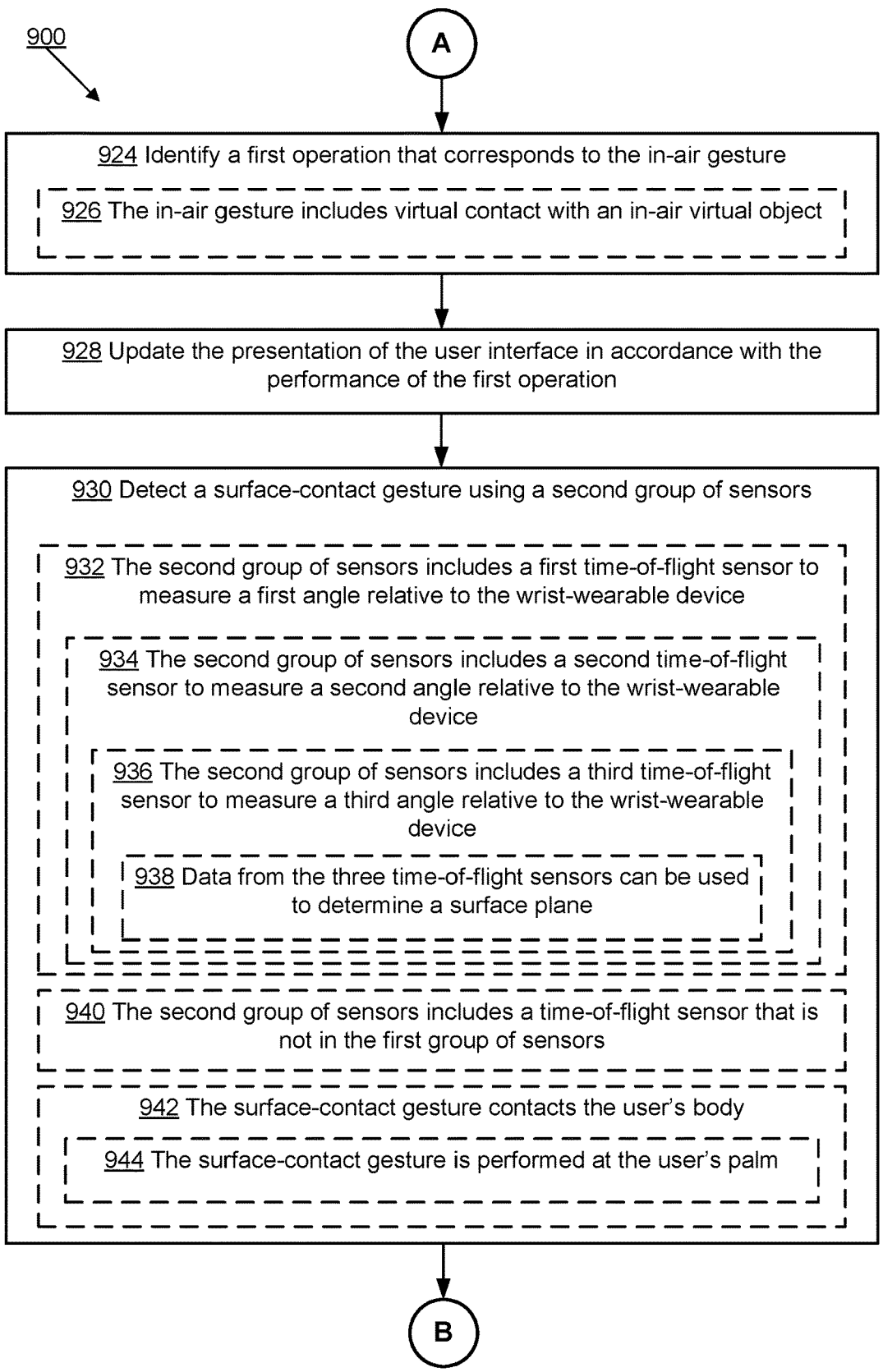
Figure 9C:
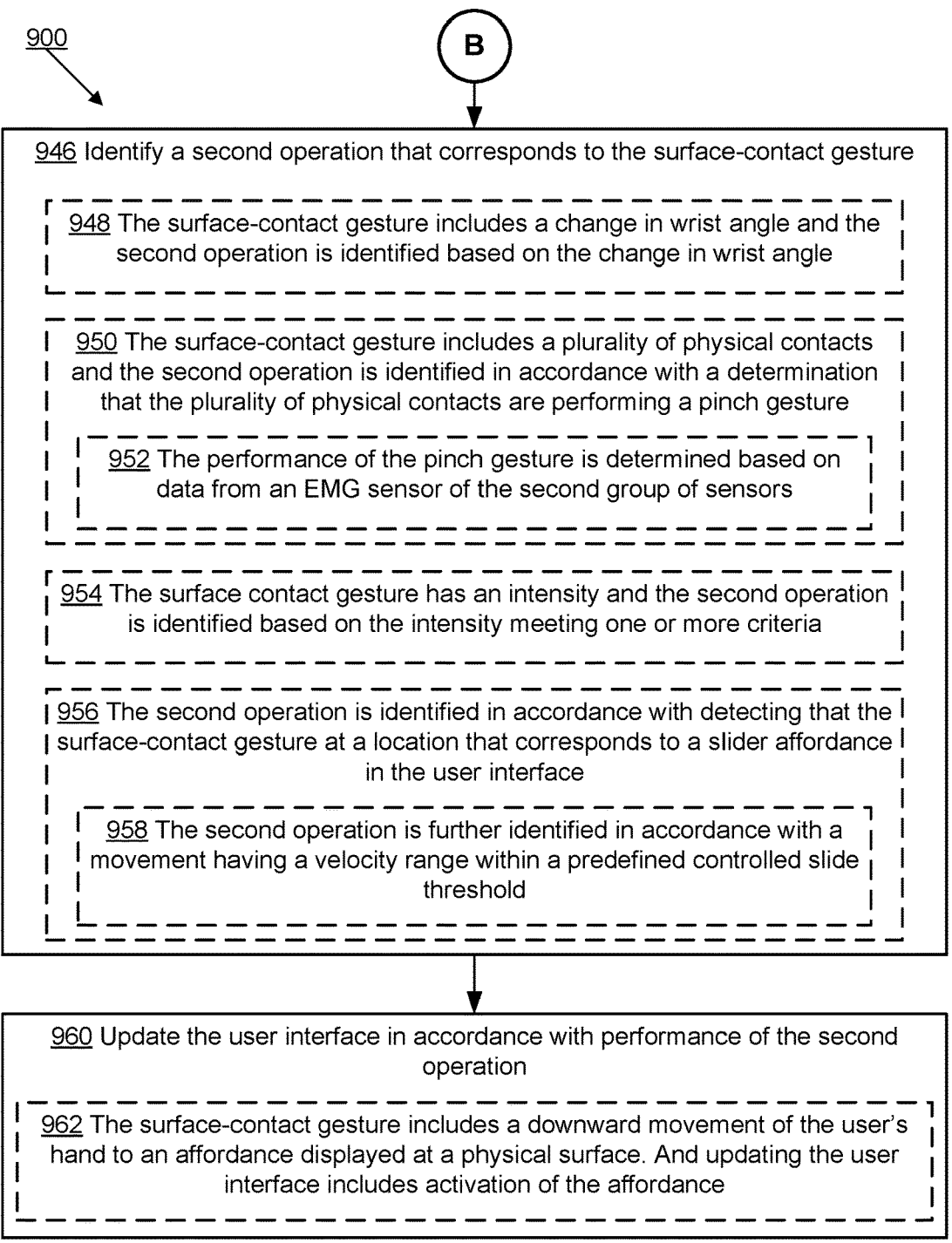

FIGS. 9A-9C are flow diagrams illustrating a method 900 for making in-air and surface gestures available to a user in accordance with some embodiments. The method 900 is performed at an artificial-reality system (e.g., artificial-reality system 100, 200, 300, 400, 500, 600, 700, or 800) having one or more processors and memory. In some embodiments, the artificial-reality system is the system 1200 in FIG. 12A. In some embodiments, the artificial-reality system is the system 1250 in FIG. 12B. In some embodiments, the artificial-reality system includes one or more wearable devices, such as the wrist-wearable device 102 and the head-wearable device 104. In some embodiments, the artificial-reality system includes one or more handheld devices, such as a controller or smartphone. In some embodiments, the memory stores one or more programs configured for execution by the one or more processors. At least some of the operations shown in FIGS. 9A-9C correspond to instructions stored in a computer memory or computer-readable storage medium (e.g., the memory 1278 of the computer system 1272 or the memory 1256 of the accessory device 1252 in FIG. 12B). In some embodiments, the artificial-reality system is a wearable device such as the wrist-wearable device 102 or the head-wearable device 104 in FIGS. 1A-1J.

The artificial-reality system presents (902), via a head-wearable device (e.g., the AR system 1320 in FIG. 13A), an artificial-reality environment that includes a user interface (e.g., the virtual object 118 in FIG. 1A). Various additional examples of artificial-reality environments are described and illustrated in the description and corresponding FIGS. 1A-8E. In some embodiments, presenting the artificial-reality environment includes providing audio and/or tactile feedback.

The artificial-reality system is responsive to (904) to in-air gestures (e.g., the in-air gesture 242 in FIG. 2B). For example, the system is able to detect and respond to the user performing an in-air gesture that involves the user's hand making virtual contact with an in-air virtual object and sliding across the virtual object in a horizontal direction (e.g., the in-air gesture 244 in FIG. 2C).

The in-air gestures correspond (906) to a first set of operations caused to be performed by the computer system (e.g., updating the size of the two-dimensional virtual affordance displayed in the display control portion 224 of virtual object 220 in FIG. 2B). In some embodiments, the first set of operations correspond to operations performed to update the display of an in-air virtual object (e.g., the in-air gesture 343 in FIG. 3G). In some embodiments, in-air gestures can also cause operations that update the display of virtual objects at a physical surface. In some embodiments, the in-air gestures cause non-visual updates to the artificial-reality environment.

The artificial-reality system is responsive to (908) surface gestures (e.g., the surface gesture 109 in FIG. 1B). For example, the artificial-reality system is able to detect and respond to the user performing a surface gesture at or within a surface threshold distance of a physical surface (e.g., the surface gesture 122 in FIG. 1C).

The surface gestures correspond (910) to a second set of operations caused to be performed by the artificial-reality system (e.g., operations corresponding to surface gestures). As an example, FIG. 1C shows a change in size of the virtual object 118 in response to the user performing the surface gesture 122.

In some embodiments, the user interface, caused by the artificial-reality system to be presented via the head-wearable device, is responsive to (912) a set of location-agnostic operations that correspond to location-agnostic gestures. For example, FIGS. 4A-4D illustrate a user 401 performing location-agnostic gestures in various locations relative to a physical surface, and the gestures cause the same operation to be performed in the artificial-reality environment (the operation being saving the current state of the two-dimensional affordance 430 at the virtual object 420).

In some embodiments, the user interface, caused by the artificial-reality system to be presented via the head-wearable device, includes (914) two or more virtual objects (e.g., the virtual object 320 and the second virtual object 328 in FIG. 3B). In some embodiments, one of the virtual objects is presented at a location that corresponds to the location of the wrist-wearable device (e.g., presented directly above the display of the wrist-wearable device).

In some embodiments, at least a portion of a virtual object is displayed (916) at a location on the physical surface (e.g., virtual object 118 in FIGS. 1A-1F). In some embodiments, a virtual object is caused to be displayed at a curved surface portion of the physical surface (e.g., the virtual button 816-1 in FIG. 8B is displayed to appear at the curved surface portion 806 of the couch, by accounting for the arm curvature 814).

In some embodiments, at least a portion of a second virtual object is (918) displayed in-air (e.g., virtual object 220 in FIGS. 2A-2D). For example, FIG. 3A shows an example with a virtual object 320 that is displayed in air above the physical surface 310, and a second virtual object 328 that is displayed at the physical surface 310. In some embodiments, such as FIG. 5E, multiple, distinct virtual objects (e.g., the interactive display portion 526, and the user-interface element 528) are displayed in-air. In some embodiments, multiple, distinct virtual objects are displayed at the physical surface. In some embodiments, one virtual object is displayed at a first location on a first surface, and a second virtual object is displayed at a second location on a second surface. In some embodiments, as shown in FIGS. 3A-3I, the user 301 can perform operations at the second virtual object 328 that indirectly cause operations to be performed at another virtual object (e.g., the virtual object 320 in FIG. 3A).

In some embodiments, the artificial-reality system detects (920) an in-air gesture using a first group of sensors. For example, the in-air gesture 242 in FIG. 2B can be detected by the group of sensors 252, which can an include the EMG sensors 254. In some embodiments, IMU sensors (e.g., IMU sensors 260) are used to detect in-air gestures in place of, or in addition to, the EMG sensors 254, e.g., based on a current mode of operation of the wrist-wearable device. The mode of operation can be determined by a current power level at the wrist-wearable device 202 and/or power-saving options configured by the user 201.

In some embodiments, detecting an in-air gesture includes detecting (922) that the in-air gesture occurred within an in-air threshold distance from the physical surface. For example, various Figures in 1A-8E display visual aids that correspond to the in-air threshold distance (e.g., the in-air threshold distance 208 in FIG. 2B).

In some embodiments, the artificial-reality system identifies (924) a first operation that corresponds to the in-air gesture. In some embodiments, the in-air gesture includes (926) virtual contact with an in-air virtual object. For example, the in-air gesture 242 makes virtual contact with the simulated location of the affordance 228-3 display at the virtual object 220.

In some embodiments, the artificial-reality system causes the head-wearable device, or another electronic device, to update (928) the presentation of the user interface in accordance with the performance of the first operation. In some embodiments, the performance of the first operation causes a non-visual update to the user interface. For example, in FIG. 6A, the gesture 640 causes the performance of an operation (e.g., the first operation) which adjusts the volume of audio of speakers at the electronic device 670. In some embodiments, the performance of the first operation is detected by another electronic device that causes an update to the volume of a speaker at a head-wearable device or another wearable device worn by the user.

In some embodiments, the artificial-reality system detects (930) a surface gesture using a second group of sensors. For example, the gestures performed in FIGS. 1B-1C (e.g., the surface gesture 109 and the surface gesture 122) are performed within the surface threshold distance 106 of the physical surface 110 and are detected by the sensors 150.

In some embodiments, the second group of sensors includes (932) a first time-of-flight sensor to measure a first angle relative to the wrist-wearable device. For example, one or more of the rays 113, 115, or 117 (e.g., ray 113) can be emitted by a first time-of-flight sensor of the time-of-flight sensors 158.

In some embodiments, the second group of sensors includes (934) a second time-of-flight sensor to measure a second angle relative to the wrist-wearable device. For example, the ray 115 shown in FIG. 1A can be emitted by a second time-of-flight sensor of the time-of-flight sensors 158.

In some embodiments, the second group of sensors includes (936) a third time-of-flight sensors to measure a third angle relative to the wrist-wearable device (e.g., ray 117 shown in FIG. 1A can be emitted from a third time-of-flight sensor of the time-of-flight sensors 158).

In some embodiments, data from the three time-of-flight sensors is used (938) to detect (identify or recognize) a surface plane. For example, the rays 113, 115, and 117 can be triangulated to infer a surface plane created by the incident locations on the surface that the rays are emitted towards. In some embodiments, determining a surface plane allows the sensors to be calibrated based on the sensors' relative locations at the wrist-wearable device. Determination of such a surface plane can allow the wrist-wearable device 102 to more accurately determine the relative locations of gestures performed in the artificial-reality system 100.

In some embodiments, the second group of sensors includes (940) a time-of-flight sensor that is not in the first group of sensors. For example, the group of sensors 152 may include one or more time-of-flight sensors that are not included in the group of sensors 156.

In some embodiments, the surface gesture contacts (942) the user's body (or clothing worn by the user). For example, the user's leg in FIG. 8E can be a surface used to detect a surface gesture. In some embodiments, the user's hand, arm, shoulder, or torso is considered to be a surface for surface gestures (e.g., the user's palm in FIG. 6B is considered to be a surface for the surface gesture 642).

In some embodiments, the surface gesture is (944) performed at the user's palm. For example, the surface gesture 543 in FIG. 5H is performed at the user's palm and is determined to be a surface gesture by a group of sensors at the wrist-wearable device 502.

Turning now to FIG. 9C, the system identifies (946) a second operation that corresponds to the surface gesture according to some embodiments. For example, the user can swipe in a first direction to change a volume of an electronic device and can swipe in a second direction, distinct from the first direction, to skip a song being played by the same electronic device as illustrated in FIGS. 6B-6C.

In some embodiments, the surface gesture includes (948) a change in wrist angle and the second operation is identified based on the change in wrist angle. For example, the user can perform a virtual touch gesture at a simulated location of a virtual screen element of a two-dimensional virtual display (e.g., the virtual object 220 in FIG. 2A), and then the user can rotate their wrist to a second orientation relative to the first location such that there is an angular difference between the user's first wrist angle and the user's second wrist angle. As another example, the location-agnostic gesture 345 (e.g., a virtual pull gesture) shown in FIG. 3H involves a rotation of the user's wrist toward the user's body. In some embodiments, the change in wrist angle is detect while a user interface object that is being targeted by the surface gesture is in focus (e.g., reference-locked). For example, a user can perform a first gesture that selects a user interface object to be targeted by additional gestures, and then perform subsequent gestures while the user interface object is in focus. For example, in FIGS. 3G and 3H, the user performs a first gesture that causes a selection of the virtual object 332, and performs the location-agnostic gesture 345 to interact with the virtual object 332 while it is in focus.

In some embodiments, the surface gesture includes (950) a plurality of physical contacts, and the second operation is identified in accordance with identification of two or more of the plurality of physical contacts. For example, the surface gesture 348 in FIG. 3E includes two contacts (e.g., a double tap) with the physical surface 310. As another example, a surface pinch gesture involves two moving contacts on a surface (e.g., the location-agnostic gesture 346 in FIG. 3D performed at the physical surface 310).

In some embodiments, the two or more physical contacts comprise a pinch gesture and the performance of the pinch gesture is determined (952) based on data from an EMG sensor. For example, FIG. 3D illustrates prophetic EMG sensor data for the EMG sensors 354 during the location-agnostic gesture 346 according to some embodiments.

In some embodiments, the surface gesture has (954) an intensity, and the second operation is identified based on the intensity meeting one or more criteria. For example, the surface gesture 348 in FIG. 3E can require a tap intensity threshold be met for each individual tap that the user 301 makes against the physical surface 310.

In some embodiments, the second operation is identified (956) in accordance with detecting that the surface gesture at a location that corresponds to a slider affordance in the user interface.

In some embodiments, the second operation is further identified (958) in accordance with a movement having a velocity range within a predefined controlled slide threshold. For example, a certain gesture can involve a transition from a first location within the surface threshold distance to a second location within the in-air virtual threshold distance of a physical surface, and the speed and acceleration with which the user moves from the first location to the second location can indicate whether a particular gesture is a controlled slide gesture or a swipe gesture, which can each correspond to a separate respective operation from a set of operations.

In some embodiments, the head-wearable device is caused to update (960) the user interface in accordance with performance of the second operation. For example, when the user 101 performs the surface gesture 109 in FIG. 1B, the display of the virtual object 118 is visually updated to indicate the performance of the surface gesture 109.

In some embodiments, the surface gesture includes (962) a downward movement of the user's hand to an affordance displayed at a physical surface and updating the user interface includes activation of the affordance. For example, in FIG. 1C the user 101 performs the surface gesture 122 downward toward an affordance (e.g., the virtual object 118), and performing the surface gesture 122 causes the affordance to be activated (e.g., to perform an operation corresponding to pressing the virtual object 118).

Figure 10A:
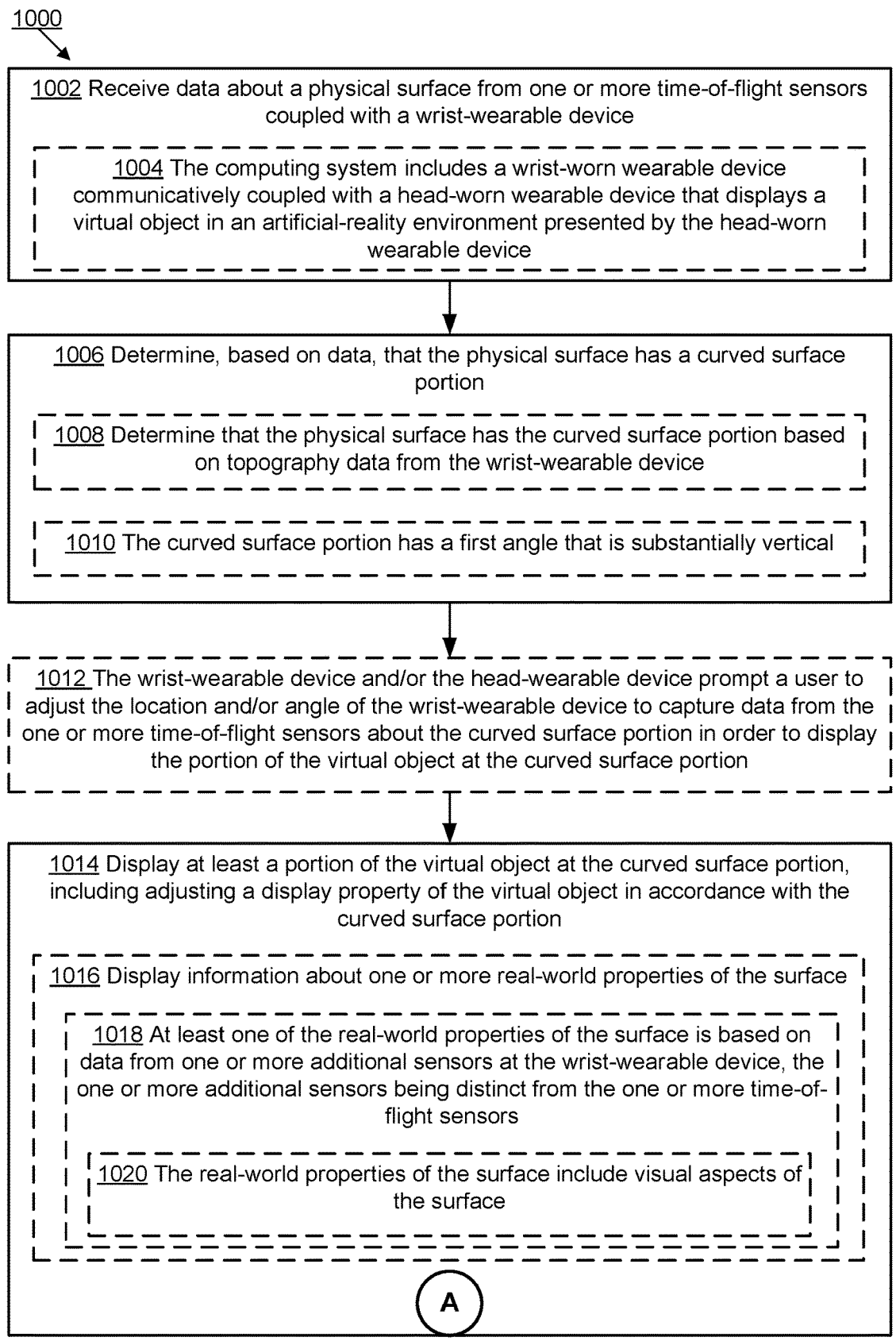
FIGS. 10A-10C are flow diagrams illustrating an example method for using time-of-flight sensors for gesture detection and content-rendering determinations in an artificial-reality environment in accordance with some embodiments.
Figure 10B:
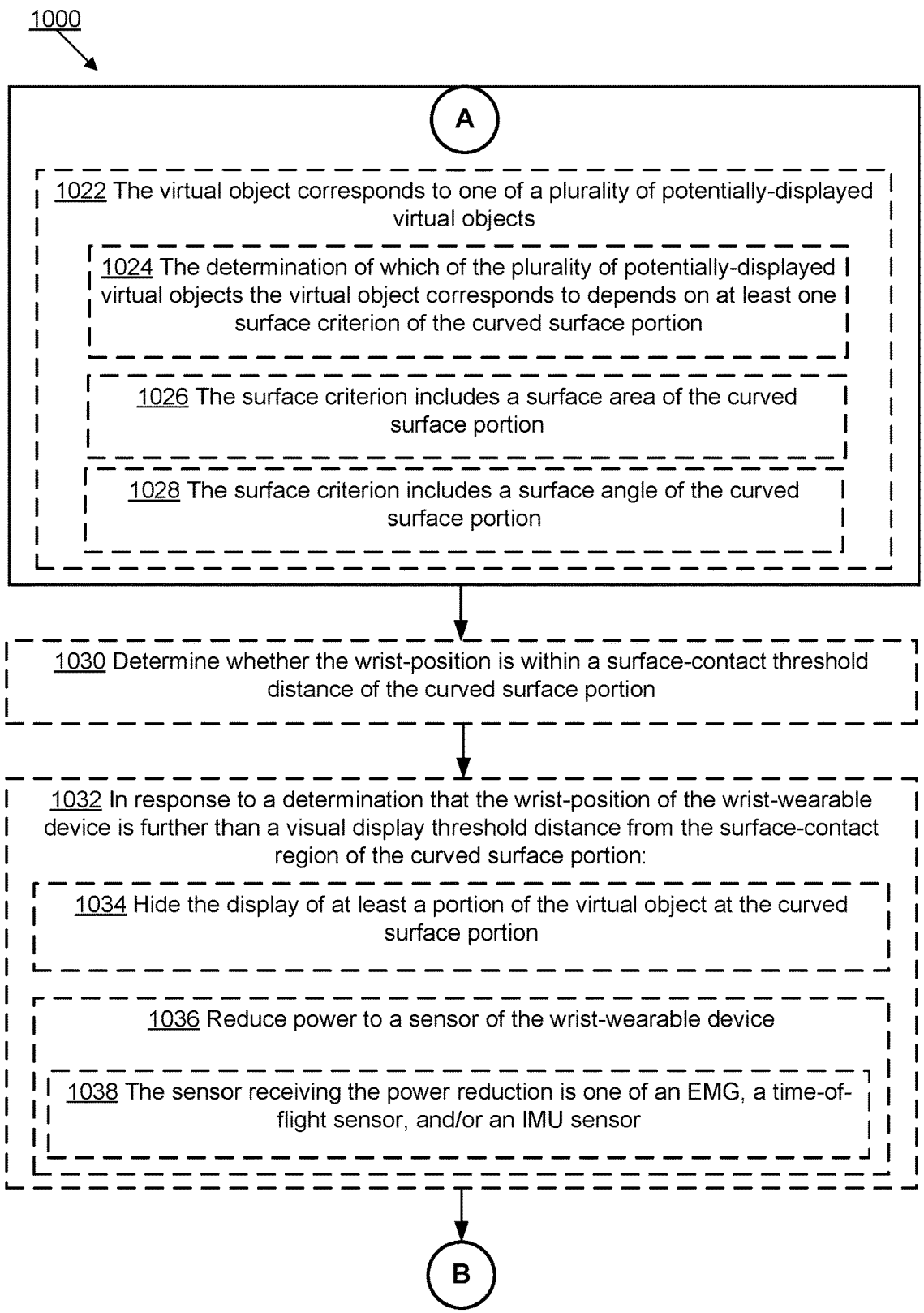
Figure 10C:
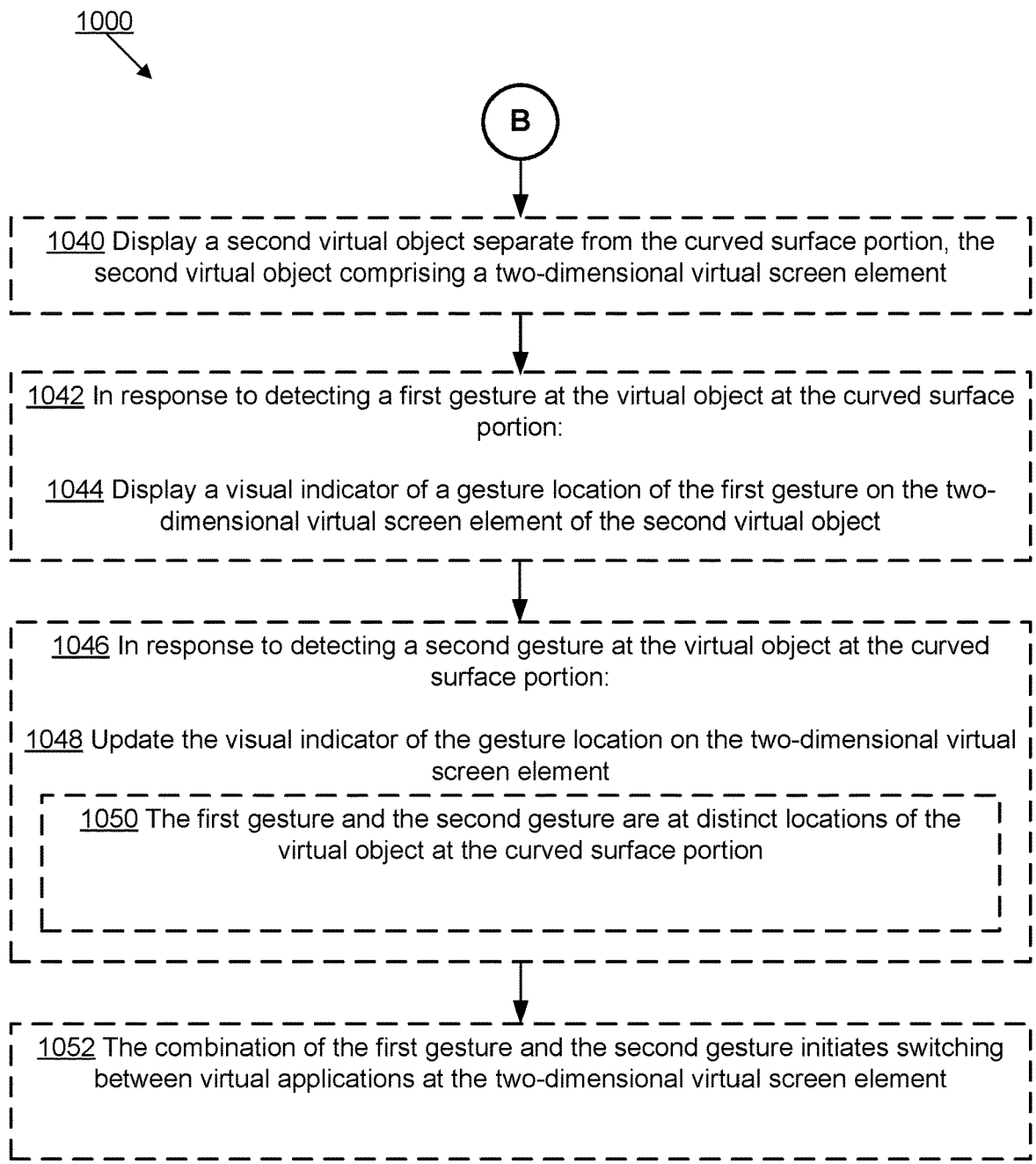

FIGS. 10A-10C are flow diagrams illustrating an example method 1000 for using time-of-flight sensors for gesture detection and content-rendering determinations in an artificial-reality environment. The method 1000 is performed at an artificial-reality system (e.g., artificial-reality system 100, 200, 300, 400, 500, 600, 700, or 800) having one or more processors and memory. In some embodiments, the artificial-reality system is the system 1200 in FIG. 12A. In some embodiments, the artificial-reality system is the system 1250 in FIG. 12B. In some embodiments, the artificial-reality system includes one or more wearable devices, such as the wrist-wearable device 102 and the head-wearable device 104 in FIGS. 1A-1J. In some embodiments, the artificial-reality system includes one or more handheld devices, such as a controller or smartphone. In some embodiments, the memory stores one or more programs configured for execution by the one or more processors. At least some of the operations shown in FIGS. 10A-10C correspond to instructions stored in a computer memory or computer-readable storage medium (e.g., the memory 1278 of the computer system 1272 or the memory 1256 of the accessory device 1252). In some embodiments, the artificial-reality system is a wearable device such as the wrist-wearable device 102 or the head-wearable device 104 in FIGS. 1A-1J.

The artificial-reality system receives (1002) data about a physical surface from one or more time-of-flight sensors coupled with a wrist-wearable device. For example, the group of sensors 856 at the wrist-wearable device 802 can be used to detect that surface 806 has a curved surface portion. In FIG. 8B, the wrist-wearable device 802 can detect the arm curvature 814.

In some embodiments, the artificial-reality system includes (1004) a wrist-wearable device (e.g., the wrist-wearable device 802) communicatively coupled with a head-wearable device (e.g., the head-wearable device 804) that displays a virtual object in an artificial-reality environment presented by the head-wearable device. For example, the head-wearable device 804 displays a virtual object that contains a virtual button 816-1 in FIG. 8B.

In some embodiments, the artificial-reality system determines (1006) that the physical surface has a curved surface portion. For example, the display of the virtual object in FIG. 8B can be based on determining that the curved surface portion 806 has an arm curvature 814.

In some embodiments, the artificial-reality system determines (1008) that the physical surface has the curved surface portion based on topography data obtained by the wrist-wearable device.

In some embodiments, the curved surface portion has (1010) a first angle that is substantially vertical. For example, the user can be performing a gesture such that the wrist-wearable device is detecting a vertical wall as a relevant physical surface. In such embodiments, the head-wearable device can display a virtual object that includes a set of control options different from the virtual object that would be displayed if the relevant physical surface has an angle below a threshold display option angle.

In some embodiments, the artificial-reality system prompts (1012) a user to adjust the location and/or angle of the wrist-wearable device to capture data from the one or more time-of-flight sensors about the curved surface portion in order to display the portion of the virtual object at the curved surface portion. For instance, if the sensors at the wrist-wearable device have not identified a full portion of a physical surface that the user is attempting to perform gestures with respect to, the head-wearable device can display an alert virtual object indicating to the user that they need to adjust the position of the wrist-wearable device in order to perform gestures (e.g., surface or in-air gestures) with respect to the physical surface.

In some embodiments, a head-wearable device displays (1014) at least a portion of the virtual object at the curved surface portion, including adjusting a display property of the virtual object in accordance with the curved surface portion. For example, FIGS. 8B-8E show various embodiments in which portions of the virtual object with virtual button affordance such as 816-1 are displayed along the curved surface portion 806 based on the arm curvature 814 of the curved surface portion 806.

In some embodiments, the head-wearable device displays (1016) information about one or more real-world properties of the surface. For example, the user can perform a touch contact at a physical surface that causes the head-wearable device to display material properties about the physical surface, such as a current temperature or electrical conductivity of the physical surface.

In some embodiments, at least one of the real-world properties of the surface is (1018) based on data from one or more additional sensors at the wrist-wearable device, the one or more additional sensors being distinct from the one or more time-of-flight sensors. For example, in some embodiments, thermal sensors at the wrist-wearable device can be used to detect the temperature of the surface. In some embodiments, capacitance sensors and/or other conductivity-detecting sensors can be used to detect one or more electrical properties of the surface.

In some embodiments, the real-world properties of the surface include (1020) visual aspects of the surface. For example, the visual aspects include color, texture, etc.

Turning now to FIG. 10B, the virtual object corresponds (1022) to one of a plurality of potentially-displayed virtual objects according to some embodiments. For example, multiple virtual objects corresponding to a same functionality but having different visual appearance.

In some embodiments, the determination of which of the plurality of potentially-displayed virtual objects the virtual object corresponds to depends (1024) on at least one surface criterion of the curved surface portion. To continue the previous example, a virtual object of the multiple virtual objects is selected based on properties of the surface (e.g., angle, size, and orientation). In some embodiments, the surface criterion includes (1026) a surface area of the curved surface portion. In some embodiments, the surface criterion includes (1028) a surface angle of the curved surface portion.

In some embodiments, the artificial-reality system determines (1030) whether the wrist-position is within a surface threshold distance of the curved surface portion. For example, in FIGS. 1B-1C the system determines that the surface gestures 109 and 122 occur within the surface threshold distance 106.

In some embodiments, the head-wearable device hides (1034) the display of at least a portion of the virtual object at the curved surface portion in response to the determination (1032) that the wrist-position of the wrist-wearable device is further than a visual display threshold distance from the surface-contact region of the curved surface portion. In some embodiments, the in-air threshold distance is the visual display threshold distance. In some embodiments, the surface threshold distance is the visual display threshold distance. In some embodiments, the visual display threshold distance corresponds to a reach distance of the user.

In some embodiments, the artificial-reality system reduces power (1036) to a sensor of the wrist-wearable device in response to the determination (1032) that the wrist-position of the wrist-wearable device is further than a visual display threshold distance from the surface-contact region of the curved surface portion. In some embodiments, the system reduces power (e.g., disables) one or more projectors and circuitry in accordance with the determination (1032).

In some embodiments, the sensor receiving the power reduction is (1038) one of an EMG, a time-of-flight sensor, and/or an IMU sensor. For example, when the user 201 performs the in-air gesture 242 in FIG. 2B, the wrist-wearable device 202 can determine that the user 201 has performed one or more gestures outside of the surface threshold distance 206, or that the wrist-wearable device 202 has been outside of the surface threshold distance 206 for a predefined duration threshold such that the artificial-reality system 200 causes power to be reduced to one or more sensors in the group of sensors 256, including one or more of the time-of-flight sensors 258. In some embodiments, the artificial-reality system 200 is configured to reduce power to one or more IMU sensors 260 in accordance with determining that the device has a threshold power level to use the EMG sensors 254.

Turning now to FIG. 10C, in some embodiments, the head-wearable device displays (1040) a second virtual object separate from the curved surface portion, the second virtual object comprising a two-dimensional virtual screen element. For example, the virtual object 320 in FIG. 3A can optionally be displayed in conjunction with the virtual object displayed at the curved surface portion 806 in FIGS. 8B-8E.

In some embodiments, in response to detecting (1042) a first gesture at the virtual object at the curved surface portion, the head-wearable device displays (1044) a visual indicator of a gesture location of the first gesture on the two-dimensional virtual screen element of the second virtual object. For example, when the user 301 performs the surface gesture 344 along the physical surface 310, the affordance 330 on the interactive display portion 326 of the virtual object 320 changes position based on the change of position of the wrist-wearable device 302 in FIG. 3C.

In some embodiments, in response to (1046) detecting a second gesture at the virtual object at the curved surface portion, the artificial-reality system causes the head-wearable device to update (1048) the visual indicator of the gesture location on the two-dimensional virtual screen element. In some embodiments, the first gesture and the second gesture are (1050) at distinct locations of the virtual object at the curved surface portion.

In some embodiments, the combination of the first gesture and the second gesture causes the artificial-reality system to initiate switching (1052) between virtual applications at the two-dimensional virtual screen element. For example, the combination of gestures can be a first location-agnostic pinch gesture to display a three-dimensional carousel view of the open virtual applications in the artificial-reality system, and the second gesture can be a virtual swipe gesture to scroll through the open virtual applications.

Figure 11B:
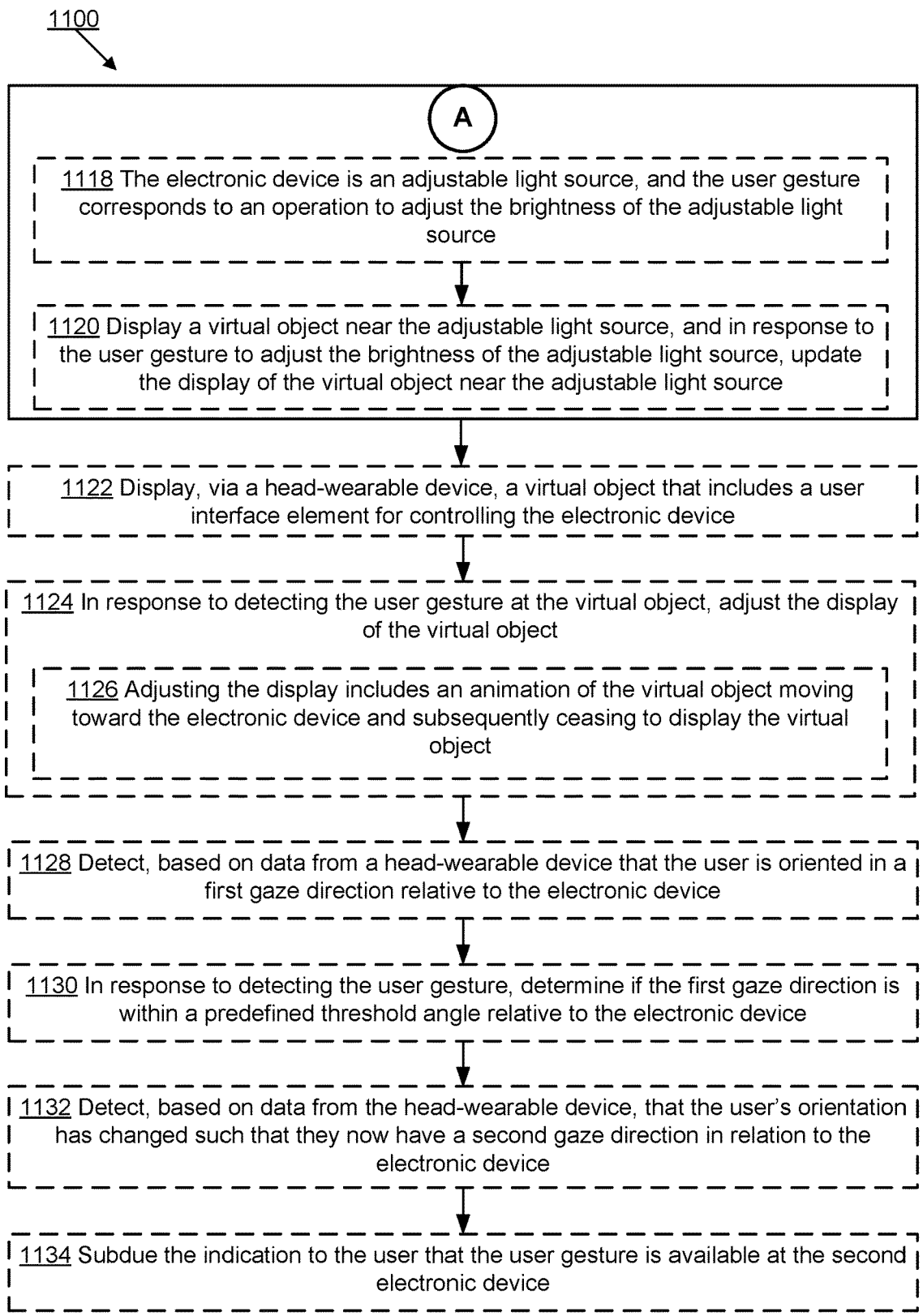

FIGS. 11A-11B are flow diagrams illustrating an example method for using interactions with an artificial-reality environment to control at least one physical electronic device. The method 1100 is performed at an artificial-reality system (e.g., artificial-reality system 100, 200, 300, 400, 500, 600, 700, 800) having one or more processors and memory. In some embodiments, the artificial-reality system is the system 1200 in FIG. 12A. In some embodiments, the artificial-reality system is the system 1250 in FIG. 12B. In some embodiments, the artificial-reality system includes one or more wearable devices, such as the wrist-wearable device 102 and the head-wearable device 104 in FIGS. 1A-1J. In some embodiments, the artificial-reality system includes one or more handheld devices, such as a controller or smartphone. In some embodiments, the memory stores one or more programs configured for execution by the one or more processors. In some embodiments, the memory stores one or more programs configured for execution by the one or more processors. At least some of the operations shown in FIGS. 11A-11B correspond to instructions stored in a computer memory or computer-readable storage medium (e.g., the memory 1278 of the computer system 1272 or the memory 1256 of the accessory device 1252). In some embodiments, the artificial-reality system is a wearable device such as the wrist-wearable device 102 or the head-wearable device 104 in FIGS. 1A-1J. Operations of the method 1100 can be performed while an artificial-reality environment that includes a virtual object and a representation of at least one physical object is being presented to a user by a head-wearable device.

Turning to FIG. 11A, the artificial-reality system detects (1102), based on data from a first group of sensors of a wrist-wearable device, that a user of a wrist-wearable device is in proximity to an electronic device (e.g., a physical electronic device) that is responsive to one or more user gestures. In some embodiments, a user is determined to be in proximity to an electronic device based on a determination that the user is within a first activation-threshold distance of the device. In some embodiments, the determination that the user is in proximity to the electronic device is made further in accordance with a determination that the user is within a second activation-threshold distance of a virtual object (e.g., the virtual object 520 shown in FIG. 5B). In some embodiments, as shown in FIGS. 5A and 5B, detecting that the user 501 is in proximity to the electronic device is also based on whether a gaze direction of the user is within a predefined gaze threshold range.

In some embodiments, the artificial-reality system provides (1104) an indication to the user that the one or more user gestures are available at the electronic device (e.g., the audio notification 511 shown in FIG. 5B). In some embodiments, the indication is provided at a head-wearable device, or another connected device (e.g., a display of the wrist-wearable device 102 in FIG. 1A-1J). In some embodiments, the indication is provided based on a determination that the user is within the first activation-threshold distance of the physical electronic device. In some embodiments, the indication indicates that one or more gestures, detectable a second group of sensors of the wrist-wearable device, are available for causing operations to be performed at the physical electronic device. In some embodiments, indication is provided at the virtual object.

In some embodiments, the indication to the user that the user input is (1106) a haptic event at one or more of the wrist-wearable device, a head-wearable device, or another connected electronic device. For example, in FIG. 5A, when the user 501 changes their orientation such that the gaze direction 566 to be directed toward the electronic device 572, the head-wearable device 504 provides a haptic event (e.g., a slight vibration of the lenses or other components of the head-wearable device 504).

In some embodiments, while the user is within an activation threshold distance to the electronic device, the wrist-wearable device detects (1108), using a second set of sensors of the wrist-wearable device, a user gesture that corresponds to an operation at the electronic device (e.g., the gesture 542 that the user 501 performs in FIG. 5B is detected by sensors of the wrist-wearable device 502, which can include time-of-flight sensors and/or EMG sensors).

In some embodiments, in response to (1110) detecting the user gesture, the artificial-reality system causes the operation to be performed at the electronic device. For example, when the user 501 performs the gesture 542 in FIG. 5B, the virtual object 520 can be displayed at a home display location 560 relative to the electronic device 570. In some embodiments, the home display location 560 has a fixed location and/or orientation relative to the electronic device 570.

In some embodiments, the user gesture includes (1112) a movement from a first location to a second location. For example, the gesture 542 can have a first location associated with the start of the gesture 542 and a second location associated with the end of the gesture 542.

In some embodiments, a haptic event is produced (1114) at the wrist-wearable device between the first location and the second location of the user gesture indicating a change to a controlled option at the electronic device. For example, when the user performs the surface gesture 543 to adjust the volume of the electronic device 570, the adjustment can involve more than one discrete volume level. When the user performs a first portion of the surface gesture 543 such that the volume is adjusted by a first volume level, a haptic event can be produced at the wrist-wearable device and/or the head-wearable device (e.g., the haptic event in FIG. 5A) to indicate to the user that the controlled option (e.g., volume) at the electronic device 570 has been adjusted the first volume level.

In some embodiments, the electronic device is (1116) a speaker, and the operation performed at the speaker adjusts a volume level of the speaker. For example, either of the electronic devices 770 and 776 in FIGS. 7A-7F include speakers, and various gestures performed by the user 701 can cause the performance of operations to adjust the volume levels of one or both the respective speakers of the electronic devices 770 and 776.

Turning now to FIG. 11B, in some embodiments, the electronic device is (1118) an adjustable light source, and the user gesture causes an operation to be performed to adjust the brightness of the adjustable light source (e.g., electronic device 772 in FIG. 7F). For example, after the user performs the location-agnostic gesture 746 in FIG. 7D, the brightness of the electronic device 772 is adjusted, and the adjusted brightness level is displayed at the virtual object 722 displayed by the head-wearable device 704 in FIG. 7E.

In some embodiments, the artificial-reality system causes the head-wearable device to display (1120) a virtual object near the adjustable light source, and in response to the user gesture to adjust the brightness of the adjustable light source, update the display of the virtual object near the adjustable light source. For example, the virtual object 722 in FIG. 7E includes current levels of brightness, color, and saturation, and the display of the virtual object 722 can be adjusted at the head-wearable device 704 in accordance with the user performing one or more gestures directed to the electronic device 772).

In some embodiments, the artificial-reality system causes a head-wearable device to display (1122), a virtual object that includes a user interface element for controlling the electronic device. For example, the virtual object 520 in FIG. 5D includes an interactive display portion 526 for interacting with the virtual object 520 to select songs to play at the electronic device 570.

In some embodiments, in response to detecting the user gesture at the virtual object, the artificial-reality system adjusts (1124) presentation of the display of the virtual object. For example, as shown in FIG. 5C, the virtual object 520 appears to move so as to appear closer to the user 501, so as to be accessible to the user 501 for viewing and/or virtual touch interactions.

In some embodiments, adjusting presentation of the display includes presenting (1130) an animation of the virtual object moving toward the electronic device and subsequently ceasing to display the virtual object. For example, in FIG. 5F-5G, the virtual object 520 first moves closer to the electronic device 570, and then in 5G, the virtual object 520 is caused to be hidden from view at the head-wearable device 504.

In some embodiments, the artificial-reality system detects (1132), based on data from a head-wearable device, that the user is oriented in a first gaze direction relative to the electronic device (e.g., gaze direction 568 relative to the electronic device 570 in FIG. 5A).

In some embodiments, in response to detecting the user gesture, the artificial-reality system determines (1134) if the first gaze direction is within a predefined threshold angle relative to the electronic device. For example, in FIG. 5B, the head-wearable device 504 determines that the gaze direction 568 of the user 501 is within a predefined threshold range of the electronic device 570, and the artificial-reality system therefore causes the head-wearable device 504 to display the virtual object 520. In other words, data received from the head-wearable device can be used to determine that the user is oriented such that the user has a first gaze direction, where the first gaze direction is within a threshold angular range of a first direction between a location of the user and a location of the physical electronic device. And, in accordance with detecting a user gesture while the first gaze direction of the user is within the threshold angular range of the first direction, the artificial-reality system can cause the operation to be performed at the physical electronic device.

In some embodiments, the artificial-reality system detects (1136), based on data from the head-wearable device, that the user's orientation has changed such that they now have a second gaze direction in relation to the electronic device. For example, in FIG. 5B, the gaze direction 568 is a second gaze direction with respect to the gaze direction 566.

In some embodiments, the artificial-reality system then subdues (1138) the indication (e.g., forgoes providing the indication) to the user that the user gesture is available at the second electronic device. For example, in FIGS. 5A-5B the user 501 changes their gaze direction from the gaze direction 566 to the gaze direction 568. When the user is oriented towards the gaze direction 566, the head-wearable device 504 determines that the gaze direction 566 is not within a predefined threshold angle of the electronic device 570, and therefore does not show the virtual object 520. But the same sequence could occur in reverse as recited in operation 1138.

In some embodiments, the method 1100 includes detecting, based on data from the second group of sensors of the wrist-wearable device, a second user gesture, distinct from the user gesture, that corresponds to a second operation at the physical electronic device, distinct from the operation. And the method includes, in response to detecting the second user gesture, causing the second operation to be performed at the physical electronic device.

In some embodiments, operations and/or aspects of the operations of the methods 900 and/or 1000 are used in conjunction with operations of the method 1100. For example, in some embodiments, the method 1100 includes detecting, based on data from the second group of sensors of the wrist-wearable device, a third user gesture, the third user gesture having a same hand movement as the user gesture, that corresponds to a third operation at the physical electronic device, distinct from the operation, where (i) the user gesture is a surface gesture within a surface threshold distance of a physical surface, and (ii) the third user gesture is an in-air gesture beyond the surface threshold distance of the physical surface.

Having thus described example sequences and methods of operation that make user of the example sequences, attention will now be directed to system-level depictions of hardware and software on which (or with which) the methods can be implemented.

Example System-Level Block Diagrams

Figure 12A:
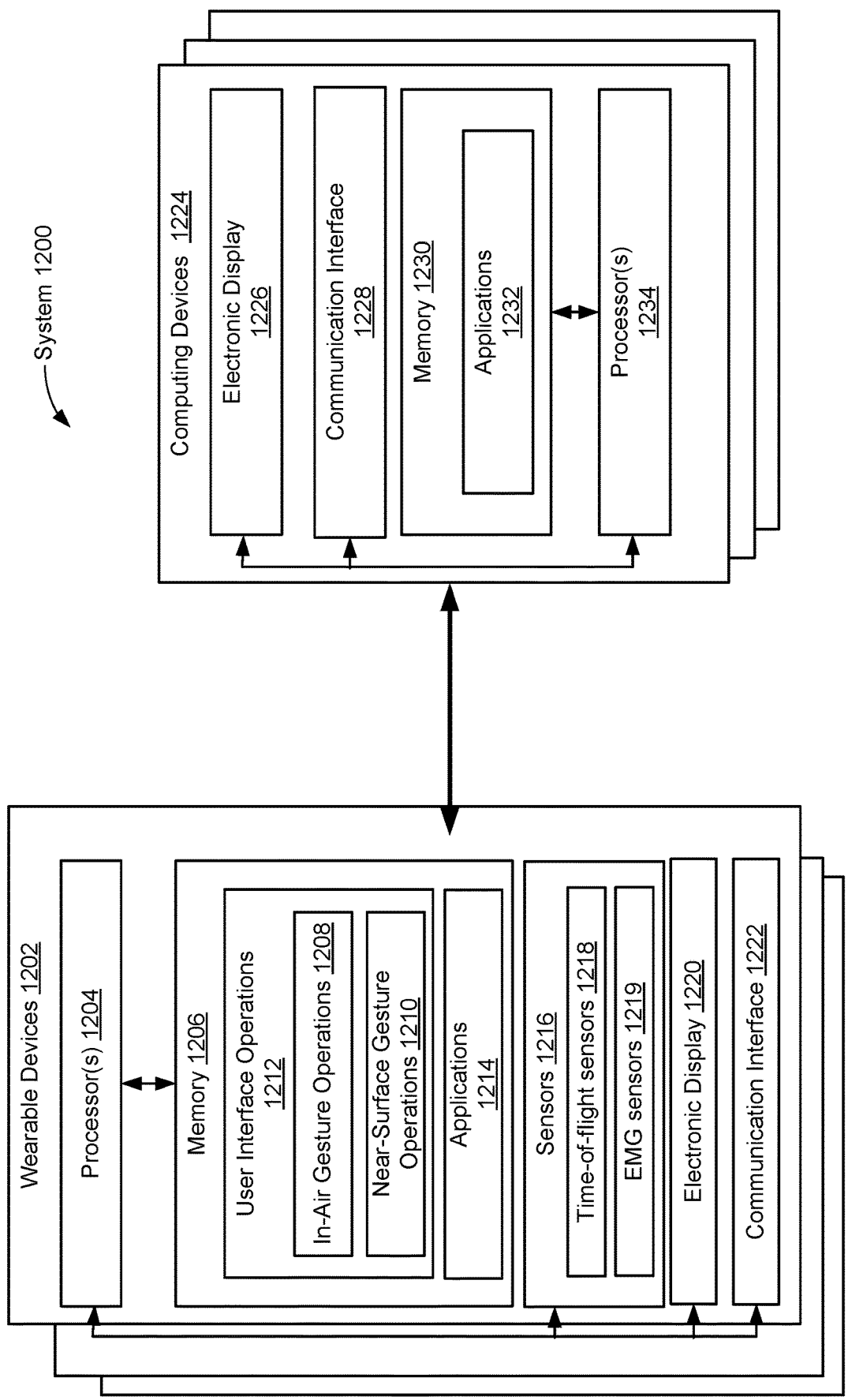
FIGS. 12A-12B are block diagrams illustrating example artificial-reality systems in accordance with some embodiments.
Figure 12B:
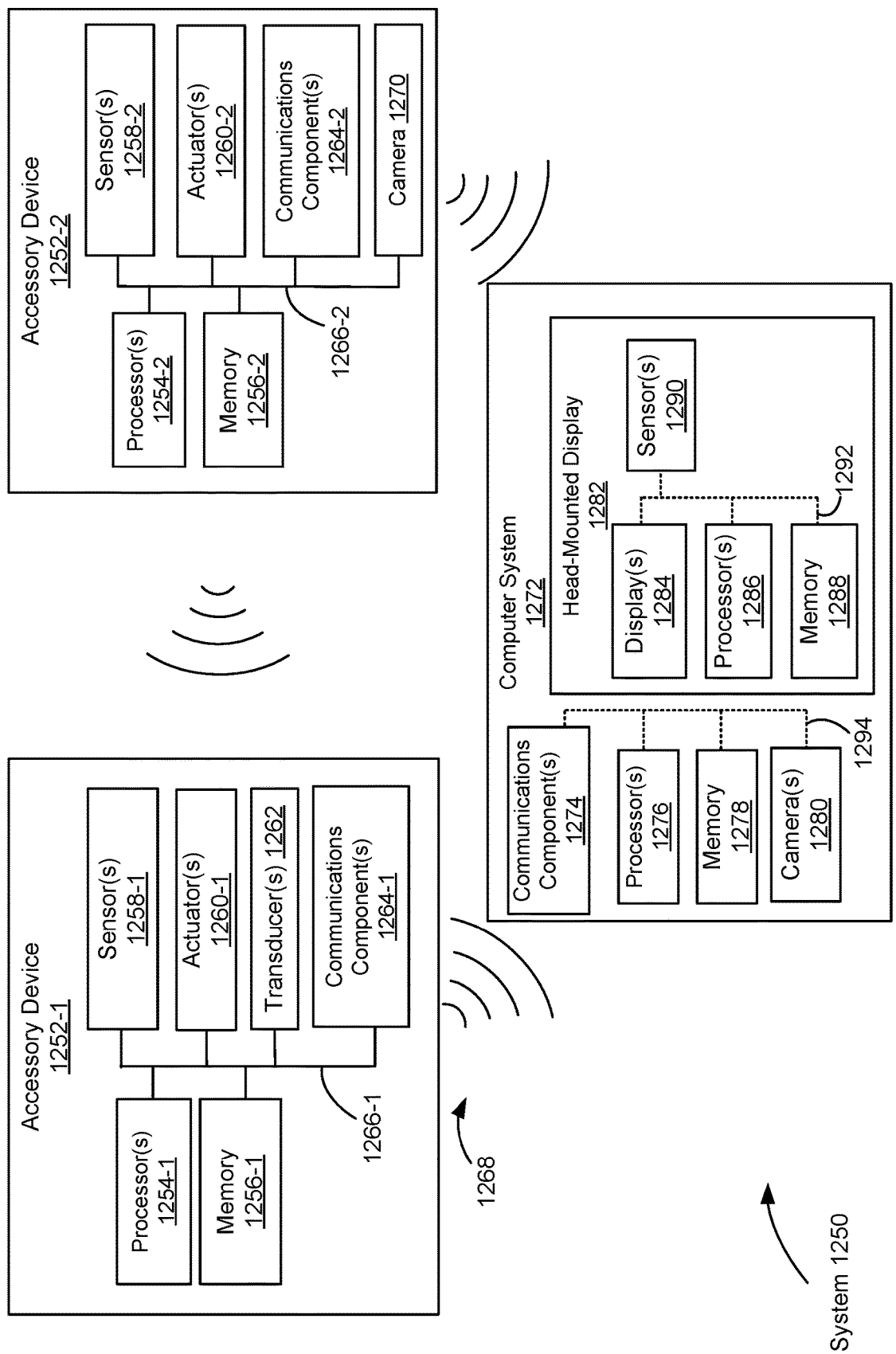

FIGS. 12A-12B are block diagrams illustrating example components used with artificial reality systems in accordance with some embodiments. FIG. 12A is a block diagram illustrating an artificial-reality system 1200 in accordance with some embodiments. While some example features are illustrated, various other features have not been illustrated for the sake of brevity and so as not to obscure pertinent aspects of the example embodiments disclosed herein. To that end, as a non-limiting example, the system 1200 includes one or more wearable devices 1202, which can be used in conjunction with one or more computing devices 1224. In some embodiments, the system 1200 provides the functionality of a virtual-reality device, an AR device, a mixed-reality device, hybrid-reality device, or a combination thereof. In some embodiments, the system 1200 provides the functionality of a user interface and/or one or more user applications (e.g., games, word processors, messaging applications, calendars, clocks, etc.). In some embodiments, the system 1200 is an instance of any of the artificial-reality systems 100, 200, 300, 400, 500, 600, 700, or 800 described above.

In some embodiments, the system 1200 provides the functionality to control or provide commands to the one or more computing devices 1224 based on a wearable device 1202 determining motor actions or intended motor actions of the user. The relative locations of such motor actions or intended motions (e.g., gestures) can be detected using the time-of-flight sensors 1218 and/or the EMG sensors 1219, in addition to other sensors at the wearable device 1202. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to in-air hand gestures). The one or more computing devices 1224 include one or more wearable devices (e.g., ahead-mounted display), smartphone, tablet, smart watches, laptops, computer systems, augmented reality systems, robots, vehicles, virtual avatars, user interfaces, the wearable device 1202, and/or other electronic devices and/or control interfaces.

The wearable device 1202 includes a wearable structure worn by the user. In some embodiments, the wearable device 1202 is an instance of any of the wrist-wearable devices described previously (e.g., the wrist-wearable device 102) or any of the head-wearable devices described previously (e.g., the head-wearable device 104). In some embodiments, the wearable device 1202 collects information about a portion of the user's body (e.g., the user's hand(s) and finger(s) position(s) and orientation(s) relative to a physical surface such as the physical surface 110) that can be used as input to perform one or more command the computing device 1224. In some embodiments, the collected information about a portion of the user's body (e.g., the user's hand(s) and finger(s) position(s) and orientation(s) relative to a physical surface such as the physical surface 110) can be used as input to perform one or more command at the wearable device 1224 (e.g., selecting content to present on the electronic display 1226 of the wearable device 1202 or controlling one or more applications 1214 locally stored on the wearable device 1202). The information collected about the portion of the user's body can include neuromuscular signals that can be used by the one or more processors 1204 of the wearable device 1202 to determine a motor action that the user intends to perform with their hand and/or fingers. The information collected about the user's body can also include information about surface features of one or more portions of the user's body. For example, the information can be used to determine if a portion of the user's body has a curved surface portion (e.g., the user's leg 862 in FIG. 8E).

In the example illustrated by FIG. 12A, the wearable device 1202 includes the one or more processors 1204, memory 1206, sensors 1216, including time-of-flight sensors 1218, an electronic display 1220, and a communication interface 1222. In some embodiments, the memory 1206 includes one or more of interface operations 1212 (e.g., a first set of in-air gesture operations 1208, a second set of surface gesture operations 1210), and applications 1214. The wearable device 1202 can include additional components that are not shown in FIG. 12A, such as a power source (e.g., an integrated battery, a connection to an external power source), a haptic feedback generator, etc. In some embodiments, one or more of the components shown in FIG. 12A are housed within a conductive hemispherical-like shape of the wearable device.

In some embodiments, sensors 1216 include one or more hardware devices that contact the user's skin (e.g., a wrist of a user 101). In some embodiments, the sensors 1216 detect neuromuscular signals from neuromuscular pathways within and on the wrist of a user (the sensors can additionally, or alternatively, be coupled with the head-wearable devices discussed herein), and the sensors 1216 can further detect a proximity to a physical surface of the wearable device 1202 based on time-of-flight sensing data. In some embodiments, the sensors 1216 are configured to detect different digit movements, wrist movements, arm movements, index finger movements, middle finger movements, ring finger movements, little finger movements, thumb movements, hand movements, etc. from the different neuromuscular signals detected from the user's skin. In some embodiments, the sensors 1216 are used in pairs and/or other combinations to form respective channels and/or planes for detecting neuromuscular signals and/or gestures relative to a physical surface, where each channel is a pair of sensors. In some embodiments, the wearable device 1202 includes at least three time-of-flight sensors 1218 that can be used in combination to detect a "surface plane" on a physical surface. In some embodiments, the sensors 1216 of the wearable device 1202 include time-of-flight sensors 1218, and/or EMG sensors 1219.

In some embodiments, the one or more processors 1204 are configured to receive the data detected by the sensors 1216 and determine whether a user gesture performed by the user corresponds to an in-air gesture or a surface gesture (e.g., the time-of-flight sensors 158 in FIGS. 1A-1I). The input commands when provided to a computing device 1224 cause the computing device to perform an action (e.g., as described in detail above, various in-air hand gestures can cause performance of various operations that update the display of a user interface at the head-wearable device). Alternatively, in some embodiments, the one or more input commands are used to cause the wearable device 1202 to perform one or more actions locally (e.g., present a display on the electronic display 1220, operate one or more applications 1214, cause operations to be performed at another electronic device, etc.). For example, the wearable device 1202 can be a wrist-wearable device (e.g., a smartwatch) and the one or more input commands can be used to cause the smartwatch to perform one or more actions.

The one or more applications 1214 stored in the memory 1206 can be productivity-based applications (e.g., calendars, organizers, word processors), social applications (e.g., social platforms), games, etc. In some embodiments, the one or more applications 1214 are presented to the user via the electronic display 1220. In some embodiments, the one or more applications 1214 are used to facilitate the transmission of information (e.g., to another application running on a computing device 1224). In some embodiments, the user can provide one or more input commands based on the determined motor action to the applications 1214 operating on the wearable device 1202 to cause the applications 1214 to perform the input commands.

Additionally, different sets of gestures, including sets of in-air gesture operations 1208 and sets of surface gesture operations 1210 can be stored in the memory 1206. This allows the wearable device 1202 to provide user-specific performance. More specifically, the wearable device 1202 can be tailored to perform as efficiently as possible for each user.

The communication interface 1222 enables input and output to the computing device 1224. In some embodiments, the communication interface 1222 is a single communication channel, such as USB. In other embodiments, the communication interface 1222 includes several distinct communication channels operating together or independently. For example, the communication interface 1222 can include separate communication channels for sending input commands to the computing device 1224 to cause the computing device 1224 to perform one or more actions. In some embodiments, data from the sensors 1216 is sent to the computing device 1224, which then interprets the appropriate input response based on the received data. The one or more communication channels of the communication interface 1222 can be implemented as wired or wireless connections. In some embodiments, the communication interface 1222 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

In some embodiments, the computing device 1224 presents media to a user. Examples of media presented by the computing device 1224 include images, video, audio, or some combination thereof. Additional examples of media include executed virtual-reality applications and/or AR applications to process input data from the sensors 1216 on the wearable device 1202. In some embodiments, the media content is based on received information from one or more applications 1232 (e.g., productivity applications, social applications, games, etc.). The computing device 1224 includes an electronic display 1226 for presenting media content to the user. In various embodiments, the electronic display 1226 comprises a single electronic display or multiple electronic displays (e.g., one display for each eye of a user). The computing device 1224 includes a communication interface 1228 that enables input and output to other devices in the system 1200. The communication interface 1228 is similar to the communication interface 1222 described above.

In some embodiments, the computing device 1224 receives instructions (or commands) from the wearable device 1202 (e.g., a request to process sensor data related to the performance of a surface gesture, an in-air gesture, and/or a location-agnostic gesture). In response to receiving the instructions, the computing device 1224 performs one or more actions associated with the instructions (e.g., perform the one or more input commands in an AR or VR environment). Alternatively, in some embodiments, the computing device 1224 receives instructions from external device communicatively coupled to the wearable device 1202, and in response to receiving the instructions, performs one or more actions associated with the instructions. In some embodiments, the computing device 1224 receives instructions from the wearable device 1202, and in response to receiving the instructions, provides the instruction to an external device communicatively coupled to the computing device 1224 which performs one or more actions in accordance with the instructions. Although not shown, in the embodiments that include a distinct external device, the external device can be connected to the wearable device 1202, and/or the computing device 1224 via a wired or wireless connection. The external device can be remote game consoles, additional displays, additional head-mounted displays, and/or any other additional electronic devices that can be could to be coupled in conjunction with the wearable device 1202 and/or the computing device 1224.

In some embodiments, the computing device 1224 provides information to the wearable device 1202, which in turn causes the wearable device to present the information to the user. The information provided by the computing device 1224 to the wearable device 1202 can include media content (which can be displayed on the electronic display 1220 of the wearable device 1202), organizational data (e.g., calendars, phone numbers, invitation, directions), files (such as word processing documents, spreadsheets, or other documents that can be worked on locally from the wearable device 1202).

In some embodiments, the computing device 1224 is implemented as an integrated system-on-a-chip, a microcontroller, a desktop or laptop computer, a server computer, a tablet, or a smart phone or other mobile device. Thus, the computing device 1224 includes components common to computing devices, such as the processor(s) 1234, random access memory, a storage device, a network interface, an input-output interface (I/O interface), and the like. The processor can be or include one or more microprocessors or application specific integrated circuits (ASICs). The memory 1230 can be or include RAM, ROM, DRAM, SRAM and MRAM, and can include firmware, such as static data or fixed instructions, BIOS, system functions, configuration data, and other routines used during the operation of the computing device and the processor. The memory 1230 also provides a storage area for data and instructions associated with applications and data handled by the processor.

The storage device provides non-volatile, bulk, or long-term storage of data or instructions in the computing device. The storage device can take the form of a magnetic or solid-state disk, tape, CD, DVD, or other reasonably high capacity addressable or serial storage medium. Multiple storage devices can be provided or available to the computing device. Some of these storage devices can be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 12A, the computing device 1224 further includes applications 1232. In some embodiments, the applications 1232 are implemented as software modules that are stored on the storage device and executed by the processor 1234. Some embodiments of the computing device 1224 include additional or different components than those described in conjunction with FIG. 12A. Similarly, the functions further described below can be distributed among components of the computing device 1224 in a different manner than is described here.

Each application 1232 is a group of instructions that, when executed by a processor, generates specific content for presentation to the user. For example, an application 1232 can include virtual-reality application that generates virtual-reality content (such as a virtual-reality environment) and that further generate virtual-reality content in response to inputs received from the wearable devices 1202 (based on determined user motor actions). Examples of virtual-reality applications include gaming applications, conferencing applications, and video playback applications. Additional examples of applications 1232 can include productivity-based applications (e.g., calendars, organizers, word processors, etc.), social based applications (e.g., social media platforms, dating platforms, etc.), entertainment (e.g., shows, games, movies, etc.), and travel (e.g., ride share applications, hotel applications, airline applications, etc.). In some embodiments, the applications 1232 include React.js, React VR, and/or or React Native functions associated with performing operations to update display properties at the electronic display 1226.

In some embodiments, the computing device 1224 allows the applications 1232 to operate in conjunction with the wearable device 1202. In some embodiments, the computing device 1224 receives information from the sensors 1216 of the wearable device 1202 and provides the information to an application 1232. Based on the received information, the application 1232 determines media content to provide to the computing device 1224 (or the wearable device 1202) for presentation to the user via the electronic display 1226 and/or a type of haptic events (e.g., the haptic event provided in accordance with the user 101 performing a press surface gesture at the virtual object 118 in FIG. 1B). For example, if the computing device 1224 receives information from the sensors 1216 on the wearable device 1202 indicating that the user has performed an action (e.g., a virtual touch gesture, a surface touch gesture, a "thumbs-up" gesture, etc.), the application 1232 generates content for the computing device 1224 (or the wearable device 1202) to present, the content mirroring the user's instructions based on determined motor actions by the wearable device 1202. Similarly, in some embodiments, the applications 1232 receive information directly from the sensors 1216 on the wearable device 1202 (e.g., applications locally saved to the wearable device 1202) and provide media content to the computing device 1224 for presentation to the user based on the information (e.g., determined motor actions by the wearable device 1202).

FIG. 12B is a block diagram illustrating a system 1250 in accordance with some embodiments. While some example features are illustrated, various other features have not been illustrated for the sake of brevity and so as not to obscure pertinent aspects of the example embodiments disclosed herein. To that end, as a non-limiting example, the system 1250 includes accessory devices 1252-1 and 1252-2, which are used in conjunction with a computer system 1272 (e.g., a computing device 1224). In some embodiments, the system 1250 is an instance of any of the artificial-reality systems 100, 200, 300, 400, 500, 600, 700, 800, or 1200.

An example accessory device 1252 (two example embodiments of which are represented by 1252-1 and 1252-2 in FIG. 12B) includes, for example, one or more processors/cores 1254 (referred to henceforth as "processors"), a memory 1256, one or more actuators 1260, one or more communications components 1264, and/or one or more sensors 1258. In some embodiments, these components are interconnected by way of a communications bus 1266. References to these components of the accessory device 1252 cover embodiments in which one or more of these components (and combinations thereof) are included. In some embodiments, the one or more sensors 1258 and the one or more transducers 1262 are the same components. In some embodiments, the example accessory device 1252 includes one or more cameras 1270. In some embodiments (not shown), accessory device 1252 includes a wearable structure. In some embodiments the accessory device and the wearable structure are integrally formed. In some embodiments, the accessory device and the wearable structure are distinct structures, yet part of the system 1250. In some embodiments, one or more of the accessory devices 1252 is any of the wrist-wearable devices described previously (e.g., the wrist-wearable device 102) or any of the head-wearable devices described previously (e.g., the head-wearable device 104) in FIGS. 1A-1J. In some embodiments, there are additional accessory devices, such as handheld accessory devices that allow for better detection of user gestures and/or a physical surface.

For example, the accessory device 1252-1 can be a ring that is used in conjunction with a wearable structure to utilize data measurements obtained by sensor 1258-1 to adjust a fit of the wearable structure. In another example, the accessory device 1252-1 and accessory device 1252-2 are distinct wristbands to be worn on each wrist of the user.

In some embodiments, a single processor 1254 (e.g., processor 1254-1 of the accessory device 1252-1) executes software modules for controlling multiple accessory devices 1252 (e.g., accessory devices 1252-1 . . . 1252-n). In some embodiments, a single accessory device 1252 (e.g., accessory device 1252-2) includes multiple processors 1254 (e.g., processors 1254-2), such as one or more actuator processors, one or more communications component processors, one or more sensor processors, and/or one or more transducer processors. In some embodiments, the one or more actuator processors are configured to adjust a fit of a wearable structure. In some embodiments, the one or more communications processors are configured to control communications transmitted by communications component 1264 and/or receive communications by way of communications component 1264. In some embodiments, the one or more sensor processors are configured to control operation of sensor 1258 and/or receive output from sensors 1258. In some embodiments, the one or more transducer processors are configured to control operation of transducers 1262.

In some embodiments, the communications component 1264 of the accessory device 1252 includes a communications component antenna for communicating with the computer system 1272. In some embodiments, the communications component 1274 includes a complementary communications component antenna that communicates with the communications component 1264. In some embodiments, the data contained within the communication signals alerts the computer system 1272 that the accessory device 1252 is ready for use. In some embodiments, the computer system 1272 sends instructions to the accessory device 1252, and in response to receiving the instructions, the accessory device 1252 instructs a transmit and receive electrode to provide coupling information between the receive electrode and the user.

In some embodiments, the one or more actuators 1260 are used to adjust a fit of the wearable structure on a user's appendage. In some embodiments, the one or more actuators 1260 are also used to provide haptic feedback to the user. For example, each actuator 1260 can apply vibration stimulations, pressure stimulations, shear stimulations, or some combination thereof to the user. In some embodiments, the one or more actuators 1260 are hydraulic, pneumatic, electric, and/or mechanical actuators.

In some embodiments, the one or more transducers 1262 are used to transmit and receive one or more signals 1268. In some embodiments, the one or more sensors 1258 are used to transmit and receive one or more signals 1268. In some embodiments, the one or more sensors 1258 and the one or more transducers 1262 are part of a same component that is used to transmit and receive one or more signals 1268. The signals 1268 can be electromagnetic waves, mechanical waves, electrical signals, or any wave/signal capable of being transmitted through a medium. As used herein, a medium includes the wearer's skin, flesh, bone, blood vessels, or some combination thereof.

In addition to transmitting signals (e.g., electrical signals), the accessory device 1252 is also configured to receive (e.g., detect, sense) signals transmitted by itself or by another accessory device 1252. To illustrate, an accessory device 1252-1 can transmit a plurality of signals through a medium, such as a user's appendage, and a second accessory device 1252-2 can receive the signals transmitted by the accessory device 1252-1 through the medium. Furthermore, an accessory device 1252 receiving transmitted signals can use the received signals to determine whether the accessory device is in contact with a user.

In some embodiments, the one or more transducers 1262 of the accessory device 1252-1 include one or more transducers configured to generate and/or receive signals. In some embodiments, integrated circuits (not shown) of the accessory device 1252-1, such as a controller circuit and/or signal generator, control the behavior of the transducers 1262. In some embodiments, the transmit electrode and/or the receive electrode are part of the one or more transducers 1262 of the accessory device 1252-1. Alternatively, the transmit electrode and/or the receive electrode can be part of the one or more sensors 1258-1 of the accessory device 1252-1, or the transmit electrode can be part of a transducer 1262 while the receive electrode can be part of a sensor 1258-1 (or vice versa).

In some embodiments, the sensors 1258 include one or more time-of-flight sensors, and one or more EMG sensors. In some embodiments, the sensors 1258 include one or more of the transmit electrode and the receive electrode for obtaining coupling information. In some embodiments, the sensors 1258 includes one or more neuromuscular sensors. In some embodiments, the neuromuscular sensors include one or more surface electromyography (sEMG) sensors, mechanomyography sensors, and/or sonomyography sensors. Additional non-limiting examples of the sensors 1258 (and the sensors 1290) include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the sensors 1258 (and the sensors 1290) are configured to gather additional data about the user (e.g., an impedance of the user's body). Examples of sensor data output by these sensors can include body temperature data, infrared rangefinder data, motion data, activity recognition data, silhouette detection and recognition data, gesture data, heart rate data, and other wearable device data (e.g., biometric readings and output, accelerometer data).

The computer system 1272 is a computing device that executes artificial-reality applications (e.g., virtual-reality applications, AR applications, etc.) to process input data from the sensors 1290 on the head-wearable device 1282 and the sensors 1258 on the accessory device 1252. The computer system 1272 provides output data to at least (i) the display 1284 on the head-wearable device 1282 and (ii) the accessory device(s) 1252. In some embodiments, the head-wearable device 1282 is an instance of the head-wearable device 104 or the AR system 1320.

The computer system 1272 includes one or more processors/cores 1276, memory 1278, one or more communications components 1274, and/or one or more cameras 1280. In some embodiments, these components are interconnected by way of a communications bus 1294. References to these components of the computer system 1272 cover embodiments in which one or more of these components (and combinations thereof) are included.

In some embodiments, the computer system 1272 is a standalone device that is coupled to a head-mounted display (e.g., a display of a head-wearable device) 1282. For example, the computer system 1272 has processor(s)/core(s) 1276 for controlling one or more functions of the computer system 1272 and the head-mounted display 1282 has processor(s)/core(s) 1286 for controlling one or more functions of the head-mounted display 1282. Alternatively, in some embodiments, the head-mounted display 1282 is a component of computer system 1272. For example, the processor(s) 1276 controls functions of the computer system 1272 and the head-mounted display 1282. In addition, in some embodiments, the head-mounted display 1282 includes the processor(s) 1286 that communicate with the processor(s) 1276 of the computer system 1272. In some embodiments, communications between the computer system 1272 and the head-mounted display 1282 occur via a wired (or wireless) connection between communications bus 1294 and communications bus 1292. In some embodiments, the computer system 1272 and the head-mounted display 1282 share a single communications bus. In some embodiments, the head-mounted display 1282 is separate from the computer system 1272.

The computer system 1272 can be any suitable computer device, such as a laptop computer, a tablet device, a netbook, a personal digital assistant, a mobile phone, a smart phone, an artificial-reality console, or device (e.g., a virtual-reality device, an AR device, or the like), a gaming device, a computer server, or any other computing device. The computer system 1272 is sometimes called a host or a host system. In some embodiments, the computer system 1272 includes other user interface components such as a keyboard, a touch-screen display, a mouse, a trackpad, and/or any number of supplemental I/O devices to add functionality to computer system 1272.

In some embodiments, one or more cameras 1280 of the computer system 1272 are used to facilitate the artificial-reality experience. In some embodiments, the computer system 1272 provides images captured by the one or more cameras 1280 to the display 1284 of the head-mounted display 1282, and the display 1284 in turn displays the provided images. In some embodiments, the processors 1286 of the head-mounted display 1282 process the provided images. It is noted that in some embodiments, one or more of the cameras 1280 are part of the head-mounted display 1282. In some embodiments, data from the cameras 1280 of the head-mounted display can be combined with data from the time-of-flight sensors at the wrist-wearable device 102 for more accurate gesture detection.

The head-mounted display 1282 presents media to a user. Examples of media presented by the head-mounted display 1282 include images, video, audio, or some combination thereof. In some embodiments, audio is presented via an external device (e.g., speakers and/or headphones) that receives audio information from the head-mounted display 1282, the computer system 1272, or both, and presents audio data based on the audio information. The displayed images can be in virtual reality, augmented reality, or mixed reality. The display 1284 displays images to the user in accordance with data received from the computer system 1272. In various embodiments, the display 1284 comprises a single electronic display or multiple electronic displays (e.g., one display for each eye of a user).

The sensors 1290 include one or more hardware devices that detect spatial and motion information about the head-mounted display 1282. In some embodiments, the sensors 1290 includes one or more neuromuscular sensors. In some embodiments, the neuromuscular sensors include one or more surface electromyography (sEMG) sensors, mechanomyography sensors, and/or sonomyography sensors. Spatial and motion information can include information about the position, orientation, velocity, rotation, and acceleration of the head-mounted display 1282. For example, the sensors 1290 can include one or more inertial measurement units that detect rotation of the user's head while the user is wearing the head-mounted display 1282. In some embodiments, the sensors 1290 include one or more cameras positioned on the head-mounted display 1282. In some embodiments, the head-mounted display 1282 includes one or more sensors 1290. In some embodiments, one or more of the sensors 1290 are part of the computer system 1272.

Having thus described example block diagrams, attention will now be directed to examples of the wearable devices that can be used in conjunction with the techniques described herein.

Example Wearable Devices (e.g., Wrist-Wearable Devices Such as Smartwatches, AR Glasses, VR Goggles/Headsets, which can Form Various Artificial-Reality Systems Used with the Techniques Described Herein)

Figure 13A:
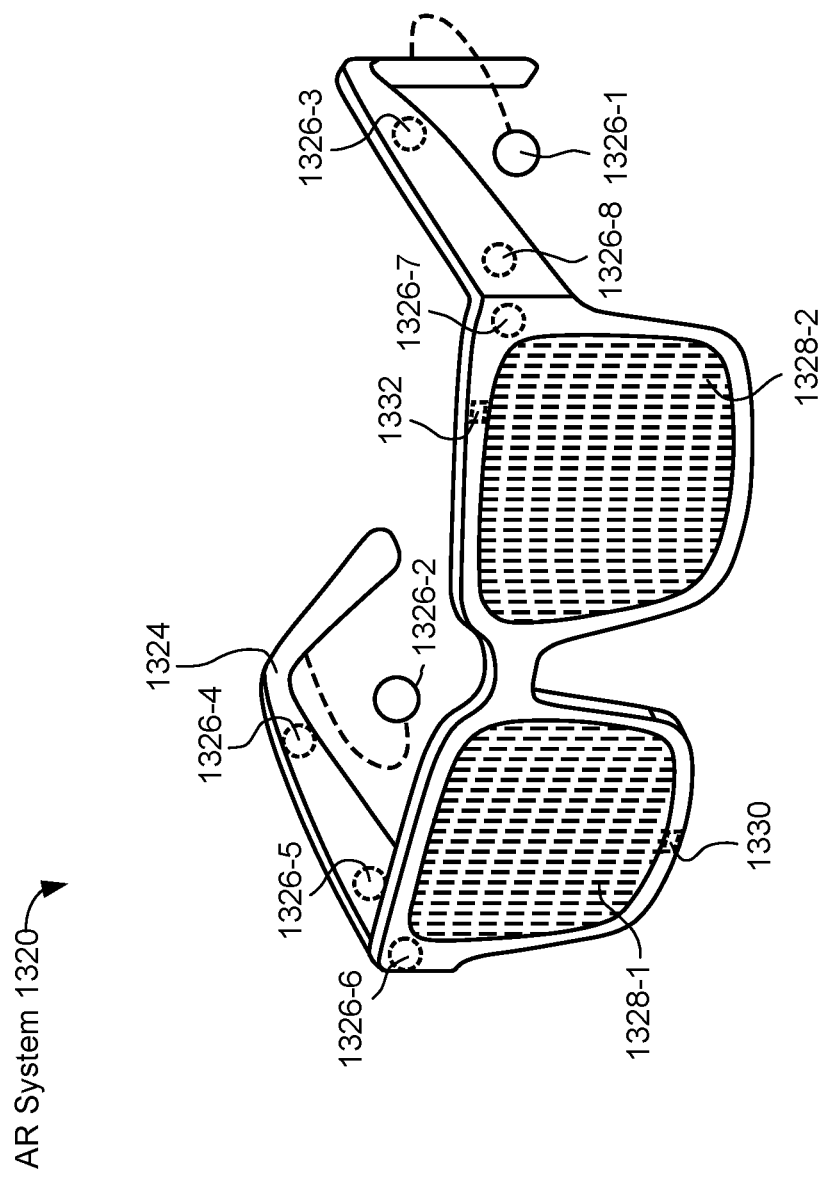
FIG. 13A shows example AR glasses (which can be used with some embodiments of the artificial-reality system) in accordance with some embodiments.

FIG. 13A shows an example AR system 1320 in accordance with some embodiments. In FIG. 13A, the AR system 1320 includes an eyewear device with a frame 1324 configured to hold a left display device 1328-1 and a right display device 1328-2 in front of a user's eyes. The display devices 1328-1 and 1328-2 may act together or independently to present an image or series of images to a user. While the AR system 1320 includes two displays, embodiments of this disclosure may be implemented in AR systems with a single near-eye display (NED) or more than two NEDs. In some embodiments, the AR system 1320 is an instance of any of the head-wearable devices described previously (e.g., the head-wearable device 104).

In some embodiments, the AR system 1320 includes one or more sensors, such as the sensors 1330 and 1332 (e.g., instances of the sensors 503, FIG. 5A). For example, the sensors 1330 and 1332 may generate measurement signals in response to motion of the AR system 1320 and may be located on substantially any portion of the frame 1310. Each sensor may be a position sensor, an inertial measurement unit (IMU), a depth camera assembly, or any combination thereof. In some embodiments, the AR system 1320 includes more or less sensors than is shown in FIG. 13A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1320 includes a microphone array with a plurality of acoustic sensors 1326-1 through 1326-8, referred to collectively as the acoustic sensors 1326. The acoustic sensors 1326 may be transducers that detect air pressure variations induced by sound waves. In some embodiments, each acoustic sensor 1326 is configured to detect sound and convert the detected sound into an electronic format (e.g., an analog or digital format). In some embodiments, the microphone array includes ten acoustic sensors: 1326-1 and 1326-2 designed to be placed inside a corresponding ear of the user, acoustic sensors 1326-3, 1326-4, 1326-5, 1326-6, 1326-7, and 1326-8 positioned at various locations on the frame 1324, and acoustic sensors positioned on a corresponding neckband, where the neckband is an optional component of the system that is not present in certain embodiments of the artificial-reality systems discussed herein.

The configuration of the acoustic sensors 1326 of the microphone array may vary. While the AR system 1320 is shown in FIG. 13A having ten acoustic sensors 1326, the number of acoustic sensors 1326 may be greater or less than ten. In some situations, using more acoustic sensors 1326 increases the amount of audio information collected and/or the sensitivity and accuracy of the audio information. In contrast, in some situations, using a lower number of acoustic sensors 1326 decreases the computing power required by a controller 1336 to process the collected audio information. In addition, the position of each acoustic sensor 1326 of the microphone array may vary. For example, the position of an acoustic sensor 1326 may include a defined position on the user, a defined coordinate on the frame 1324, an orientation associated with each acoustic sensor, or some combination thereof.

The acoustic sensors 1326-1 and 1326-2 may be positioned on different parts of the user's ear, such as behind the pinna or within the auricle or fossa. In some embodiments, there are additional acoustic sensors on or surrounding the ear in addition to acoustic sensors 1326 inside the ear canal. In some situations, having an acoustic sensor positioned next to an ear canal of a user enables the microphone array to collect information on how sounds arrive at the ear canal. By positioning at least two of the acoustic sensors 1326 on either side of a user's head (e.g., as binaural microphones), the AR device 1320 is able to simulate binaural hearing and capture a 3D stereo sound field around a user's head. In some embodiments, the acoustic sensors 1326-1 and 1326-2 are connected to the AR system 1320 via a wired connection, and in other embodiments, the acoustic sensors 1326-1 and 1326-2 are connected to the AR system 1320 via a wireless connection (e.g., a Bluetooth connection). In some embodiments, the AR system 1320 does not include the acoustic sensors 1326-1 and 1326-2.

The acoustic sensors 1326 on the frame 1324 may be positioned along the length of the temples, across the bridge, above or below the display devices 1328, or in some combination thereof. The acoustic sensors 1326 may be oriented such that the microphone array is able to detect sounds in a wide range of directions surrounding the user wearing AR system 1320. In some embodiments, a calibration process is performed during manufacturing of the AR system 1320 to determine relative positioning of each acoustic sensor 1326 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1320 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices (e.g., the wrist-wearable device 102). The other devices may provide certain functions (e.g., tracking, localizing, depth mapping, processing, storage, etc.) to the AR system 1320. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1320. For example, the controller may process information from the acoustic sensors 1326. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1320 includes an IMU, the controller 1336 may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 1350 in FIG. 13B, which mostly or completely covers a user's field of view.

Figure 13B:
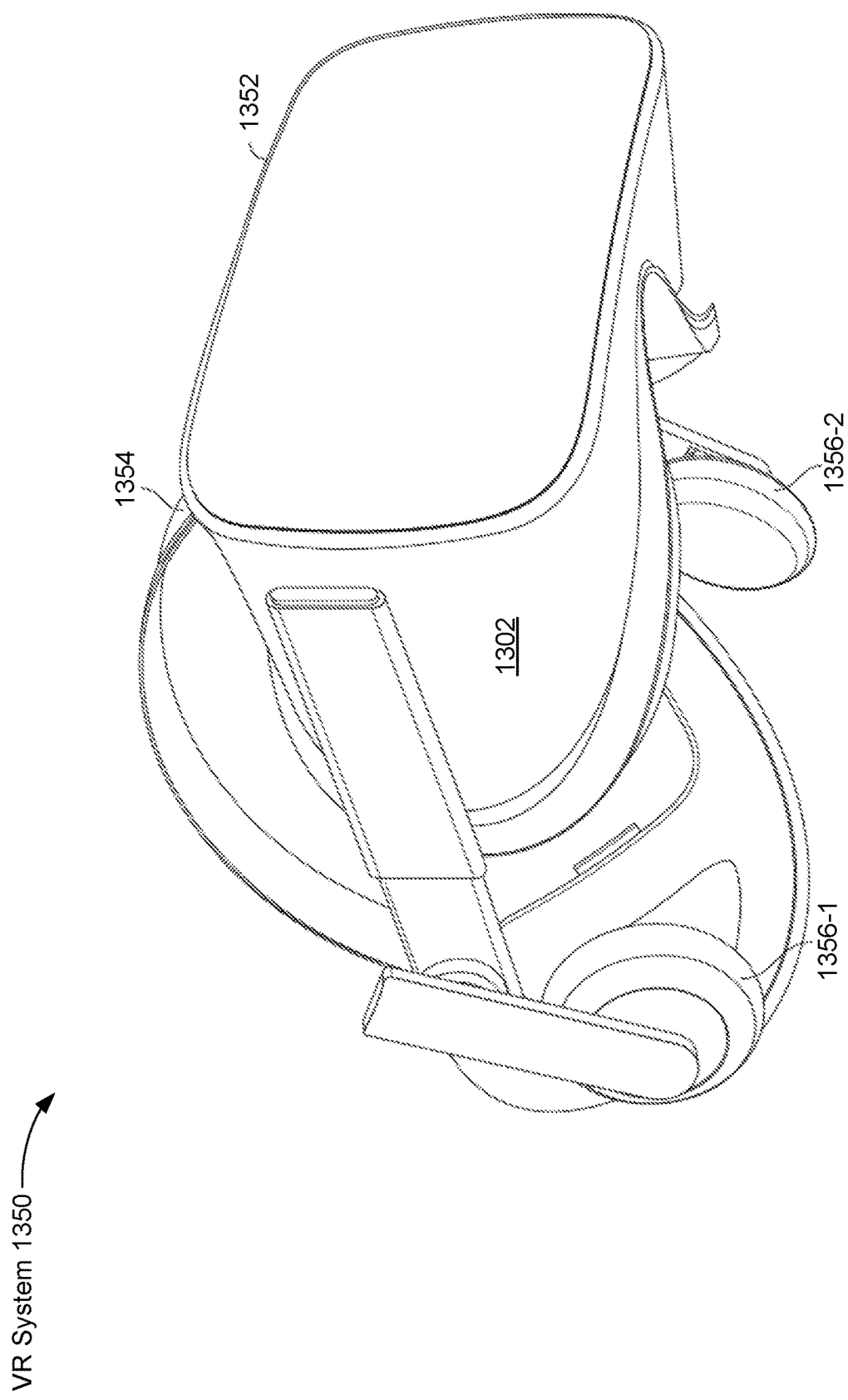
FIG. 13B shows example VR glasses (which can be used with some embodiments of the artificial-reality systems) in accordance with some embodiments.

FIG. 13B shows a VR system 1350 (e.g., also referred to herein as VR goggles or VR headset) in accordance with some embodiments. The VR system 1350 includes the head-mounted display 1302. The head-mounted display 1302 includes a front body 1352 and a frame 1354 (e.g., a strap or band) shaped to fit around a user's head. In some embodiments, the head-mounted display 1302 includes output audio transducers 1356-1 and 1356-2, as shown in FIG. 8B. In some embodiments, the front body 1352 and/or the frame 1354 includes one or more electronic elements, including one or more electronic displays, one or more IMUs, one or more tracking emitters or detectors, and/or any other suitable device or sensor for creating an artificial-reality experience. In some embodiments, the VR system 1350 is an instance of any of the head-wearable devices described previously (e.g., the head-wearable device 104).

Artificial-reality systems may include a variety of types of visual feedback mechanisms. For example, display devices in the AR system 1320 and/or the VR system 1350 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1320 and/or the VR system 1350 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the artificial-reality systems 1320 and 1350 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

In some embodiments, the artificial-reality systems 1320 and 1350 include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

Figure 14A:
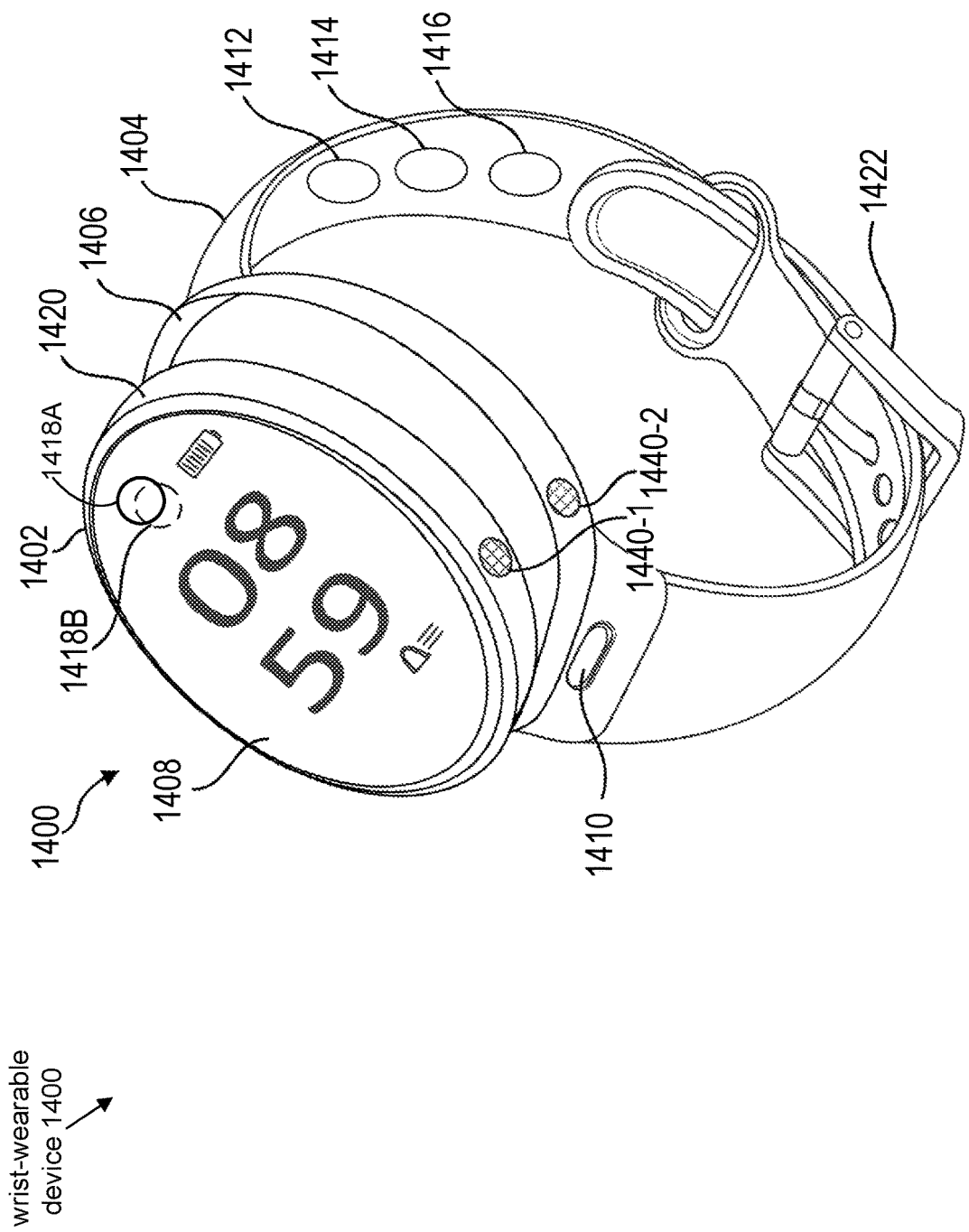
FIGS. 14A-14B illustrate an example wrist-wearable device in accordance with some embodiments.
Figure 14B:
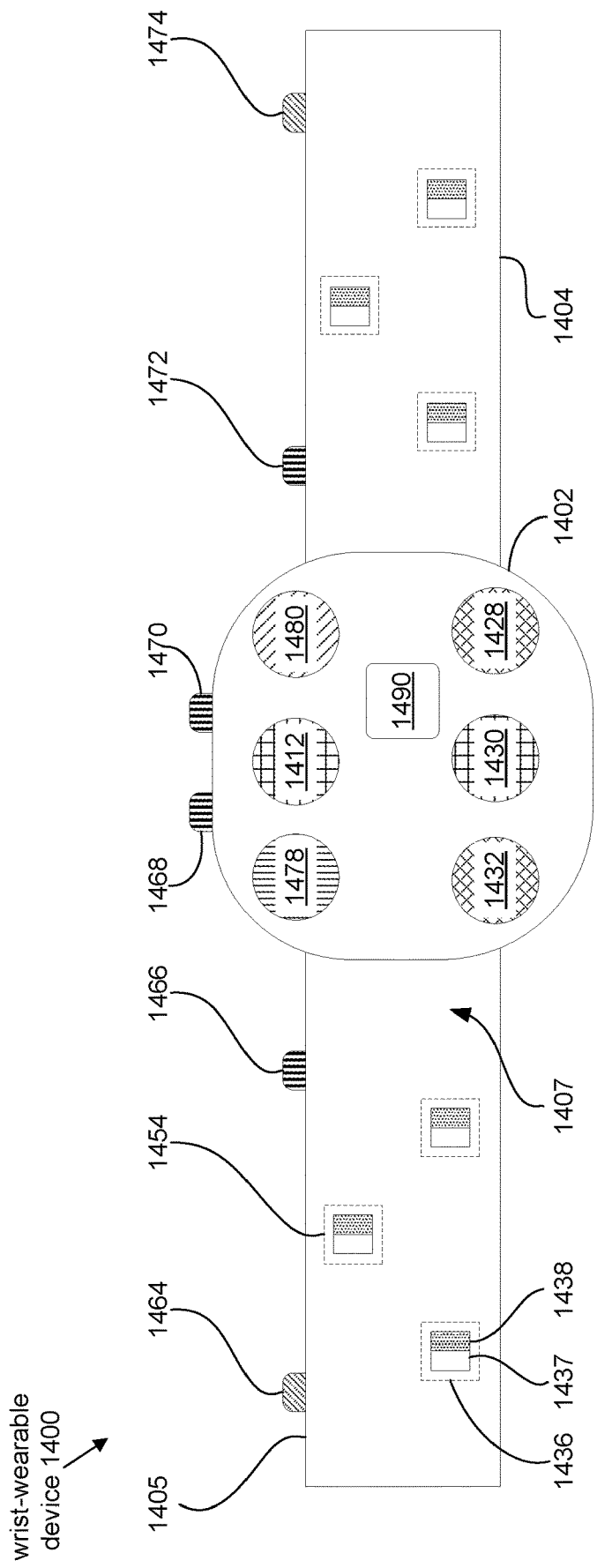

FIGS. 14A and 14B illustrate an example wrist-wearable device 1400, in accordance with some embodiments. In some embodiments, the wrist-wearable device 1400 is an instance of any of the wrist-wearable devices described previously (e.g., the wrist-wearable device 102 described above in reference to FIGS. 1A-1J). FIG. 14A illustrates a perspective view of the wrist-wearable device 1400 that includes a watch body 1402 decoupled from a watch band 1404. The watch body 1402 and watch band 1404 can have a substantially rectangular or circular shape and can be configured to allow a user to wear the wrist-wearable device 1400 on a body part (e.g., a wrist). In some embodiments, the wrist-wearable device 1400 includes a retaining mechanism 1406 (e.g., a buckle, a hook and loop fastener, etc.) for securing watch band 1404 to the user's wrist. In some embodiments, the wrist-wearable device 1400 includes a coupling mechanism 1406 (e.g., a cradle) for detachably coupling capsule or watch body 1402 (via a watch band coupling mechanism 1406 of the watch body 1402) to watch band 1404.

The wrist-wearable device 1400 is configured to perform various functions associated with selection of a representation of a contact as described above with reference to FIGS. 1A-11B. As described above in more detail below with reference to FIGS. 12A-12B, functions executed by the wrist-wearable device 1400 can include, without limitation, display of visual content to the user (e.g., visual content displayed on display 1408), sensing user input (e.g., sensing a touch on button 1410, sensing biometric data on sensor 1412, sensing neuromuscular signals on neuromuscular sensor 1414, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. These functions can be executed independently in watch body 1402, independently in watch band 1404, and/or in communication between watch body 1402 and watch band 1404. In some embodiments, functions can be executed on the wrist-wearable device 1400 in conjunction with an artificial-reality environment which includes, but is not limited to, virtual-reality (VR) environments (including non-immersive, semi-immersive, and fully-immersive VR environments), AR environments (including marker-based AR environments, markerless AR environments, location-based AR environments, and projection-based AR environments), hybrid reality, and other types of mixed-reality environments. As the skilled artisan will appreciate upon reading the descriptions provided herein, the novel wearable devices described herein can be used with any of these types of artificial-reality environments.

The watch band 1404 is configurable to be worn by a user such that an inner surface of the watch band 1404 is in contact with the user's skin. When worn by a user, sensor 1412 is in contact with the user's skin. In some embodiments, the sensor 1412 is a biosensor that senses a user's heart rate, saturated oxygen level, temperature, sweat level, muscle intentions, or a combination thereof. The watch band 1404 can include multiple sensors 1412 that can be distributed on an inside and/or an outside surface of the watch band 1404. Additionally, or alternatively, the watch body 1402 can include the same or different sensors than the watch band 1404 (or the watch band 1404 can include no sensors at all in some embodiments). For example, multiple sensors can be distributed on an inside and/or an outside surface of watch body 1402. As described below with reference to FIGS. 13A-13B, the watch body 1402 can include, without limitation, front-facing image sensor 1418A and/or rear-facing image sensor 1418B, a biometric sensor, an IMU, a heart rate sensor, a saturated oxygen sensor, a neuromuscular sensor(s) (e.g., EMG sensors 1219 in FIG. 12A), an altimeter sensor, a temperature sensor, a bioimpedance sensor, a pedometer sensor, an optical sensor, a touch sensor, a sweat sensor, etc. The sensor 1412 can also include a sensor that provides data about a user's environment including a user's motion (e.g., an IMU), altitude, location, orientation, gait, or a combination thereof. The sensor 1412 can also include a light sensor (e.g., an infrared light sensor, a visible light sensor) that is configured to track a position and/or motion of watch body 1402 and/or watch band 1404. Watch band 1404 can transmit the data acquired by the sensor 1412 to watch body 1402 using a wired communication method (e.g., a UART, a USB transceiver, etc.) and/or a wireless communication method (e.g., near field communication, Bluetooth, etc.). Watch band 1404 can be configured to operate (e.g., to collect data using sensor 1412) independent of whether watch body 1402 is coupled to or decoupled from watch band 1404.

The watch band 1404 and/or watch body 1402 can include a haptic device 1416 (e.g., a vibratory haptic actuator) that is configured to provide haptic feedback (e.g., a cutaneous and/or kinesthetic sensation, etc.) to the user's skin. The sensor 1412 and/or haptic device 1416 can be configured to operate in conjunction with multiple applications including, without limitation, health monitoring, social media, game playing, and artificial reality (e.g., the applications associated with artificial reality).

In some examples, the watch band 1404 can include a neuromuscular sensor 1414 (e.g., an electromyography (EMG) sensor, a mechanomyogram (MMG) sensor, a sonomyography (SMG) sensor, etc.). Neuromuscular sensor 1414 can sense a user's intention to perform certain motor actions. The sensed muscle intention can be used to control certain user interfaces displayed on the display 1408 of the wrist-wearable device 1400 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 1414 can be used to provide a user with an enhanced interaction with a physical object and/or a virtual object in an artificial-reality application generated by an artificial-reality system (e.g., user interface objects presented on the display 1408, or another computing device (e.g., a smartphone)). Signals from neuromuscular sensor 1414 can be obtained (e.g., sensed and recorded) by one or more neuromuscular sensors 1414 of watch band 1404. Although FIG. 14A shows an example with one neuromuscular sensor 1414, watch band 1404 can include a plurality of neuromuscular sensors 1414 arranged circumferentially on an inside surface of watch band 1404 such that the plurality of neuromuscular sensors 1414 contact the skin of the user. Watch band 1404 can include a plurality of neuromuscular sensors 1414 arranged circumferentially on an inside surface of watch band 1404. Neuromuscular sensor 1414 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

In some embodiments, the wrist-wearable device 1400 includes a coupling mechanism (also referred to as a cradle) for detachably coupling watch body 1402 to watch band 1404. A user can detach watch body 1402 from watch band 1404 in order to reduce the encumbrance of the wrist-wearable device 1400 to the user. In some embodiments, the wrist-wearable device 1400 includes a coupling surface 1420 on the watch body 1402 and/or coupling mechanism 1406 (e.g., a cradle, a tracker band, a support base, a clasp). A user can perform any type of motion to couple watch body 1402 to watch band 1404 and to decouple watch body 1402 from watch band 1404. For example, a user can twist, slide, turn, push, pull, or rotate watch body 1402 relative to watch band 1404, or a combination thereof, to attach watch body 1402 to watch band 1404 and to detach watch body 1402 from watch band 1404.

As shown in the example of FIG. 14A, watch band coupling mechanism 1406 can include a type of frame or shell that allows watch body 1402 coupling surface 1420 to be retained within watch band coupling mechanism 1406. Watch body 1402 can be detachably coupled to watch band 1404 through a friction fit, magnetic coupling, a rotation-based connector, a shear-pin coupler, a retention spring, one or more magnets, a clip, a pin shaft, a hook and loop fastener, or a combination thereof. In some examples, watch body 1402 can be decoupled from watch band 1404 by actuation of release mechanism 1440. The release mechanism 1440 can include, without limitation, a button, a knob, a plunger, a handle, a lever, a fastener, a clasp, a dial, a latch, or a combination thereof.

The wrist-wearable device 1400 can include a single release mechanism 1440 or multiple release mechanisms 1440 (e.g., two release mechanisms 1440 positioned on opposing sides of the wrist-wearable device 1400 such as spring-loaded buttons). As shown in FIG. 14A, the release mechanism 1440 can be positioned on watch body 1402 and/or watch band coupling mechanism 1406. Although FIG. 14A shows release mechanism 1440 positioned at a corner of watch body 1402 and at a corner of watch band coupling mechanism 1406, the release mechanism 1440 can be positioned anywhere on watch body 1402 and/or watch band coupling mechanism 1406 that is convenient for a user of wrist-wearable device 1400 to actuate. A user of the wrist-wearable device 1400 can actuate the release mechanism 1440 by pushing, turning, lifting, depressing, shifting, or performing other actions on the release mechanism 1440. Actuation of the release mechanism 1440 can release (e.g., decouple) the watch body 1402 from the watch band coupling mechanism 1406 and the watch band 1404 allowing the user to use the watch body 1402 independently from watch band 1404. For example, decoupling the watch body 1402 from the watch band 1404 can allow the user to capture images using rear-facing image sensor 1418B.

FIG. 14B is a bottom view of the wrist-wearable device 1400, showing sensors along the wrist-wearable device 1400. The sensors can include a variety of sensors along the inside surface of the watch band 1404, and/or on an inside surface of the watch body 1402. Different sensors can be placed at different locations along the watch band 1404, such that the sensors can detect signals at various locations of the wrist of a user. In some embodiments, there are sensors along a front edge 1405 of the wrist-wearable device 1400 to detect, for example, a proximity of the wrist-wearable device 1400 relative to a physical surface (e.g., the time-of-flight sensors 158 in FIGS. 1A-1J). In some embodiments, there are multiple types of sensors along the front edge 1405 of the wrist-wearable device 1400. For example, sensors on a first portion of the front edge 1405 of the wrist-wearable device 1400 (e.g., time-of-flight sensors 1464 and 1474) can be time-of-flight sensors, configure to emit rays of light (e.g., ray 113, ray 115, and ray 117 in FIG. 1A). Sensors on a second portion of the wrist-wearable device 1400 (e.g., sensor 1466, sensor 1468, sensor 1470, and sensor 1472) can be a different kind of proximity sensors than the time-of-flight sensors 1464 and 1474. In some embodiments, the time-of-flight sensors on the first portion (e.g., time-of-flight sensors 1464 and 1474) are configured for slower, but denser sampling than the proximity sensors (e.g., sensor 1466, sensor 1468, sensor 1470, and sensor 1472) on the second portion. In some embodiments, the time-of-flight sensors 1464 and 1474 on the first portion of the wrist-wearable device 1400 are configured to primarily detect a distance of the wrist-wearable device 1400 from a physical surface. In some embodiments, the proximity sensors 1466, 1468, 1470, and 1472 are configured to primarily detect hand motions and/or gestures performed by the user of the wrist-wearable device 1400.

In some embodiments, the watch body 1402 of the wrist-wearable device 1400 includes components of EMG sensors (e.g., EMG ground ("GND") 1478, EMG reference ("REF") 1480, and EMG sensors 1428 and 1432). In some embodiments, the watch body of the wrist-wearable device also includes sensors 1412 and 1430 that are configured to deliver an electrical signal to the body of the user of the wrist-wearable device 1400 and use the electrical signal to detect when a portion of the user's body contacts a physical surface. In some embodiments, the watch body 1402 of the wrist-wearable device 1400 also includes a haptic controller 1490 for providing haptic events to the user of the wrist-wearable device 1400. In some embodiments, the haptic controller 1490 on the watch body 1402 of the wrist-wearable device 1400 is configured to receive signals from one or more other electronic devices besides the wrist-wearable device 1400 (e.g., via transducers 1262 configured to transmit one or more signals 1268 between, for example, an accessory device 1252 and the wrist-wearable device 1400).

In some embodiments, the watch band 1404 of the wrist-wearable device 1400 includes an inner surface 1407 that is configured to be in contact with the user when the wrist-wearable device is worn by the user, according to some embodiments. In some embodiments, the inner surface 1407 of the wrist-wearable device 1400 includes one or more sensors disposed at various, separate locations along the inner surface 1407 (e.g., sensor location 1436, sensor and/or sensor location 1454). In some embodiments each of the sensor locations include an EMG sensor disposed at the respective sensor location. In some embodiments, at least one of the sensor locations can include two or more sensors, including two different types of EMG sensors, or an EMG sensor and an impedance sensor (e.g., EMG sensor 1437 and an impedance sensor 1438 at sensor location 1436 of the wrist-wearable device 1400). In some embodiments, a single sensor disposed at a respective sensor location can have more than one sensing capabilities (e.g., a single sensor disposed at the sensor location 1450 can have the sensing capabilities of an EMG sensor 1437 and an impedance sensor 1438).

Figure 15A:
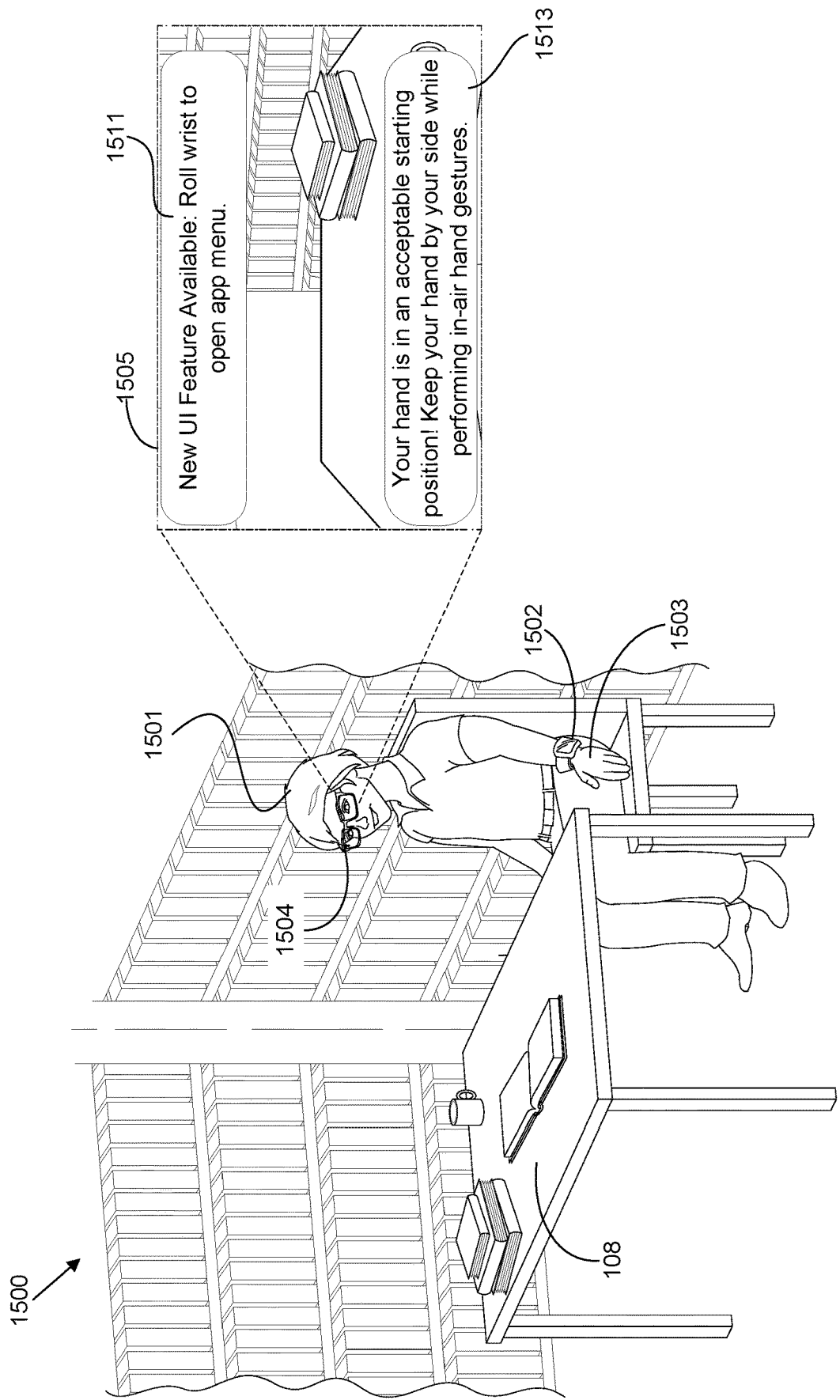
FIGS. 15A-15V illustrate an example user scenario with an artificial-reality system (e.g., including at least augmented reality glasses and a wrist-wearable device) in accordance with some embodiments.
Figure 15B:
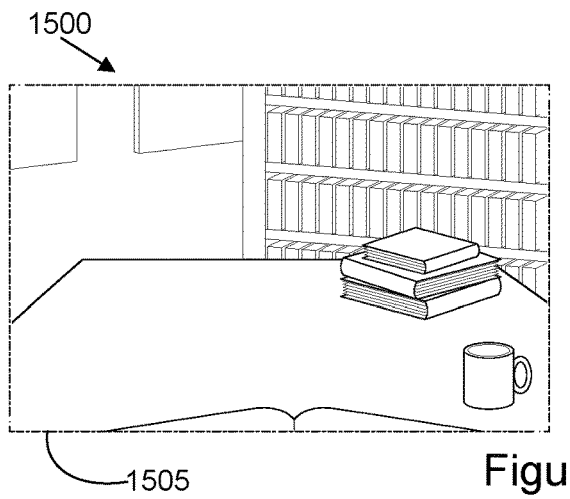
Figure 15B:
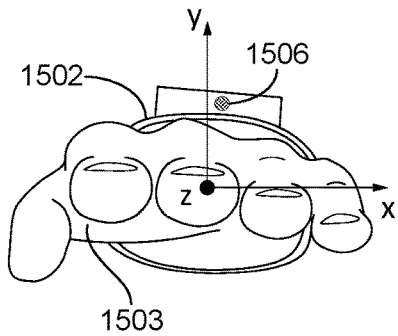
Figure 15C:
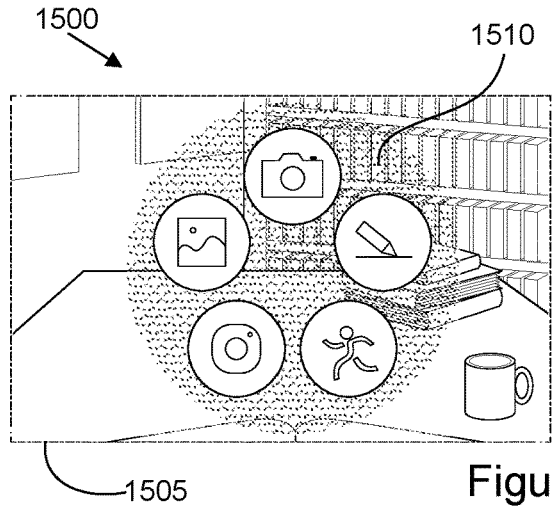
Figure 15C:
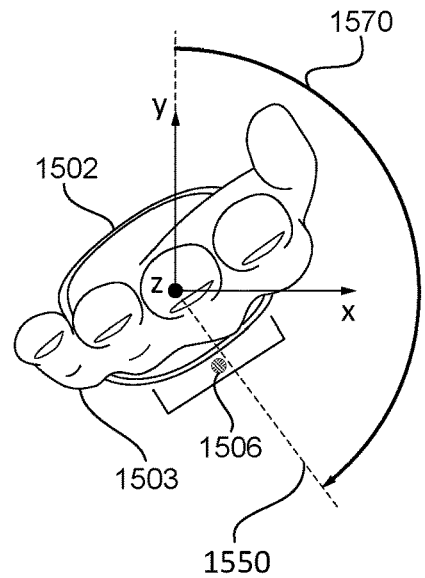
Figure 15D:
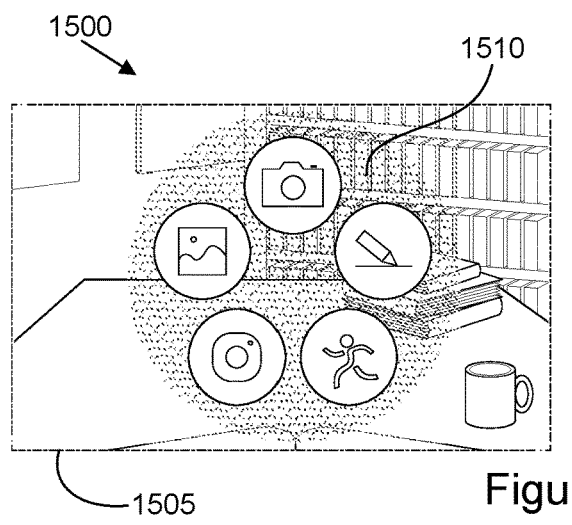
Figure 15D:
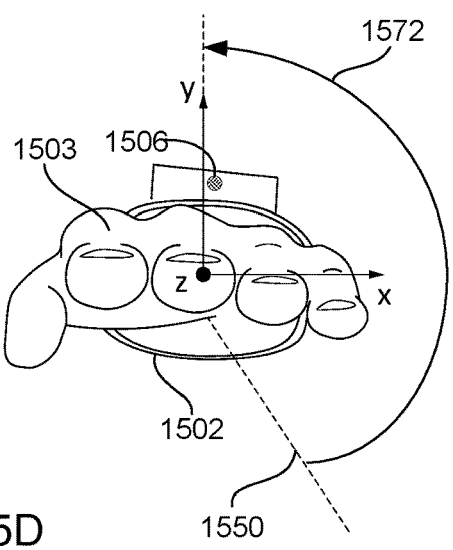
Figure 15E:
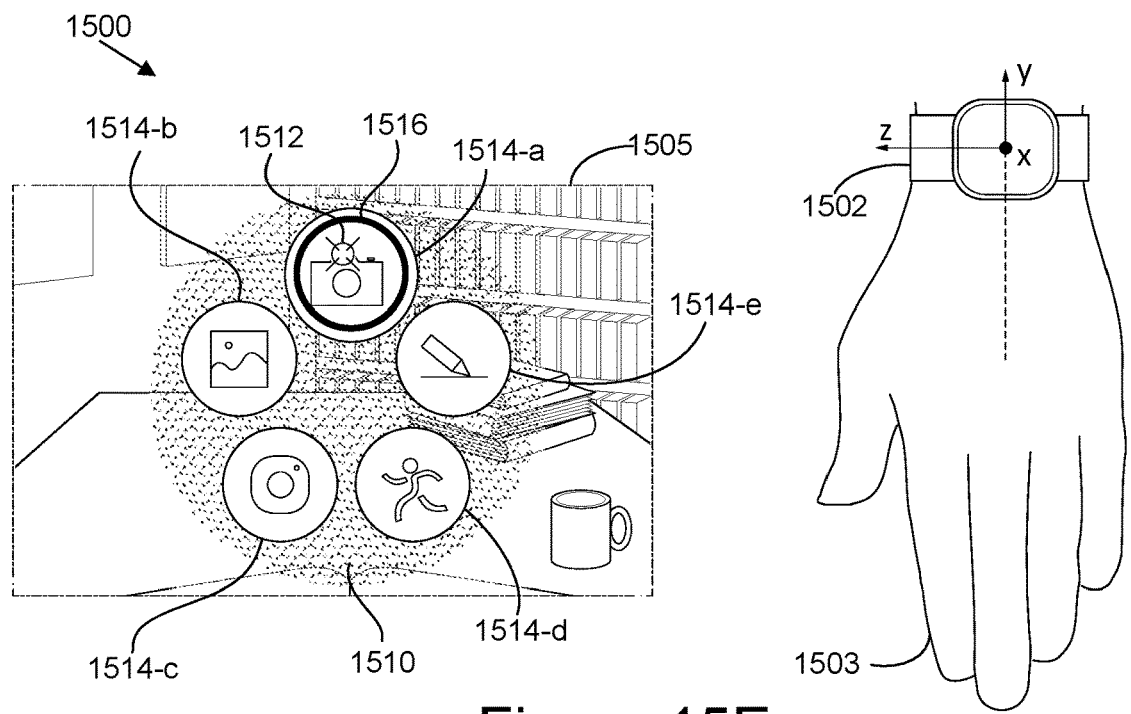
Figure 15F:
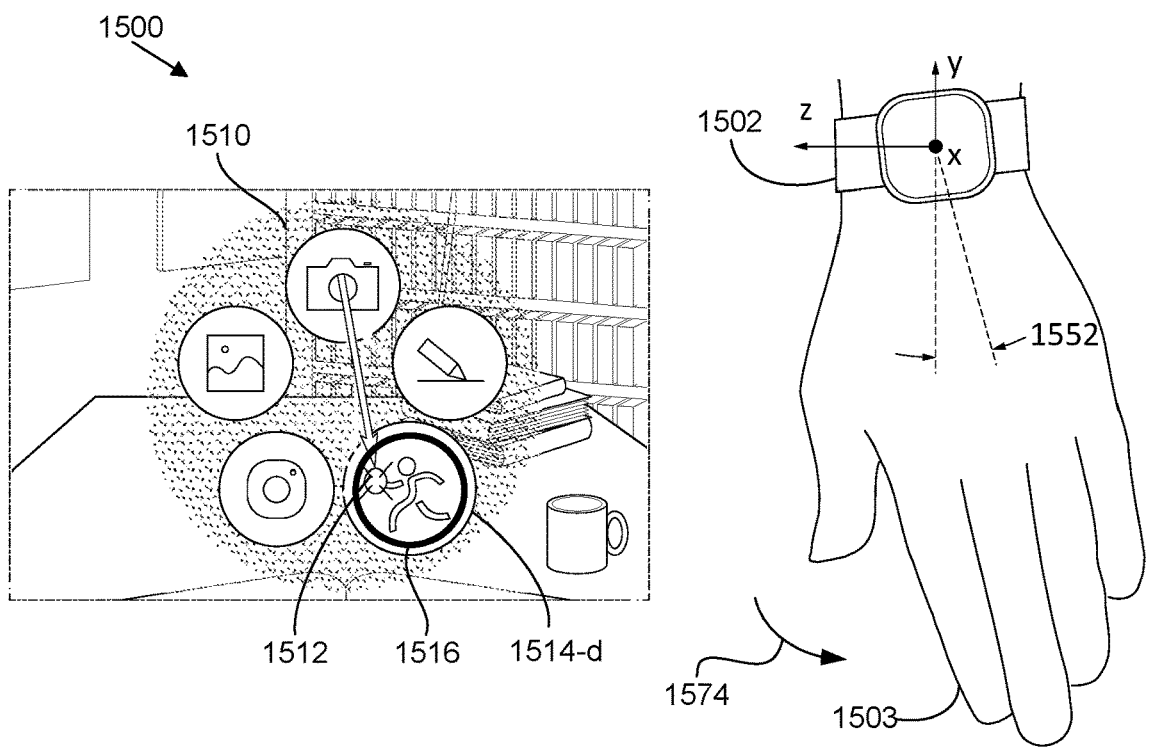
Figure 15G:
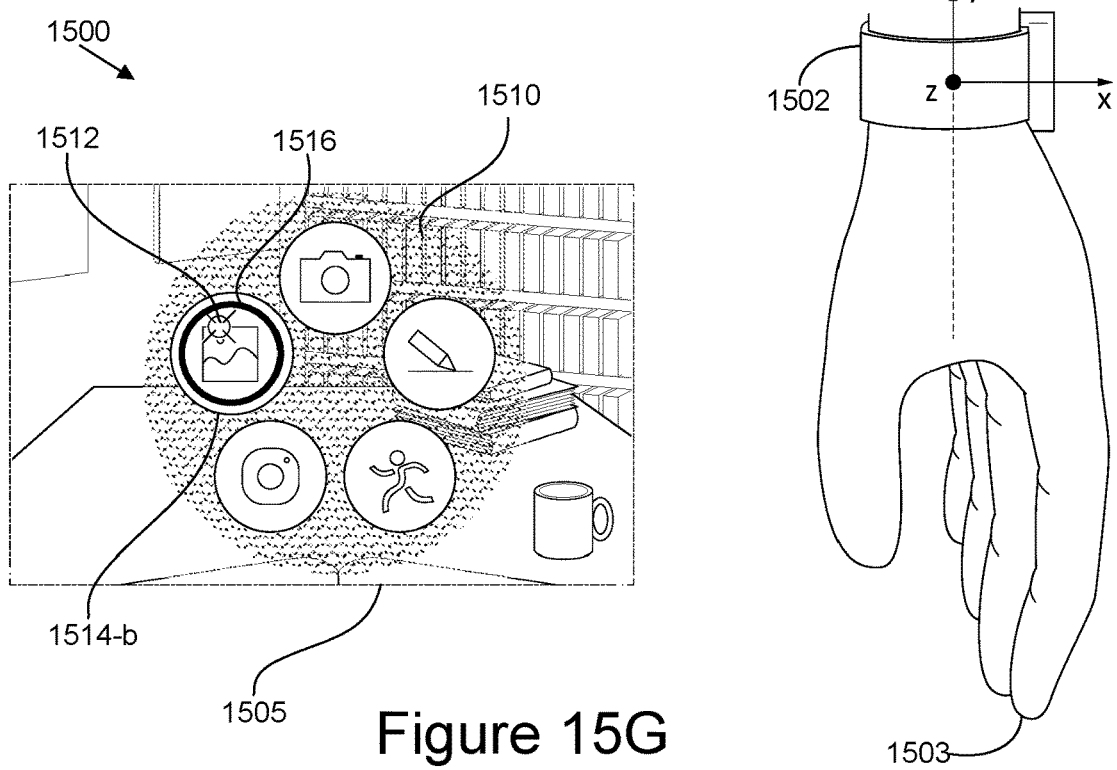
Figure 15H:
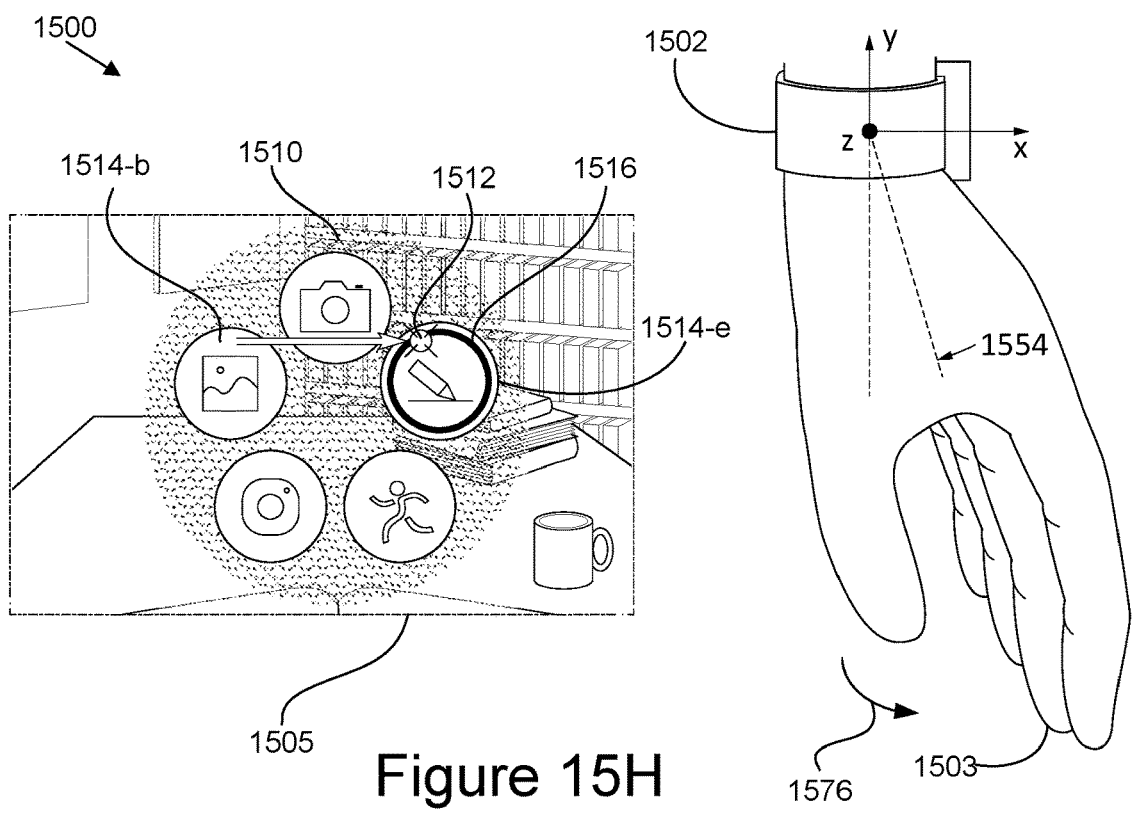
Figure 15I:
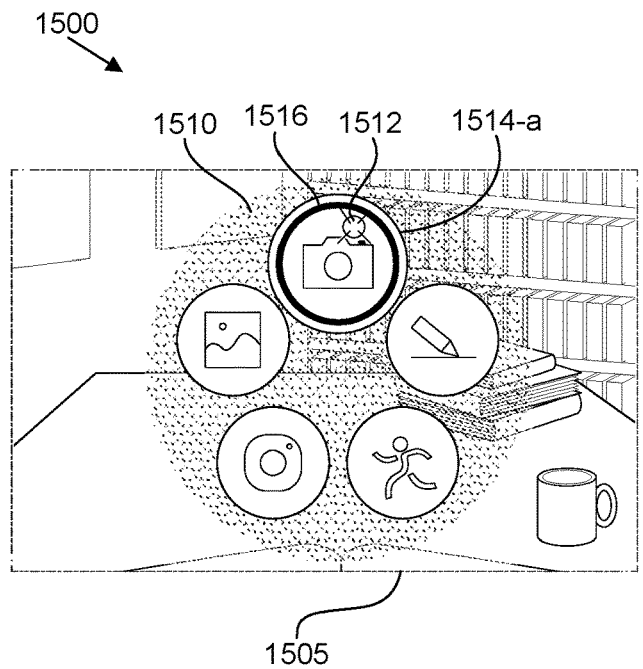
Figure 15I:
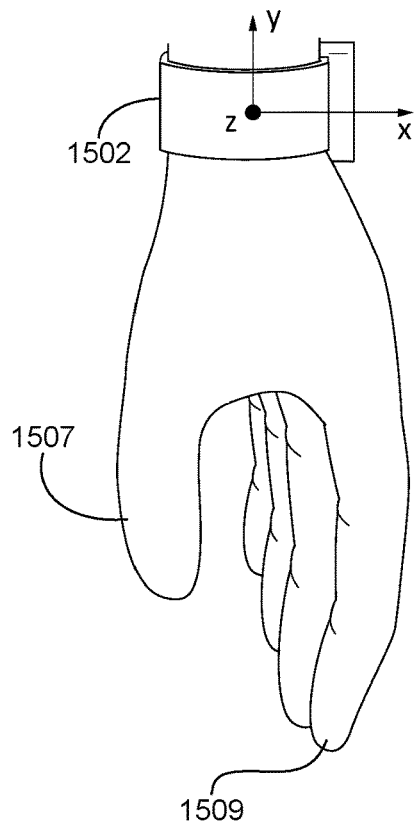
Figure 15J:
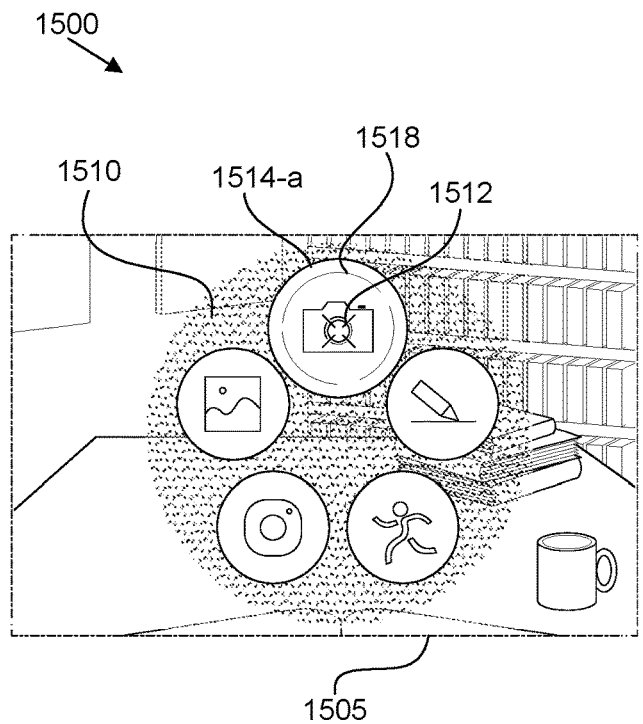
Figure 15J:
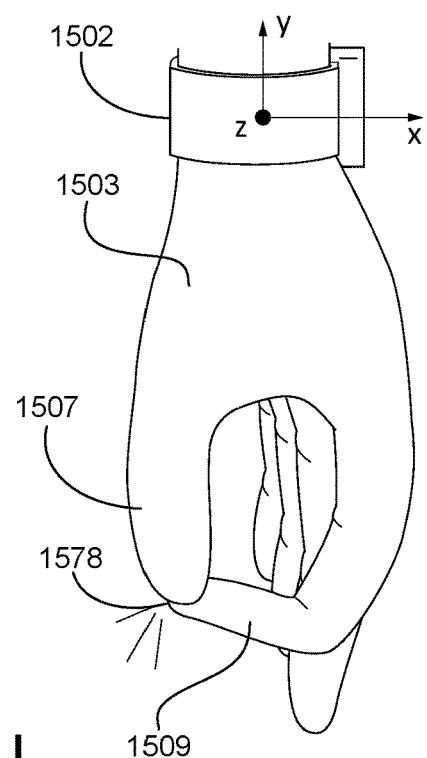
Figure 15K:
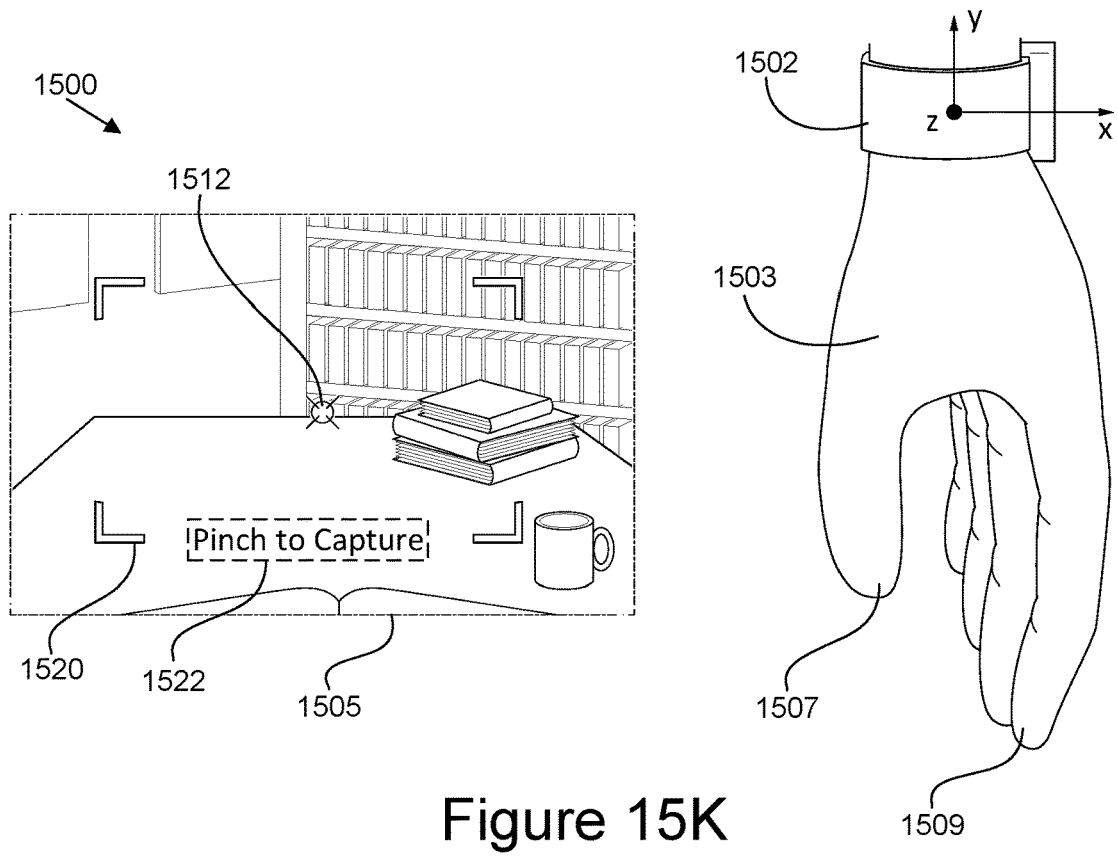
Figure 15L:
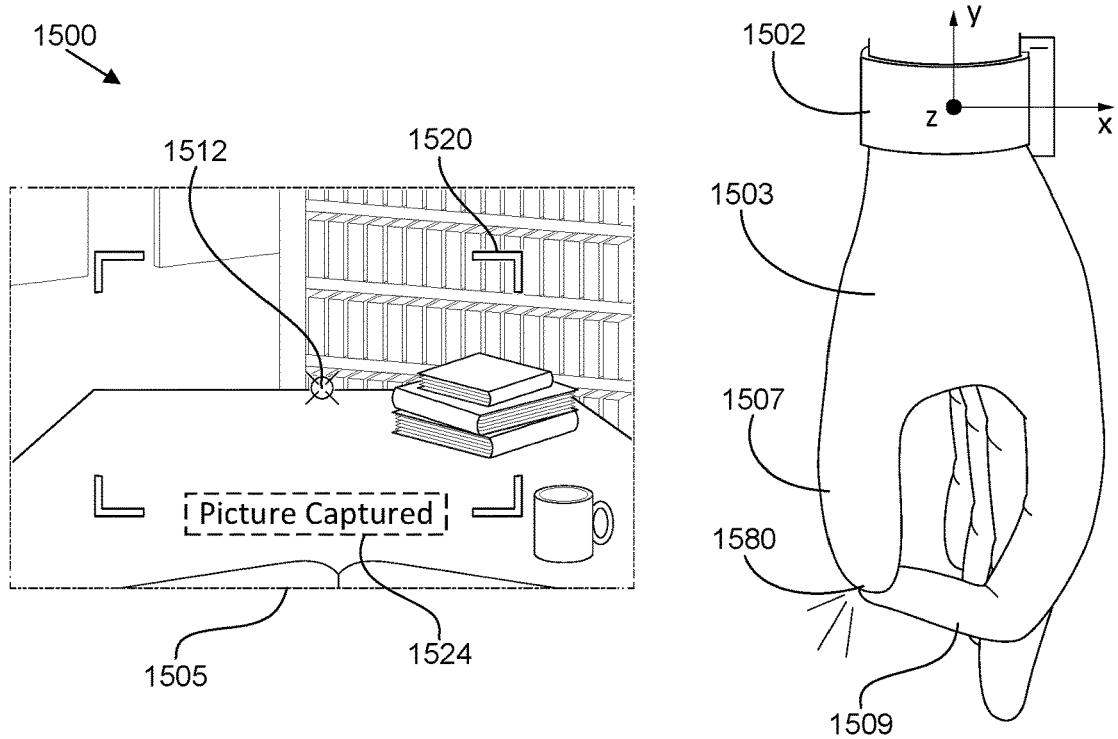
Figure 15M:
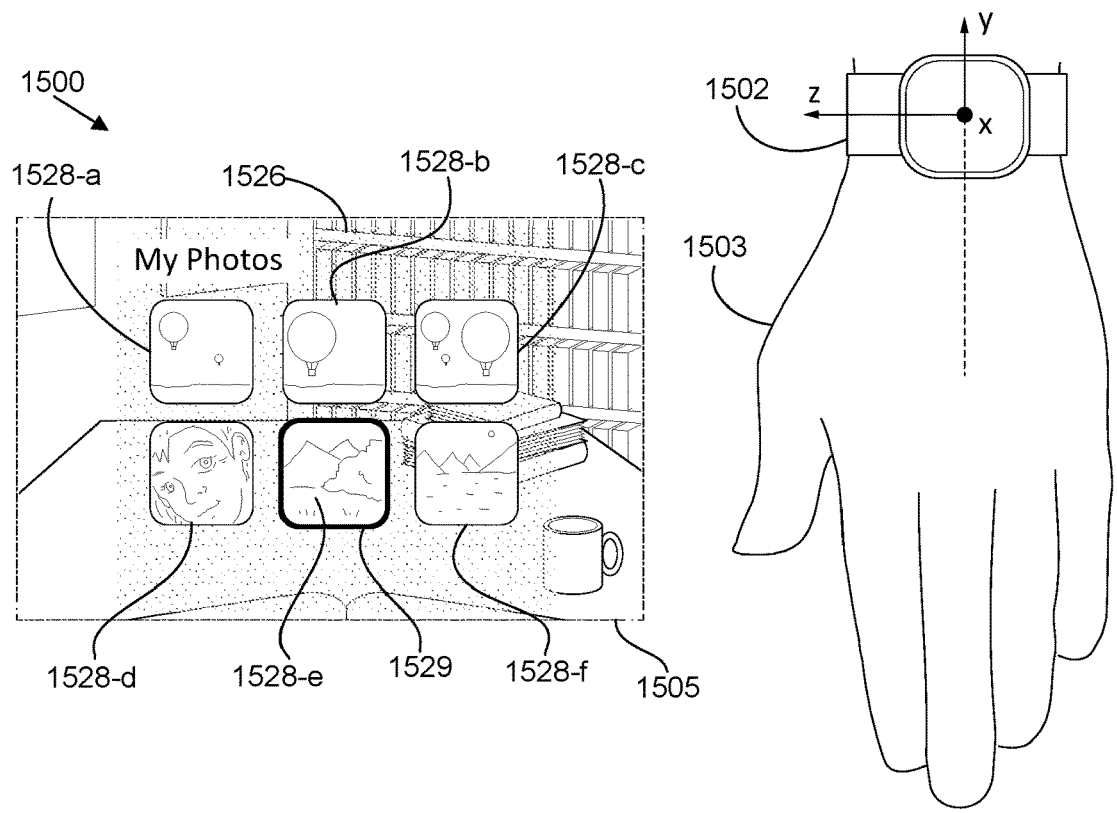
Figure 15N:
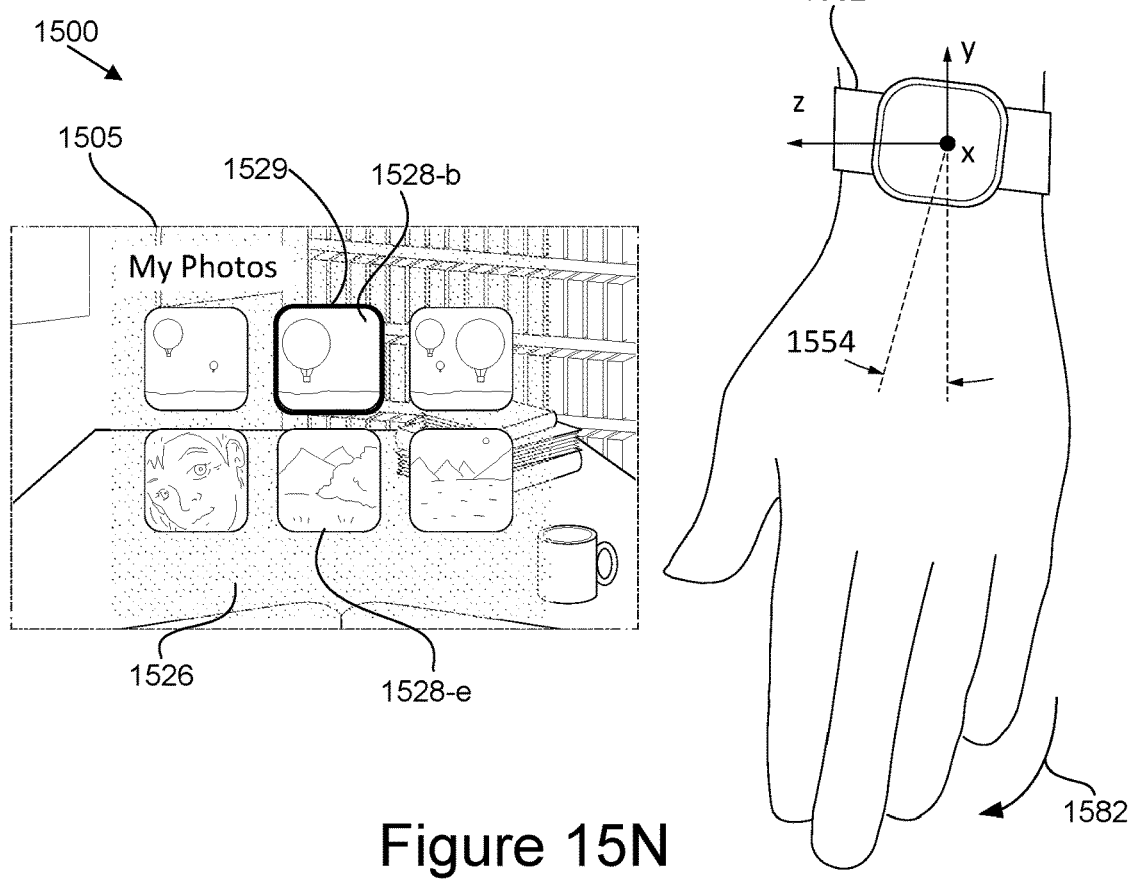
Figure 15O:
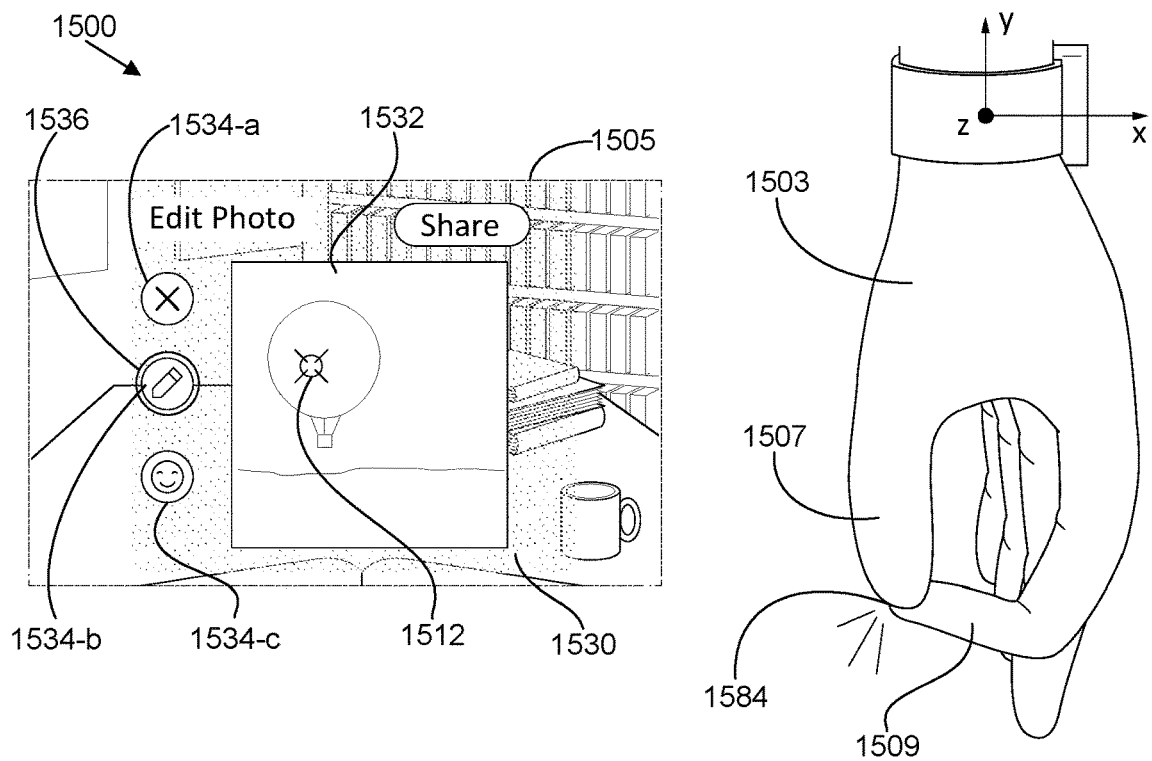
Figure 15P:
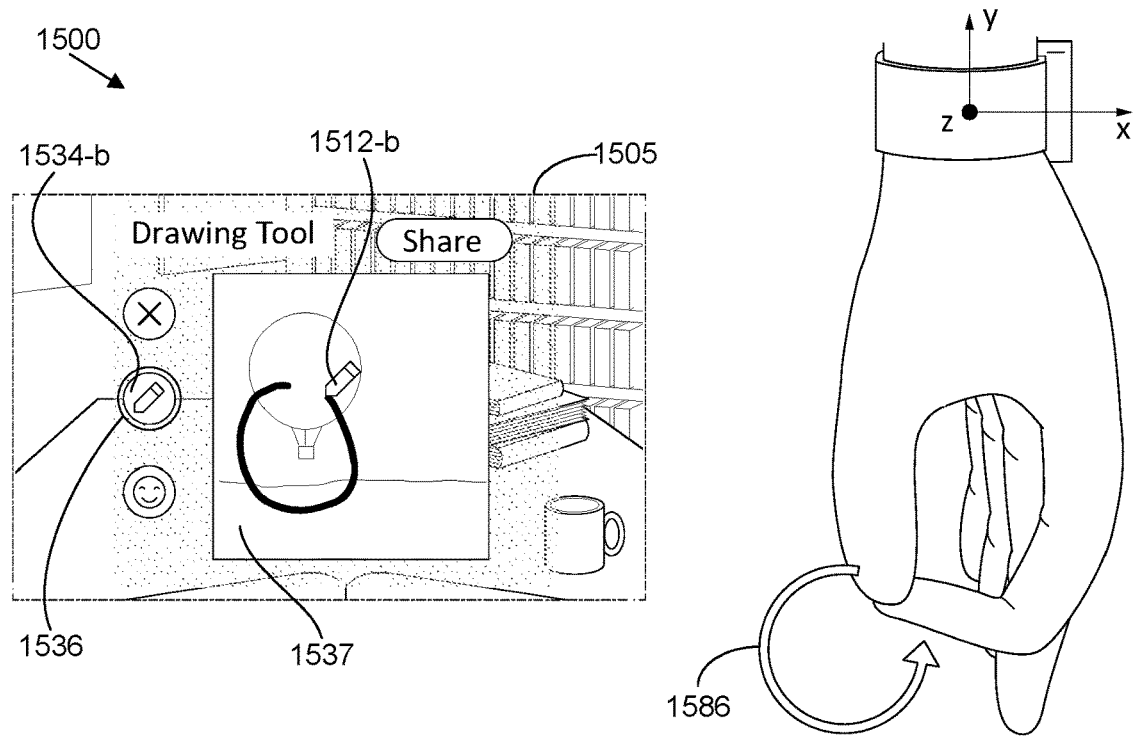
Figure 15Q:
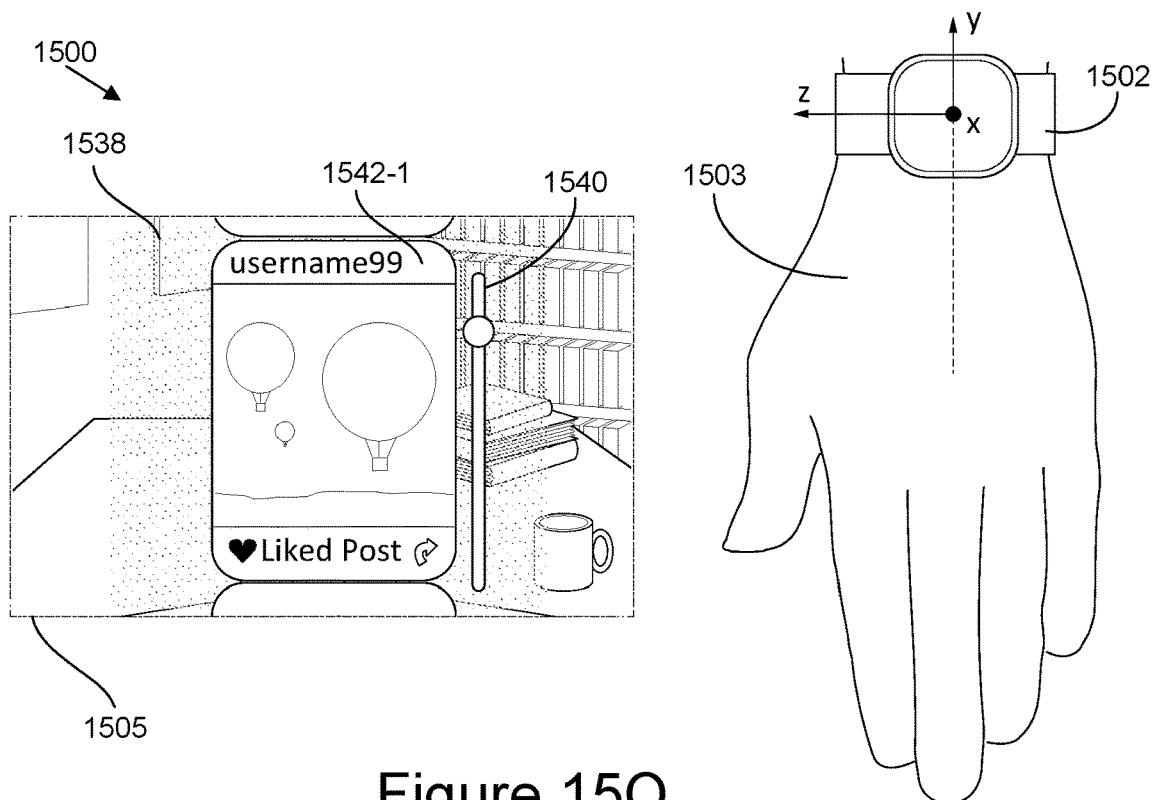
Figure 15R:
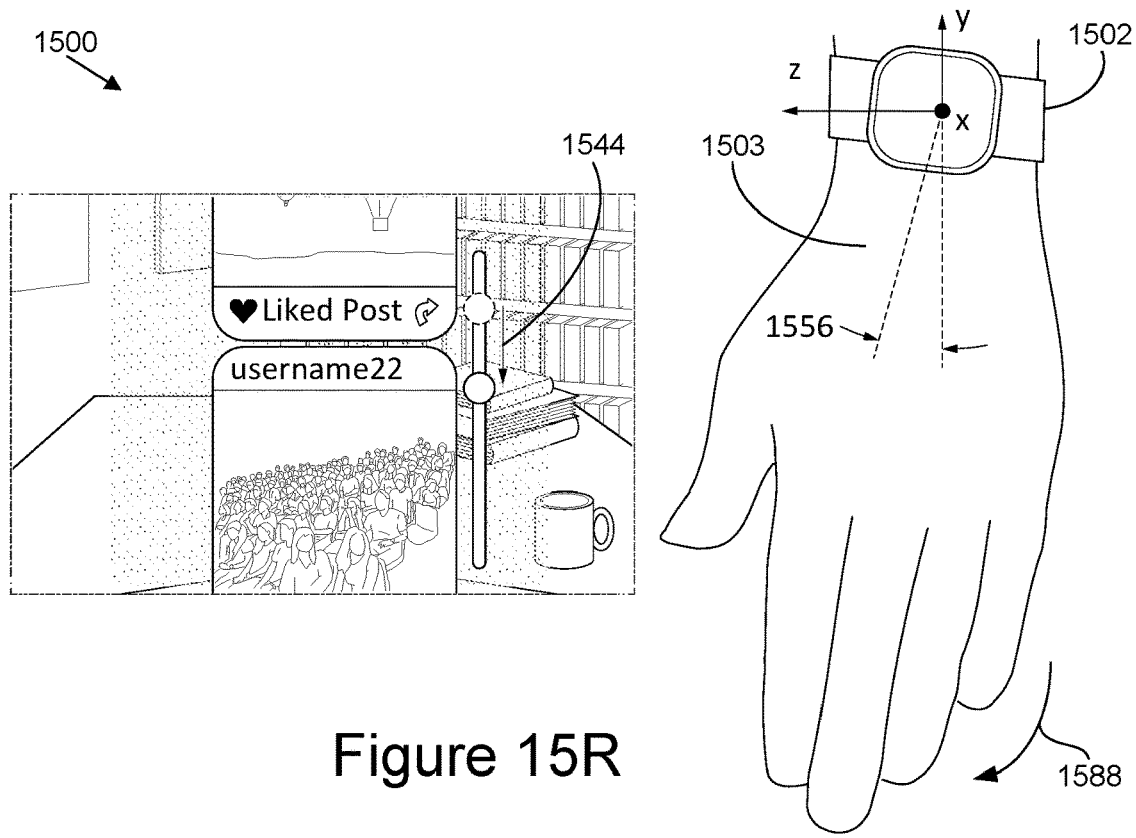
Figure 15S:
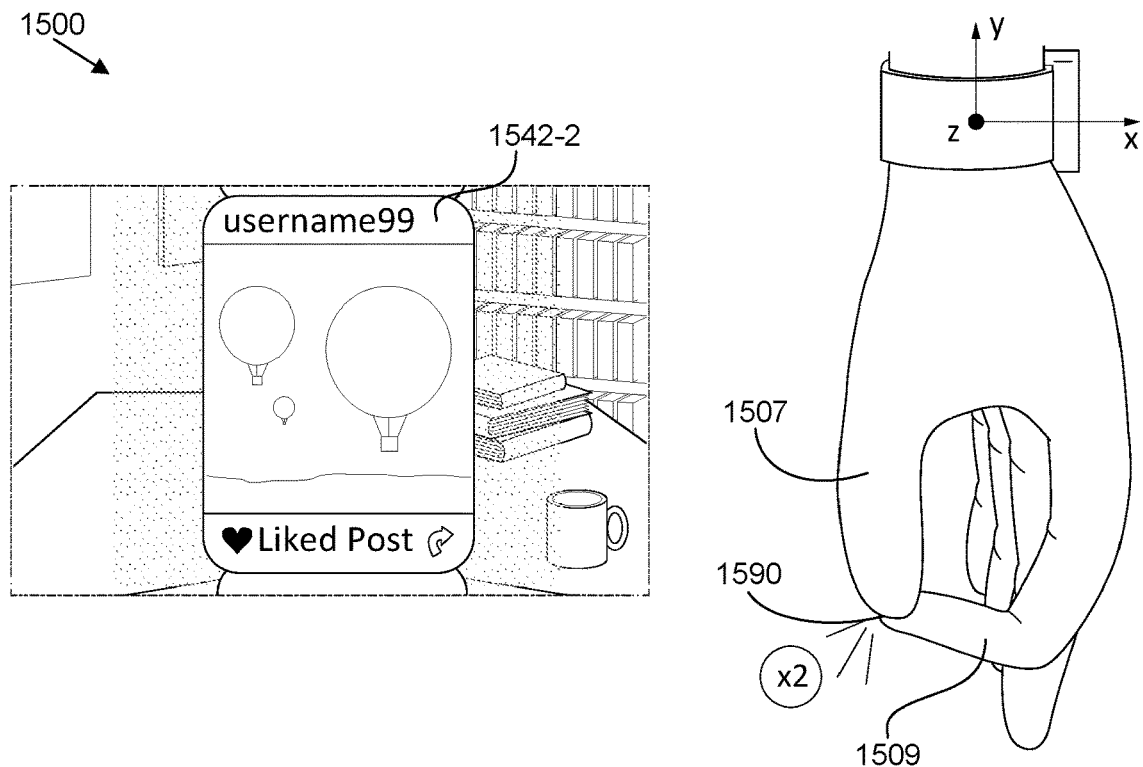
Figure 15T:
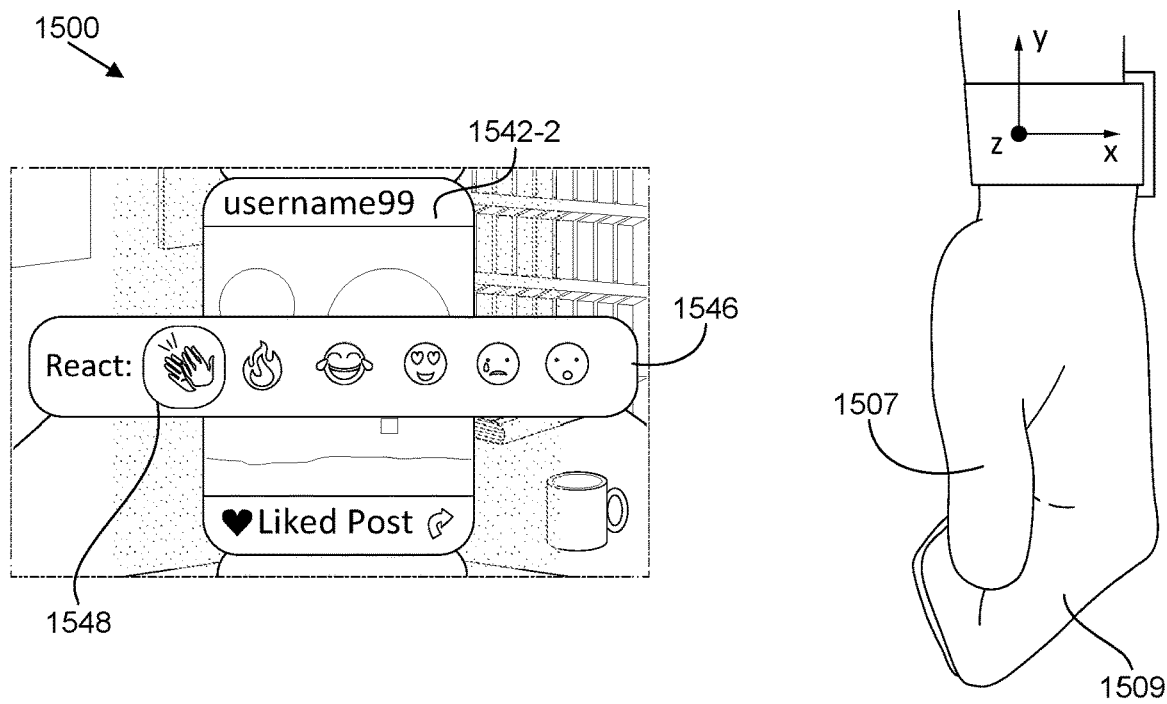
Figure 15U:
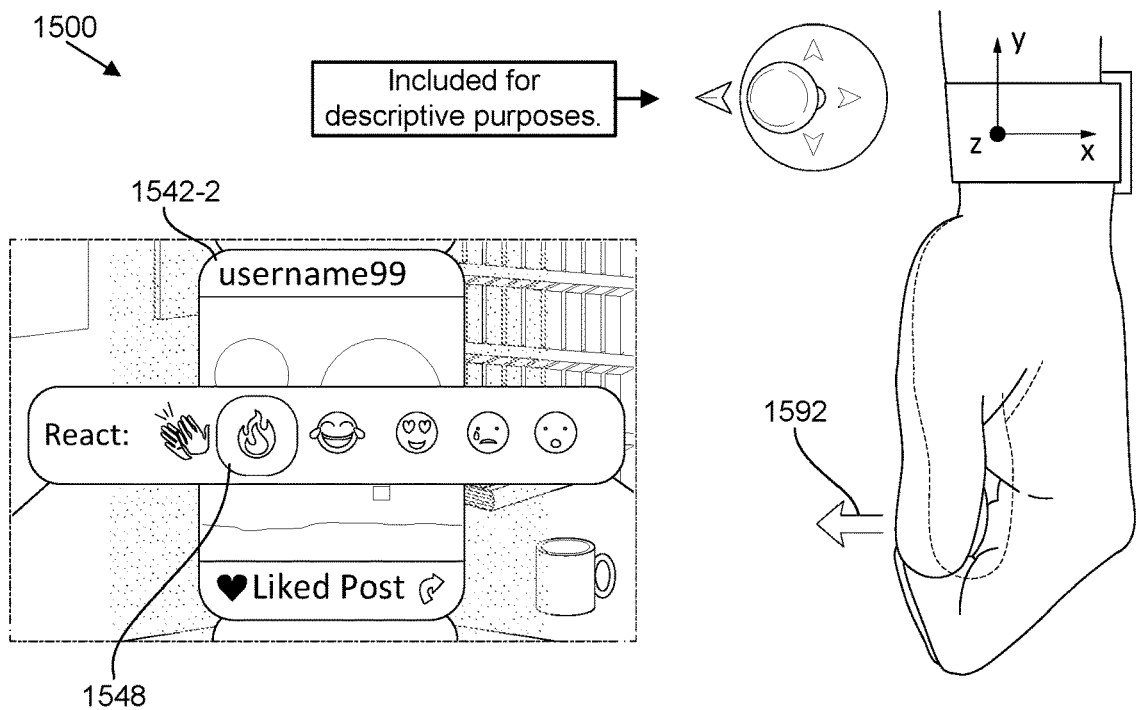
Figure 15V:
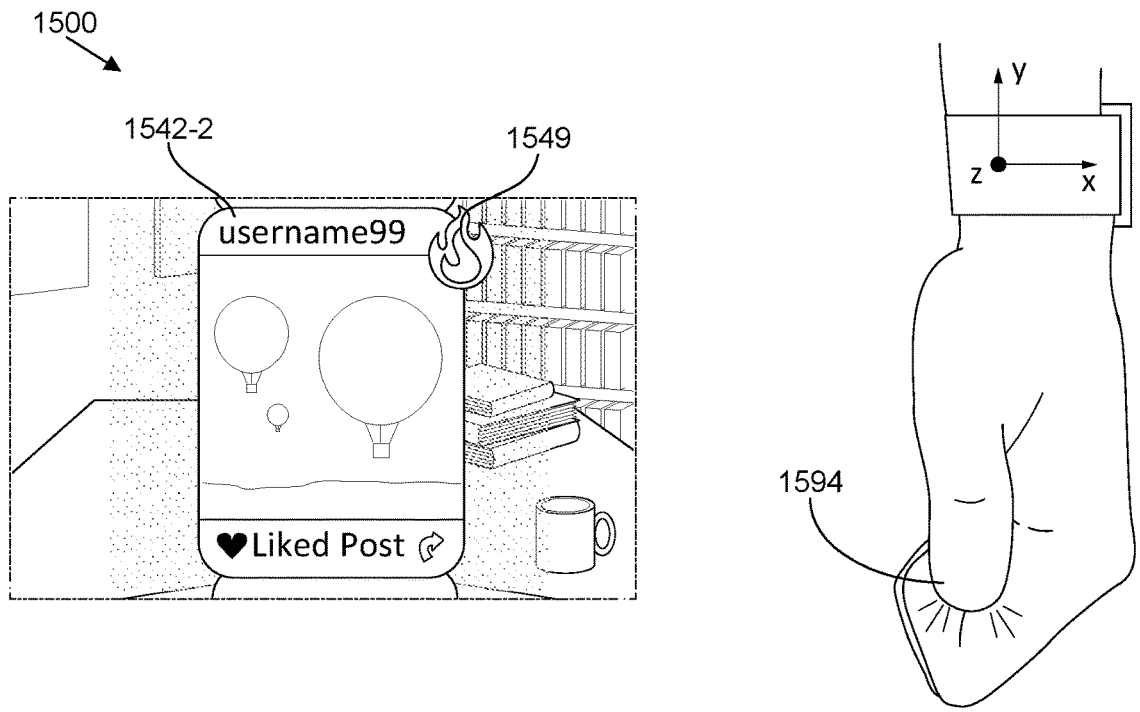

FIGS. 15A-15V illustrate an example user scenario with an artificial-reality system (e.g., including at least augmented reality glasses and a wrist-wearable device) in accordance with some embodiments.

FIG. 15A shows a user 1501 and a computing system 1500 that includes a wrist-wearable device 1502 and a head-wearable device 1504 (e.g., AR glasses such as the AR system 1320 shown in FIG. 13A). The user 1501 in FIGS. 15A-15V is performing gestures that correspond to operations that are caused to be performed within the computing system 1500. In the specific example illustrated by FIGS. 15A-15V, the user 1501 is with user interface objects presented in the field of view 1505 of the user 1501 (e.g., the circular user interface object 1510 shown in FIGS. 15C-15J).

In some embodiments, the user interface objects presented in the field of view 1505 of the user 1501 can be three-dimensional virtual object. In some embodiments, the virtual objects are part of a virtual user interface displayed at a physical surface (e.g., a physical surface 1508 of the desk in front of the user 1501).

Turning now to FIG. 15A, the user 1501 is sitting at a desk having a physical surface 1508. In some embodiments, the physical surface 1508 can be used in conjunction with any of the in-air and/or surface gestures described above. In some embodiments, such in-air and/or surface gestures can be performed in combination with, or as an alternative to, the gestures described in FIGS. 15A-15V. The user 1501 is wearing a wrist-wearable device 1502, and a head-wearable device 1504. The head-wearable device 1504 is capable of presenting user interface objects within a field of view 1505 of the user 1501. FIG. 15A illustrates the head-wearable device 104 displaying a notification user interface element 1511. The notification user interface element is displaying textual information to the user 1501: "New UI Feature Available: Roll wrist to open app menu." In some embodiments, the notification user interface element 1511 can include selectable user interface elements that the user 1501 is capable of interacting with, configured to allow the user to adjust the settings related to the new user interface feature. A hand 1503 of the user 1501 that is on the same arm as the wrist-wearable device 1502 is located at a side of the user 1501.

In some embodiments, there are acceptable starting positions for the operations described herein to be performed. In some embodiments, the acceptable starting positions include the arm of the user 1501 being extended downward at a side of the user 1501, as shown in FIG. 15A. In some embodiments, the wrist-wearable device 1502 and/or the head-wearable device 1504 can cause an indication to be provided to the user 1501 that the hand 1503 is in an acceptable starting position. In some embodiments, the indication can be a non-visual indication (e.g., an audial indication, a haptic event, etc.). In some embodiments, after the hand 1503 is in an acceptable starting position, an indication can be provided to the user 1501 indicating that the hand 1503 is or is about to be outside of the acceptable starting position. In some embodiments, the acceptable starting positions of the hand 1503 are dynamically determined, based on sensor data from an imaging sensor of the wrist-wearable device 1502. For example, if the hand 1503 of the user 1501 is located such that an imaging sensor 1506 of the wrist-wearable device 1502 cannot detect movements of the hand 1503 of the user 1501, then a notification can be provided to the user 1501 that in-air hand gestures will not be detected until the user adjusts the position of the hand 1503 such that it is in an acceptable starting position.

FIG. 15B shows a bottom view of the hand 1503 of the user 1501 (e.g., from perspective directly facing the top fingertips of the user) is shown at the right, and the field of view 1505 of the user 1501 is shown at the left. No user interface elements are displayed in the field of view 1505 of the user 1501 in FIG. 15B. In some embodiments, a user interface can be displayed indicating that the hand 1503 of the user 1501 is in an acceptable starting position for performing gestures to cause operations to be performed at a user interface.

Turning now to FIG. 15C, the bottom view of the hand 1503 is showing the hand 1503 having performed a hand rotation 1570, where the hand rotation 1570 corresponds to a rotation angle 1550 around an axis in the direction of the user's arm from the bottom view of the hand 1503. Based on the user 1501 having performed the hand rotation 1570, a circular user interface object 1510 is presented, by the head-wearable device 1504, in the field of view 1505 of the user 1501. In some embodiments a speed at which the circular user interface object 1510 animates into the field of view 1505 (e.g., an animation transition length) is based on a rotational velocity at which the user 1501 performs the hand rotation 1570. In some embodiments, the hand rotation 1570 must have a minimum velocity to satisfy gesture criteria (e.g., two meters per second). In some embodiments, one or more IMU sensors located at the wrist-wearable device 1502 can be used to detect an in-air hand gesture that includes the hand rotation 170, and/or a velocity of the hand rotation 1570.

Turning now to FIG. 15D, the bottom view of the hand 1503 is showing the hand 1503 performing a hand rotation 1572, where the hand rotation 1572 corresponds to the rotation angle 1550 but is in the opposite direction of the hand rotation 1570 (e.g., the hand rotation 1570 is clockwise, and the hand rotation 1572 is counterclockwise, according to some embodiments). The circular user interface object 1510 remains presented, by the head-wearable device 1504, in the field of view 1505 of the user 1501. In some embodiments, the circular user interface object would not be displayed at the point in the sequence illustrated by FIG. 15B and would instead only be presented when the hand 1503 of the user 1501 reaches the hand's starting rotation (e.g., after a rolling gesture, and another rolling gesture in the opposite direction).

FIG. 15E shows a front view of the hand 1503 of the user 1501 (e.g., from a perspective directly facing the top of the hand 1503 of the user 1501). As shown in FIG. 15E, the circular user interface object 1510 includes selectable option user interface elements 1514a-1514e, which the user 1501 can interact with by performing in-air hand gestures. A focus selector 1512 is displayed within the circular user interface object 1510, and a focus indicator 1516 is displayed on the selectable option user interface element 1514-a, which corresponds to the focus selector 1512 being located within the selectable option user interface element 1514a.

Turning now to FIG. 15F, the front view of the hand 1503 of the user 1501 shows that the user 1501 has performed an in-air hand gesture that includes a hand rotation 1572, having a rotation angle 1552 in the "z" direction of the cartesian plane displayed in FIG. 15F. In some embodiments, the imaging sensor 1506 detects the hand 1503 performing in-air hand gesture by determining that the hand has rotated by the rotation angle 1552. In some embodiments, the determination is made by tracking movement of a particular location on the hand 1503 (e.g., a point on the finger, a knuckle, a ring on the user's finger or another wearable electronic device).

FIG. 15G shows a side view of the hand 1503 of the user 1501 (e.g., from a perspective directly facing the side a thumb and index finger of the hand 1503). The circular user interface object 1510, presented within the field of view 1505 of the user 1501, shows the focus selector 1512 located within the selectable option user interface element 1514-b (e.g., the focus indicator 1516 is displayed at the location of the selectable option user interface element 1514-b).

Turning now to FIG. 15H, the side view of the hand 1503 of the user 1501 shows that the user 1501 has performed an in-air hand gesture that includes a hand rotation 1576 in the "x" direction by a rotation angle 1554. In some embodiments, the imaging sensor 1506 detects that the hand 1503 has rotated by the rotation angle 1554 by determining how much of the hand 1503 is in a field of view of the imaging sensor 1506. For example, a larger amount of the hand being in the field of view of the imaging sensor 1506 can mean that the hand of the user is rotating in the positive "x" direction of a cartesian plane as shown in FIG. 15H.

FIG. 15I shows the side view of the hand 1503 of the user 1501. The circular user interface object 1510, presented within the field of view 1505 of the user 1501, shows the focus selector 1512 located within the selectable option user interface element 1514-a (e.g., the focus indicator 1516 is displayed at the location of the selectable option user interface element 1514-a).

Turning now to FIG. 15J, the side view of the hand 1503 of the user 1501 shows that the user 1501 is performing another in-air hand gesture (e.g., a pinch gesture) that includes a contact 1578 between a thumb 1507 of the hand 1503, and an index finger 1509 of the hand 1503. As will be discussed in more detail below, the user 1501 can perform in-air hand gestures that correspond to different operations to be performed by the computing system 1500 by performing pinch gestures using different combinations of fingers of the user. Based on the user 1501 performing the pinch gesture in FIG. 15J, while the focus selector 1512 is located within the selectable option user interface element 1514-a, a selection indicator is displayed within the selectable option user interface element 1514-a, indicating that the user 1501 has selected the selectable option user interface element 1514-1 (e.g., to open a corresponding camera application) at the user interface presented in the field of view 1505 of the user 1501. In some embodiments, different aspects of a pinch gesture like that performed in FIG. 15J can cause different operations to be performed within the user interface. For example, a discrete pinch gesture can cause an operation to be performed to open the camera application, while a maintained pinch gesture can cause a different operation (e.g., causing additional options related to the camera application to be presented at the user interface).

FIG. 15K shows the side view of the hand 1503 of the user 1501. The circular user interface object 1510 is no longer presented within the field of view 1505 of the user 1501, and instead, a camera view indicator 1520 is presented, which can indicate a portion of the field of view that will be captured as an image if the user 1501 performs a gesture that causes an image to be captured by the head-wearable device. A notification user interface element is also presented within the field of view 1505 of the user 1501, stating: "Pinch to Capture," which is intended to instruct the user 1501 how to cause an image to be captured.

Turning now to FIG. 15L, the side view of the hand 1503 of the user 1501 shows that the user 1501 is performing another in-air hand gesture (e.g., a pinch gesture) that includes a contact 1578 between the thumb 1507 and the index finger 1509. Based on the user 1501 performing the pinch gesture in FIG. 15L, an image is captured by a camera located at the head-wearable device 1504. In some embodiments, the user can adjust the location of the camera view indicator by performing a different gesture than the pinch gesture corresponding to the contact 1578 in FIG. 15L. For example, the user can perform another in-air hand gesture, which can cause the focus selector 1512 to move to a different location, thereby changing the location of the camera view indicator 1520, which is centered by the focus selector 1512. In some embodiments, the head-wearable device can detect a gaze direction of the user 1501, based on, for example, an eye-tracking module located within the head-wearable device 1504. In some embodiments, the gaze direction can be determined by detecting an angle of the user's head (e.g., the camera view indicator can be at some predetermined location with the field of view 1505 of the user 1501, such that causing the field of view 1505 to change causes a corresponding adjustment to the location of the camera view indicator 1520.

FIG. 15M shows a front view of the hand 1503 of the user 1501 (e.g., from a perspective directly facing the top of the hand 1503 of the user 1501). As shown in FIG. 15M, a gallery user interface element 1526 is presented within the field of view 1505 of the user 1501. The gallery user interface element 1526 includes gallery thumbnail user interface elements 1528-a-1528-e, one or more of which can include thumbnails of images that have been captured or saved by the user 1501 (e.g., images that have been captured by the head-wearable device 1504, as illustrated in FIG. 15L). A focus indicator 1529 is displayed over the gallery thumbnail user interface element 1528-e, indicating that the gallery thumbnail user interface element 1528-e is currently in focus within the gallery user interface element 1526. As illustrated in FIG. 15M, an explicit focus selector object (e.g., the focus selector displayed in FIGS. 15E-15L) does not need to be present in order for the user 1501 to perform in-air hand gestures that correspond to navigational operations at the user interface presented by the head-wearable device 1504.

Turning now to FIG. 15N, the front view of the hand 1503 shows that the user 1501 is performing another in-air hand gesture that includes a hand rotation 1582 that has a rotation angle 1554. Based on the in-air hand gesture, the focus indicator 1529 relocates (e.g., moves) from the gallery thumbnail user interface element 1528-e to the gallery thumbnail user interface element 1528-b. Indicating, for example, that if a gesture causing a selection operation were to be performed by the user 1501, the gallery thumbnail user interface element 1528-b would be selected for display in, for example, an image editing application.

FIG. 15O shows the side view of the hand 1503 of the user 1501. In FIG. 15O, the user 1501 is performing a pinch gesture that includes a contact 1584 between the thumb 1507 and the index finger 1509. An image editing user interface element 1530 is displayed in the field of view 1505, and the focus selector 1512 is presented within the image editing user interface element 1530. Based on the user 1501 performing the pinch gesture that includes the contact 1584, a selection indicator 1536 is caused to be presented over the selectable editing option user interface element 1534-b (e.g., a drawing tool). In some embodiments, once the user 1501 activates the drawing tool, the computing system 1500 can cause drawing to occur based on an eye-tracking module tracking the location of a pupil of the user 1501.

FIG. 15P shows the side view of the hand 1503 of the user 1501. In FIG. 15P, the user 1501 is maintaining the contact 1584 of the pinch gesture from FIG. 15O, while performing a hybrid gesture that includes a hand movement 1586. As described herein, the term "hybrid gesture" refers to a gesture that includes to individual aspect corresponding to other discrete gestures (e.g., a pinch gesture combined with a hand movement, a double-pinch gesture, etc.). The focus selector 1512 is represented by a pencil icon 1512-b, indicating that the selectable editing option user interface element 1534-b is selected. Based on the user 1501 performing the hand movement 1586 while maintaining the contact 1584 of the pinch gesture from FIG. 15O, the pencil icon 1512-b moves within the image 1537 displayed within the image editing user interface element 1530. Based on the movement of the pencil icon 1512-b, the image 1537 is edited by the pencil icon 1512-b.

FIG. 15Q shows the front view of the hand 1503 of the user 1501. A scrollable user interface element 1538 is displayed within the field of view 1505 of the user 1501 (e.g., a scrollable user interface element of a social media application). The scrollable user interface element 1538 includes a displayed post user interface element 1542-1 that includes an image and textual content (e.g., similar to a post displayed on an Instagram feed). The scrollable user interface element 1538 also includes a scroll location indicator user interface element 1540 that indicates a location of the scrollable user interface element 1538 that is currently displayed in the field of view 1505.

Turning now to FIG. 15R, the user 1501 is performing an in-air hand gesture that includes a hand rotation 1588 having a rotation angle 1556. Based on the user 1501 performing the in-air hand gesture that includes the hand rotation 1588, a different location of the scrollable user interface element is caused to be presented within the scrollable user interface element 1538. As illustrated in FIG. 15R, the relocation of the displayed portion of the scrollable user interface element 1538 causes a scroll movement 1544 of the scroll location indicator user interface element 1540 to indicate that a different location of the scrollable user interface element 1538 is currently being displayed at the scrollable user interface element 1538.

FIG. 15S shows the side view of the hand 1503 of the user 1501. In FIG. 15S, the user 1501 is performing a double pinch gesture that includes two discrete contacts 1590 between the thumb 1507 and the index finger 1509 of the user 1501. The performance of the double-pinch gesture causes an operation to be performed at a displayed post user interface element 1542-2, displayed within the scrollable user interface element 1538. Specifically, the performance of the double-tap gesture causes a reaction (e.g., a like) to be applied to the displayed post user interface element 1542-2. In some embodiments, the operation that is caused to be performed by the performance of the double-pinch gesture depends on whether the user 1501 performed the gesture within a threshold distance of a physical surface near the user (e.g., within a surface threshold distance, within an in-air threshold distance, etc.).

FIG. 15T shows the side view of the hand 1503 of the user 1501. In Figure the user 1501 is making a fist, and the thumb 1507 is resting on the index finger 1509. The scrollable user interface element 1538 is displayed in the field of view 1505. Based on the double pinch gesture performed in FIG. 15S, a reaction selector user interface element 1546 is displayed over the displayed post user interface element 1542-2 that is currently in focus in the scrollable user interface element 1538. A focus indicator 1548 is shown at the location of the first reaction in the reaction selector user interface element 1546 indicating that a specific reaction (a "clapping hands" emoji reaction), is in focus at the reaction selector user interface element 1546.

Turning now to FIG. 15U, the side view shows the user 1501 performing an in-air hand gesture that includes a thumb movement 1592 along the index finger 1509 of the user 1501, away from the palm of the user 1501. Based the thumb movement 1592, the focus indicator 1548 can relocate to be at a location of a different reaction within the reaction selector user interface element 1546. In some embodiments, the distance of relocation of the focus indicator 1548, and/or the speed of an animation showing the relocation of the focus indicator 1548 can be based on an amount associated with the thumb movement 1592. For example, if the thumb movement 1592 satisfies a velocity criterion, the focus indicator 1548 can be relocated to a reaction that is past one or more reactions between where the focus indicator 1548 was before the in-air gesture was performed. In some embodiments, the focus indicator 1548 can relocate during the performance of the in-air hand gesture, such that the user 1501 received intermediate feedback that the gesture is causing the operation to be performed. For example, after the user 1501 performs a first portion of the thumb movement 1592, the focus indicator can relocate by one reaction within the reaction selector user interface element 1546. Then, after the user 1501 performs a second portion of the thumb movement 1592, the focus indicator can relocate by another reaction within the reaction selector user interface element 1546.

In FIG. 15V, the side view shows the user 1501 performing an in-air hand gesture within the computing system 1500 that includes a thumb movement 1594 (a downward press movement towards the index finger 1509). Based on the user 1501 performing the thumb movement 1594, a reaction 1549 (e.g., a fire emoji) is applied to the displayed post user interface element 1542-2. In some embodiments, the thumb movement 1594 must satisfy an intensity threshold in order to cause the intended operation to be performed at the user interface presented in the field of view 1505 presented by the head-wearable device 1504.

Having thus described system-block diagrams and then example wearable devices, attention will now be directed to certain example embodiments.

FIGS. 16A-16B are flow diagrams illustrating a method 1600 for making in-air and surface gestures available to a user in accordance with some embodiments. The method 1600 is performed at a computing system (e.g., computing system 1500) having one or more processors and memory (e.g., the processor 1234 and the memory 1230 in FIG. 12A). In some embodiments, the artificial-reality system includes one or more wearable devices, such as the wrist-wearable device 1502 and the head-wearable device 1504 (which can include some or all of the components of the wearable device 1202 discussed in FIG. 12A). In some embodiments, the computing system includes one or more handheld devices, such as a controller or smartphone. In some embodiments, the memory stores one or more programs configured for execution by the one or more processors. At least some of the operations shown in FIGS. 9A-9C correspond to instructions stored in a computer memory or computer-readable storage medium (e.g., the memory 1278 of the computer system 1272 or the memory 1256 of the accessory device 1252 in FIG. 2B). In some embodiments, the computing system is a wearable device such as the wrist-wearable device 102 or the head-wearable device 1504 in FIGS. 1A-1V.

For performance of the operations of the method 1600 at the computing system, a user (e.g., the user 101 in FIGS. 15A-15V) is (1602) wearing a wrist-wearable device that includes an imaging sensor (e.g., the imaging sensor 1506 illustrated in FIGS. 15B-15D). The imaging sensor is (1604) facing towards the hand of the user while the wrist-wearable device is worn by the user. In some embodiments, there can be more than one imaging sensors facing towards the hand of the user. For example, the imaging sensor 1506 shown in FIG. 15B-15D can include a photodiode array that includes, for example, eight individual imaging sensors located at distinct and separate locations of the wrist-wearable device 1502.

In some embodiments, there is more than one imaging sensor at the wrist-wearable device. In some embodiments, the user is wearing a head-wearable device (e.g., the head-wearable device 1504 in FIGS. 15A-15V), and the head-wearable device includes at least one imaging sensor. In some embodiments, sensor fusion techniques are used to determine a combination of sensors, including imaging sensors, to use to detect gestures with optimal parameters of, for example, accuracy and power usage. For example, if an imaging sensor at the wrist-wearable device is receiving a relatively strong signal of hand movements corresponding to in-air hand gestures, then the computing system 1500 can determine, based on the data from the imaging sensor of the wrist-wearable device, that power can be reduced to the imaging sensor of the head-wearable device. In some embodiments, the imaging sensor at the head-wearable device can be used exclusively, and power can be reduced at the imaging sensor of the wrist-wearable device while the imaging sensor of the head-wearable device is capable of accurately detecting in-air hand gestures performed by the user. In some embodiments, the determination of which sensors to reduce power to is based on a set of gestures that is currently available to the user. For example, while no operations at the computing system 1500 correspond to pinch gestures, power can be reduced to a vibration sensor at the wrist-wearable device.

In some embodiments, before (1606) presenting a user interface object to the user at a head-wearable device, receiving a first indication, from the wrist-wearable device, of a performance of a first in-air hand gesture that includes a rotation of a wrist of the user, the rotation being of at least a threshold angular range (e.g., roll angle), where the rotation is detected by the imaging sensor facing toward the user's hand. In some embodiments, the first in-air hand gesture includes a first rolling motion having the predefined roll angle in a first direction (e.g., clockwise). In some embodiments, the first in-air hand gesture includes a second rolling motion having the predefined roll angle in a second direction (e.g., counterclockwise). In some embodiments, the first in-air hand gesture includes both the first rolling motion and the second rolling motion, each having the predefined roll angle. In other words, considering FIGS. 15B-15D as continuous sequences, the circular user interface object 1510 can be displayed based on the user performing the hand rotation 1570 in FIG. 15C, and/or the circular user interface object 1510 can be displayed based on the user performing the hand rotation 1572 in FIG. 15D. In some embodiments, a full wrist roll, out and in, is required to display the user interface, while in some embodiments the roll out is all that is required. Either way, a haptic event can be received at one of the wrist-wearable device or a head-wearable device worn by the user based on the user performing a gesture that causes the circular user interface object 1510 to be displayed.

In some embodiments, in response to (1608) the first indication, the computing system causes the user interface object to be displayed within the user interface present at the head-wearable device. For example, FIGS. 15B-15D illustrate the hand 1503 of the user 1501 rotating through an angular range, and as a result of the gesture involving the rotation of the hand 1503, the circular user interface object 1510 is presented to the user 1501 at the head-wearable device 1504.

The computing system presents (1610) a user interface to a user via the head-wearable device. For example, the circular user interface object 1510 is part of an artificial-reality user interface displayed to the user 1501 in the sequence shown by FIGS. 15A-15V. In some embodiments, the user interface presented to the user includes one or more virtual objects configured to be appear as three-dimensional objects within the field of view of the user (e.g., the field of view 1505 in FIGS. 15A-15V).

In some embodiments, before (1612) receiving the second indication about the performance of the in-air hand gesture, detect, using the imaging sensor, that the user's hand is in a first location that corresponds to an acceptable starting position. For example, one acceptable starting position can be achieved when the hand 1503 of the user 1501 is extended downward by a side of the user 1501. In some embodiments, there can be a plurality of acceptable starting positions, and the user 1501 can be prompted regarding the locations of the hand 1503 for each of the acceptable starting positions.

In some embodiments, based on detecting (1614) that the user's hand is in the acceptable starting position, providing a visual notification to the user (or, e.g., audio, haptics, etc.) that the user's hand is in a first location that corresponds to an acceptable starting position. In some embodiments, additional user inputs and/or conditions are detected before providing the indication to the user that in-air hand gestures are available for controlling the user-interface object. For example, the user can activate the in-air gesture space by performing a pinch gesture at the starting location, according to some embodiments.

The computing system receives (1616) an indication, from the wrist-wearable device, of a performance of an in-air hand gesture that includes movement of a hand of a user in a direction relative to a starting position of the hand of the user. In some embodiments, the starting position of the hand of the user 1501 can be represented by FIG. 15E, where the hand 1503 of the user 1501 is extended directly downward. And the FIG. 15F represents one example of a movement of the hand 1503 of the user 1501 relative to the starting position of the hand 1503 of the user 1501.

The movement is detected (1618) by the imaging sensor (e.g., a camera, a charge-coupled device (CCD), an active-pixel sensor (CMOS), etc.) included on the wrist-wearable device. In some embodiments, different imaging sensors, or a combination of two or more imaging sensors can be used in various situations. In some embodiments, sensor fusion is used to determine an optimal combination of imaging sensors to use in a given situation. For example, the wrist-wearable device 1502 depicted in the FIGS. 15A-15V can include more than one imaging sensor (e.g., the imaging sensor 1506), such that the determination of what in-air hand gesture the user 1501 is performing is based on the data from more than one imaging sensor.

In some embodiments, the direction corresponds to a distinct angular orientations of the user's hand relative to the initial wrist angle of the user's wrist. For example, the first wrist orientation can correspond to the user's hand being extended substantially straight from the user's wrist, and the second wrist orientation can correspond to the user's hand being angled in a forward direction from the user's wrist (e.g., the user's hand being tilted forward away from the user's body, which is illustrated by FIG. 15F). In some embodiments, the user's respective wrist orientations are relative to a current angle of the user's arm. For example, the relative wrist orientations of the user's wrist when their arm is extended outward in front of them are different than when the user's arm is extended directly downward (e.g., at the user's side).

In some embodiments, no (1620) EMG sensor is used to detect the in-air hand gesture. In some embodiments, only one or more imaging sensors are used to detect the performance of at least some of the in-air hand gestures. In some embodiments, power is reduced to one or more of a first group of sensors, which can include EMG sensors, based on a set of available gestures and/or operations currently available to the user at the wrist-wearable device and/or the head-wearable device. For example, any of the in-air hand gestures shown in FIGS. 15A-15V can be detected without an EMG sensor. In some embodiments, an in-air hand gesture, including a pinch gesture having a contact between two fingers of a user (e.g., the contact 1584 in FIG. 15O) can be detected by a vibration sensor located at the wrist-wearable device. In some embodiments, one or more IMU sensors can be used to detect in-air hand gestures that include a movement of the hand of the user.

In response to the indication, the computing system controls (1622) the user interface object on the display of the head-wearable device in accordance with determining the movement of the hand of the user. For example, in FIG. 15F, the focus selector 1512 is illustrated moving from the selectable option user interface element 1514-*a* to the selectable menu option user interface element 1514-*d* based on the movement of the hand 1503 of the user 1501. In some embodiments, the determining of the movement can be performed by a head-wearable device (e.g., the head-wearable device 104 shown in FIGS. 15A-15V). In some embodiments, the determining can be performed by the wrist-wearable device or another, intermediate device. In some embodiments, the determining of the movement can be performed by a combination of electronic devices.

The controlling of the user interface object is (1624) based on the direction of the movement relative to the starting position of the hand of the user. For example, the focus selector 1512 moves in different directions in FIGS. 15F and 15H based on the user 1501 moving their hand 1503 in different direction relative to the starting position of the hand 1503.

In some embodiments, the controlling of the user interface object is based on (1626) an amount associated with the movement, where the amount associated with the movement is one of a distance of the movement, a speed of the movement, or a period of time during which the movement takes place. In some embodiments, the controlling can be based on more than one amount. For example, the controlling can be based on both the distance that the user's hand moved during the first movement and a time that the user maintained a second position after the first movement before the user's hand returns to the starting position. For example, the distance of the scroll movement 1544 in FIG. 15R caused by the in-air hand gesture that includes the hand rotation 1588 can be based on both the angle 1556 and the amount of time that the user held the hand 1503 in the rotated position after the hand rotation 1588.

In some embodiments, data from one or more sensors included on the wrist-wearable device is calibrated such that respective weightings are applied to respective sensors based on user criteria.

In some embodiments, the controlling of the user interface object includes (1628) moving between the plurality of available options of the user interface object. In some embodiments, the controlling of the user interface object causes a focus selector to change locations (e.g., visibly move, animate) from the first selected aspect of the user interface to the second selected aspect of the user interface, e.g., between multiple displayed menus. For example, the focus selector in FIGS. 15E-15H moves in response to in-air hand gestures performed by the user 1501. Another example is the focus indicator 1529 shown in FIGS. 15M and 15N, which moves from the gallery thumbnail user interface element 1528-*e* to the gallery thumbnail user interface element 1528-*b* based on the user performing the in-air hand gesture that includes the hand rotation 1582 in FIG. 15N.

In some embodiments, the in-air hand gesture is (1630) a hand-waving gesture that causes a focus selector to move circumferentially around the circular menu user interface object (e.g., in a clockwise or counter-clockwise direction). In other words, the movement of the user interface object does not always have a one-to-one correspondence with the direction of movement associated with the in-air hand gesture. For example, if the first direction is to the right, the indicator can move clockwise, and if the first direction is to the left and/or forwards relative to the initial wrist angle, the indicator can move in a clockwise direction, and if the first direction is to the right and/or backwards relative to the initial wrist angle, the indicator can move in a counterclockwise direction. In some embodiments, the wrist gesture illustrated in FIG. 15F corresponds to a clockwise direction of movement of the user interface object (e.g., from selecting the camera application menu option to selecting the editor menu option located clockwise from the camera application menu option).

In some embodiments, the indication is a first indication, and the in-air hand gesture is a first in-air hand gesture, and the method 1600 further includes receiving a second indication, from the wrist-wearable device, of a performance of a second in-air hand gesture, distinct from the first in-air hand gesture. In some embodiments, based on the computing system receiving the second indication, the computing system causes an operation to be performed distinct from the controlling of the user interface object caused by the first indication.

In some embodiments, the movement corresponding to the first in-air hand gesture is in a first direction relative to the user (e.g., in a direction that extends forwards and backwards from the user), and the controlling of the user interface object in response to the first indication includes moving the location of a selector within the user interface object (e.g., a focus selector, a scrollable sidebar, etc.). In some embodiments, another movement corresponding to the second in-air hand gesture is in a second direction relative to the user, where the second direction is substantially orthogonal to the first direction (e.g., left, and right), and the operation performed in response to the second indication causes another user interface object to be displayed, distinct from the user interface object that is controlled by the first in-air hand gesture.

In some embodiments, the first in-air hand gesture causes the user interface object to move in a direction that corresponds to a direction of the movement of the hand of the user during the first in-air hand gesture. In some embodiments, the second in-air hand gesture is a pinch gesture, where the pinch gesture includes a contact between a thumb of the user and another finger of the user, and the operation performed in response to the second indication causes an image to be captured by a camera at the wrist-wearable device or the head-wearable device. In some embodiments, the direction that the camera is facing when it captures the image is based on the location of the focus selector.

In some embodiments, while (1632) a first option of a plurality of available options, at the user interface, is in focus, detect, using one or more sensors of the wrist-wearable device that are not EMG sensors (e.g., a vibration sensor, camera sensor, etc.), a pinch gesture that includes a contact between a thumb of the user and an index finger of the user, the contact having at least a predefined pinch intensity (e.g., the contact 1578 between the thumb 1507 and the index finger 1509 of the user 101 in FIG. 15L).

In some embodiments, based on detecting (1634) the pinch gesture, performing an action associated with the user interface object. For example, as shown in FIG. 15J, when the user 1501 performs the pinch gesture including the contact 1578 between the thumb 1507 and the index finger 1509, it causes the selectable option user interface element 1514-*a* (e.g., a selectable option corresponding to a camera application) to be presented in the field of view 1505 of the head-wearable device 1504.

In some embodiments, in response to (1636) the second indication, causing an image to be captured by a camera at the wrist-wearable device, the head-wearable device, or another electronic device. For example, in FIG. 15L, the user 1501 performs a pinch gesture that includes the contact 1578 between the thumb 1507 and the index finger 1509 of the user, and based on the performance of the pinch gesture, an image is captured by a camera of the head-wearable device 1504.

Having thus described example sequences and methods of operation that make user of the example sequences, attention will now be directed to system-level depictions of hardware and software on which (or with which) the methods can be implemented.

Example Embodiments

Turning now to some example embodiments of the methods, devices, systems, and computer-readable storage media described earlier. In short, the descriptions below proceed by first discussing the paragraphs beginning with an A symbol, which are related to an aspect in which a system is responsive to in-air and surface gestures from a user, following that is a discussion of paragraphs beginning with a B symbol, which relate to an aspect in which sensors at a wrist-wearable device detect that a physical surface has a curved surface portion (e.g., detect curvature, texture, and/or any other topographical features), following that is a discussion of paragraphs beginning with a C symbol, which relate to an aspect in which detected gestures performed a wrist-wearable device cause operations to be performed at an electronic device that is not.

(A1) In one aspect, some embodiments include a method (e.g., the method 900) of making in-air and surface gestures available to a user. The method is performed at a wearable device (e.g., the wearable device 1202) having memory (e.g., the memory 1206) and one or more processors (e.g., the processor(s) 1204). The method includes: (i) presenting, via a head-wearable device, an artificial-reality environment that includes a user interface (e.g., the application 1232), where the user interface is responsive to a first set of operations corresponding to respective in-air gestures and a second set of operations corresponding to respective surface gestures; and, while presenting the user interface: (ii) in response to detecting, using a first group of sensors of a wrist-wearable device (e.g., the group of sensors 252), performance of an in-air gesture (e.g., the in-air gesture 242) that corresponds to an operation from the first set of operations, causing the head-wearable device to perform an operation of the first set of operations to update the presentation of the user interface (e.g., update the virtual object 220), and (iii) in response to detecting, using a second group of sensors of the wrist-wearable device (e.g., the surface gesture 342 at the physical surface 310), the second group of sensors having at least one sensor that is not in the first group of sensors (e.g., the time-of-flight sensor 258), performance of a surface gesture at a physical surface (e.g., the surface gesture 342 at the physical surface 310) that corresponds to an operation from the second set of operations, causing the head-wearable device to perform the operation from the second set of operations to update the presentation of the user interface (e.g., as shown in FIG. 3B).

(A2) In some embodiments of A1, the method further includes, detecting, using the second group of sensors, whether the wrist-wearable device is within a surface-edge threshold distance of a surface edge of the physical surface (e.g., surface edge 112 of the physical surface 110 in FIGS. 1A-1I).

(A3) In some embodiments of A2, the method further includes, in response to detecting that the wrist-wearable device is crossing the surface-edge threshold distance of the surface edge, causing a haptic event (e.g., via the haptic controller 1490) at one of the head-wearable device the wrist-wearable device, or another connected device. For example, a haptic event can be provided when the wrist-wearable device 102 crosses the surface edge 112 of the physical surface 110 during the surface gesture 128.

(A4) In some embodiments of any of A1-A3, detecting the surface gesture further includes determining, using the second group of sensors, that the surface gesture occurred within a surface threshold distance of the physical surface. For example, the time-of-flight sensors 158 determine that the surface gesture 109 occurred within the surface threshold distance 106 of the physical surface 110.

(A5) In some embodiments of any of A1-A4, detecting the performance of the surface gesture further includes determining, using the second group of sensors, that at least a portion of the surface gesture contacts the physical surface (e.g., using a time-of-flight sensor 158).

(A6) In some embodiments of any of A1-A5, detecting the performance of the surface gesture further includes determining, using the second group of sensors, that the surface gesture includes a plurality of contacts. For example, the time-of-flight sensors 358 can determine that the surface gesture 348 in FIG. 3E includes two distinct physical contacts with the physical surface 310. In some embodiments, the plurality of contacts occurs in sequence (e.g., a double tap gesture) while in other embodiments, the plurality of contacts occurs concurrently (e.g., a surface pinch gesture).

(A7) In some embodiments of A6, detecting the performance of the surface gesture further includes determining, using the second group of sensors, whether two or more contacts of the plurality of contacts are performing a pinch gesture (e.g., the location-agnostic gesture 346 in 3C can be detected based on detecting that the two or more contacts of the plurality of contacts are performing a pinch gesture using the EMG sensors 354).

(A8) In some embodiments of A7, the second group of sensors includes an EMG sensor and determining whether the two or more contacts are performing a pinch gesture further includes detecting a pinch-threshold distance change between the two or more of the plurality of contacts of the surface gesture. For example, the location-agnostic gesture 346 in FIG. 3D can be determined to be a surface gesture and can be determined to be a pinch gesture based on determining that a plurality of the user's 301 fingers have performed a pinch-threshold distance change during the performance of the location-agnostic gesture 346. In some embodiments, the second group of sensors includes an IMU sensor (e.g., the IMU sensors 160) and the IMU sensor detects the pinch-threshold distance change between the two or more of the plurality of contacts of the surface gesture based on, e.g., vibration signals detected via the IMU sensors 160 as the pinch gesture is performed. In some embodiments, the second group of sensors includes a camera sensor (e.g., the camera sensors 164) and the camera sensor (e.g., an infrared camera that is positioned on the wrist-wearable device such that its field of view is looking towards a top of the user's hand) detects the pinch-threshold distance change between the two or more of the plurality of contacts of the surface gesture. For such gestures as the one recited in A8, involving detection of detailed gesture features, such as whether two or more contacts have performed a pinch-threshold distance change, the EMG sensors, such as EMG sensors 154, can be more sensitive to such detailed gesture features than, for example, the IMU sensors 160. However, EMG sensors can consume power at a higher rate than IMU sensors, and/or camera sensors 164. In some embodiments, the wrist-wearable device can activate the EMG sensors 154 when the wrist-wearable device has a threshold amount of power remaining. In some embodiments, the user can configure the wrist-wearable device for when to use the EMG sensors, and when to instead use the IMU sensors and/or the camera sensors. In some embodiments, the wrist-wearable device does not include EMG sensors and uses IMU sensors, camera (imaging) sensors, or other sensors for gesture detection (both in-air and surface).

In some embodiments, the wrist-wearable devices discussed herein can include a limited set of sensors that does not include any EMG sensors (or other neuromuscular-signal sensors), the limited set of sensors instead including only one or more IMU sensors and one or more camera sensors (e.g., infrared sensors (which can be infrared proximity sensors) with their field of view looking towards a top of the user's hand). In such embodiments, the wrist-wearable device can make a set of gestures available to the user that is appropriately selected based on the capabilities of the limited set of sensors. For instance, wrist-wearable devices consistent with these embodiments can have the following gestures available: (i) a closed-fist wrist-rotation gesture (e.g., the user's wrist moves to the left and right in quick succession while the user's hand is making a fist), which closed-fist wrist-rotation gesture can be interpreted to cause display of a menu within an artificial-reality environment (e.g., via a head-wearable device); (ii) an open-hand horizontal-movement gesture in which the user's wrist moves to cause a leftward or a rightward movement of the user's hand while the user's hand is not making a fist, which gesture can cause left and right navigational movements within the menu (or within another user interface object that is currently in focus within the artificial-reality environment); (iii) an open-hand vertical-movement gesture in which the user's wrist moves to cause an upward or downward movement of the user's hand while the user's hand is not making a fish, which can cause upward or downward navigational movements within the menu (or within another user interface object that is currently in focus within the artificial-reality environment); and (iv) in-air finger tap gestures, in which one of the user's fingers is moved to make contact with the user's thumb a certain number of times, where the certain number of times triggers different types of actions (e.g., a single tap can cause capturing of an image of the artificial-reality environment, a double tap can cause the artificial-reality environment to allow for drawing on top of a captured image, and a triple tap can cause capturing of a video of the artificial-reality environment). In some embodiments, a weighting factor for data from the one or more IMU sensors and the one or more camera sensors can also be selected by the user, to allow users to customize which data should be weighted more heavily in making gesture determinations. These additional features can be used as alternatives (e.g., for wrist-wearable devices including only the limited set of sensors) or can also be used to supplement the gesture spaces made available in conjunction with the other wrist-wearable devices discussed herein.

(A9) In some embodiments of any of A1-A8, detecting the performance of the surface gesture further includes detecting, using the second group of sensors, a swipe gesture along the physical surface. For example, the time-of-flight sensors 358 can determine that the surface gesture 344 in FIG. 3C is a swipe gesture along the physical surface 310.

(A10) In some embodiments of A9, at least a portion of the swipe gesture includes one or more contacts with the physical surface. For example, the EMG sensors 354 can determine that the user 301 made physical contact with the physical surface 310 during the performance of the surface gesture 344 in FIG. 3C. As alternative examples, data from the IMU sensors 160 or the camera sensors 164 is used to determine that the user made physical contact with the surface.

(A11) In some embodiments of any of A1-A10, detecting either the in-air gesture or the surface gesture includes detecting (e.g., via a sensor 1216) a hold of the respective gesture in a location for at least a hold-threshold time (e.g., at least one, three, five, or seven seconds).

(A12) In some embodiments of any of A1-A11, detecting the performance of the surface gesture further includes detecting, using the second group of sensors, a touch intensity corresponding to the surface gesture, and identifying the operation from the second set of operations in accordance with a determination whether the touch intensity is above a press-threshold intensity (e.g., 1.66 Pascals). For example, the surface gesture 348 in FIG. 3E can determine whether a tap intensity threshold is met for each individual tap that the user 301 makes against the physical surface 310. In some embodiments, the touch intensity is detected via an EMG sensor, an impedance sensor, or an IMU sensor.

(A13) In some embodiments of any of A1-A12, detecting the performance of the surface gesture further includes detecting, using the second group of sensors, a first wrist angle of the wrist-wearable device, detecting, using the second group of sensors, a second wrist angle of the wrist-wearable device, and identifying the operation from the second set of operations includes determining an angle of rotation between the first wrist angle and the second wrist angle. In some embodiments, the same sequence of operations can be detected as an in-air gesture within the in-air threshold distance of a respective surface. For example, FIG. 3H shows a location-agnostic gesture 345 (e.g., a virtual pull gesture) that includes a change in wrist angle. In some embodiments, the wrist angle of the user is determined based on data from an EMG sensor, an IMU sensor, or a camera sensor.

(A14) In some embodiments of any of A1-A13, detecting the performance of the surface gesture further includes detecting, using the second group of sensors (e.g., using an EMG sensor 354), a first contact at a first location within the surface threshold distance, detecting, using the second group of sensors, a second contact a second location within the surface threshold distance, and determining that a user performed a steady-movement gesture between the first location and the second location in accordance with respective gesture criteria. In some embodiments, the stead-movement gesture is distinguishable from a swipe gesture, in that a swipe gesture includes a "flick" motion with a relatively high acceleration, whereas a steady movement gesture is a controlled movement with a relatively steady velocity. For example, an adjustment to the two-dimensional volume control affordance 532 could be made through the performance of a steady-movement gesture.

(A15) In some embodiments of any of A1-A14, the second set of operations includes an affordance activation operation, where detection of performance of the surface gesture includes detecting, by the second group of sensors, a first gesture portion that corresponds to selection of an affordance of the user interface and detecting a second gesture portion that corresponds to activation of the selected affordance, where the second gesture includes a downward movement of a user's hand. For example, FIG. 1B shows a surface gesture 109 that selects the virtual object 118 (e.g., changes its appearance to indicate it's being selected) and the FIG. 1C shows a surface gesture 122 that activates the virtual object 118.

(A16) In some embodiments of any of A1-A15, detecting the performance of the in-air gesture further includes determining, using the first group of sensors, that the in-air gesture occurred within an in-air threshold distance. For example, data from the EMG sensors 354 or a time-of-flight sensor in the group of sensors 252 is used to determine that the in-air gesture 242 occurred between the surface threshold distance 206 and the in-air threshold distance 208.

(A17) In some embodiments of A16, the in-air threshold distance has a maximum value of fifty centimeters. For example, the in-air threshold distance in FIGS. 2A-2D can be configured to be in a range of six to fifty centimeters.

(A18) In some embodiments of any of A16-A17, the method further includes, in accordance with a determination that the in-air gesture did not occur within the in-air threshold distance, causing an electronic device to perform an operation from a third set of operations that corresponds to location-agnostic gestures (e.g., as illustrated in FIG. 1J). In some embodiments, the operation is performed in response to the determination that the in-air gesture did not occur within the in-air threshold distance. In some embodiments, a gesture being detected within the in-air threshold distance further includes the gesture being detected outside of the surface threshold distance. In some embodiments, other criteria are considered. For example, in some embodiments, the EMG sensors indicate that the user is performing a location-agnostic gesture. Upon the indication from the EMG sensors, the electronic device performs an operation from a third set of operations corresponding location-agnostic gestures.

(A19) In some embodiments of any of A1-A18, the user interface includes a virtual object (e.g., the virtual object 220) within the in-air threshold distance of the physical surface, and the in-air gesture includes a simulated contact with a simulated location of the virtual object (e.g., as illustrated in FIG. 2B). In some embodiments, a haptic event is provided in accordance with the simulated contact. For example, in some embodiments, a haptic event is provided at the wrist-wearable device in response to a determination that the user's hand is in the same simulated location as a virtual surface of the virtual object.

(A20) In some embodiments of any of A1-A19, the method further includes causing a haptic event (e.g., via the haptic controller 1490) at one of the head-wearable device and the wrist-wearable device in response to detecting performance of one or more of the in-air gesture and the surface gesture (e.g., as illustrated in FIG. 2D).

(A21) In some embodiments of A20, the haptic event corresponds to the in-air gesture including a simulated contact with a virtual object at a simulated location within an in-air threshold distance of the physical surface (e.g., haptic event 221 in FIG. 2B).

(A22) In some embodiments of any of A1-A21, the physical surface corresponds to a portion of a user's body. For example, the user's leg 865 in FIG. 8E. Examples of portions of a user's body that could be used as a physical surface include a palm, hand, arm, shoulder, leg chest. In some embodiments, the physical surface corresponds to an article of clothing for the user.

(A23) In some embodiments of A22, the portion of the user's body is the user's palm (e.g., the user's palm in FIG. 6C).

(A24) In some embodiments of any of A22-A23, the physical surface does not include the physical surface of the portion of the user's body. In some embodiments, the method detects whether there are clothes or other material on the portion of the user's body and can still respond to gestures on the physical surface or other material (e.g., clothing).

(A25) In some embodiments of any of A1-A24, presenting the user interface further includes displaying a message object corresponding to a received-message at one of the wrist-wearable device, the head-wearable device, or another connected device. For example, an instant message or SMS is sent to the user and received by a wearable device (e.g., the wrist-wearable device 102). The received instant message or SMS is displayed to the user (e.g., along with options for responding).

(A26) In some embodiments of A25, the message object is displayed above the wrist-wearable device. For example, the message object is anchored to the wrist-wearable device similar to how the virtual object 220 displayed above the physical surface 210 in FIG. 2A.

(A27) In some embodiments of any of A25-A26, the message object is a virtual, three-dimensional object. In some embodiments, the virtual three-dimensional object is a three-dimensional emoji virtual object that is based on the content of the received message from a different user of a different electronic device. In some embodiments, the received message is from another user of a different device. In some embodiments, another user sends the received-message from a phone (distinct from the wrist-wearable device).

(A28) In some embodiments of any of A25-A27, the method further includes, in accordance with receiving the received-message at one of the wrist-wearable device, the head-wearable device, or another connected device, updating the presentation of the user interface to display one or more selectable affordances, where each of the one or more selectable affordances, when selected, perform a respective operation from a set of message response operations related to the received-message. For example, the message object is displayed with the selectable affordance similar to how the virtual object 220 is displayed with the display control portion 224.

(A29) In some embodiments of any of A1-A28, the method further includes, in response to detecting a location-agnostic gesture anywhere, including within the surface threshold distance of the physical surface and the in-air threshold distance of the physical surface, performing an operation from a set of location-agnostic operations to update the presentation of the user interface. In some embodiments, to be recognized, the location-agnostic gesture must be in proximity to the physical surface (e.g., within 2 feet, 6 feet, or 10 feet). In some embodiments, to be recognized, the location-agnostic gesture must be directly over the physical surface. In some embodiments, one or more location-agnostic gestures are not detected when performed at distances relative to respective physical surfaces to the wrist-wearable device. For example, in some embodiments, the artificial-reality system is configured to prevent detection of location-agnostic gestures, while the wrist-wearable device is within one or more of the surface threshold distance, the in-air threshold distance, and/or the surface edge threshold distance.

(A30) In some embodiments of A29, the location-agnostic gesture is one of a thumbs-up gesture and a thumbs-down gesture, and in response to detecting the location-agnostic gesture, applying a respective reaction to a received-message corresponding to a message object displayed above the wrist-wearable device. Examples of other location-agnostic gestures include a wave gesture, a first clench gesture, a head nod gesture, a shrug gesture, a clap gesture, and a head shake gesture.

(A31) In some embodiments of any of A1-A30, the second group of sensors includes a first time-of-flight sensor arranged and configured to measure a first angle relative to the wrist-wearable device (e.g., corresponding to the ray 105 in FIG. 1A), and a second time-of-flight sensor arranged and configured to measure a second angle relative to the wrist-wearable device (e.g., corresponding to the ray 103 in FIG. 1A). In some embodiments, one or more of the time-of-flight sensors is a laser-emitting time-of-flight sensor. In some embodiments, one or more of the time-of-flight sensors emits structured light. In some embodiments, one or more of the time-of-flight sensors is a multi-mode sensor capable of emitting either laser or structured light.

(A32) In some embodiments of A31, the second group of sensors further includes a third time-of-flight sensor arranged and configured to measure a third angle relative to the wrist-wearable device. For example, the ray 107 in FIG. 1A can correspond to a third time-of flight sensor from the time-of-flight sensors 158.

(A33) In some embodiments of any of A1-A32, each of a plurality of time-of-flight sensors from the second group of sensors has a distinct sensor location at the wrist-wearable device (e.g., time-of-flight sensors 1466, 1468, and 1470 in FIG. 14B are disposed at distinct locations of the watch body 1402.

(A34) In some embodiments of any of A1-A33, the second group of sensors includes one or more time-of-flight sensors, and at least one of the one or more time-of-flight sensors is a photoelectric CMOS device.

(A35) In some embodiments of A34, the photoelectric CMOS device includes a sensor array. For example, the time-of-flight sensors 158 can include one CMOS sensor array that is configured to emit two or more of the rays 103, 105, and 107 in FIG. 1A.

(A36) In some embodiments of any of A1-A35, the method further includes, in accordance with detecting that the wrist-wearable device is further than the surface threshold distance from the physical surface, causing a power reduction to at least one sensor from the second group of sensors. In some embodiments, the power reduction includes restricting or disabling power to the at least one sensor. In some embodiments, the power reduction further includes reducing power to one or more processing or control circuits for the sensor(s). In some situations, reducing power in this way increases the battery life of the wrist-wearable device.

(A37) In some embodiments of A36, the at least one sensor receiving the power reduction is a time-of-flight sensor.

(A38) In some embodiments of any of A1-A37, the at least one sensor not in the first group of sensors is one of: a time-of-flight sensor, an EMG sensor, a camera (imaging) sensor, and an sEMG sensor.

(A39) In some embodiments of any of A1-A38, at least one sensor from one of the first group of sensors and the second group of sensors includes a shared electrode, where the shared electrode includes more than one sensing capability. For example, the sensor location 1436 in FIG. 14B can include a group of sensors 1437 and 1438, which can include two or more sensing capabilities.

(A40) In some embodiments of any of A1-A39, the method further includes, in response to detecting, using one or more of the first group of sensors and the second group of sensors of the wrist-wearable device, performance of a hybrid gesture that corresponds to an operation from a set of hybrid operations, causing the head-wearable device to perform the operation from the set of hybrid operations to update the presentation of the user interface, where the set of hybrid operations corresponds to hybrid gestures which include two or more of: a surface gesture portion, an in-air gesture portion, and a location-agnostic gesture portion. For example, a surface gesture portion of a hybrid gesture is detected by an EMG sensor and an in-air portion gesture portion of the hybrid gesture is detected by a time-of-flight sensor. For example, any combination of individual gestures described herein can be performed as part of the performance of a hybrid gesture (e.g., the surface gesture 128 in FIG. 1G and the location-agnostic gesture 130 in FIG. 1I).

(A41) In some embodiments of A40, the hybrid gesture further includes a physical-contact gesture portion, where the physical-contact gesture portion includes at least one contact with the physical surface. For example, a hybrid gesture includes a surface tap gesture portion followed by a pinch-and-flick gesture portion and corresponds to an operation to delete a user interface element (at the tap location).

(A42) In some embodiments of any of A1-A41, detecting the surface gesture further includes detecting, using an sEMG sensor (e.g., an sEMG sensor in the sensors 1258) from the second group of sensors, whether a user of the wrist-wearable device has transferred an electrical signal to the physical surface.

(B1) In another aspect, some embodiments include a method (e.g., the method 1000) of using time-of-flight sensors for gesture detection and content-rendering determinations in an artificial reality environment. The method is performed at a wearable device (e.g., the wearable device 1202) having memory (e.g., the memory 1206) and one or more processors (e.g., the processor(s) 1204). The method includes: (i) receiving data, from one or more time-of-flight sensors (e.g., the time-of-flight sensors 1218) communicatively-coupled with a wrist-wearable device (e.g., the wrist-wearable device 1400), about a physical surface, where the wrist-wearable device is communicatively-coupled with a head-wearable device (e.g., the AR system 1320) that is configured to display a virtual object (e.g., the virtual object 810) within an artificial-reality environment presented by the head-wearable device, and (ii) in accordance with a determination, based on the data, that the physical surface has a curved surface portion (e.g., the curved surface portion 806): (iii) causing display of at least a portion of the virtual object at the curved surface portion, including updating the display of the virtual object in accordance with the curved surface portion (e.g., as illustrated in FIG. 8B).

In some embodiments, the data from the one or more time-of-flight sensors indicates the distance of the wrist-wearable device from the surface. In some embodiments, the data from the one or more time-of-flight sensors indicate whether the surface is associated with an animate or inanimate object. In some embodiments, the data form the one or more time-of-flight sensors indicates whether the surface meets requirements (e.g., certain minimum dimensions) for displaying a virtual object. In some embodiments, the surface is the user's leg, palm, etc., or an inanimate object. In some embodiments, the inanimate object can be substantially planar such that its surface does not have a curved portion. In some embodiments, the surface can have distinct edges or other significant surface topology. In some embodiments, the surface is dynamic, meaning that it is moving or otherwise changing shape.

In some embodiments, at least one of the one or more time-of-flight sensors are pivotably coupled to the wrist-wearable device. In some embodiments, at least one of the one or more time-of-flight sensors is located at a different electronic device than the wrist-wearable device (e.g., head-wearable device 204 in FIG. 2). In some embodiments, the data about a distance of the wrist-wearable device away from a surface is based on data from more than one time-of-flight sensors. In some embodiments, that the wrist-wearable device includes more than time-of-flight sensor having distinct angles of projection from the wrist-wearable device. In some embodiments, the data from one or more time-of-flight sensors is from at least one time-of-flight sensor at a different electronic device (e.g., the head-wearable device or a smartphone). In some embodiments, a semiconductor-based time-of-flight sensor is used.

In some embodiments, taking the curved surface portion into account includes determining a surface topology by performing time-of-flight measurements at a predefined range of launch angles from time-of-flight sensors of a wrist-wearable device (as shown in FIG. 1A). In some embodiments, time-of-flight sensors sweep through a predefined range of angles, to determine a time of flight at various locations along an identified surface. In some embodiments, only the portion of the surface that can be accurately detected by the time-of-flight sensors is used for the display of the virtual object. In some embodiments, the accuracy threshold for the time-of-flight sensors depends on a location's corresponding relative location of the display of the virtual object.

(B2) In some embodiments of B1, the virtual object corresponds to one of a plurality of potentially-displayed virtual objects and determining which of the plurality of potentially-displayed virtual objects to display depends on one or more surface criteria of the curved surface portion. For example, multiple virtual objects corresponding to a same functionality but having different visual appearance. The virtual object of the multiple virtual objects can be selected based on properties of the surface (e.g., angle, size, and orientation). In some embodiments, the surface properties are determined based on data from one or more sensors (e.g., EMG, sEMG, imaging, and time-of-flight sensors) of a wearable device.

(B3) In some embodiments of B2, at least one of the one or more surface criteria is a surface angle of the curved surface portion. For example, the virtual object is selected based on an assessment of relative visibility (as compared to other potentially-displayed virtual objects) given the surface properties. In some embodiments, the surface angle is determined based on data from one or more time-of-flight sensors.

(B4) In some embodiments of B3, in accordance with a determination that the surface angle is greater than a keyboard-display threshold angle (e.g., an angle greater than 30, 50, or 70 degrees), displaying a virtual object including device controls, including at least one slider element (e.g., the two-dimensional volume control affordance 532), and in accordance with a determination that the surface angle is less than a keyboard-display threshold angle, displaying a virtual object including at least one virtual keyboard element.

(B5) In some embodiments of any of B2-B4, at least one of the one or more surface criteria is a surface area of the curved surface portion. For example, a virtual object with relatively small dimensions (as compared to other potential virtual objects) is selected when the surface area of the curved portion is determined to be small.

(B6) In some embodiments of any of B1-B5, the method further includes prompting a user of the wrist-wearable device to adjust at least one of a wrist-position or a wrist-angle of the wrist-wearable device to capture data from the one or more time-of-flight sensors about the curved surface portion in order to display the portion of the virtual object at the curved surface portion. For example, in response to a user requesting display of a virtual object, a wearable device identifies the curved surface portion as a potential surface for displaying the virtual object. However, before the wearable device requires more information about the curved surface portion in order properly display the virtual object. Therefore, the wearable device requests that the user adjust its location such that the time-of-flight sensor(s) can collect data about the curved surface portion.

(B7) In some embodiments of any of B1-B6, the method further includes causing display of information at the head-wearable device about one or more real-world properties of the physical surface. For example, when the user changes to the gaze direction 830 in FIG. 8B, in addition to displaying the virtual object on the curved surface portion 806, the head-wearable device can also be caused to display a current temperature of the surface at the curved surface portion 806.

(B8) In some embodiments of B7, the information about at least one of the one or more real-world properties of the physical surface includes at least one visual aspect of the physical surface. For example, the head-wearable device 804 in FIG. 8B can be caused to display a color of the material on the surface of the curved surface portion 806.

(B9) In some embodiments of B8, the at least one visual aspect of the physical surface includes textual content contained at the physical surface. In an example according to some embodiments, the user is writing on a notepad or tablet, and wishes to display the content at the head-wearable device or transmit it to a device of another user.

(B10) In some embodiments of any of B1-B 9, the method further includes determining whether a wrist-height of the wrist-wearable device is within a display-activation threshold distance of the curved surface portion, and, in response to a determination that the wrist-height of the wrist-wearable device is further than the display-activation threshold distance of the curved surface portion, hiding the display of the virtual object. In some embodiments, the display-activation threshold distance is the surface threshold distance. In some embodiments, the display-activation threshold distance is the in-air threshold distance. In some embodiments, the display-activation threshold distance corresponds to a reach distance of the user (e.g., 1 foot, 2 feet, or 3 feet). For example, the virtual object is hidden when the surface is too far away for the user to reach without walking in that direction.

(B11) In some embodiments of any of B1-B10, the method further includes displaying a second virtual object separate from the curved surface portion, the second virtual object including a virtual screen element, and, in response to detecting a gesture at the virtual object at the curved surface portion, displaying a visual indicator of a gesture location of the gesture on the virtual screen element of the second virtual object (e.g., as described above with reference to FIG. 8C).

(B12) In some embodiments of B11, the gesture is a first gesture, and the method further includes, in response to detecting a second gesture at the virtual object at the curved surface portion, updating the visual indicator of the gesture location on the virtual screen element. For example, the virtual object 320 in FIG. 3B includes a virtual screen element with an interactive display portion 326.

(B13) In some embodiments of B12, the first gesture and the second gesture are at distinct locations of the virtual object at the curved surface portion (e.g., at distinct affordances within the virtual object).

(B14) In some embodiments of any of B11-B12, updating the visual indicator of the gesture location further includes switching between virtual applications at the virtual screen element (e.g., switching content streams displayed at the virtual screen element).

(B15) In some embodiments of any of B1-B14, the method further includes, in response to a determination that the wrist-position of the wrist-wearable device is further than an interaction threshold distance from a surface-contact region of the curved surface portion, turning off a sensor of the wrist-wearable device.

(B16) In some embodiments of B15, the sensor includes one or more of EMG sensing capabilities and time-of-flight sensing capabilities. For example, the various sensor locations shown in FIG. 14B can include more than one sensor, including one or more EMG sensors and one or more time-of-flight sensors, and/or a shared sensor that includes both capabilities. In some embodiments, the system does not include EMG sensors, and detections described previously as being performed by EMG sensors are instead performed by one or more of the IMU sensors (e.g., IMU sensors 160) and/or camera sensors 164.

(B17) In some embodiments of any of B1-B16, determining that the physical surface has a curved surface portion includes determining a topology of the physical surface (e.g., using one or more time-of-flight sensors as described above with reference to FIG. 1A).

(B18) In some embodiments of any of B1-B17, the physical surface includes at least a first side and a second side, and the curved surface portion includes a surface edge between the first side and the second side, and at least a portion of the virtual object is displayed at the first side, and at least a portion of the virtual object is displayed at the second side.

(B19) In some embodiments of any of B1-B18, the method further includes causing display of at least a portion of the virtual object at a separate location from the curved surface portion. For example, a first portion of the virtual object (e.g., a virtual screen element) can be displayed in the air above the surface portion while a second portion of the virtual object (e.g., one or more affordances) are displayed at the curved surface portion.

(B20) In some embodiments of any of B19, the method further includes detecting a gesture having a first gesture portion and a second gesture portion, where the first gesture portion is directed to the portion of the virtual object at the curved surface portion, the second gesture portion is directed to the portion of the virtual object at the separate location from the curved surface portion, and a first operation corresponds to the first gesture portion, and a second operation corresponds to the second gesture portion. For example, the user can perform a gesture at a physical surface that has a curved surface portion, where a first portion of the gesture is performed at the curved surface portion, and a second portion of the gesture occurs at a location that is separate from the curved surface portion. The first portion of the gesture that occurs at the curved surface portion can cause an operation to be performed accounting for the curved surface portion, and second portion of the gesture that does not occur at the curved surface portion can cause an operation to be performed from a second set of operations corresponding to surface gestures, that does not account for the curved surface portion.

(B21) In some embodiments of any of B1-B20, the curved surface portion corresponds to a portion of a user's body. For example, when the user 601 performs the gestures on the user's palm in FIGS. 6B-6C, time-of-flight sensors at the wrist-wearable device 602 can determine that the user's palm has a curved surface portion.

(C1) In one aspect, some embodiments include a method (e.g., the method 1100) of using time-of-flight sensors for gesture detection and content-rendering determinations in an artificial reality environment. The method is performed at a wearable device (e.g., the wearable device 1602) having memory (e.g., the memory 1606) and one or more processors (e.g., the processor(s) 1604). The method includes: (i) detecting, based on data from a first group of sensors of a wrist-wearable device, that a user of the wrist-wearable device is within an activation threshold distance of an electronic device that is responsive to user gestures (e.g., the electronic device 770); (ii) while the user is within the activation threshold distance of the electronic device, detecting, using a second set of sensors of the wrist-wearable device, a user gesture that corresponds to an operation at the electronic device; and (iii) in response to detecting the user gesture, causing the electronic device to perform the operation (e.g., as illustrated in FIG. 7A).

(C2) In some embodiments of C1, the method further includes providing an indication to the user that the user gesture is available at the electronic device. In some embodiments, the indication is provided at a head-wearable device, or another connected device. In some embodiments, the indication is a notification at the wrist-wearable device. In some embodiments, the indication is an audio signal at a headphone device. In some embodiments, the indication is a notification at the wrist-wearable device. In some embodiments, the indication is an audio signal at a headphone device. For example, in FIG. 5B, the user receives an audio notification 511 indicating to the user 501 that they are in proximity to electronic device 570 and that gestures are available for performing operations at the electronic device 570 based on the user 501 being in proximity to the electronic device 570.

(C3) In some embodiments of C2, the indication provided to the user that the user gesture is available includes a haptic event at one or more of the wrist-wearable device, a head-wearable device, and another connected device. For example, when the user 501 changes their gaze direction to gaze direction 568 in FIG. 5B, an audio notification 511 is provided at the head-wearable device 504.

(C4) In some embodiments of any of C1-C3, the gesture includes movement from a first location to a second location. For example, the gesture 542 in FIG. 5B is an in-air gesture including movement from a first location at the beginning of the gesture 542 to a second location at the end of the gesture 542.

(C5) In some embodiments of any of C1-C4, a haptic event is produced (e.g., via the haptic controller 1490) at the wrist-wearable device in response to detecting the user gesture. For example, the haptic event can be provided at the wrist-wearable device 502 in FIG. 5C when the virtual object 520 is within an accessible distance for performing user inputs.

(C6) In some embodiments of any of C4-05, an intermediate haptic event is produced at the wrist-wearable device between the first location and the second location of the gesture. In some embodiments, the intermediate haptic event corresponds to a discrete change to a control option of the electronic device. For example, the user can perform a gesture that causes an operation to be performed at an electronic device to change the volume of the speaker at the electronic device. The user's gesture can change the volume of the speaker by more than one discrete volume level. When the user's gesture causes the volume of the speaker to change by the first volume level, the wrist-wearable device and/or the head-wearable device can cause a haptic event to be provided to the user indicating to the user that the volume of the speaker has changed by the first volume level.

(C7) In some embodiments of any of C1-C6, the method further includes detecting, based on data from a head-wearable device that the user is oriented in a first gaze direction relative to the electronic device, and in response to the detecting of the user gesture, before causing the electronic device to perform the operation, determining if the first gaze direction is within an activation threshold angle (e.g., 90 degrees, 60 degrees, or 30 degrees) of the electronic device. In some embodiments, the activation threshold angle corresponds to an angle at which the user is able to view the electronic device.

(C8) In some embodiments of C7, the method further includes detecting, based on data from the head-wearable device, that the user has changed orientations such that the user has a second gaze direction relative to the electronic device. For example, in FIGS. 5A-5B the user 501 changes their gaze direction from the gaze direction 566 to the gaze direction 568. When the user is oriented towards the gaze direction 566, the head-wearable device 504 determines that the gaze direction 566 is not within a predefined threshold angle of the electronic device 570, and therefore does not show the virtual object 520. But the same sequence could occur in reverse as recited in operation 1138.

(C9) In some embodiments of any of C1-C8, the method further includes displaying at the head-wearable device a virtual object of a user interface of an artificial-reality environment, where the virtual object includes a user interface element for controlling the electronic device, and in response to detecting the user gesture, updating the display of the virtual object. For example, in FIGS. 5D-5E, the user 501 performs gestures 546 and 548 to select songs at the virtual object 520 that causes the display of the virtual object to be updated based on the performance of the respective gestures.

(C10) In some embodiments of C9, updating the display of the virtual object includes providing an artificial-reality animation of the virtual object traveling toward the electronic device and then hiding the virtual object in the user interface of the artificial-reality environment.

(C11) In some embodiments of any of C1-C10, the electronic device is an adjustable light source, and the user gesture corresponds to an operation to adjust a brightness of the adjustable light source. For example, in FIG. 5C, when the user performs the in-air gesture 544, the virtual object 520 is caused by the head-wearable device to animate in a movement towards the user 501.

(C12) In some embodiments of C11, the method further includes displaying a virtual object near the adjustable light source, and in response to the user gesture to adjust the brightness of the adjustable light source, updating the display of the virtual object near the adjustable light source. For example, the virtual object 722 in FIG. 7E can be a virtual object and displays the brightness shown in the virtual object 722 can correspond to a brightness of the electronic device 772, which can be caused to update when the user 701 performs a gesture directed to the electronic device 772 (e.g., the in-air gesture 744 in FIG. 7C).

(C13) In some embodiments of any of C1-C10, the electronic device is a speaker, and the operation performed at the speaker adjusts a volume control of the speaker. For example, the electronic device 770 has a speaker that is playing music in FIG. 7C.

(C14) In some embodiments of any of C1-C13, the method further includes detecting, based on data from the second set of sensors of the wrist-wearable device, a second user gesture that corresponds to second operation at the electronic device, and in response to detecting the second user gesture, performing the second operation. For example, FIGS. 6B-6C show the user 601 performing two surface gestures at the user's palm (surface gesture 642 and surface gesture 644, respectively), which correspond to two different operations that can be performed at the electronic device 670. Specifically, when the user 601 performs the surface gesture 642 in FIG. 6B, the volume of the music playing from the electronic device 670 is adjusted based on an operation that corresponds to the surface gesture 642. And when the user 601 performs the surface gesture 644 in FIG. 6C, the song playing at the electronic device 670 is adjusted based on an operation that corresponds to the surface gesture 644, which is a virtual swipe gesture in a direction distinct from the direction of the surface gesture 642.

(D1) In one aspect, some embodiments include a method (e.g., the method 1600) of controlling a user interface object in an artificial-reality environment. The method is performed at a wearable device (e.g., the wearable device 1202) having memory (e.g., the memory 1206) and one or more processors (e.g., the processor(s) 1204). The method includes: (i) while a user interface object is in focus at a user interface presented to a user via a head-wearable device: (ii) receiving an indication, from a wrist-wearable device that includes an imaging sensor, of a performance of an in-air hand gesture that includes movement of a hand of the user in a direction relative to a starting position of the hand of the user, where (a) the imaging sensor is facing towards the hand of the user while the wrist-wearable device is worn by the user, and (b) the movement is detected based on data from the imaging sensor included on the wrist-wearable device; (iii) in response to the indication, controlling the user interface object presented to the user via the head-wearable device in accordance with determining the movement of the hand of the user, where the controlling of the user interface object is based on the direction of the movement relative to the starting position of the hand of the user.

(D2) In some embodiments of D1, the in-air hand gesture is a second in-air hand gesture, and the indication is a second indication, and the method further includes, before presenting the user interface to the user at the head-wearable device, receiving a first indication, from the wrist-wearable device, of a performance of a first in-air hand gesture that includes a rotation of the wrist of the user (e.g., the hand rotation 1570 shown in FIG. 15C, and/or the hand rotation 1572 shown in FIG. 15D), the rotation being of at least a threshold angular range (e.g., the rotation angle 1550 can be an example of a rotation having at least the threshold angular range), where the rotation is detected by the imaging sensor facing toward the hand of the user, and in response to the first indication, causing the user interface object to be displayed within the user interface presented at the head-wearable device.

(D3) In some embodiments of D1-D2, no EMG sensor is used to detect the in-air hand gesture. For example, as discussed with respect to the operation 1620 in FIG. 16A, any or all of the operations performed with respect to FIGS. 15A-15V can be detected without any EMG sensors. Instead, one or more of vibration sensors, impedance sensors, IMU sensors, and/or imaging sensors can be used to detect the respective gestures that are detected without using any EMG sensors.

(D4) In some embodiments of D1-D3, in addition to the direction of the movement, the controlling of the user interface object is further based on an amount associated with the movement, wherein the amount associated with the movement is one of a distance of the movement, a speed of the movement, or a period of time during which the movement takes place. For example, the scroll movement 1544 within the scrollable user interface element 1538 in FIG. 15R can be based on an amount associated with the hand rotation 1588 of the in-air hand gesture. That is, the amount of the scroll movement 1544 can correspond to the speed with which the user performs the hand rotation 1588, the angular rotation of the hand rotation 1588, and/or a duration that the user 1501 holds the hand rotation 1588 before returning the hand to the starting location. The amount can also be associated with a force applied during a pinch gesture.

(D5) In some embodiments of D1-D4, the method further includes, before receiving the indication about the performance of the in-air hand gesture, detecting, using the imaging sensor, that the hand of the user is in a first location that corresponds to an acceptable starting position, and based on detecting that the hand of the user is in the acceptable starting position, providing a visual notification to the user that the hand of the user is in the acceptable starting position, and that in-air hand gestures are available for controlling the user interface object. For example, the position in the hand 1503 in FIG. 15B can be an acceptable starting position of the hand 1503 for performing gestures that cause operations to be performed at a user interface. In some embodiments, a user interface element, haptic event, and/or audio event can be provided as an indication to the user that the user's hand is in an acceptable starting position to begin performing in-air hand gestures.

(D6) In some embodiments of D1-D5, the method further includes, after controlling the user interface object based on the movement of the hand of the user, a first option of a plurality of available options of the user interface object is in focus, while the first option is in focus, detecting, using one or more sensors of the wrist-wearable device that are not EMG sensors, a pinch gesture that includes a contact between a thumb of the user and an index finger of the user, the contact having at least a predefined pinch intensity, and based on detecting the pinch gesture, performing an action associated with the user interface object. For example, in FIG. 15J, the location-agnostic gesture 132 shown in FIG. 1J can be performed while the virtual object 118 is presenting a plurality of user interface to the user, and the location-agnostic gesture 132 can cause an option corresponding to a location of a focus selector user interface element (e.g., the focus selector user 1512) to be selected. In some embodiments, the selection causes another user interface element corresponding to a different application to be presented.

(D7) In some embodiments of D6, the controlling of the user interface object based on the movement of the hand of the user includes moving between the plurality of available options of the user interface object. For example, the sequence shown by FIGS. 15E-15F shows the user performing a hand rotation 1574 that causes the focus selector 1512 to move from the selectable option user interface element 1514-*a* to the different selectable option user interface element 1514-*d*.

(D8) In some embodiments of D7, the user interface object is a circular menu user interface object, and the in-air hand gesture is a hand-waving gesture that causes a focus selector to move circumferentially around the circular menu user interface object. For example, the hand rotation 1574 shown in FIG. 15F can cause the focus indicator 1516 to move in clockwise or counterclockwise rotational motion around the circular user interface object 1510, instead of in cardinal direction that corresponds to the direction of the hand rotation 1574.

(D9) In some embodiments of D1-D8, the in-air hand gesture includes a pivoting motion of a wrist of the user in the direction relative to the starting position of the hand of the user, while an arm of the user that includes the wrist-wearable device is extended downward by a side of the user. For example, any of the hand rotations and/or pinch gestures shown with respect to FIGS. 15A-15V can be performed while the user's hand is extended downward by the user's side. In some embodiments, the user can configure the wrist-wearable device to detect subtle hand gestures (e.g., via high-sensitivity settings that can detect a user gesture that is not visibly perceptible from a short distance away from the user).

(D10) In some embodiments of D1-D9, data from one or more sensors included on the wrist-wearable device is calibrated such that respective weightings are applied to respective sensors based on user criteria. For example, a direction and or amount of movement of user interface object (e.g., the focus selector 1512 shown in FIGS. 15A-15V can be based on a calibration that is performed when the user begins wearing a wearable electronic device, such a wrist-wearable electronic (e.g., the wrist-wearable device 1502) device or a head-wearable electronic device (e.g., the head-wearable device 1504).

(D11) In some embodiments of D1-D10, the indication is a first indication, and the in-air hand gesture is a first in-air hand gesture, and the method further includes receiving a second indication, from the wrist-wearable device, of a performance of a second in-air hand gesture, distinct from the first in-air hand gesture, and in response to the second indication, causing an operation to be performed distinct from the controlling of the user interface object caused by the first indication.

(D12) In some embodiments of D11, the movement corresponding to the first in-air hand gesture is in a first direction relative to the user, and the controlling of the user interface object in response to the first indication includes moving a location of a selector within the user interface object, and another movement corresponding to the second in-air hand gesture is in a second direction relative to the user, wherein the second direction is substantially orthogonal to the first direction, and the operation performed in response to the second indication causes another user interface object displayed, distinct from the user interface object that is controlled by the first in-air hand gesture.

(D13) In some embodiments of D11, the first in-air hand gesture causes the user interface object to move in a direction that corresponds to a direction of the movement of the hand of the user during the first in-air hand gesture, and the second in-air hand gesture is a pinch gesture, that includes a contact between a thumb of the user and another finger of the user, and the operation performed in response to the second indication causes an image to be captured by a camera at the wrist-wearable device or the head-wearable device.

(D14) In some embodiments of D1-D13, the wrist-wearable device includes one or more sensors distinct from the imaging sensor, the one or more sensors including an IMU sensor and a vibration sensor, the in-air hand gesture is detected by the IMU sensor, and another in-air hand gesture, distinct from the in-air hand gesture is detected by the vibration sensor.

(D15) In some embodiments of D14, the method further includes another in-air hand gesture that includes a wrist movement and a pinch gesture, wherein the wrist movement is detected using the IMU sensor and the pinch gesture is detected using the vibration sensor.

In some embodiments, one or more of the gestures described above (e.g., with respect to A1-D15) are detected with an optical sensor (e.g., a camera) or sensors associated with an inertial measurement unit (IMU) rather than (or in addition to, via fusing the sensor inputs to detect the various in-air hand gestures described herein) the one or more neuromuscular-signal sensors. In some embodiments, the one or more gestures described above (e.g., with respect to A1-D15) are replaced with gestures performed by other parts of the user's body (e.g., head gestures, leg gestures, or torso gestures). As one example, the in-air hand gesture used to activate a text-modification mode can be a nod of user's head, which can be detected using one or more of neuromuscular-signal sensors, data from an IMU, and cameras; as another example, the deletion gesture described above can be a shaking of the user's head (as if the user is indication "No"). In some embodiments, the wearable device detects neuromuscular signals travelling through the user's neck or back, which can be done using neuromuscular-signal sensors coupled with the VR goggles or the AR glasses in some example embodiments. In some embodiments, the one or more gestures described above (e.g., with respect to A1-D15) are replaced with (or performed using) in-air hand gestures on a controller (e.g., a handheld controller or foot pedal controller). In some embodiments, the one or more in-air hand gestures described above (e.g., with respect to A1-D15) are replaced with audio commands (e.g., spoken word commands or non-word commands such as a tongue click).

In another aspect, some embodiments include an artificial-reality system including one or more processors and memory coupled to the one or more processors, the memory storing one or more programs configured to be executed by the one or more processors, the one or more programs including instructions for performing any of the methods described herein (e.g., methods 900, 1000, 1100, and/or A1-D15 above).

In yet another aspect, some embodiments include a non-transitory computer-readable storage medium storing one or more programs for execution by one or more processors of an artificial-reality system, the one or more programs including instructions for performing any of the methods described herein (e.g., methods 900, 1000, 1100, and/or A1-D15 above).

As one of skill in the art will appreciate, aspects of the method 1600 can be combined and/or replaced with aspects of any of the methods 900, 1000, and/or 1100. For example, one or more of the hand gestures described with respect to the operations 1606, 1616, and/or 1632 can be examples of gestures described with respect to the operations 920, 930, and/or 1102. And the controlling of the user interface object described with respect to the operation 1622 can be based on a determination, as described with respect to the method 900, of whether the in-air hand gesture is within a first threshold distance of a physical surface that corresponds in near-surface gestures, and/or a second threshold distance of the physical surface that corresponds to in-air hand gestures. In some embodiments, the in-air hand gesture described with respect to the method 2100 can be determined to be a location-agnostic gesture that is not dependent on where the gesture was performed relative to a physical surface but can be based on whether the gesture was performed in proximity to an electronic device that is responsive to user inputs, as described by the operation 1102 of the method 1100.

As one example, in some embodiments, the operation 1606 corresponding to a first in-air hand gesture that includes a rotation of a wrist of a user, can also correspond the operations 1102, 1108, and 1116, and can cause an operation to be performed at an electronic device that includes a speaker. In some embodiments, a roll gesture as described by the operation 1606 (e.g., a gesture that includes one or more of the hand rotations 1570 and 1572) can cause a user interface to be displayed near the electronic device with the speaker (e.g., the virtual object 720 shown in FIG. 7E). After the user interface is displayed, the user can perform an operation corresponding to the operation 1616, that includes movement of a hand of the user in a direction relative to the starting position of the user's hand (e.g., the hand rotation 1576, in a forward direction relative to the user). The hand movement corresponding to the operation 1616 in FIG. 16A can also correspond to the operation 1116, that is, it causes a volume level to be adjusted at the speaker of the electronic device. Further, the amount that the volume level is adjusted based on the operation 1116 can correspond to an amount associated with the movement as described by the operation 1626. The amount can be associated with a speed of the movement, a distance of the movement, and/or a period of time during which the movement takes place.

As another example, any of the user interface elements described with respect to FIGS. 15A-15V (e.g., the user interface element 1538 described with respect to FIG. 15Q) and/or modifications thereof can be displayed at or near a physical surface having a curved surface portion (e.g., a physical surface having curvature, texture, and/or other topographical features). In an example where such a user interface element is displayed, the presentation of the user interface element can be adjusted based on the curved surface portion of the physical surface, as shown with respect to the virtual object 810 in FIG. 8C.

While text terms are used as a primary illustrative example herein, the skilled artisan will appreciate upon reading this disclosure that the inventive techniques discussed herein can also be used to allow for neuromuscular gesture control of additional types of inputs, including graphical inputs (such as images included near any of the text terms, or emojis), attachment-type inputs (e.g., document attachments), and many other types of inputs that can be provided at wearable devices in addition to text-based inputs.

Any data collection performed by the devices described herein and/or any devices configured to perform or cause the performance of the different embodiments described above in reference to any of the figures discussed above is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. can be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
    while an artificial-reality environment that includes a virtual object for controlling a physical electronic device is being presented to a user by a head-wearable device, distinct from the physical electronic device:
        in accordance with determining that the user is within a first activation-threshold distance for controlling the physical electronic device, causing an indication to be provided, via the head-wearable device, indicating that one or more gestures are available for controlling the physical electronic device;
        detecting, based on data from a first group of sensors of a wrist-wearable device worn by the user, wherein the first group of sensors includes a depth sensor, and does not include any biopotential-signal sensors, that the wrist-wearable device is within the first activation-threshold distance of the physical electronic device that is responsive to user gestures and is also within a second activation-threshold distance of the virtual object for controlling the physical electronic device, wherein the physical electronic device is represented within the artificial-reality environment that includes the virtual object for controlling the physical electronic device;
        while the wrist-wearable device is within the first activation-threshold distance of the physical electronic device and is also within the second activation-threshold distance of the virtual object for controlling the physical electronic device, determining, based at least in part on data from a second group of sensors of the wrist-wearable device, wherein the second group of sensors includes a biopotential-signal sensor, and does not include any depth sensors, that a user gesture corresponds to an operation at the physical electronic device; and
        in response to determining that the user gesture corresponds to the operation at the physical electronic device, causing the physical electronic device to perform the operation and updating the virtual object based on performance of the operation.

2. The method of claim 1, further comprising:
    determining, based on data received from the head-wearable device, that the user is oriented such that the user has a first gaze direction, wherein the first gaze direction is within a threshold angular range of a first direction between a location of the user and a location of the physical electronic device; and
    in accordance with detecting a user gesture while the first gaze direction of the user is within the threshold angular range of the first direction, causing the operation to be performed at the physical electronic device.

3. The method of claim 2, further comprising:
    determining, based on data received from the head-wearable device, that the user has changed orientations such that the user has a second gaze direction, wherein the second gaze direction is not within the threshold angular range of the first direction to the physical electronic device relative to the location of the user; and
    forgoing providing an indication to the user that the user gesture is available at the physical electronic device in accordance with the user having the second gaze direction.

4. The method of claim 3, further comprising:
    in accordance with determining that the second gaze direction is within the threshold angular range of a second direction to a second physical electronic device relative to the location of the user:
        causing a second indication to be provided, via the head-wearable device, indicating that one or more gestures, detectable by the second group of sensors, are available for causing operations to be performed at the second physical electronic device.

5. The method of claim 1, further comprising:
    detecting, based on data from the second group of sensors of the wrist-wearable device, a second user gesture, distinct from the user gesture, that corresponds to a second operation at the physical electronic device, distinct from the operation; and
    in response to detecting the second user gesture, causing the second operation to be performed at the physical electronic device.

6. The method of claim 5, further comprising:
    detecting, based on data from the second group of sensors of the wrist-wearable device, a third user gesture, the third user gesture having a same hand movement as the user gesture, that corresponds to a third operation at the physical electronic device, distinct from the operation, wherein:
        the user gesture is a surface gesture within a surface threshold distance of a physical surface, and
        the third user gesture is an in-air gesture beyond the surface threshold distance of the physical surface.

7. The method of claim 1, wherein determining that the user is within the first activation-threshold distance of the physical electronic device further includes determining that the user is in a same room as the physical electronic device.

8. The method of claim 1, wherein the user gesture comprises movement from a first location to a second location.

9. The method of claim 8, further comprising:
    during the movement from the first location to the second location:
        providing an intermediate haptic event at the wrist-wearable device, the intermediate haptic event indicating that the movement between the first location and the second location corresponds to the user gesture.

10. The method of claim 1, wherein updating a display element of the virtual object comprises:
    providing an artificial-reality animation of the virtual object toward the physical electronic device; and
    ceasing to display the virtual object.

11. The method of claim 1, wherein:

the physical electronic device is an adjustable light source; and the user gesture corresponds to an operation to adjust a brightness of the adjustable light source.

12. The method of claim 11, further comprising:
displaying the virtual object near the adjustable light source; and
in response to the user gesture to adjust the brightness of the adjustable light source, updating the display of the virtual object near the adjustable light source.

13. The method of claim 1, wherein:
the physical electronic device is a speaker; and
the operation performed at the speaker adjusts a volume control of the speaker.

14. An electronic device, comprising:
one or more processors; and
memory, comprising instructions, which, when executed by the one or more processors, cause the electronic device to perform operations for:
while an artificial-reality environment that includes a virtual object for controlling a physical electronic device is being presented to a user by a head-wearable device, distinct from the physical electronic device:
in accordance with determining that the user is within a first activation-threshold distance for controlling the physical electronic device, causing an indication to be provided, via the head-wearable device, indicating that one or more gestures are available for controlling the physical electronic device;
detecting, based on data from a first group of sensors of a wrist-wearable device worn by the user, wherein the first group of sensors includes a depth sensor, and does not include any biopotential-signal sensors, that the wrist-wearable device is within the first activation-threshold distance of the physical electronic device that is responsive to user gestures and is also within a second activation-threshold distance of the virtual object for controlling the physical electronic device, wherein the physical electronic device is represented within the artificial-reality environment that includes the virtual object for controlling the physical electronic device;
while the wrist-wearable device is within the first activation-threshold distance of the physical electronic device and is also within the second activation-threshold distance of the virtual object for controlling the physical electronic device, wherein the second group of sensors includes a biopotential-signal sensor, and does not include any depth sensors, determining, based at least in part on data from a second group of sensors of the wrist-wearable device, that a user gesture corresponds to an operation at the physical electronic device; and
in response to determining that the user gesture corresponds to the operation at the physical electronic device, causing the physical electronic device to perform the operation and updating the virtual object based on performance of the operation.

15. A non-transitory computer-readable storage medium, comprising instructions, which when executed by one or more processors of an electronic device, cause performance of operations for:
while an artificial-reality environment that includes a virtual object for controlling a physical electronic device is being presented to a user by a head-wearable device, distinct from the physical electronic device:
in accordance with determining that the user is within a first activation-threshold distance for controlling the physical electronic device, causing an indication to be provided, via the head-wearable device, indicating that one or more gestures are available for controlling the physical electronic device;
detecting, based on data from a first group of sensors of a wrist-wearable device worn by the user, wherein the first group of sensors includes a depth sensor, and does not include any biopotential-signal sensors, that the wrist-wearable device is within the first activation-threshold distance of the physical electronic device that is responsive to user gestures and is also within a second activation-threshold distance of the virtual object for controlling the physical electronic device, wherein the physical electronic device is represented within the artificial-reality environment that includes the virtual object for controlling the physical electronic device;
while the wrist-wearable device is within the first activation-threshold distance of the physical electronic device and is also within the second activation-threshold distance of the virtual object for controlling the physical electronic device, determining, based at least in part on data from a second group of sensors of the wrist-wearable device, wherein the second group of sensors includes a biopotential-signal sensor, and does not include any depth sensors, that a user gesture corresponds to an operation at the physical electronic device; and
in response to determining that the user gesture corresponds to the operation at the physical electronic device, causing the physical electronic device to perform the operation and updating the virtual object based on performance of the operation.

16. The non-transitory computer-readable storage medium of claim 15, comprising:
determining, based on data received from the head-wearable device, that the user is oriented such that the user has a first gaze direction, wherein the first gaze direction within a threshold angular range of a first direction between a location of the user and a location of the physical electronic device; and
in accordance with detecting a user gesture while the first gaze direction of the user is within the threshold angular range of the first direction, causing the operation to be performed at the physical electronic device.

* * * * *